US012490008B2

(12) United States Patent
Fu et al.

(10) Patent No.: US 12,490,008 B2
(45) Date of Patent: Dec. 2, 2025

(54) HEADPHONES

(71) Applicant: SHENZHEN SHOKZ CO., LTD., Guangdong (CN)

(72) Inventors: Junjiang Fu, Shenzhen (CN); Yueqiang Wang, Shenzhen (CN); Chaojie Cui, Shenzhen (CN); Lei Zhong, Shenzhen (CN); Zhi Cai, Shenzhen (CN); Yingying Zhang, Shenzhen (CN); Weihua Zhou, Shenzhen (CN); Piyou Cheng, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 77 days.

(21) Appl. No.: 18/544,394

(22) Filed: Dec. 18, 2023

(65) Prior Publication Data

US 2024/0137687 A1 Apr. 25, 2024

Related U.S. Application Data

(63) Continuation of application No. PCT/CN2022/120667, filed on Sep. 22, 2022.

(30) Foreign Application Priority Data

Oct. 22, 2021 (CN) ........................ 202111232608.3

(51) Int. Cl.

*H04R 1/10* (2006.01)
*H04R 1/22* (2006.01)
(Continued)

(52) U.S. Cl.

CPC ......... *H04R 1/1016* (2013.01); *H04R 1/1008* (2013.01); *H04R 1/1041* (2013.01);
(Continued)

(58) Field of Classification Search

None
See application file for complete search history.

(56) References Cited

U.S. PATENT DOCUMENTS 4,551,584 A 11/1985 Mathiasen
9,807,520 B2 10/2017 Inagaki
(Continued)

FOREIGN PATENT DOCUMENTS

CA 3103583 A1 12/2019
CN 106954150 A 7/2017
(Continued)

OTHER PUBLICATIONS

The Notice of Preliminary Rejection in Korean Application No. 10-2024-7012130 mailed on Apr. 18, 2025, 12 pages.
(Continued)

*Primary Examiner* — Qin Zhu
(74) *Attorney, Agent, or Firm* — METIS IP LLC

(57) ABSTRACT

The present disclosure mainly relates to a headphone. The headphone may include a supporting assembly and a core module connected with the supporting assembly. The supporting assembly may be configured to support the core module to be worn at a wearing position. The core module may include a core housing, a transducer device, and a vibration panel. The transducer device may be provided in a accommodating cavity of the core housing, and the vibration panel may be connected with the transducer device and configured to transmit a mechanical vibration generated by the transducer device to a user.

20 Claims, 25 Drawing Sheets

(51) Int. Cl.

| | |
|---|---|
| ***H04R 1/28*** | (2006.01) |
| ***H04R 1/34*** | (2006.01) |
| ***H04R 5/027*** | (2006.01) |
| ***H04R 5/033*** | (2006.01) |
| ***H04R 9/02*** | (2006.01) |
| ***H04R 9/04*** | (2006.01) |
| ***H04R 9/06*** | (2006.01) |

(52) U.S. Cl.

CPC ........... *H04R 1/105* (2013.01); *H04R 1/1058* (2013.01); *H04R 1/1075* (2013.01); *H04R 1/22* (2013.01); *H04R 1/2811* (2013.01); *H04R 1/345* (2013.01); *H04R 5/0335* (2013.01); *H04R 9/025* (2013.01); *H04R 9/045* (2013.01); *H04R 9/06* (2013.01); *H04R 2201/105* (2013.01); *H04R 2400/11* (2013.01); *H04R 2460/13* (2013.01)

(56) References Cited

U.S. PATENT DOCUMENTS

| | | | | |
|---|---|---|---|---|
| 10,104,463 | B2 | 10/2018 | Kim et al. | |
| 10,609,496 | B2 | 3/2020 | Liao et al. | |
| 11,166,094 | B2 | 11/2021 | Li et al. | |
| 11,310,601 | B2 | 4/2022 | Zheng et al. | |
| 12,413,897 | B2 | 9/2025 | Linghu et al. | |
| 2007/0041595 | A1 | 2/2007 | Carazo et al. | |
| 2007/0053536 | A1 | 3/2007 | Westerkull | |
| 2010/0316235 | A1 | 12/2010 | Park et al. | |
| 2013/0156248 | A1 | 6/2013 | Nakajima | |
| 2015/0319526 | A1 | 11/2015 | Kunimoto et al. | |
| 2016/0086458 | A1* | 3/2016 | Biggs .................. | A61B 5/6815 340/407.1 |
| 2016/0127841 | A1 | 5/2016 | Horii | |
| 2017/0111728 | A1 | 4/2017 | Kim et al. | |
| 2017/0180841 | A1 | 6/2017 | Koido et al. | |
| 2018/0098153 | A1 | 4/2018 | Jan | |
| 2018/0146293 | A1 | 5/2018 | Hardi | |
| 2018/0288537 | A1 | 10/2018 | Fyrlund et al. | |
| 2018/0302703 | A1 | 10/2018 | Andrikowich et al. | |
| 2019/0014425 | A1 | 1/2019 | Liao et al. | |
| 2020/0037080 | A1* | 1/2020 | Biggs .................. | H04R 1/1075 |
| 2020/0228904 | A1 | 7/2020 | Liao et al. | |
| 2020/0336824 | A1 | 10/2020 | Zheng et al. | |
| 2020/0396529 | A1 | 12/2020 | Thomas | |
| 2021/0037325 | A1 | 2/2021 | Qi et al. | |
| 2021/0092525 | A1 | 3/2021 | Zheng et al. | |
| 2021/0168483 | A1 | 6/2021 | Zhang et al. | |
| 2021/0168513 | A1 | 6/2021 | Qi et al. | |
| 2021/0168542 | A1 | 6/2021 | Qi et al. | |
| 2021/0219060 | A1 | 7/2021 | Qi et al. | |
| 2021/0250700 | A1 | 8/2021 | Qi et al. | |
| 2021/0289285 | A1 | 9/2021 | Zheng et al. | |
| 2021/0337287 | A1 | 10/2021 | Li et al. | |
| 2023/0362556 | A1 | 11/2023 | Qi et al. | |

FOREIGN PATENT DOCUMENTS

| | | | |
|---|---|---|---|
| CN | 106954152 | B | 7/2019 |
| CN | 111083612 | A | 4/2020 |
| CN | 111654771 | A | 9/2020 |
| CN | 214125513 | U | 9/2021 |
| EP | 2767099 | B1 | 9/2016 |
| EP | 3796670 | A1 | 3/2021 |
| JP | 2004080198 | A | 3/2004 |
| JP | 2007336432 | A | 12/2007 |
| JP | 2011114512 | A | 6/2011 |
| JP | 2020191511 | A | 11/2020 |
| KR | 20010111653 | A | 12/2001 |
| KR | 20090082999 | A | 8/2009 |
| KR | 20130067227 | A | 6/2013 |
| KR | 20170138610 | A | 12/2017 |
| WO | 2008023116 | A2 | 2/2008 |
| WO | 2017173506 | A1 | 10/2017 |
| WO | 2020140451 | A1 | 7/2020 |
| WO | 2020257114 | A1 | 12/2020 |

OTHER PUBLICATIONS

The Extended European Search Report in European Application No. 22882569.1 mailed on Sep. 19, 2024, 8 pages.

The Extended European Search Report in European Application No. 24185840.6 mailed on Oct. 9, 2024, 10 pages.

The Extended European Search Report in European Application No. 24185847.1 mailed on Oct. 15, 2024, 9 pages.

The Extended European Search Report in European Application No. 24185854.7 mailed on Oct. 15, 2024, 10 pages.

The Extended European Search Report in European Application No. 24185857.0 mailed on Oct. 21, 2024, 9 pages.

International Search Report in PCT/CN2022/120667 mailed on Nov. 25, 2022, 7 pages.

Written Opinion in PCT/CN2022/120667 mailed on Nov. 25, 2022, 6 pages.

The Notice of Reasons for Refusal in Japanese Application No. 2024-524004 mailed on Jun. 24, 2025, 12 pages.

The Notice of Reasons for Refusal in Japanese Application No. 2024-114698 mailed on Jul. 8, 2025, 7 pages.

The Notice of Reasons for Refusal in Japanese Application No. 2024-114702 mailed on Jul. 8, 2025, 9 pages.

The Notice of Reasons for Refusal in Japanese Application No. 2024-114707 mailed on Jul. 8, 2025, 9 pages.

The Notice of Preliminary Rejection in Korean Application No. 10-2024-7024533 mailed on Jul. 21, 2025, 12 pages.

* cited by examiner

HEADPHONES

CROSS-REFERENCE TO RELATED APPLICATIONS

This application is a continuation of International Application No. PCT/CN2022/120667, filed on Sep. 22, 2022, which claims priority to Chinese Application No. 202111232608.3, filed on Oct. 22, 2021, entitled “Headphones,” the entire contents of each of which are incorporated herein by reference.

TECHNICAL FIELD

The present disclosure relates to the technical field of electronic devices, and in particular to headphones.

BACKGROUND

Headphones have been widely used in people’s daily life, which may be used in conjunction with cell phones, computers, and other electronic devices to provide users with an auditory feast. According to a working principle of the headphones, the headphones generally include air-conduction headphones and bone-conduction headphones; according to the way a user wears the headphone, the headphones generally include over-ear headphones, ear-hook headphones, and in-ear headphones; according to an interaction between a headphone and an electronic device, the headphones generally include wired headphones and wireless headphones.

SUMMARY

In some embodiments, a headphone may include a supporting assembly and a core module connected to the supporting assembly, wherein the supporting assembly may be configured to support the core module to be worn at a wearing position, the core module may include a core housing, a transducer device, and a vibration panel, the transducer device may be provided in a accommodating cavity of the core housing, and the vibration panel may be connected with the transducer device and may be configured to transmit a mechanical vibration generated by the transducer device to a user.

In some embodiments, the core module may include a first vibration plate and a connecting member, the transducer device may be suspended within the accommodating cavity of the core housing through the first vibration plate, the core housing may include an inner cylinder wall, a first end wall and a second end wall respectively connected with both ends of the inner cylinder wall, the first end wall and the second end wall may be disposed on two opposite sides of the transducer device along a vibration direction of the transducer device and enclose the accommodating cavity with the inner cylinder wall, the first end wall may be provided with a mounting hole, the vibration panel may be located outside the core housing and may be configured to contact the skin of the user, one end of the connecting member may be connected with the vibration panel, and another end of the connecting member may extend into the core housing through the mounting hole and may be connected with the transducer device; and viewed along the vibration direction, an area of the vibration panel may be larger than an area of the mounting hole, and the area of the mounting hole may be larger than an area of the connecting member.

In some embodiments, the first vibration plate may be provided in the accommodating cavity.

In some embodiments, the first vibration plate may be disposed on a side of the first end wall close to the second end wall.

In some embodiments, the area of the mounting hole may be smaller than an area of the first vibration plate along the vibration direction.

In some embodiments, a shape of a cross-section of the inner cylinder wall, viewed along the vibration direction, may include any one of a circular shape, an elliptical shape, or a polygonal shape.

In some embodiments, the accommodating cavity may communicate with an exterior of the headphone merely through one single channel, and the channel may be a gap between the connecting member and a wall of the mounting hole; or

- the accommodating cavity may communicate with the exterior of the headphone merely through a first channel and a second channel, the first channel may be the gap between the connecting member and the wall of the mounting hole, and the second channel may communicate with the exterior of the headphone through an audio filter; or
- the accommodating cavity may communicate with the exterior of the headphone merely through the first channel and the second channel, the first channel may be the gap between the connecting member and the wall of the mounting hole, and a ratio of an opening area of the second channel to an opening area of the first channel may be less than or equal to 10%.

In some embodiments, the Young’s modulus of the first end wall or the second end wall may be greater than or equal to 2000 MPa.

In some embodiments, a ratio of the area of the mounting hole to an area of the first end wall viewed along the vibration direction may be less than or equal to 0.6.

In some embodiments, the gap between the connecting member and a wall of the mounting hole may form a Helmholtz resonance cavity with the accommodating cavity, wherein a peak resonance frequency of the Helmholtz resonance cavity may be less than or equal to 4 kHz.

In some embodiments, the peak resonance frequency of the Helmholtz resonant cavity may be less than or equal to 1 kHz.

In some embodiments, when viewed along the vibration direction, a ratio of a difference between the area of the mounting hole and the area of the connecting member to the area of the mounting hole may be greater than 0 and less than or equal to 0.5.

In some embodiments, an opening shape of the mounting hole and a cross-sectional shape of the connecting member may be corresponding polygons, or corresponding circles;

- the gap between the connection member and the wall of the mounting hole may be greater than 0 and less than or equal to 2 mm.

In some embodiments, the gap between the connection member and the wall of the mounting hole may be greater than or equal to 0.1 mm and less than or equal to 1 mm.

In some embodiments, one connecting member may be connected with a central region of the vibration panel; or

- the core module may include a plurality of connecting members including the connecting member provided at intervals around a centerline of the vibration panel parallel to the vibration direction, and each of the plurality of connecting members may be connected with the transducer device through a corresponding mounting hole; or one of the plurality of connecting members may be connected with the central region of the vibration panel, other connecting members may be spaced around the one of the plurality of connecting members located in the central region of the vibration panel, and each of the plurality of connecting members may be connected with the transducer device through a corresponding mounting hole.

In some embodiments, the Young's modulus of the vibration panel may be greater than or equal to 3000 MPa.

In some embodiments, a ratio of an absolute value of a difference between a stiffness of the vibration panel and a stiffness of the first end wall to a greater of the stiffness of the vibration panel and the stiffness of the first end wall may be less than or equal to 0.4; and/or, a ratio of an absolute value of a difference between the stiffness of the vibration panel and a stiffness of the second end wall to a greater of the stiffness of the vibration panel and the stiffness of the second end wall may be less than or equal to 0.4.

In some embodiments, a ratio of the area of the vibration panel to an area of the first end wall viewed along the vibration direction may be within a range of 0.3 to 1.6.

In some embodiments, a thickness of the vibration panel along the vibration direction may be within a range of 0.3 mm to 3 mm; and/or, a gap between the vibration panel and the first end wall may be within a range of 0.5 mm to 3 mm; and/or, a gap between a side of the first end wall away from the second end wall and a side of the second end wall away from the first end wall may be within a range of 6 mm to 16 mm.

In some embodiments, a side of the vibration panel away from the transducer device may include a skin contacting region configured to contact the skin of the user and an air-conduction enhancement region, at least a portion of the air-conduction enhancement region may not contact the skin of the user, the vibration panel driving the air outside the headphone to vibrate through the air-conduction enhancement region to generate a sound wave.

In some embodiments, in a wearing state, at least a portion of the air-conduction enhancement region may be directed to an opening of an outer ear canal of an ear of the user to allow the sound wave to be directed to the opening of the outer ear canal.

In some embodiments, at least a portion of the air-conduction enhancement region may be inclined relative to the skin contacting region and extend towards the transducer device, and an inclination angle of the air-conduction enhancement region relative to the skin contacting region may be within a range of 0 to 75°; and/or a width of an orthographic projection of the air-conduction enhancement region along the vibration direction may be greater than or equal to 1 mm.

In some embodiments, the vibration panel may have a long axis direction and a short axis direction, the long axis direction and the short axis direction being perpendicular to the vibration direction and orthogonal to each other, and a size of the vibration panel along the long axis direction may be larger than a size of the vibration panel along the short axis direction, in a wearing state, the long axis direction may be directed to a top of a head of user, and the short axis direction may be directed to an opening of an outer ear canal of an ear of the user.

In some embodiments, the vibration panel may have an elliptical shape, or a rounded rectangular shape, or a runway shape viewed along the vibration direction.

In some embodiments, the core housing may further include a surrounding edge connected with an end of the core housing close to the vibration panel, and the surrounding edge encircle the vibration panel, the surrounding edge may be spaced from the vibration panel in a direction perpendicular to the vibration direction in a non-wearing state, and a side of the vibration panel away from the transducer device may at least partially protrude out of a side of the surrounding edge away from the transducer device along the vibration direction.

In some embodiments, the surrounding edge may be provided with one or more communicating holes, and a gap between the vibration panel and the core housing and the exterior of the headphone may be in flow communication via the one or more communicating holes.

In some embodiments, a count of the one or more communicating holes may exceed 1, and in a wearing state, an opening direction of at least one of the one or more communicating holes may be away from a top of a head of the user, and an angle between the opening direction and a vertical axis of the user may be within a range of 0 to 10°.

In some embodiments, a spacer may be provided between the vibration panel and the first end wall, and a Rockwell hardness of the spacer may be less than a Rockwell hardness of the first vibration plate.

In some embodiments, the core module may further include an audio filter in flow communication with the accommodating cavity, a cut-off frequency of the audio filter may be less than or equal to 5 kHz.

In some embodiments, the first end wall may include a first sub-end wall and a second sub-end wall provided at intervals along the vibration direction, the mounting hole may pass through the first sub-end wall and the second sub-end wall along the vibration direction, and the first sub-end wall, the second sub-end wall, and the inner cylinder wall form the audio filter.

In some embodiments, a gap between the first sub-end wall and the second sub-end wall along the vibration direction of the transducer device may be within a range of 0.5 mm to 5 mm.

In some embodiments, the transducer device may include a frame, a second vibration plate, a magnetic circuit system, and a coil, the frame may be connected with the core housing through the first vibration plate, the second vibration plate may connect the frame and the magnetic circuit system to suspend the magnetic circuit system inside the accommodating cavity, the coil may be connected with the frame and extend into a magnetic gap of the magnetic circuit system along the vibration direction, and the vibration panel may be connected with the frame.

In some embodiments, the magnetic circuit system and/or the core housing may be provided with the Helmholtz resonance cavity in flow communication with the accommodating cavity.

In some embodiments, a frequency response curve of an air-conduction sound output to the exterior of the headphone through the mounting hole may have a resonant peak, and the Helmholtz resonance cavity may be configured to attenuate an intensity of the resonant peak; and a peak resonance frequency of the resonant peak may be within a range of 500 Hz to 4 kHz.

In some embodiments, the Helmholtz resonance cavity may be configured to attenuate a vibration intensity, in a preset frequency band, of a frequency response curve of an air-conduction sound output to the exterior of the headphone through the mounting hole, and a difference between a peak value of the vibration intensity when an opening for realizing flow communication between the Helmholtz resonance cavity and the accommodating cavity is in an open state and a peak value of the vibration intensity when the opening for realizing flow communication between the Helmholtz resonance cavity and the accommodating cavity is in a closed state may be greater than or equal to 3 dB.

In some embodiments, the frame may be provided with a communicating hole extending along the vibration direction; and/or, the magnetic circuit system may include a magnetic guide cover and a magnet connected with a bottom of the magnetic guide cover, the magnet may be connected with a central region of the second vibration plate and provided at intervals from the magnetic guide cover along a direction perpendicular to the vibration direction to form the magnetic gap, the coil may extend between the magnet and the magnetic guide cover, and the magnetic guide cover may be provided with a communicating hole, the magnetic gap being in flow communication with an external space of the magnetic circuit system via the communicating hole on the magnetic guide cover.

In some embodiments, a volume of the core housing may be less than or equal to 3 $cm^3$.

In some embodiments, the supporting assembly may be a header-beam assembly, the header-beam assembly may be configured to wrap around a top of a head of the user and to allow the core module to contact a cheek of the user through the vibration panel.

In some embodiments, the core module may include a connecting member, the transducer device may be provided in an accommodating cavity of the core housing, the core housing may be provided with a mounting hole, the vibration panel may be located outside the core housing and may be configured to contact the skin of the user, one end of the connecting member may be connected with the vibration panel, and another end of the connecting member may extend into the core housing through the mounting hole and may be connected with the transducer device; wherein viewed along a vibration direction, an area of the vibration panel may be larger than an area of the mounting hole, and an area of the mounting hole may be larger than an area of the connection member;

wherein the accommodating cavity may communicate with the exterior of the headphone merely through one single channel, and the channel may be a gap between the connecting member and a wall of the mounting hole; or the accommodating cavity may communicate with the exterior of the headphone merely through a first channel and a second channel, the first channel may be the gap between the connecting member and the wall of the mounting hole, and the second channel may communicate with the exterior of the headphone through an audio filter.

In some embodiments, the transducer device may include a frame, a second vibration plate, a magnetic circuit system, and a coil, the frame may be connected with the core housing through the first vibration plate, the second vibration plate may connect the frame and the magnetic circuit system to suspend the magnetic circuit system inside the accommodating cavity, the coil may be connected with the frame and extend into a magnetic gap of the magnetic circuit system along the vibration direction, and the vibration panel may be connected with the frame, and the area of the mounting hole viewed along the vibration direction may be smaller than an area of the first vibration plate In some embodiments, the ratio of a difference between the area of the mounting hole and the area of the connecting member to the area of the mounting hole may be greater than 0 and less than or equal to 0.5.

In some embodiments, the core module may include a first vibration plate and a connecting member, the transducer device may be suspended in the accommodating cavity of the core housing through the first vibration plate, the core housing may be provided with a mounting hole, and the core housing may enclose the accommodating cavity in flow communication with an exterior of the headphone merely through the mounting hole; and the vibration panel may be located outside the core housing and may be configured to contact the skin of the user, one end of the connecting member may be connected with the vibration panel, and another end of the connecting member may extend into the core housing through the mounting hole and may be connected with the transducer device, wherein a gap between the connecting member and a wall of the mounting hole may be greater than 0 and less than or equal to 2 mm.

In some embodiments, the gap between the connecting member and the wall of the mounting hole may be greater than or equal to 0.1 mm and less than or equal to 1 mm In some embodiments, the transducer device may include a frame, a second vibration plate, a magnetic circuit system, and a coil, the frame may be connected with the core housing through the first vibration plate, the second vibration plate may connect the frame and the magnetic circuit system to suspend the magnetic circuit system inside the accommodating cavity, the coil may be connected with the frame and extend into a magnetic gap of the magnetic circuit system along a vibration direction, and the vibration panel may be connected with the frame, and an area of the mounting hole viewed along the vibration direction may be smaller than an area of the first vibration plate.

In some embodiments, the core module may include a first vibration plate, and the transducer device may be suspended in the accommodating cavity of the core housing through the first vibration plate, wherein a mass of the core housing may be greater than or equal to 1 g, and a stiffness of the first vibration plate may be less than or equal to 7000 N/m.

In some embodiments, the mass of the core housing may be greater than or equal to 1.2 g and the stiffness of the first vibration plate may be less than or equal to 5000 N/m.

In some embodiments, a ratio of the mass of the core housing to the stiffness of the first vibration plate may be greater than or equal to 0.15 s2.

In some embodiments, the ratio between the mass of the core housing and the stiffness of the first vibration plate may be greater than or equal to 0.2 s2.

In some embodiments, the transducer device may include a frame, a second vibration plate, a magnetic circuit system, and a coil, the frame may be connected with the core housing through the first vibration plate, the second vibration plate may connect the frame and the magnetic circuit system to suspend the magnetic circuit system inside the accommodating cavity, the coil may be connected with the frame and extend into a magnetic gap of the magnetic circuit system along a vibration direction of the transducer device, and the vibration panel may be connected with the frame.

In some embodiments, the stiffness of the second vibration plate may be greater than or equal to 1000 N/m.

In some embodiments, in a non-wearing state, a frequency response curve of the vibration panel may have a resonant valley generated by the first vibration plate, and a peak resonance frequency of the resonant valley may be less than or equal to 400 Hz.

In some embodiments, the frequency response curve may have at least one resonant peak generated jointly by the first vibration plate and the second vibration plate in a frequency band within a range of 200 Hz to 2 kHz.

In some embodiments, the at least one resonant peak may include a first resonant peak and a second resonant peak, a peak resonance frequency of the first resonant peak may be between 200 Hz and 400 Hz, and a peak resonance frequency of the second resonant peak may be greater than the peak resonance frequency of the first resonant peak.

In some embodiments, when the stiffness of the first vibration plate is changed, an absolute value of an offset of the peak resonance frequency of the second resonant peak may be greater than an absolute value of an offset of the peak resonance frequency of the first resonant peak; and when a stiffness of the second vibration plate is changed, the absolute value of the offset of the peak resonance frequency of the first resonant peak may be greater than the absolute value of the offset of the peak resonance frequency of the second resonant peak.

In some embodiments, the core module may further include a connecting member, the core housing may include an inner cylinder wall, a first end wall and a second end wall respectively connected with both ends of the inner cylinder wall, the first end wall and the second end wall may be disposed on two opposite sides of the transducer device along a vibration direction of the transducer device and enclose the accommodating cavity with the inner cylinder wall, the first end wall may be provided with a mounting hole, the vibration panel may be located outside the core housing and may be configured to contact the skin of the user, one end of the connecting member may be connected with the vibration panel, and another end of the connecting member may extend into the core housing through the mounting hole and may be connected with the transducer device, and viewed along the vibration direction, an area of the vibration panel may be larger than an area of the mounting hole, and the area of the mounting hole may be larger than an area of the connecting member.

In some embodiments, the core module may include a first vibration plate, and the transducer device may be suspended in the accommodating cavity of the core housing through the first vibration plate, and a ratio of a mass of the core housing to a stiffness of the first vibration plate may be greater than or equal to 0.15 s2.

In some embodiments, the core module may include a first vibration plate, and the transducer device may be suspended in the accommodating cavity of the core housing through the first vibration plate, and a mass of the core housing may be less than or equal to 0.5 g, and a stiffness of the first vibration plate may be greater than or equal to 80,000 N/m.

In some embodiments, the transducer device may include a frame, a second vibration plate, a magnetic circuit system, and a coil, the frame may be connected with the core housing through the first vibration plate, the second vibration plate may connect the frame and the magnetic circuit system to suspend the magnetic circuit system inside the accommodating cavity, the coil may be connected with the frame and extend into a magnetic gap of the magnetic circuit system along a vibration direction of the transducer device, and the vibration panel may be connected with the frame.

In some embodiments, a peripheral region of the second vibration plate may be connected with the frame, and a central region of the second vibration plate may be connected with the magnetic circuit system.

In some embodiments, in the non-wearing state, a frequency response curve of the vibration panel may have a resonant valley generated by the first vibration plate, and a peak resonance frequency of the resonant valley may be greater than or equal to 2 kHz.

In some embodiments, the frequency response curve may have a first resonant peak and a second resonant peak that may be generated jointly by the first vibration plate and the second vibration plate, a peak resonance frequency of the first resonant peak may be less than the peak resonance frequency of the resonant valley, and a peak resonance frequency of the second resonant peak may be greater than the peak resonance frequency of the resonant valley.

In some embodiments, the peak resonance frequency of the first resonant peak may be within a range of 200 Hz to 400 Hz.

In some embodiments, the core module may further include a connecting member, the core housing may include an inner cylinder wall, a first end wall and a second end wall respectively connected with both ends of the inner cylinder wall, the first end wall and the second end wall may be disposed on two opposite sides of the transducer device along a vibration direction of the transducer device and enclose the accommodating cavity with the inner cylinder wall, the first end wall may be provided with a mounting hole, the vibration panel may be located outside the core housing and may be configured to contact the skin of a user, one end of the connecting member may be connected with the vibration panel, and another end of the connecting member may extend into the core housing through the mounting hole and may be connected with the transducer device, and viewed along a vibration direction, an area of the vibration panel may be larger than an area of the mounting hole, and the area of the mounting hole may be larger than an area of the connecting member.

In some embodiments, the accommodating cavity may communicate with an exterior of the headphone merely through one single channel, and the channel may be a gap between the connecting member and a wall of the mounting hole; or

- the accommodating cavity may communicate with the exterior of the headphone merely through a first channel and a second channel, the first channel may be a gap between the connecting member and the wall of the mounting hole, and the second channel may communicate with the exterior of the headphone through an audio filter; or
- the accommodating cavity may communicate with the exterior of the headphone merely through the first channel and the second channel, the first channel may be the gap between the connecting member and the wall of the mounting hole, and a ratio of an opening area of the second channel to an opening area of the first channel may be less than or equal to 10%.

In some embodiments, the accommodating cavity may communicate with the exterior of the headphone through one single channel, the channel may be a gap between the connecting member and the wall of the mounting hole, the core module may further include a sealing membrane, and the sealing membrane may seal the channel.

In some embodiments, the sealing membrane may include a first connecting portion, a pleated portion, and a second connecting portion, the first connecting portion, the pleated portion, and the second connecting portion may be integrally connected, the pleated portion may form a recessed region between the first connecting portion and the second connecting portion, the first connecting portion may be connected with the first end wall, and the second connecting portion may be connected with the connecting member or the vibration panel.

In some embodiments, the core module may include a first vibration plate, and the transducer device may be suspended in the accommodating cavity of the core housing through the first vibration plate; the core module may be configured such that in the non-wearing state, a frequency response curve of the vibration panel may not have an effective resonant valley in a frequency band within a range of 400 Hz to 2 kHz; and the frequency response curve may be configured to characterize a relationship between an intensity and a frequency of a vibration of the vibration panel, and the effective resonant valley may satisfy one or more conditions including: a reference line section parallel to a horizontal axis of the frequency response curve may have two intersections with the frequency response curve, an intensity corresponding to the reference line section minus a peak resonance intensity of the effective resonant valley may be equal to 6 dB, and a difference between frequencies corresponding to two end-points of the reference line section may be less than or equal to 4 octaves, wherein the effective resonant valley may be between the two intersections.

In some embodiments, the mass of the core housing and/or the stiffness of the first vibration plate may be configured such that the frequency response curve may not have the effective resonant valley in a frequency band within a range of 400 Hz to 2 kHz.

In some embodiments, the transducer device may include a frame, a second vibration plate, a magnetic circuit system, and a coil, the frame may be connected with the core housing through the first vibration plate, the second vibration plate may connect the frame and the magnetic circuit system to suspend the magnetic circuit system within the accommodating cavity, the coil may be connected with the frame and extend into a magnetic gap of the magnetic circuit system along a vibration direction of the transducer device, and the vibration panel may be connected with the frame.

In some embodiments, the mass of the core housing and/or the stiffness of the first vibration plate may be configured such that the frequency response curve may have the effective resonant valley in a frequency band within a range of 200 Hz to 400 Hz.

In some embodiments, the mass of the core housing may be greater than or equal to 1 g and the stiffness of the first vibration plate may be less than or equal to 7000 N/m.

In some embodiments, the frequency response curve may have two resonant peaks generated jointly by the first vibration plate and the second vibration plate in a frequency band within a range of 400 Hz to 2 kHz.

In some embodiments, the stiffness of the second vibration plate may be greater than or equal to 1000 N/m.

In some embodiments, the mass of the core housing and/or the stiffness of the first vibration plate may be configured such that the frequency response curve may have the effective resonant valley in a frequency band within a range of 2 kHz to 20 kHz.

In some embodiments, the mass of the core housing may be less than or equal to 0.5 g and the stiffness of the first vibration plate may be greater than or equal to 80,000 N/m.

In some embodiments, the mass of the core housing and/or the stiffness of the first vibration plate may be configured such that the frequency response curve may not have the effective resonant valley in a frequency band within a range of 200 Hz to 2 kHz.

In some embodiments, the mass of the core housing may be greater than or equal to 1 g and the stiffness of the first vibration plate may be less than or equal to 2500 N/m; or the mass of the core housing may be less than or equal to 0.5 g and the stiffness of the first vibration plate may be greater than or equal to 80,000 N/m.

In some embodiments, the mass of the core housing and/or the stiffness of the first vibration plate may be configured such that the frequency response curve may not have the effective resonant valley in a frequency band within a range of 200 Hz to 4 kHz.

In some embodiments, the mass of the core housing may be greater than or equal to 1 g and the stiffness of the first vibration plate may be less than or equal to 2500 N/m; or the mass of the core housing may be less than or equal to 0.5 g and the stiffness of the first vibration plate may be greater than or equal to 160,000 N/m.

In some embodiments, the frequency response curve may have at least one resonant peak generated jointly by the first vibration plate and the second vibration plate in a frequency band within a range of 200 Hz to 2 kHz.

In some embodiments, the mass of the core housing may be greater than or equal to 1 g, the stiffness of the first vibration plate may be less than or equal to 2500 N/m, and a stiffness of the second vibration plate may be less than or equal to 100000 N/m; or the mass of the core housing may be less than or equal to 0.5 g, the stiffness of the first vibration plate may be greater than or equal to 80,000 N/m, and the stiffness of the second vibration plate may be between 1,000 N/m and 500,000 N/m.

In some embodiments, the core module may further include a connecting member, the core housing may include an inner cylinder wall, a first end wall and a second end wall respectively connected with both ends of the inner cylinder wall, the first end wall and the second end wall may be disposed on two opposite sides of the transducer device along a vibration direction of the transducer device and enclose the accommodating cavity with the inner cylinder wall, the first end wall may be provided with a mounting hole, the vibration panel may be located outside the core housing and may be configured to contact the skin of a user, one end of the connecting member may be connected with the vibration panel, and another end of the connecting member may extend into the core housing through the mounting hole and may be connected with the transducer device, and viewed along a vibration direction, an area of the vibration panel may be larger than an area of the mounting hole, and the area of the mounting hole may be larger than an area of the connecting member.

In some embodiments, the non-wearing state may be defined as that the headphone may be not worn on the head of a user, the supporting assembly may be fixed, and the core module may be in a cantilever state relative to the supporting assembly.

In some embodiments, the core module may include a first vibration plate, and the transducer device may be suspended in the accommodating cavity of the core housing through the first vibration plate, and the core module may include a frame, a second vibration plate, a magnetic circuit system, and a coil, the frame may be connected with the core housing through the first vibration plate, the second vibration plate may connect the frame and the magnetic circuit system to suspend the magnetic circuit system within the accommodating cavity, the coil may be connected with the frame and extend into a magnetic gap of the magnetic circuit system along a vibration direction of the transducer device, and the vibration panel may be connected with the frame; in a non-wearing state, a frequency response curve of the vibration panel may have a first resonant peak and a second resonant peak that may be generated jointly by the first vibration plate and the second vibration plate, a peak resonance frequency of the first resonant peak may be less than a peak resonance frequency of the second resonant peak, and there may be no effective resonant valley between the first resonant peak and the second resonant peak; and the frequency response curve may be configured to characterize a relationship between an intensity and a frequency of a vibration of the vibration panel, and the effective resonant valley may satisfy one or more conditions including: a reference line section parallel to a horizontal axis of the frequency response curve may have two intersections with the frequency response curve, an intensity corresponding to the reference line section minus a peak resonance intensity of the effective resonant valley may be equal to 6 dB, and a difference between frequencies corresponding to two endpoints of the reference line section may be less than or equal to 4 octaves, wherein the effective resonant valley may be between the two intersections.

In some embodiments, the mass of the core housing may be greater than or equal to 1 g, the stiffness of the first vibration plate may be less than or equal to 7000 N/m, and the stiffness of the second vibration plate may be greater than or equal to 1000 N/m.

In some embodiments, the mass of the core housing may be greater than or equal to 1.2 g, the stiffness of the first vibration plate may be less than or equal to 5000 N/m, and the stiffness of the second vibration plate may be greater than or equal to 3000 N/m.

In some embodiments, the stiffness of the second vibration plate may be greater than the stiffness of the first vibration plate.

In some embodiments, when the stiffness of the first vibration plate is changed, an absolute value of an offset of the peak resonance frequency of the second resonant peak may be greater than an absolute value of an offset of the peak resonance frequency of the first resonant peak; and when the stiffness of the second vibration plate is changed, the absolute value of the offset of the peak resonance frequency of the first resonant peak may be greater than the absolute value of the offset of the peak resonance frequency of the second resonant peak.

In some embodiments, the peak resonance frequency of the first resonant peak may be between 80 Hz and 400 Hz, and the peak resonance frequency of the second resonant peak may be between 100 Hz and 2 kHz.

In some embodiments, a peripheral region of the second vibration plate may be connected with the frame, and a central region of the second vibration plate may be connected with the magnetic circuit system.

In some embodiments, the core module may further include a connecting member, the core housing may include an inner cylinder wall, a first end wall and a second end wall respectively connected with both ends of the inner cylinder wall, the first end wall and the second end wall may be disposed on two opposite sides of the transducer device along a vibration direction of the transducer device and form the accommodating cavity by enclosing with the inner cylinder wall, the first end wall may be provided with a mounting hole, the vibration panel may be located outside the core housing and may be configured to contact the skin of the user, one end of the connecting member may be connected with the vibration panel, and another end of the connecting member may be extended into the core housing through the mounting hole and may be connected with the transducer device, and viewed along the vibration direction, an area of the vibration panel may be larger than an area of the mounting hole, and the area of the mounting hole may be larger than an area of the connecting member.

In some embodiments, the accommodating cavity may communicate with an exterior of the headphone through one single channel, the channel may be a gap between the connecting member a wall of the mounting hole, the core module may further include a sealing membrane, and the sealing membrane may seal the channel.

In some embodiments, the sealing membrane may include a first connecting portion, a pleated portion, and a second connecting portion, the first connecting portion, the pleated portion, and the second connecting portion may be integrally connected, the pleated portion may form a recessed region between the first connecting portion and the second connecting portion, the first connecting portion may be connected with the first end wall, and the second connecting portion may be connected with the connecting member or the vibration panel.

In some embodiments, the core module may include a first vibration plate, and the transducer device may be suspended in the accommodating cavity of the core housing through the first vibration plate, and the core module may include a frame, a second vibration plate, a magnetic circuit system, and a coil, the frame may be connected with the core housing through the first vibration plate, the second vibration plate may connect the frame and the magnetic circuit system to suspend the magnetic circuit system within the accommodating cavity, the coil may be connected with the frame and extend into a magnetic gap of the magnetic circuit system along a vibration direction of the transducer device, and the vibration panel may be connected with the frame, and in a non-wearing state, a frequency response curve of the vibration panel may have a resonant valley generated by the first vibration plate, and a first resonant peak and a second resonant peak that may be generated jointly by the first vibration plate and the second vibration plate, a peak resonance frequency of the resonant valley may be less than a peak resonance frequency of the first resonant peak, and the peak resonance frequency of the first resonant peak may be less than a peak resonance frequency of the second resonant peak.

In some embodiments, the peak resonance frequency of the resonant valley may be greater than or equal to 400 Hz.

In some embodiments, a mass of the core housing may be less than or equal to 1 g, a stiffness of the first vibration plate may be greater than or equal to 7000 N/m, and a stiffness of the second vibration plate may be greater than or equal to 1000 N/m.

In some embodiments, the peak resonance frequency of the second resonant peak may be less than or equal to 1 kHz.

In some embodiments, the mass of the core housing may be less than or equal to 1 g, a stiffness of the first vibration plate may be greater than or equal to 7000 N/m, and a stiffness of the second vibration plate may be between 20000 N/m and 50000 N/m.

In some embodiments, a peripheral region of the second vibration plate may be connected with the frame, and a central region of the second vibration plate may be connected with the magnetic circuit system.

In some embodiments, the core module may further include a connecting member, the core housing may include an inner cylinder wall, a first end wall and a second end wall respectively connected with both ends of the inner cylinder wall, the first end wall and the second end wall may be disposed on two opposite sides of the transducer device along a vibration direction of the transducer device and enclose the accommodating cavity with the inner cylinder wall, the first end wall may be provided with a mounting hole, the vibration panel may be located outside the core housing and may be configured to contact the skin of the user, one end of the connecting member may be connected with the vibration panel, and another end of the connecting member may extend into the core housing through the mounting hole and may be connected with the transducer device, and viewed along the vibration direction, an area of the vibration panel may be larger than an area of the mounting hole, and the area of the mounting hole may be larger than an area of the connecting member.

In some embodiments, the accommodating cavity may communicate with an exterior of the headphone merely through one single channel, and the channel may be a gap between the connecting member and a wall of the mounting hole; or

- the accommodating cavity may communicate with the exterior of the headphone merely through a first channel and a second channel, the first channel may be the gap between the connecting member and the wall of the mounting hole, and the second channel may communicate with the exterior of the headphone through an audio filter; or
- the accommodating cavity may communicate with the exterior of the headphone merely through the first channel and the second channel, the first channel may be the gap between the connecting member and the wall of the mounting hole, and a ratio of an opening area of the second channel to an opening area of the first channel may be less than or equal to 10%.

In some embodiments, the accommodating cavity may communicate with an exterior of the headphone through one single channel, the channel may be a gap between the connecting member a wall of the mounting hole, the core module may further include a sealing membrane, and the sealing membrane may seal the channel.

In some embodiments, the sealing membrane may include a first connecting portion, a pleated portion, and a second connecting portion, the first connecting portion, the pleated portion, and the second connecting portion may be integrally connected, the pleated portion may form a recessed area between the first connecting portion and the second connecting portion, the first connecting portion may be connected with the first end wall, and the second connecting portion may be connected with the connecting member or the vibration panel.

In some embodiments, the core module may include a first vibration plate, the transducer device may be suspended within an accommodating cavity of the core housing through the first vibration plate, the core module may include a frame, a second vibration plate, a magnetic circuit system, and a coil, the frame may be connected with the core housing through the first vibration plate, the second vibration plate connect the frame to the magnetic circuit system to suspend the magnetic circuit system within the accommodating cavity, the coil may be connected with the frame and extend into a magnetic gap of the magnetic circuit system along a vibration direction of the transducer device, and the vibration panel may be connected with the frame; and in a non-wearing state, a frequency response curve of the vibration panel may have a resonant peak strongly related to a stiffness of the frame, the stiffness of the frame may be greater than or equal to 100,000 N/m, and a peak resonance frequency of the resonant peak may be greater than or equal to 4 kHz.

In some embodiments, a material of the frame may include any one of polycarbonate, nylon, and plastic titanium; or

- the frame may include a substrate and a reinforcement, a material of the substrate may include any one of polycarbonate, nylon, or plastic titanium, a material of the reinforcement may include glass fiber or carbon fiber doped in the substrate, or the material of the reinforcement may include aluminum alloy or stainless steel molded on the substrate through an overmolding technique.

In some embodiments, a ratio of an average thickness of the frame to an area of the frame may be greater than or equal to 0.01 $mm^{-1}$, wherein the area of the frame may be defined as an area of an orthographic projection of the frame along the vibration direction, and the average thickness of the frame may be defined as a volume of the frame divided by the area of the frame.

In some embodiments, a mass of the core housing and/or a stiffness of the first vibration plate may be configured such that the frequency response curve may not have an effective resonant valley in a frequency band within a range of 400 Hz to 2 kHz, and the effective resonant valley may satisfy one or more conditions including that a reference line section parallel to a horizontal axis of the frequency response curve may have two intersections with the frequency response curve, an intensity corresponding to the reference line section minus a peak resonance intensity of the effective resonant valley may be equal to 6 dB, and a difference between frequencies corresponding to two endpoints of the reference line section may be less than or equal to 4 octaves, wherein the effective resonant valley may be between the two intersections.

In some embodiments, the mass of the core housing and/or a stiffness of the first vibration plate may be configured such that the frequency response curve may have an effective resonant valley in a frequency band within a range of 200 Hz to 400 Hz.

In some embodiments, a mass of the core housing may be greater than or equal to 1 g, and a stiffness of the first vibration plate may be less than or equal to 7000 N/m.

In some embodiments, the frequency response curve may have two resonant peaks generated jointly by the first vibration plate and the second vibration plate in a frequency band within a range of 400 Hz to 2 kHz.

In some embodiments, a stiffness of the second vibration plate may be greater than or equal to 1000 N/m.

In some embodiments, the core module may further include a connecting member, the core housing may include an inner cylinder wall, a first end wall and a second end wall respectively connected with both ends of the inner cylinder wall, the first end wall and the second end wall may be disposed on two opposite sides of the transducer device along the vibration direction of the transducer device and enclose the accommodating cavity with the inner cylinder wall, the first end wall may be provided with a mounting hole, the vibration panel may be located outside the core housing and may be configured to contact the skin of a user, one end of the connecting member may be connected with the vibration panel, and another end of the connecting member may extend into the core housing through the mounting hole and may be connected with the transducer device, and viewed along the vibration direction, an area of the vibration panel may be larger than an area of the mounting hole, and the area of the mounting hole may be larger than an area of the connecting member.

In some embodiments, the accommodating cavity may communicate with the exterior of the headphone merely through a first channel and a second channel, the first channel may be the gap between the connecting member and the wall of the mounting hole, and the second channel may communicate with the exterior of the headphone through an audio filter, or the accommodating cavity may communicate with the exterior of the headphone merely through the first channel and the second channel, the first channel may be the gap between the connecting member and the wall of the mounting hole, and a ratio of an opening area of the second channel to an opening area of the first channel may be less than or equal to 10%.

the supporting assembly may be a header-beam assembly, the header-beam assembly may be configured to wrap around the top of the head of the user to allow the core module to contact the cheek of the user through the vibration panel, and the core module may transmit the mechanical vibration generated by the transducer device through bone-conduction, the accommodating cavity may communicate with the exterior of the headphone merely through the first channel and the second channel, the first passage may be the gap between the connecting member and the wall of the mounting hole, and the ratio of the opening area of the second channel to the opening area of the first channel may be less than or equal to 10%.

In some embodiments, the supporting assembly may be a header-beam assembly, the header-beam assembly may be configured to wrap around the top of the head of the user to allow the core module to contact the cheek of the user through the vibration panel, and the core module may transmit the mechanical vibration generated by the transducer device through bone-conduction, and the header-beam assembly may apply a pressing force between 0.4 N and 0.8 N to press the core module against the cheek of the user, and a contacting area between the core module and the cheek of the user may be in a range of 400 $mm^2$ to 600 $mm^2$.

In some embodiments, the core module may further include a first vibration plate, the core housing may be connected with the header-beam assembly, the transducer device may be suspended in the accommodating cavity of the core housing through the first vibration plate, and the vibration panel may be connected with the transducer device and may be configured to contact the skin of the user, and a pressing force of the vibration panel on the cheek of the user may be less than the pressing force applied by the header-beam assembly to press the core module against the cheek of the user, and a contacting area between the vibration panel and the cheek of the user may be less than the contacting area between the core module and the cheek of the user.

In some embodiments, the pressing force of the vibration panel on the cheek of the user may be between 0.1 N and 0.7 N, and the contacting area between the vibration panel and the cheek of the user may be between 180 $mm^2$ and 300 $mm^2$.

In some embodiments, the core housing may further include a surrounding edge connected with an end of the core housing close to the vibration panel, and the surrounding edge may encircle the vibration panel and contact the cheek of the user, and in a non-wearing state, the surrounding edge may be spaced from the vibration panel in a direction perpendicular to a vibration direction of the transducer device, and a side of the vibration panel away from the transducer device may at least partially protrude out of a side of the surrounding edge away from the transducer device along the vibration direction.

In some embodiments, the side of the vibration panel away from the transducer device may include a skin contacting region configured to contact the skin of the user and an edge region connected with the skin contacting region, the edge region may be located at the periphery of the skin contacting region and may be provided at intervals from the skin contacting region along the vibration direction, the surrounding edge may include a connecting portion connected with the core housing and a limiting portion connected with the connecting portion, the limiting portion may be disposed on the side of the vibration panel away from the transducer device; and viewed along the vibration direction, the limiting portion may overlap the edge region and may be staggered from the skin contacting region, and in the non-wearing state, the skin contacting region may protrude out of the side of the limiting portion away from the transducer device along the vibration direction.

In some embodiments, the side of the vibration panel away from the transducer device may further include an air-conduction enhancement region connected between the skin contacting region and the edge region, at least a portion of the air-conduction enhancement region may not contact the skin of the user, and the vibration panel may drive the air outside the headphone to vibrate through the air-conduction enhancement region to generate a sound wave.

In some embodiments, in the wearing state, at least a portion of the air-conduction enhancement region may be directed to an opening of an outer ear canal of an ear of the user to allow the sound wave to be directed to the opening of the outer ear canal.

In some embodiments, at least a portion of the air-conduction enhancement region may be inclined relative to the skin contacting region and extend towards the transducer device, and an inclination angle of the air-conduction enhancement region relative to the skin contacting region may be within a range of 0 to 75°; and/or a width of an orthographic projection of the air-conduction enhancement region along the vibration direction may be greater than or equal to 1 mm.

In some embodiments, the vibration panel may have a long axis direction and a short axis direction, the long axis direction and the short axis direction being perpendicular to the vibration direction and orthogonal to each other, and a size of the vibration panel along the long axis direction may be larger than a size of the vibration panel along the short axis direction, and in a wearing state, the long axis direction may be directed to a top of a top of a head of the user, and the short axis direction may be directed to an opening of an outer ear canal of an ear of the user.

In some embodiments, the surrounding edge may be provided with one or more communicating holes, a gap between the vibration panel and the core housing may be in flow communication with an exterior of the headphone via the one or more communicating holes; and a count of the one or more communicating holes may exceed 1, an opening direction of at least one of the one or more communicating holes may be away from a top of a head of the user, and an angle between the opening direction and a vertical axis of the user may be within a range of 0 to 10°.

In some embodiments, the supporting assembly may be a header-beam assembly, the header-beam assembly may include an arcuate header-beam member and an adapter member, the arcuate header-beam member may be configured to wrap around a top of a head of the user, two ends of the adapter member may be respectively connected with the arcuate header-beam member and the core module, and allow the core module to move close to or away from the arcuate header-beam member along an extension direction of the header-beam assembly, and the core module may transmit the mechanical vibration generated by the transducer device through bone-conduction; and the header-beam assembly may apply a pressing force between 0.4 N and 0.8 N to press the core module against a cheek of the user.

In some embodiments, each of both ends of the arcuate header-beam member may be provided with the adapter member and the core module, the header-beam assembly may provide a first pressing force for the core module in a first using state and provide a second pressing force for the core module in a second using state, an absolute value of a difference between the second pressing force and the first pressing force may be between 0 and 0.1N; and in the first using state, each adapter member of two adapter members at the both ends of the arcuate header-beam member may have a first extension relative to the arcuate header-beam member and two core modules at the both ends of the arcuate header-beam member have a first spacing between each other, in the second using state, the each adapter member may have a second extension relative to the arcuate header-beam member and the two core modules have a second spacing between each other, the second extension may be greater than the first extension, and the second spacing may be greater than the first spacing.

In some embodiments, the first extension may have a minimum value when the core module is closest to the arcuate header-beam member, and the second extension may have a maximum value when the core module is farthest away from the arcuate header-beam member.

In some embodiments, when each core module of two core modules at the both ends of the arcuate header-beam member is closest to or farthest away from the arcuate header-beam member, the two adapter members at the both ends of the arcuate header-beam member may be symmetrical relative to a first reference plane, a second reference plane may pass over a line connecting the both ends of the arcuate header-beam member and perpendicularly intersect with the first reference plane, and when projecting the arcuate header-beam member and the two adapter members to the second reference plane when the arcuate header-beam member is in a natural state, a free end of the adapter member configured to connect the core module may have a first position when the core module is closest to the arcuate header-beam member, and the free end may have a second position when the core module is farthest away from the arcuate header-beam member, a line connecting the first position and the second position may have a first projection magnitude at a first reference direction parallel to a line connecting the both ends of the arcuate header-beam member, and the line connecting the first position and the second position may have a second projection magnitude at a second reference direction perpendicular to the line connecting the both ends of the arcuate header-beam member, and a ratio of the second projection magnitude to the first projection magnitude may be greater than or equal to 2; and/or a ratio of a cross-sectional bending stiffness of the adapter member and a cross-sectional bending stiffness of the arcuate header-beam member may be less than or equal to 0.9.

In some embodiments, the headphone may further comprise an adapter housing rotationally connected with one end of the adapter member away from the arcuate header-beam member, the core module may further include the core housing rotationally connected with the adapter housing, the transducer device may be provided in the accommodating cavity of the core housing, and an axis of the core housing rotating relative to the adapter housing may intersect with an axis of the adapter housing rotating relative to the adapter member.

In some embodiments, the adapter housing may be provided with a rotating shaft cavity, the adapter member may be inserted into the rotating shaft cavity along an axial direction of the rotating shaft cavity, the headphone may further comprise a locking member, the locking member may be configured to restrict the adapter member along the axial direction of the rotating shaft cavity to keep the adapter member inside the rotating shaft cavity, an outer peripheral wall of the adapter member may be provided with a restriction groove, and an inner peripheral wall of the rotating shaft cavity may be provided with a restriction block, the restriction block may be embedded in the restriction groove to restrict a rotation angle of the adapter member relative to the rotating shaft cavity.

In some embodiments, a free end of the adapter member may be provided with a slot, and after the adapter member may be inserted into the rotating shaft cavity from one end of the rotating shaft cavity, the slot may be exposed from another end of the rotating shaft cavity, the locking member may be arranged in the slot, and a radial dimension of the locking member may be larger than a radial dimension of the rotating shaft cavity.

In some embodiments, the rotation angle may be between 5° and 15°.

In some embodiments, the headphone may further comprise a battery and a main board coupled to the transducer device, the adapter housing may include a center plate rotationally connected with the adapter member and an outer housing connected with the center plate, the battery or the main board may be provided between the outer housing and the center plate, and the core housing may be rotationally connected with the adapter housing and disposed on a side of the center plate away from the outer housing.

In some embodiments, the core module may further include a first vibration plate and a vibration panel, the transducer device may be suspended in the accommodating cavity of the core housing through the first vibration plate, and the vibration panel may be connected with the transducer device and configured to contact the skin of the user; and a pressure force of the vibration panel against the cheek of the user may be less than the pressure force applied by the header-beam assembly to press the core module against the cheek of the user, and a contacting area between the vibration panel and the cheek of the user may be less than a contacting area between the core module and the cheek of the user.

In some embodiments, the supporting assembly may be a header-beam assembly, the headphone may include an adapter housing rotationally connected with the header-beam assembler, the core module connected with the adapter housing, and a battery and a main board coupled to the core module, the header-beam assembly may be configured to wrap around a top of a head of the user and to allow the core module to contact the cheek of the user, the adapter assembly may include a center plate rotationally connected with the header-beam assembly and an outer housing connected with the center plate, the battery or the main board may be provided between the outer housing and the center plate, the core module include a core housing rotationally connected with the adapter housing and the transducer device provided in the accommodating cavity of the core housing, and the core housing and the outer housing may be respectively disposed on opposite sides of the center plate.

In some embodiments, the core housing may rotate around a first axis relative to the adapter housing, the adapter housing may rotate around a second axis relative to the header-beam assembly, and the first axis and the second axis intersect on a reference plane perpendicular to a vibration direction of the transducer device.

In some embodiments, the core module may further include a first vibration plate and a vibration panel, the transducer device may be suspended in the accommodating cavity of the core housing through the first vibration plate, and the vibration panel may be connected with the transducer device and configured to contact the skin of the user.

In some embodiments, the core module may further include a connecting member, the core housing may include an inner cylinder wall, a first end wall and a second end wall respectively connected with both ends of the inner cylinder wall, the first end wall and the second end wall may be disposed on two opposite sides of the transducer device along the vibration direction of the transducer device and enclose the accommodating cavity with the inner cylinder wall, the first end wall may be provided with a mounting hole, the vibration panel may be located outside the core housing, one end of the connecting member may be connected with the vibration panel, and another end of the connecting member may extend into the core housing through the mounting hole and may be connected with the transducer device; and viewed along the vibration direction, an area of the vibration panel may be larger than an area of the mounting hole, and the area of the mounting hole may be larger than an area of the connecting member.

In some embodiments, viewed along the vibration direction, a ratio of the area of the mounting hole to an area of the first end wall may be less than or equal to 0.6.

In some embodiments, viewed along the vibration direction, a ratio of a difference between the area of the mounting hole to the area of the connecting member to the area of the mounting hole may be greater than 0 and less than or equal to 0.5.

In some embodiments, a side of the vibration panel away from the transducer device may include a skin contacting region configured to contact the skin of the user and an edge region connected with the skin contacting region, the edge region may be located at a periphery of the skin contacting region and may be provided at intervals from the skin contacting region along the vibration direction, the core module may further include a surrounding edge connected with an end of the inner peripheral wall away from the second end wall, the surrounding edge may include a connecting portion connected with the inner peripheral wall and a limiting portion connected with the connecting portion, the limiting portion may be disposed on the side of the vibration panel away from the transducer device, and viewed along the vibration direction, the limiting portion may overlap the edge region and may be staggered from the skin contacting region, and in a non-wearing state, the skin contacting region may protrude out of the side of the limiting portion away from the transducer device along the vibration direction.

In some embodiments, the side of the vibration panel away from the transducer device may further include an air-conduction enhancement region connected between the skin contacting region and the edge region, at least a portion of the air-conduction enhancement region may not contact the skin of the user, and the vibration panel may drive the air outside the headphone to vibrate through the air-conduction enhancement region to generate a sound wave.

In some embodiments, at least a portion of the air-conduction enhancement region may be inclined relative to the skin contacting region, and an inclination angle of the air-conduction enhancement region relative to the skin contacting region may be within a range of 0 to 75°; and/or a width of an orthographic projection of the air-conduction enhancement region along the vibration direction may be greater than or equal to 1 mm.

In some embodiments, the header-beam assembly may include an arcuate header-beam member and an adapter member, the arcuate header-beam member may be configured to wrap around a top of a head of the user, the adapter member may include a first connecting section, an intermediate transition section, and a second connecting section connected in sequence, the first connecting section may be connected with the arcuate header-beam member, the second connecting section may be rotationally connected with the center plate, the first connecting section and the second connecting section may be respectively bent relative to the intermediate transition section and extend along opposite directions such that in a wearing state and viewed along a coronal axis of the user, the arcuate header-beam member may be located above an ear of the user, and the core module may be located on a front side of the ear of the user.

In some embodiments, the first connecting section may be bent at an angle greater than or equal to 90° and less than 180° relative to the intermediate transition section; and/or the second connecting section may be bent at an angle greater than or equal to 90° and less than 180° relative to the intermediate transition section.

In some embodiments, in the wearing state and viewed along the coronal axis of the user, the first connecting section may be parallel to the second connecting section, and a spacing between the first connecting section and the second connecting section may be between 20 mm and 30 mm.

In some embodiments, the headphone may comprise an adapter housing, the core module may include the core housing rotationally connected with the adapter housing, the transducer device provided in the accommodating cavity of the core housing, and a surrounding edge connected with an end of the core housing away from the adapter housing, and the surrounding edge may include a connecting portion connected with the core housing and a flange portion connected with the connecting portion; and viewed along a vibration direction of the transducer device, the flange portion may be located at a periphery of the core housing and overlap the adapter housing, and in a non-wearing state, a distance between the flange portion and the adapter housing in a vibration direction gradually may increase with an axis of the core housing rotating relative to the adapter housing as a starting point along a reference direction, wherein the reference direction may be perpendicular to the vibration direction and a direction where the axis is located and is away from the axis.

In some embodiments, a maximum distance between the flange portion and the adapter housing along the vibration direction may be between 2 mm and 5 mm.

In some embodiments, viewed along the axis direction, a side of the flange portion facing the adapter housing may have an arcuate shape.

In some embodiments, an arc radius of the side of the flange portion facing the adapter housing may be greater than or equal to 50 mm.

In some embodiments, the core module may further include a first vibration plate and a vibration panel, the transducer device may be suspended in the accommodating cavity of the core housing through the first vibration plate, the vibration panel may be connected with the transducer device and may be configured to contact the skin of the user, and the surrounding edge may surround the vibration panel; and in the non-wearing state, the surrounding edge may be provided at intervals from the vibration panel along a direction perpendicular to the vibration direction, and at least a portion of a side of the vibration panel away from the transducer device may protrude out of a side of the surrounding edge away from the transducer device along the vibration direction.

In some embodiments, the side of the vibration panel away form the transducer device may include a skin contacting region configured to contact the skin of the user and an edge region connected with the skin contacting region, the edge region may be located at the periphery of the skin contacting area and may be provided at intervals from the skin contacting area along the vibration direction, the surrounding edge may further include a limiting portion connected with the connection section, and the limiting portion may be located at the side of the vibration panel away from the transducer, and viewed along the vibration direction, the limiting portion may overlap with the edge region and may be staggered from the edge region, and in the non-wearing state, the skin contacting region may protrude out of a side of the limiting portion away from the transducer device along the vibration direction.

In some embodiments, the side of the vibration panel away from the transducer device may further include an air-conduction enhancement region connected between the skin contacting region and the edge region, at least a portion of the air-conduction enhancement region may not contact the skin of the user, and the vibration panel may drive the air outside the headphone to vibrate through the air-conduction enhancement region to generate a sound wave.

In some embodiments, at least a portion of the air-conduction enhancement region may be inclined relative to the skin contacting region, and an inclination angle of the air-conduction enhancement region relative to the skin contacting region may be within a range of 0 to 75°; and/or a width of an orthographic projection of the air-conduction enhancement region along the vibration direction may be greater than or equal to 1 mm.

In some embodiments, the headphone may further include a header-beam assembly connected with the adapter housing, the header-beam assembly may be configured to wrap around a top of a head of the user and to allow the core module to contact a cheek of the user, the header-beam assembly may include an arcuate header-beam member and an adapter member, the arcuate header-beam member may be configured to wrap around the top of the head of the user, the adapter member may include a first connecting section, an intermediate transition section, and a second connecting section connected in sequence, the first connecting section may be connected with the arcuate header-beam member, the second connecting section may be connected with the adapter housing, and the first connecting section and the second connecting section may be respectively bent relative to the intermediate transition section and extend along opposite directions such that in a wearing state, viewed along a coronal axis of the user, the arcuate header-beam member may be located above an ear of the user, and the core module may be located on a front side of the ear of the user.

In some embodiments, the first connecting section may be bent at an angle greater than or equal to 90° and less than 180° relative to the intermediate transition section; and/or the second connecting section may be bent at an angle greater than or equal to 90° and less than 180° relative to the intermediate transition section.

In some embodiments, in the wearing state and viewed along the coronal axis of the user, the first connecting section may be parallel to the second connecting section, and the spacing between the first connecting section and the second connecting section may be between 20 mm and 30 mm.

In some embodiments, the headphone may comprise an adapter housing, the adapter housing may include a cylinder sidewall, the cylinder sidewall may be disposed at a periphery of the core module, the core module may include the core housing and the transducer device provided in the accommodating cavity of the core housing, the core housing may include a first core housing, the first core housing may include an inner cylinder wall and an outer cylinder wall, the inner cylinder wall may be disposed at a periphery of the transducer device, the outer cylinder wall may be disposed at a periphery of the inner cylinder wall and may be provided at intervals from the inner cylinder wall along a direction perpendicular to a vibration direction of the transducer device, one of the outer cylinder wall and the cylinder sidewall may be provided with a shaft hole, another of the outer cylinder wall and the cylinder sidewall may be provided with a rotating shaft cooperating with the shaft hole, and the rotating shaft may be embedded in the shaft hole to allow the core housing to rotate relative to the adapter housing.

In some embodiments, the first core housing may further include a reinforcing post, the reinforcing post may be connected between the outer cylinder wall and the inner cylinder wall, a side of the cylinder sidewall facing the outer cylinder wall may be provided with the rotating shaft, and the reinforcing post may be provided with the shaft hole.

In some embodiments, the first core housing may further include a transition wall and a cover plate that may be connected between the inner cylinder wall and the outer cylinder wall, the cover plate and the transition wall may be provided at intervals along the vibration direction and enclose a Helmholtz resonance cavity with the outer cylinder wall, the inner cylinder wall, and the transition wall, and the Helmholtz resonance cavity may communicate with the accommodating cavity to absorb acoustic energy of a sound wave generated by a vibration of the air in the accommodating cavity vibrating with the transducer device.

In some embodiments, a frequency response curve of the sound wave may have a resonant peak, a peak resonance frequency of the resonant peak may be within a range of 500 Hz to 4 kHz, and a difference between a peak resonance intensity of the resonant peak when an opening for realizing flow communication between the Helmholtz resonance cavity and the accommodating cavity is in an open state and a peak resonance intensity of the resonant peak when the opening for realizing flow communication between the Helmholtz resonance cavity and the accommodating cavity is in a closed state may be greater than or equal to 3 dB.

In some embodiments, the first core housing may further include an end wall and a transition wall, the end wall may be connected with one end of the inner cylinder wall and enclose the accommodating cavity, the transition wall may be connected between the inner cylinder wall and the outer cylinder wall, the adapter housing may further include a center plate connected with the cylinder sidewall, the center plate may be disposed on a side of the end wall away from the accommodating cavity, the end wall, the inner cylinder wall, the transition wall, and the outer cylinder wall may be enclosed with the center plate and the cylinder sidewall to form an audio filter, the audio filter may communicate with the accommodating cavity to absorb acoustic energy of the sound wave generated by a vibration of the air in the accommodating cavity vibrating with the transducer device, and the sound wave may be absorbed by the audio filter and then transmitted to an exterior of the headphone through a gap between the cylinder sidewall and the outer cylinder wall.

In some embodiments, a cut-off frequency of the audio filter may be less than or equal to 5 kHz.

In some embodiments, a distance between the transition wall and the center plate along the vibration direction and a distance between the inner cylinder wall and the outer cylinder wall along the direction perpendicular to the vibration direction may be all greater than a distance between the cylinder sidewall and the outer cylinder wall along the direction perpendicular to the vibration direction.

In some embodiments, the headphone further may comprise a battery and a main board coupled to the transducer device, the adapter housing may further include an outer housing connected with the cylinder sidewall, and the battery or the main board may be provided on a side of the outer housing facing the transducer device.

In some embodiments, the headphone further may comprise a function assembly provided on the outer housing and coupled to the battery and the main board, the function assembly may include a first circuit board, a second circuit board, an encoder, a flick switch, and a function key; the first circuit board may be provided in stacked with the second circuit board, the encoder may be provided on the first circuit board, the flick switch may be provided on the second circuit board and may be disposed on a side of the second circuit board facing the first circuit board, the function key may include a key cap and a key rod connected with the key cap, the key cap may be disposed on a side of the first circuit board away from the second circuit board, a free end of the key rod away from the key cap may be provided facing the flick switch, and the encoder may be sleeved on the key rod; and when the user rotates the key rod through the key cap, the key rod may drive the encoder to generate a first input signal, and when the user presses the key rod through the key cap, the key rod may trigger the flick switch to generate a second input signal.

In some embodiments, the first input signal may be configured to control volume up/down of the headphone; and/or the second input signal may be configured to control any one of playing/pausing, song skipping, device matching, and power on/off of the headphone.

In some embodiments, the headphone may further comprise a pickup assembly and a switch assembly, the pickup assembly may include a pivot connecting block, a connecting rod, and a pickup, the pivot connecting block may be pivotally connected with the outer housing, one end of the connecting rod may be connected with the pivot connecting block, the pickup may be provided on another end of the connecting rod, a recessed region may be provided on a side of the pivot connecting block away from the adapter housing, and the switch assembly may be provided in the recessed region.

In some embodiments, a protrusion may be provided on the bottom of the recessed region, and an outer peripheral wall of the protrusion and a sidewall of the recessed region form a ring groove, the switch assembly may include a switch circuit board, an elastic supporting member, a reinforcing ring, and a key, the switch circuit board may be disposed on a top of the protrusion, the elastic supporting member may include a ring fixing portion and an elastic supporting portion that may be integrally formed, the reinforcing ring may be provided on the ring fixing portion along a circumference of the ring fixing portion, the ring fixing portion may be fixed to the ring groove through the reinforcing ring, the elastic supporting portion may be provided in a shape of a dome, and the key may be provided on the elastic supporting portion.

In some embodiments, the core module may include a first vibration plate and a connecting member, the transducer device may be suspended in the accommodating cavity of the core housing through the first vibration plate, the core housing may include a first core housing, a second core housing, and a surrounding edge, the first core housing may include an inner cylinder wall and a first outer cylinder wall, the inner cylinder wall may be located at a periphery of the transducer device, the first outer cylinder wall may be located at a periphery of the inner cylinder wall and may be provided at intervals from the inner cylinder wall along a direction perpendicular to a vibration direction of the transducer device, the second core housing may be connected with the inner cylinder wall and may be provided with a mounting hole, the vibration panel may be disposed outside the core housing and may be configured to contact the skin of a user, one end of the connecting member may be connected with the vibration panel, another end of the connecting member may extend into the core housing through the mounting hole and may be connected with the transducer device, and the surrounding edge may be connected with the first outer cylinder wall and enclose the vibration panel.

In some embodiments, the second core housing may include a first end wall and a first cylinder sidewall connected with the first end wall, the first cylinder sidewall may be disposed between the inner cylinder wall and the first outer cylinder wall, the first cylinder wall may be clamped to the inner cylinder wall, and the mounting hole may be provided on the first end wall.

In some embodiments, the second core housing may abut a peripheral region of the first vibration plate against the inner cylinder wall.

In some embodiments, a side of the vibration panel away from the transducer device may include a skin contacting region for contacting the skin of the user and an edge region connected with the skin contacting region, the edge region may be located at a periphery of the skin contacting region and may be provided at intervals from the skin contacting region along the vibration direction, the surrounding edge may include a connecting portion clamped with the first outer cylinder wall and a limiting portion connected with the connecting portion, the connecting portion may be in cylinder and located at a periphery of the first outer cylinder wall, the limiting portion may be disposed on a side of the vibration panel away from the transducer device, the limiting portion viewed along the vibration direction may overlap the edge region and may be staggered from the skin contacting region, and in a non-wearing state, the skin contacting region may protrude out of a side of the limiting portion away from the transducer device along the vibration direction.

In some embodiments, the side of the vibration panel away from the transducer device may further include an air-conduction enhancement region connected between the skin contacting region and the edge region, at least a portion of the air-conduction enhancement region may not contact the skin of the user, and the vibration panel may drive the air outside the headphone to vibrate through the air-conduction enhancement region to generate a sound wave.

In some embodiments, at least a portion of the air-conduction enhancement region may be inclined relative to the skin contacting region, and an inclination angle of the air-conduction enhancement region relative to the skin contacting region may be within a range of 0 to 75°; and/or a width of an orthographic projection of the air-conduction enhancement region along the vibration direction may be greater than or equal to 1 mm.

In some embodiments, the headphone may further comprise an adapter housing rotationally connected with the core housing, the surrounding edge may further include a flange portion connected with the connecting portion, at least a portion of the flange portion may be provided at intervals from the adapter housing along the vibration direction, and viewed along the vibration direction, the flange portion may be disposed on the periphery of the first outer cylinder wall and overlap with the adapter housing.

In some embodiments, in the non-wearing state, a distance between the flange portion and the adapter housing in a vibration direction may gradually increase with an axis of the core housing rotating relative to the adapter housing as a starting point along a reference direction, wherein the reference direction may be perpendicular to the vibration direction and the axis direction and may be away from the axis.

In some embodiments, the maximum distance between the flange portion and the adapter housing along the vibration direction may be between 2 mm and 5 mm.

In some embodiments, viewed along the axis direction, a side of the flange portion facing the adapter housing may have an arcuate shape.

In some embodiments, the first core housing may further include a second outer cylinder wall and a reinforcing post, the second outer cylinder wall may be disposed on the periphery of the inner cylinder wall and may be provided at intervals from the inner cylinder wall along the direction perpendicular to the vibration direction of the transducer device, the second outer cylinder wall and the first outer cylinder wall extend along opposite directions, the reinforcing post may connect the second outer cylinder wall and the inner cylinder wall, the adapter housing may include a second cylinder sidewall, the second cylinder sidewall may be disposed at a periphery of the second outer cylinder wall, one of the reinforcing post and the second cylinder sidewall may be provided with a shaft hole, another one of the reinforcing post and the second cylinder sidewall may be provided with a rotating shaft cooperating with the shaft hole, and the rotating shaft may be embedded in the shaft hole to allow the core housing to rotate relative to the adapter housing.

In some embodiments, the first core housing may further include a transition wall and a cover plate that may be connected between the inner cylinder wall and the second outer cylinder wall, the cover plate and the transition wall may be provided at intervals along the vibration direction, and enclose a Helmholtz resonance cavity with the second outer cylinder wall and the inner cylinder wall, the Helmholtz resonance cavity may be in flow communication with the accommodating cavity to absorb acoustic energy of a sound wave generated by a vibration of the air in the accommodating cavity vibrating with the transducer device.

In some embodiments, viewed along the vibration direction, the second outer cylinder wall may be disposed at the peripheral of the first outer cylinder wall and may be disposed inside the flange portion such that the flange portion may overlap the second cylinder sidewall.

In some embodiments, the transition wall may include a first sub-transition wall and a second sub-transition wall, the first sub-transition wall may connect the inner cylinder wall and the first outer cylinder wall, the second sub-transition wall may connect the first outer cylinder wall and the second outer cylinder wall, the second sub-transition wall may be provided at intervals from the first sub-transition wall along the vibration direction, and the second sub-transition wall may be closer to the vibration panel than the first sub-transition wall.

In some embodiments, the headphone may comprise a connecting wire assembly, the connecting wire assembly may include a wire configured to conduct electricity and an auxiliary wire connected with the wire; and a deformation of the wire under an external force may drive an elastic deformation of the auxiliary wire, the auxiliary wire may provide an elastic restoring force after the external force may be released, and the elastic restoring force may be configured to drive the wire to restore to a shape before the deformation.

In some embodiments, the wire may include a telescoping section and two natural sections disposed at two ends of the telescoping section, an elastic coefficient of the telescoping section may be between an elastic coefficient of the natural sections and an elastic coefficient of the auxiliary wire.

In some embodiments, the telescoping section may be a portion of the wire that extends spirally around at least a portion of the auxiliary wire.

In some embodiments, in a natural state, the ratio of the length of the telescoping section to the length of the wire may be between 0.1 and 0.5.

In some embodiments, the auxiliary wire may include an elastic body and two sleeve rings disposed at both ends of the elastic body, each of the two sleeve rings may be sleeved on a corresponding natural section of the two natural sections and stopped by a limiting structure on the natural section along a rebound direction of the telescoping section.

In some embodiments, the limiting structure may be a protrusion integrally connected with an insulating layer of the wire, or a knot formed by knotting the natural section.

In some embodiments, the supporting assembly may be a header-beam assembly, the header-beam assembly may include an arcuate header-beam member, an adapter member, and the connecting wire assembly, the arcuate header-beam member may be configured to wrap around the top of the head of the user, two ends of the adapter member may be respectively connected with the arcuate header-beam member and the core module, and the adapter member may be capable of extending from or retracting into the arcuate header-beam member under an action of an external force such that the core module may be allowed to be closed to or away from the arcuate header-beam member along an extending direction of the header-beam assembly, the connecting wire assembly may extend along the arcuate header-beam member and extend or retract along with an extension of the connecting member or a retraction of the connector, and the wire may be electrically connected with the core module.

In some embodiments, the wire may include a telescoping section and two natural sections disposed at two ends of the telescoping section, and an intermediate region of the telescoping section may be fixed to the arcuate header-beam member.

In some embodiments, the header-beam assembly may further include an abutting member clamped to the arcuate header-beam member, and the abutting member abutting a middle region of the telescoping section against the arcuate header-beam member.

In some embodiments, the abutting member may include an abutting portion and two clamping portions disposed at both ends of the abutting portion, each clamping portion of the two clamping portions may be bent relative to the abutting portion, the two clamping portions extending in a same direction towards a side of the clamping portion and may be capable of being close to each other under action of an external force, the abutting portion may be configured to press the middle region of the telescoping section, and the clamping portion may be configured to clamp to the arcuate header-beam member.

In some embodiments, the core module may include a first vibration plate, the transducer device may be suspended in the accommodating cavity of the core housing through the first vibration plate, the core module may include one or more frames, a second vibration plate, a magnetic circuit system, and a coil, the one or more frames may be connected with the core housing through the first vibration plate, the second vibration plate may connect the one or more frames and the magnetic circuit system to suspend the magnetic circuit system within the accommodating cavity, the coil may be connected with the one or more frames and extend into a magnetic gap of the magnetic circuit system along a vibration direction of the transducer device, and the vibration panel may be connected with the one or more frames.

In some embodiments, the magnetic circuit system may include a magnetic guide cover and a magnet connected with the bottom of the magnetic guide cover, the magnet may be connected with a central region of the second vibration plate and may be provided at intervals from a sidewall of the magnetic guide cover along a direction perpendicular to the vibration direction to form a magnetic gap, and the sidewall of the magnetic guide cover and the second vibration plate may be provided at intervals along the vibration direction to form a channel for realizing flow communication between the magnetic gap and an exterior of the magnetic circuit system.

In some embodiments, the magnet may include a first magnetic member, a magnetic conducting member, and a second magnetic member provided in layers along the vibration direction, the second magnetic member may be closer to the second vibration plate relative to the first magnetic member, magnetization directions of the first magnetic member and the second magnetic member may be different, and the sidewall of the magnetic guide cover may at least overlap with the magnetic conducting member when the sidewall of the magnetic guide cover is orthogonally projected onto an outer peripheral surface of the magnet along the direction perpendicular to the vibration direction.

In some embodiments, the coil may at least overlap with the magnetic conducting member when projected orthogonally onto the outer peripheral surface of the magnet in the direction perpendicular to the vibration direction.

In some embodiments, the one or more frames may include a first frame and a second frame, the first frame may be connected with a central region of the first vibration plate, the second frame may be connected with a peripheral region of the second vibration plate, the second frame and the vibration panel may be respectively connected with the first frame, and the coil may be connected with the second frame.

In some embodiments, the transducer device may further include a suspending frame, the suspending frame may be connected with a central region of the second vibration plate, the second frame may be disposed at the periphery of the suspending frame and may be provided at intervals from the suspending frame in a direction perpendicular to the vibration direction, and the magnetic circuit system may be connected with the suspending frame.

In some embodiments, the first frame and the first vibration plate may be integrally molded by a metal insert injection molding technique, the second frame and the second vibration plate may be integrally molded by the metal insert injection molding technique, one of the first frame and the second frame may be provided with a connecting jack, and another one of the first frame and the second frame may be provided with a connecting pin embedded in the connecting jack, and the connecting pin may extend into the connecting jack.

In some embodiments, wherein the core housing may include an inner cylinder wall, a first end wall and a second end wall respectively connected with both ends of the inner cylinder wall, the first end wall and the second end wall may be disposed on two opposite sides of the transducer device along a vibration direction of the transducer device and enclose the accommodating cavity with the inner cylinder wall, the first end wall may be provided with a mounting hole, the vibration panel may be located outside the core housing and may be configured to contact the skin of the user, one end of the connecting member may be connected with the vibration panel, and another end of the connecting member may extend into the core housing through the mounting hole and may be connected with the transducer device, and viewed along the vibration direction, an area of the vibration panel may be larger than an area of the mounting hole, and the area of the mounting hole may be larger than an area of the connecting member.

In some embodiments, the accommodating cavity may communicate with an exterior of the headphone merely through one single channel, and the channel may be a gap between the connecting member and a wall of the mounting hole; or the accommodating cavity may communicate with the exterior of the headphone merely through a first channel and a second channel, the first channel may be the gap between the connecting member and the wall of the mounting hole, and the second channel may communicate with the exterior of the headphone through an audio filter; or the accommodating cavity may communicate with the exterior of the headphone merely through the first channel and the second channel, the first channel may be the gap between the connecting member and the wall of the mounting hole, and a ratio of an opening area of the second channel to an opening area of the first channel may be less than or equal to 10%.

In some embodiments, the accommodating cavity may communicate with the exterior of the headphone through one single channel, the channel may be a gap between the connecting member and the wall of the mounting hole, the core module may further include a sealing membrane, and the sealing membrane may seal the channel.

In some embodiments, the sealing membrane may include a first connecting portion, a pleated portion, and a second connecting portion, the first connecting portion, the pleated portion, and the second connecting portion may be integrally connected, the pleated portion may form a recessed region between the first connecting portion and the second connecting portion, the first connecting portion may be connected with the first end wall, and the second connecting portion may be connected with the connecting member or the vibration panel.

In some embodiments, viewed along the vibration direction, a ratio of a difference between the area of the mounting hole and the area of the connecting member to the area of the mounting hole may be greater than 0 and less than or equal to 0.5.

In some embodiments, the distance between the connecting member and the wall of the mounting hole may be greater than or equal to 0.1 mm and less than or equal to 1 mm.

In some embodiments, the headphone may comprise the supporting assembly and the core module connected with the supporting assembly, wherein the supporting assembly may be configured to support the core module to be worn to the wearing position, the core module may include the core housing, the transducer device, and the vibration panel, the transducer device may be provided in the accommodating cavity of the core housing, the vibration panel may be connected with the transducer device and may be configured to transmit a mechanical vibration generated by the transducer device to the user. In a wearing state and along a coronal axis of the user, a center of a side of the vibration panel facing the wearing position may be closer to the outer ear canal of the user than the center of a side of the core housing facing the wearing position along a sagittal axis of the user.

In some embodiments, a center of the vibration panel projected orthogonally onto the core housing along a vibration direction of the transducer device may coincide with a center of the transducer device projected orthogonally onto the core housing along the vibration direction, and the center of the transducer device projected orthogonally onto the core housing along the vibration direction may not coincide with a center of a side of the core housing facing the transducer device along the vibration direction.

In some embodiments, the center of the transducer device projected orthogonally onto the core housing along a vibration direction of the transducer device may coincide with the center of a side of the core housing facing the transducer device along the vibration direction, and the center of the vibration panel projected orthogonally onto the core housing along the vibration direction may not coincide with the center of the transducer device projected orthogonally onto the core housing along the vibration direction.

In some embodiments, the headphone may further comprise an adapter housing connecting the core housing and the supporting assembly, the adapter housing may include a cylinder sidewall disposed at the periphery of the core housing, an orthographic projection of the core housing and an orthographic projection of the cylinder sidewall on a reference plane perpendicular to a vibration direction of the transducer device respectively have a first center and a second center, and in the wearing state, the first center may be closer to the outer ear canal of the ear of the user relative to the second center.

In some embodiments, the core housing may rotate around a first axis relative to the adapter housing, the first center and the second center may be provided at intervals along a direction where the first axis may be located.

In some embodiments, the first center and the second center may be on the first axis.

In some embodiments, the adapter housing may rotate around a second axis relative to the supporting assembly, and the second axis crosses the first axis.

In some embodiments, the headphone may further comprise a battery and a main board coupled to the transducer device, the adapter housing may further include a center plate coupled to an inner side of the cylinder sidewall and an outer housing buckled with the cylinder sidewall, the battery or the main board may be provided between the outer housing and the center plate, and the core housing may be disposed at a side of the center plate away from the outer housing.

In some embodiments, the supporting assembly may be a header-beam assembly, the header-beam assembly may be configured to wrap around the top of the head of the user and to allow the vibration panel to contact the cheek of the user, in the wearing state, the header-beam assembly and the top of the head form a first contacting point, the vibration panel and the cheek of the user form a second contacting point, and a spacing between the second contacting point and the first contacting point along the sagittal axis of the user may be between 20 mm and 30 mm.

In some embodiments, the header-beam assembly may include an arcuate header-beam member and an adapter member, the arcuate header-beam member may be configured to wrap around the top of the head of the user, the adapter member may include a first connecting section, an intermediate transition section, and a second connecting section, the intermediate transition section may connect the first connecting section and the second connecting section, the first connecting section and the second connecting section may be respectively bent relative to the intermediate transition section and extend along opposite directions, the first connecting section may be connected with the arcuate header-beam member, and the second connecting section may be connected with the adapter housing; and viewed along the coronal axis of the user, the intermediate transition section may be inclined relative to a vertical axis of the user.

In some embodiments, the supporting assembly may be a header-beam assembly, the header-beam assembly may be configured to wrap around a top of the head of the user and to allow the core module to contact the cheek of the user such that the core module may transmit a mechanical vibration generated by the core module through a bone conduction, in a wearing state, the header-beam assembly and the top of the head form a first contacting point, the core module and the cheek of the user form a second contacting point, the header-beam assembly and the head of the user also form a third contacting point, the third contacting point may be between the first contacting point and the second contacting point along a vertical axis of the user.

In some embodiments, when the header-beam assembly forms the third contacting point with the head of the user, at least a portion of the header-beam assembly between the first contacting point and the second contacting point may not contact the head of the user.

In some embodiments, the header-beam assembly and each of both sides of the head of the user form the third contacting point.

In some embodiments, both ends of the header-beam assembly may be respectively connected with one of two core modules, and each of the two core modules and the cheek of the user form the second contacting point.

In some embodiments, in the wearing state, the headphone may apply a pressing force directed to the head of the user at the first contacting point, the second contacting point, and the third contacting point, respectively.

In some embodiments, the pressing force at the second contacting point may be between 0.2 N and 2 N, and the pressing force at the third contacting point may be between 0.3 N and 2 N.

In some embodiments, the header-beam assembly may include an arcuate header-beam member and two auxiliary members connected with the arcuate header-beam member, the arcuate header-beam member may be configured to wrap around the top of the head of the user, the core module may be connected with the arcuate header-beam member, and in the wearing state, the two auxiliary members and both sides of the head of the user respectively form third contacting points.

In some embodiments, the two auxiliary members may be elastic such that when the headphone is worn by users with heads of different sizes, an amount of a change of the pressing force at the second contacting point due to different degrees of elastic deformations of the auxiliary members may be less than or equal to 0.2 N.

In some embodiments, the header-beam assembly may further include an adapter member connecting the arcuate header-beam member and the core module, the adapter member may allow the core module to move close to or away from the arcuate header-beam member along an extension direction of the header-beam assembly, the arcuate header-beam member may provide a first pressing force for the core module in a first using state, the arcuate header-beam member may provide a second pressing force for the core module in a second using state, and the auxiliary members may be configured such that an absolute value of a difference between the second pressing force and the first pressing force may be between 0 and 0.1 N; and in the first using state, each adapter member of two adapter members at both ends of the arcuate header-beam member may have a first extension relative to the arcuate header-beam member, and two core modules at both ends of the header-beam assembly have a first spacing between each other, in the second using state, the each adapter member may have a second extension relative to the arcuate header-beam member, and the two core modules at both ends of the header-beam assembly have a second spacing between each other, the first extension may be greater than the first extension, and the second spacing may be greater than the first spacing.

In some embodiments, the first pressing force and the second pressing force may be between 0.4 N and 0.8 N.

In some embodiments, the first extension may be a minimum when the core module is closest to the arcuate header-beam member; and the second extension may be a maximum when the core module is farthest away from the arcuate header-beam member.

In some embodiments, in a natural state, the header-beam assembly may have a first reference plane and a second reference plane, the first reference plane and the second reference plane being orthogonal to each other, the two auxiliary members may be symmetrically provided relative to the first reference plane, the second reference plane may pass over a highest point and two endpoints of the arcuate header-beam member, when the arcuate header-beam member and the two auxiliary members are projected onto the second reference plane, and in the second reference plane, a line connecting a fixed end and a free end of one of the two auxiliary members may have a first projection magnitude at a first reference direction parallel to a line connecting the two endpoints and have a second projection magnitude at a second reference direction perpendicular to the line connecting the two endpoints, and a ratio of the second projection magnitude to the first projection magnitude may be between 1 and 5; and/or an equivalent elasticity coefficient of one of the auxiliary members may be between 100 N/m and 180 N/m.

In some embodiments, in the natural state, when the arcuate header-beam member is projected onto the second reference plane, a right-angle coordinate system may be established in the second reference plane, the right-angle coordinate system may take the highest point as a coordinate origin, a straight line that passes through the coordinate origin and may be parallel to the line connecting the two endpoints as an x-axis, and a straight line that passes through the coordinate origin and may be perpendicular to the x-axis as a y-axis, and a curve of the arcuate header-beam member from any endpoint of the two endpoints to the highest point may satisfy a following equation:

$$x = \pm\big(-2.63472525\cdot 10^{15}\cdot y^{10} + 1.41380284\cdot 10^{12}\cdot y^{9} - 3.25586957\cdot 10^{10}\cdot y^{8} + 4.2058788\cdot 10^{8}\cdot y^{7} - 3.34381129\cdot 10^{6}\cdot y^{6} + 1.69016414\cdot 10^{4}\cdot y^{5} - 5.42625713\cdot 10^{3}\cdot y^{4} + 1.07794891\cdot 10^{1}\cdot y^{3} - 1.27679777\cdot y^{2} + 9.70381438\cdot y + 2.61\big).;$$

wherein a thickness of one of the two auxiliary members 125 may be less than or equal to 4 mm, and a distance between the one of the two auxiliary members and the arcuate headstock member may be greater than or equal to 10 mm.

In some embodiments, each of the two auxiliary members may be fixed to an end portion of the arcuate header-beam member, the line connecting any one of the two endpoints and the highest point of the arcuate header-beam member may have a third projection magnitude along the first reference direction parallel to the line connecting the two endpoints and have a fourth projection magnitude along the second reference direction perpendicular to the line connecting the two endpoints, and a ratio of the second projection magnitude to the fourth projection magnitude may be between 0.1 and 0.5.

In some embodiments, each of the two auxiliary members may be a cantilever relative to the arcuate header-beam member.

In some embodiments, in a head-down state, the pressing force at the first contacting point may form a first resistance torque relative to the second contacting point, the pressing force at the third contacting point may form a second resistance torque relative to the second contacting point, the pressing force at the second contacting point may form a third resistance torque relative to a contact surface between the core module and the cheek of the user when the header-beam assembly may include the auxiliary piece, and the pressing force at the second contacting point may form a fourth resistance torque relative to the contact surface between the core module and the cheek of the user when the header-beam assembly does not include the auxiliary member, and a combined torque formed by the first resistance torque, the second resistance torque, and the third resistance torque may be greater than a combined torque formed by the first resistance torque and the fourth resistance torque.

In some embodiments, in a natural state, the header-beam assembly may have a first reference plane and a second reference plane orthogonal to each other, the two auxiliary members may be symmetrically provided relative to the first reference plane, the second reference plane may pass over a highest point of the arcuate header-beam member and two endpoints of the arcuate header-beam member, when the arcuate header-beam member and the two auxiliary members are projected onto the second reference plane, and in the second reference plane, a distance between a fixed end of an auxiliary member of the two auxiliary members connected with the arcuate header-beam member and the core module adjacent to the auxiliary member may have a projection magnitude in a second reference direction perpendicular to a line connecting the two endpoints, and the projection magnitude may be between 40 mm and 120 mm.

In some embodiments, the two auxiliary members extend toward an intermediate region of the arcuate header-beam member, in a natural state, the header-beam assembly may have a first reference plane and a second reference plane orthogonal to each other, the two auxiliary members may be symmetrically provided relative to the first reference plane, the second reference plane may pass over a highest point and two endpoints of the arcuate header-beam member, when the arcuate header-beam member and the two auxiliary members are projected onto the second reference plane, and in the second reference plane, a fixed end of an auxiliary member of the two auxiliary member connected with the arcuate header-beam member may have a first distance from the highest point along a reference direction perpendicular to a line connecting the two endpoints, a position where the core module is connected with the header-beam assembly may have a second distance from the highest point along the reference direction, and a ratio of the first distance to the second distance may be between 1/3 and 1/2.

In some embodiments, the two auxiliary member extend toward an end portion of the arcuate header-beam member, in a natural state, the header-beam assembly may have a first reference plane and a second reference plane orthogonal to each other, the two auxiliary members may be symmetrically provided relative to the first reference plane, the second reference plane may pass over a highest point and two endpoints of the arcuate header-beam member, when the arcuate header-beam member and the two auxiliary members are projected onto the second reference plane, and in the second reference plane, a fixed end of an auxiliary member of the two auxiliary members connected with the arcuate header-beam member may have a third distance from the highest point along a reference direction perpendicular to a line connecting the two endpoints, the position where the core module is connected with the header-beam assembly may have a fourth distance from the highest point along the reference direction, and a ratio of the third distance to the fourth distance may be between 1/5 and 1/3.

In some embodiments, each auxiliary member of the two auxiliary members may include a fixing portion, a first extending portion connected with the fixing portion, and a second extending portion connected with the first extending portion, the fixing portion may be connected with the arcuate header-beam member, the first extending portion and the second extending portion may be disposed on a side of the arcuate header-beam member facing the head of the user in the wearing state and may be provided at intervals from the arcuate header-beam member in a natural state, a width of the second extending portion may be greater than a width of the first extending portion, and the second extending portion may be configured to form the third contacting point with the head of the user in the wearing state.

In some embodiments, the auxiliary member may be detachably connected with the arcuate header-beam member.

In some embodiments, an area of the second extending portion contacting the head of the user may be between 2 $cm^2$ and 8 $cm^2$.

In some embodiments, a friction coefficient of the second extending portion may be greater than a friction coefficient of the first extending portion.

In some embodiments, in the wearing state and viewed along the vertical axis of the user, second extending portions of the two auxiliary members may be close to each other towards a rear side of the head of the user.

In some embodiments, in the natural state, the header-beam assembly may have a first reference plane and a second reference plane orthogonal to each other, the two auxiliary members may be symmetrically provided relative to the first reference plane, the second reference plane may pass over a highest point and two endpoints of the arcuate header-beam member, and an angle between an average normal of the second extending portion of each auxiliary member and the second reference plane may be between 5 degrees and 10 degrees.

In some embodiments, the supporting assembly may be a header-beam assembly, the header-beam assembly may be configured to wrap around a top of a head of the user to allow the core module to contact a cheek of the user such that the core module may transmit the mechanical vibration generated by the core module through bone-conduction, in a wearing state, the core module and the cheek of the user may form a first contacting point and provide a first pressing force on the head of the user, the header-beam assembly and the head of the user may form a second contacting point and provide a second pressing force on the head of the user, the second contacting point may be closer to the top of the head of the user relative to the first contacting point along a vertical axis of the user.

In some embodiments, when the header-beam assembly provides the second pressing force to the head of the user at the second contacting point, at least a portion of the header-beam assembly between the second contacting point and the top of the head of the user may not contact the head of the user.

In some embodiments, the pressing force at the first contacting point may be between 0.2 N and 2 N, and the pressing force at the second contacting point may be between 0.3 N and 2 N.

In some embodiments, the header-beam assembly may include an arcuate header-beam member and two auxiliary members connected with the arcuate header-beam member, the arcuate header-beam member may be configured to wrap around the top of the head of the user, the core module may be connected with the arcuate header-beam member, the two auxiliary members and two sides of the head of the user respectively form second contacting points in the wearing state, and the two auxiliary members may be elastic such that when the headphone is worn by users with heads of different sizes, an amount of a change of the first pressing force due to different degrees of elastic deformations of the two auxiliary members may be less than or equal to 0.2 N.

In some embodiments, in a head-down state, the second pressing force may form a first resistance torque relative to the first contacting point, the pressing force at the first contacting point may form a second resistance torque relative to a contact surface between the core module and the cheek of the user when the header-beam assembly includes the two auxiliary members, the pressing force at the first contacting point may form a third resistance torque relative to the contact surface between the core module and the cheek of the user when the header-beam assembly does not include the two auxiliary members, and a combined torque of the first resistance torque and the second resistance torque may be greater than the third resistance torque.

In some embodiments, the core module may include a surrounding edge, the surrounding edge may be connected with the core housing, a projection of the surrounding edge in a reference plane may surround a periphery of a projection of the vibration panel in the reference plane, and the reference plane may be perpendicular to a vibration direction of the transducer device, and a side of the core housing close to the vibration panel may enclose a cavity with the vibration panel and the surrounding edge, the surrounding edge may be provided with one or more communicating holes for realizing flow communication between the cavity and an exterior of the core module such that in a wearing state, the cavity may be in flow communication with the exterior of the core module through the one or more communicating holes.

In some embodiments, at least a portion of the surrounding edge may contact the skin of the user along with the vibration panel in the wearing state.

In some embodiments, there may be a target frequency range with an interval length of at least 1/3 octave in a frequency range of 500 Hz to 4 kHz, wherein within the target frequency range, a leakage of sound generated by the headphone in the wearing state when the one or more communicating holes are in an open state may be weaker than a leakage of sound generated by the headphone in the wearing state when the one or more communicating holes are in a closed state.

In some embodiments, the target frequency may be within a range of 1 kHz to 2 kHz.

In some embodiments, a count of the one or more communicating holes may exceed 1, and an opening ratio of the one or more communicating holes on the surrounding edge may be greater than or equal to 30%.

In some embodiments, the surrounding edge may have at least one communicating hole of the one or more communicating holes on each unit area of a square millimeter.

In some embodiments, the enclosure may be a plastic member and a wall thickness of the enclosure may be between 0.2 mm and 1 mm.

In some embodiments, the surrounding edge may be a plastic member and a wall thickness of a portion of the surrounding edge contacting the skin of the user may be greater than 1 mm.

In some embodiments, the surrounding edge may be a plastic member and the plastic member may be molded onto a metal frame through an injection molding technique.

In some embodiments, the surrounding edge may be made of metal such that the opening ratio of the one or more communicating holes on the surrounding edge may be greater than or equal to 60%.

In some embodiments, the surrounding edge may be a wire mesh.

In some embodiments, the core housing may be a first plastic member, the surrounding edge may be connected with the core housing through a second plastic member, and the second plastic member may be integrally molded with the metal member through an injection molding technique.

In some embodiments, the core housing may include an first vibration plate and an connecting member, the transducer device may be suspended in the accommodating cavity through the first vibration plate, the core housing may include an inner cylinder wall, a first end wall and a second end wall respectively connected with both ends of the inner cylinder wall, the first end wall and the second end wall may be disposed on two opposite sides of transducer device along the vibration direction and enclose the accommodating cavity with the inner cylinder wall, the first end wall may be provided with a mounting hole, the vibration panel may be located outside the core housing, one end of the connecting member may be connected with the vibration panel, and another end of the connecting member may extend into the core housing through the mounting hole and may be connected with the transducer device, the surrounding edge may be connected with the first end wall and enclose the cavity with the first end wall and the vibration panel, and viewed along the vibration direction, an area of the vibration panel may be larger than an area of the mounting hole, and the area of the mounting hole may be larger than an area of the connecting member.

In some embodiments, viewed along the vibration direction, a ratio of a difference between the area of the mounting hole and the area of the connecting member to the area of the mounting hole may be greater than 0 and less than or equal to 0.5.

In some embodiments, the accommodating cavity may communicate with an exterior of the core module through one single channel, the channel may be a gap between the connecting member and a wall of the mounting hole, the core module may further include a sealing membrane, and the sealing membrane may seal the channel.

In some embodiments, the sealing membrane may include a first connecting portion, a pleated portion, and a second connecting portion, the first connecting portion, the pleated portion, and the second connecting portion may be integrally connected, the pleated portion may form a recessed region between the first connecting portion and the second connecting portion, the first connecting portion may be connected with the first end wall, and the second connecting portion may be connected with the connecting member or the vibration panel.

In some embodiments, the core module may include a surrounding edge, the surrounding edge may be connected with the core housing, a projection of the surrounding edge in a reference plane may surround a periphery of a projection of the vibration panel in the reference plane, and the reference plane may be perpendicular to a vibration direction of the transducer device, and a side of the core housing close to the vibration panel may enclose a cavity with the vibration panel and the surrounding edge, an outer surface of a side of the surrounding edge facing the skin of the user in a wearing state may have an uneven region such that a portion of the surrounding edge may not fit with the skin of the user when the surrounding edge contacts the skin of the user, thereby allowing the cavity to be communicated with an exterior of the core module.

In some embodiments, the outer surface of the surrounding edge may be provided with at least one groove, and the cavity may communicate with the exterior of the core module through the at least one groove.

In some embodiments, the projection of the surrounding edge in the reference plane may have a long axis direction and a short axis direction, the long axis direction and the long axis being orthogonal to each other, a dimension of the surrounding edge along the long axis direction may be larger than a dimension of the surrounding edge along the short axis direction, a count of the at least one groove may exceed 1, the at least one groove may be divided into four groups of grooves, wherein two groups of grooves may be provided at intervals along the long axis direction respectively, and two other groups of grooves may be provided at intervals along the short axis direction respectively, and a count of grooves of each group provided at intervals along the long axis direction may be greater than a count of grooves of each group provided at intervals along the short axis direction.

In some embodiments, the outer surface of the surrounding edge may be provided with at least one protrusion, the protrusion may be configured such that a gap may be formed between the surrounding edge and the skin of the user in the wearing state, and the cavity may be in flow communication with the exterior of the core module through the gap.

In some embodiments, a count of the at least one protrusion may exceed 1, and the at least one protrusion may make the gap to be in a form of grid.

In some embodiments, there may be a target frequency range with an interval length of at least 1/3 octave in a frequency range of 500 Hz to 4 kHz, within the target frequency range, a leakage of sound generated by the headphone in the wearing state when the outer surface of the surrounding edge has the uneven region is weaker than a leakage of sound generated by the headphone in the wearing state when the surrounding edge does not have the uneven region.

In some embodiments, the target frequency range may be from 1 kHz to 2 kHz.

In some embodiments, a height difference of the uneven region may be between 0.5 mm and 5 mm.

In some embodiments, the surrounding edge may be provided with one or more communicating holes for realizing flow communication between the cavity and the exterior of the core module such that in the wearing state, the cavity may be further in flow communication with the exterior of the core module through the one or more communicating holes.

In some embodiments, a count of the one or more communicating holes may exceed 1, and an opening ratio of the one or more communicating holes on the surrounding edge may be greater than or equal to 30%.

In some embodiments, the core housing may include an first vibration plate and an connecting member, the transducer device may be suspended in the accommodating cavity through the first vibration plate, the core housing may include an inner cylinder wall, a first end wall and a second end wall respectively connected with both ends of the inner cylinder wall, the first end wall and the second end wall may be disposed on two opposite sides of the transducer device along the vibration direction of the transducer device and enclose the accommodating cavity with the inner cylinder wall, the first end wall may be provided with a mounting hole, the vibration panel may be located outside the core housing, one end of the connecting member may be connected with the vibration panel, and another end of the connecting member may extend into the core housing through the mounting hole and may be connected with the transducer device, the surrounding edge may be connected with the first end wall and enclose the cavity with the first end wall and the vibration panel; and viewed along the vibration direction, an area of the vibration panel may be larger than an area of the mounting hole, and the area of the mounting hole may be larger than an area of the connecting member.

In some embodiments, viewed along the vibration direction, a ratio of a difference between the area of the mounting hole and the area of the connecting member to the area of the mounting hole may be greater than 0 and less than or equal to 0.5.

In some embodiments, the accommodating cavity may communicate with an exterior of the core module through one single channel, the channel may be a gap between the connecting member and a wall of the mounting hole, the core module may further include a sealing membrane, and the sealing membrane may seal the channel.

In some embodiments, the sealing membrane may include a first connecting portion, a pleated portion, and a second connecting portion, the first connecting portion, the pleated portion, and the second connecting portion may be integrally connected, the pleated portion may form a recessed region between the first connecting portion and the second connecting portion, the first connecting portion may be connected with the first end wall, and the second connecting portion may be connected with the connecting member or the vibration panel.

In some embodiments, the core module may include a surrounding edge, the surrounding edge may be connected with the core housing, a projection of the surrounding edge in a reference plane may surround a periphery of a projection of the vibration panel in the reference plane, and the reference plane may be perpendicular to a vibration direction of the transducer device; and wherein a side of the core housing close to the vibration panel may enclose a cavity with the vibration panel and the surrounding edge, a side of the surrounding edge facing a skin of the user in a wearing state may be provided with a porous structure such that in the wearing state, at least a portion of the porous structure may contact the skin of the user together with the vibration panel, and the cavity may be allowed to be in flow communication with an exterior of the core module.

In some embodiments, there may be a target frequency range with an interval length of at least 1/3 octaves in a frequency range of 500 Hz to 4 kHz, and within the target frequency range, a leakage of sound generated by the headphone in the wearing state when the core housing has the porous structure may be weaker than a leakage of sound generated by the headphone in the wearing state when the core housing does not have the porous structure.

In some embodiments, the target frequency range may be within a range of 1 kHz to 2 kHz.

In some embodiments, the porous structure may include a fixing layer and a porous body layer connected with the fixing layer, the porous structure may be connected with the surrounding edge through the fixing layer, and the porous structure may realize flow communication between the cavity and the exterior of the core module through the porous body layer.

In some embodiments, the fixing layer may be detachably connected with the surrounding edge.

In some embodiments, a manner of connection between the fixing layer and the surrounding edge may include any one of a magnetic suction, a buckle, or a bonding connection.

In some embodiments, the fixing layer may be a cured adhesive, the porous structure may include a protective layer covering the porous body layer, and the porous structure may contact the skin of the user through the protective layer.

In some embodiments, the protective layer may be a textile or a steel mesh.

In some embodiments, a porosity of the porous body layer may be greater than or equal to 60%.

In some embodiments, the porous body layer may include a foam.

In some embodiments, the surrounding edge may be provided with one or more communicating holes for realizing flow communication between the cavity and the exterior of the core module such that in the wearing state, the cavity may be further in flow communication with the cavity with the exterior of the core module through the one or more communicating holes.

In some embodiments, a count of the one or more communicating holes may exceed 1, and an opening rate of the one or more communicating holes on the surrounding edge may be greater than or equal to 30%.

In some embodiments, the core housing may include an first vibration plate and an connecting member, the transducer device may be suspended in the accommodating cavity through the first vibration plate, the core housing may include an inner cylinder wall, a first end wall and a second end wall respectively connected with both ends of the inner cylinder wall, the first end wall and the second end wall may be disposed on two opposite sides of the transducer device along the vibration direction of the transducer device and enclose the accommodating cavity with the inner cylinder wall, the first end wall may be provided with a mounting hole, the vibration panel may be located outside the core housing, one end of the connecting member may be connected with the vibration panel, and another end of the connecting member may extend into the core housing through the mounting hole and may be connected with the transducer device, and the surrounding edge may be connected with the first end wall and enclose the cavity with the first end wall and the vibration panel, and viewed along the vibration direction, an area of the vibration panel may be larger than an area of the mounting hole, and the area of the mounting hole may be larger than an area of the connecting member.

In some embodiments, viewed along the vibration direction, a ratio of a difference between the area of the mounting hole and the area of the connecting member to the area of the mounting hole may be greater than 0 and less than or equal to 0.5.

In some embodiments, the accommodating cavity may communicate with the exterior of the core module through one single channel, the channel may be a gap between the connecting member and a wall of the mounting hole, the core module may further include a sealing membrane, and the sealing membrane may seal the channel.

In some embodiments, the sealing membrane may include a first connecting portion, a pleated portion, and a second connecting portion, the first connecting portion, the pleated portion, and the second connecting portion may be integrally connected, the pleated portion may form a recessed region between the first connecting portion and the second connecting portion, the first connecting portion may be connected with the first end wall, and the second connecting portion may be connected with the connecting member or the vibration panel.

In some embodiments, the headphone may include the core module, and the battery and the main board, the battery and the main board may be coupled to the core module, wherein the core module may include the core housing and the transducer device provided in the accommodating cavity of the core housing and transmit the mechanical vibration generated by the transducer device through the bone conduction, the battery may be configured to supply power to the main board, and the main board may be configured to control the transducer device to convert an electrical signal into the mechanical vibration.

In some embodiments, the core module may further include the first vibration plate and the vibration panel, the transducer device may be suspended in the accommodating cavity through the first vibration plate, and the vibration panel may be connected with the transducer device and configured to contact the skin of the user.

In some embodiments, the headphone may further include a header-beam assembly and an adapter housing, the header-beam assembly may be configured to wrap around the top of the head of the user such that the core module as a whole may be disposed on a front side of the ear of the user, the adapter housing may enclose an accommodating space configured to accommodate an electronic component, the core housing may be elastically connected with the adapter housing, and the core housing or the adapter housing may be connected with the header-beam assembly.

In some embodiments, the transducer device may include the magnetic circuit system and the coil, and the coil may be rigidly connected with the core housing such that the coil may drive the core housing to vibrate.

In some embodiments, the transducer device may further include the frame and a second vibration plate, the frame may be rigidly connected with the core housing, the second vibration plate connects the frame and the magnetic circuit system to suspend the magnetic circuit system inside the accommodating cavity, and the coil may be connected with the frame and extends into the magnetic gap of the magnetic circuit system along the vibration direction of the transducer device.

In some embodiments, a side of the core housing away from the adapter housing forms a contact surface configured to contact the skin of the user.

In some embodiments, the adapter housing may be provided in layers with the core housing along the vibration direction of the transducer device and may be located on a side of the core housing away from the vibration panel;

wherein the adapter housing has a first projection area on the reference plane perpendicular to the vibration direction, the core housing has a second projection area on the reference plane, and a ratio between the first projection area and the second projection area may be within a range of 0.2 to 1.5; and/or along the vibration direction of the transducer device, a gap between the core housing and the adapter housing may be within a range of 1 mm to 10 mm.

In some embodiments, the battery or the main board may be supported and fixed by the adapter housing and may be located on a side of the adapter housing facing the transducer device.

In some embodiments, the headphone may further include the header-beam assembly configured to wrap around the top of the head of the user such that the core module as a whole may be disposed on the front side of the ear of the user, and the header-beam assembly applies a pressing force between 0.4N and 0.8N to press the core module against the cheek of the user.

In some embodiments, the headphone may further include the header-beam assembly and a supporting member connected with the header-beam assembly, the header-beam assembly may be configured to wrap around the top of the head of the user such that the core module as a whole may be located on the front side of the ear of the user, and the battery or the main board may be provided within the supporting member.

In some embodiments, the supporting member and the core module may be provided at intervals along the sagittal axis of the user in the wearing state.

In some embodiments, the core module may be closer to the front side of the head of the user relative to the supporting member.

In some embodiments, in the wearing state, the supporting member and the core module may be provided at intervals along the vertical axis of the user, and the core module may be located farther away from the top of the head of the user relative to the supporting member.

In some embodiments, the core module may include the core housing, the transducer device, the first vibration plate, and the vibration panel, the transducer device may be suspended in the accommodating cavity of the core housing through the first vibration plate, and the vibration panel may be connected with the transducer device and configured to contact the skin of the user; wherein the headphone may further include the battery electrically connected with the transducer device, the battery may be provided at intervals from the transducer device along the vibration direction of the transducer device, and a ratio of a capacity of the battery to a sum of a weight of the core housing and a weight of the battery may be between 11 mAh/g and 24.5 mAh/g.

In some embodiments, the headphone may include the adapter housing connected with the core housing, the battery may be provided in the adapter housing, and a ratio between the capacity of the battery and a sum of the weight of the core housing and a weight of the adapter housing may be between 55 mAh/g and 220 mAh/g.

In some embodiments, the capacity of the battery may be greater than or equal to 200 mAh, and the sum of the weight of the core housing and the weight of the adapter housing may be between 1 g and 4 g.

In some embodiments, a ratio between the capacity of the battery and a contact area between the vibration panel and the skin of the user may be between 0.37 mAh/mm$^2$ and 0.73/mm$^2$.

In some embodiments, the headphone may further include the header-beam assembly connected with the core module, the header-beam assembly may be configured to wrap around the top of the head and to allow the core module to be located on the front side of the ear of the user, wherein in the wearing state, the header-beam assembly and the top of the head of the user form the first contacting point, the core module and the cheek of the user form the second contacting point, and the spacing between the second contacting point and the first contacting point along the sagittal axis of the user may be between 20 mm and 30 mm.

In some embodiments, the header-beam assembly may include the arcuate header-beam member and the adapter member, the arcuate header-beam member may be configured to wrap around the top of the head of the user, the adapter member may include the first connecting section, the intermediate transition section, and the second connecting section, the intermediate transition section connects the first connecting section and the second connecting section, the first connecting section and the second connecting section may be respectively bent relative to the intermediate transition section and extend along opposite directions, the first connecting section may be connected with the arcuate header-beam member, and the second connecting section may be connected with the core module; wherein viewed along the coronal axis of the user, the intermediate transition section may be inclined relative to the vertical axis of the user.

In some embodiments, the core housing may include the inner cylinder wall and the first end wall and the second end wall respectively connected with both ends of the inner cylinder wall, the first end wall and the second end wall may be disposed on two opposite sides of the transducer device along the vibration direction of the transducer device and enclose the accommodating cavity with the inner cylinder wall, the first end wall may be provided with the mounting hole, the vibration panel may be located outside the core housing and may be configured to contact the skin of the user, the core module may further include a connecting member, one end of the connecting member may be connected with the vibration panel, another end of the connecting member extends into the core housing through the mounting hole and may be connected with the transducer device; wherein viewed along the vibration direction, the area of the vibration panel may be larger than the area of the mounting hole, and the area of the mounting hole may be larger than the area of the connecting member.

In some embodiments, the accommodating cavity may be in flow communication with the exterior of the headphone merely through one single channel, and the channel may be the gap between the connecting member and the wall of the mounting hole; or the accommodating cavity may be in flow communication with the exterior of the headphone merely through the first channel and the second channel, the first channel may be the gap between the connecting member and the wall of the mounting hole, and the second channel may be in flow communication with the exterior of the headphone through the audio filter.

In some embodiments, viewed along the vibration direction, the ratio of the area of the mounting hole to the area of the first end wall may be less than or equal to 0.6.

In some embodiments, viewed along the vibration direction, the ratio of the difference between the area of the mounting hole and the area of the connecting member to the area of the mounting hole may be greater than 0 and less than or equal to 0.5.

In some embodiments, the headphone may further include the header-beam assembly, the header-beam assembly may be configured to wrap around the top of the head of the user and to allow the core module to be located at the front side of the ear of the user; wherein in the wearing state, the header-beam assembly and the top of the head form the first contacting point, the core module and the cheek of the user form the second contacting point, and the spacing between the second contacting point and the first contacting point along the sagittal axis of the user may be between 20 mm and 30 mm.

In some embodiments, viewed along the coronal axis of the user, at least a portion of the header-beam assembly may be inclined relative to the vertical axis of the user.

In some embodiments, the header-beam assembly may include the arcuate header-beam member and the adapter member, the arcuate header-beam member may be configured to wrap around the top of the head of the user, the adapter member may include the first connecting section, the intermediate transition section, and the second connecting section, the intermediate transition section connects the first connecting section and the second connecting section, the first connecting section and the second connecting section may be respectively bent relative to the intermediate transition section and extend along opposite directions, the first connecting section may be connected with the arcuate header-beam member, and the second connecting section may be connected with the core module; wherein viewed along the coronal axis of the user, the intermediate transition section may be inclined relative to the vertical axis of the user.

In some embodiments, the first connecting section may be bent at the angle greater than or equal to 90° and less than 180° relative to the intermediate transition section; and/or the second connecting section may be bent at the angle greater than or equal to 90° and less than 180° relative to the intermediate transition section.

In some embodiments, in the wearing state and viewed along the coronal axis of the user, the first connecting section may be parallel to the second connecting section, and the spacing between the first connecting section and the second connecting section may be between 20 mm and 30 mm.

In some embodiments, the first connecting section and the second connecting section may be respectively provided with a wiring cavity, the intermediate transition section may be provided with an opening slot, the wiring cavity of the first connecting section and the wiring cavity of the second connecting section may be in flow communication via the opening slot such that a wiring of the headphone to extend from the core module to the arcuate header-beam member through the adapter member, and the header-beam assembly may further include a sealing member embedded in the opening slot, and the sealing member covers the wiring.

In some embodiments, the adapter member may be made of metal and the arcuate header-beam member may be made of plastic.

In some embodiments, the first connecting section may be capable of extending from or retracting into the arcuate header-beam member under an action of an external force.

In some embodiments, each of both ends of the arcuate header-beam member may be provided with the adapter member and the core module, and the header-beam assembly provides the first pressing force for the core module in the first using state and provide the second pressing force for the core module in the second using state, and the absolute value of the difference between the second pressing force and the first pressing force may be between 0 and 0.1 N;

wherein in the first using state, each adapter member of two adapter members at the both ends of the arcuate header-beam member has the first extension relative to the arcuate header-beam member and two core modules at the both ends of the arcuate header-beam member have the first spacing between each other, in the second using state, the each adapter member has the second extension relative to the arcuate header-beam member and the two core modules have the second spacing between each other, the second extension may be greater than the first extension, and the second spacing may be greater than the first spacing.

In some embodiments, the pressing force of the core module applied on the cheek of the user may be between 0.4 N and 0.8 N.

In some embodiments, the headphone may include the adapter housing, the core housing may include the first core housing connected with the adapter housing, the first core housing may include the inner cylinder wall, the outer cylinder wall, and the transition wall, the inner cylinder wall may be disposed at the periphery of the transducer device, the outer cylinder wall may be disposed at the periphery of the inner cylinder wall and may be provided at intervals from the inner cylinder wall along the direction perpendicular to the vibration direction of the transducer device, the transition wall may be connected between the inner cylinder wall and the outer cylinder wall, the outer cylinder wall, the inner cylinder wall, and the transition wall enclose an acoustic cavity, the acoustic cavity may be in flow communication with the accommodating cavity to absorb the acoustic energy of the sound waves generated by the vibrations of the air in the accommodating cavity vibrating with the transducer device.

In some embodiments, the frequency response curve of the sound waves has a resonant peak, and the acoustic cavity may be a Helmholtz resonance cavity to attenuate the peak resonance intensity of the resonant peak.

In some embodiments, the peak resonance frequency of the resonant peak may be within a range of 500 Hz to 4 kHz, and the difference between the peak resonance intensity of the resonant peak when the opening for realizing a flow communication between the Helmholtz resonance cavity and the accommodating cavity is in the open state and the peak resonance intensity of the resonant peak when the opening for realizing the flow communication between the Helmholtz resonance cavity and the accommodating cavity is in the closed state may be greater than or equal to 3 dB.

In some embodiments, the first core housing may further include the cover plate connected between the inner cylinder wall and the second outer cylinder wall, the cover plate and the transition wall may be provided at intervals along the vibration direction and enclose the Helmholtz resonance cavity with the second outer cylinder wall and the inner cylinder wall.

In some embodiments, the acoustic cavity may be an audio filter, and a cut-off frequency of the audio filter may be less than or equal to 5 kHz.

In some embodiments, the first housing may further include the end wall, the end wall may be connected with one end of the inner cylinder wall and encloses the accommodating cavity, the adapter housing may include the center plate and the cylinder sidewall connected with the center plate, the center plate may be located at a side of the end wall away from the accommodating cavity, the cylinder sidewall may be located at the periphery of the outer cylinder wall, the end wall, the inner cylinder wall, the transition wall, and the outer cylinder wall may be enclosed with the center plate and the cylinder sidewall to form the audio filter, and the acoustic wave may be absorbed by the audio filter and then transmitted to the exterior of the headphone through the gap between the cylinder sidewall and the outer cylinder wall.

In some embodiments, the distance between the transition wall and the center plate along the vibration direction and the distance between the inner cylinder wall and the outer cylinder wall along the direction perpendicular to the vibration direction may be greater than the distance between the cylinder sidewall and the outer cylinder wall along the direction perpendicular to the vibration direction.

In some embodiments, the first core housing may further include the reinforcing post, the reinforcing post may be connected between the outer cylinder wall and the inner cylinder wall, one of the outer cylinder wall and the cylinder sidewall may be provided with a shaft hole, the other one of the outer cylinder wall and the cylinder sidewall may be provided with a rotating shaft cooperating with the shaft hole, and the rotating shaft may be embedded in the shaft hole to allow the core housing to rotate relative to the adapter housing.

In some embodiments, the headphone may further include the header-beam assembly connected with the core housing, the header-beam assembly may be configured to wrap around the top of the head of the user and to allow the core module to contact the cheek of the user, the header-beam assembly may include the arcuate header-beam member and the adapter member, the arcuate header-beam member may be configured to wrap around the top of the head of the user, the adapter member may include the first connecting section, the intermediate transition section, and the second connecting section connected in sequence, the first connecting section may be connected with the arcuate header-beam member, the second connecting section may be connected with the adapter housing, and the first connecting section and the second connecting section may be respectively bent relative to the intermediate transition section and extend along opposite directions such that in the wearing state, and viewed along the coronal axis of the user, the arcuate header-beam member may be located above the ear of the user, and the core module may be located on the front side of the ear of the user.

In some embodiments, the first connecting section may be bent at the angle greater than or equal to 90° and less than 180° relative to the intermediate transition section; and/or the second connecting section may be bent at the angle greater than or equal to 90° and less than 180° relative to the intermediate transition section.

In some embodiments, in the wearing state and viewed along the coronal axis of the user, the first connecting section may be parallel to the second connecting section, and the spacing between the first connecting section and the second connecting section may be between 20 mm and 30 mm.

In some embodiments, the headphone may include the first circuit board, the second circuit board, the encoder, the flick switch, and the function key; wherein the first circuit board may be provided in layers with the second circuit board, the encoder may be provided on the first circuit board, the flick switch may be provided on the second circuit board and may be disposed on a side of the second circuit board facing the first circuit board, the function key may include the key cap and the key rod connected with the key cap, the key cap may be disposed on a side of the first circuit board away from the second circuit board, the free end of the key rod away from the key cap may be provided facing the flick switch, and the encoder may be sleeved on the key rod; wherein when the user rotates the key rod through the key cap, the key rod drives the encoder to generate the first input signal, and when the user presses the key rod through the key cap, the key rod triggers the flick switch to generate the second input signal.

In some embodiments, the first input signal may be configured to control volume up/down of the headphone; and/or the second input signal may be configured to control any one of playing/pausing, song skipping, device matching, and power on/off of the headphone.

In some embodiments, the headphone may further include a housing and an adapter ring, the housing may include a first cylinder body, the first circuit board and the second circuit board may be provided in layers within the first cylinder body along an axial direction of the first cylinder body, the adapter ring may be sleeved on a periphery of the first cylinder body, the adapter ring may be limited along an axial direction of the first cylinder body and capable of rotating around the axial direction of the first cylinder body, the key cap may be fixedly disposed on the adapter ring, and the key rod may be inserted into the first cylinder body along the axial direction of the first cylinder body.

In some embodiments, a first buckle may be provided on the outer peripheral wall of the first cylinder body, the adapter ring may include a second cylinder body, a second buckle may be provided on the inner peripheral wall of the second cylinder body, and the first buckle and the second buckle may be buckled with each other to limit a movement of the adapter ring in an opposite direction of an insertion direction of the key rod relative to the first cylinder body.

In some embodiments, a first flange may be further provided on the outer peripheral wall of the first cylinder body, and a second flange may be further provided on the outer peripheral wall of the second cylinder body, the first flange may be configured to support the second flange to limit a movement of the adapter ring along the insertion direction of the key rod relative to the first cylinder body.

In some embodiments, the key cap may include a third cylinder body and an end plate, the third cylinder body may be sleeved on a periphery of the second cylinder body, one end of the third cylinder body may be supported on a side of the second flange away from the first flange, the end plate may be disposed at another end of the third cylinder body, and the key rod may be disposed on the end plate.

In some embodiments, the function key may be made of plastic and the adapter ring may be made of metal.

In some embodiments, the headphone may further include the header-beam assembly, and the header-beam assembly may be configured to wrap around the top of the head of the user and such that the core module may be disposed on the front side of the ear of the user; wherein in the wearing state, the header-beam assembly and the top of the head form the first contacting point, the core module and the cheek of the user form the second contacting point, and the spacing between the second contacting point and the first contacting point along the sagittal axis of the user may be between 20 mm and 30 mm.

In some embodiments, the header-beam assembly may include the arcuate header-beam member and the adapter member, the arcuate header-beam member may be configured to wrap around the top of the head of the user, the adapter member may include the first connecting section, the intermediate transition section, and the second connecting section, the intermediate transition section connects the first connecting section and the second connecting section, the first connecting section and the second connecting section may be respectively bent relative to the intermediate transition section and extend along opposite directions, the first connecting section may be connected with the arcuate header-beam member, and the second connecting section may be connected with the core module; wherein viewed along the coronal axis of the user, the intermediate transition section may be inclined relative to the vertical axis of the user.

In some embodiments, the core module may further include the first vibration plate, the vibration panel, and the connecting member, the core housing may be connected with the header-beam assembly, the transducer device may be suspended in the accommodating cavity of the core housing through the first vibration plate, the core housing may include the inner cylinder wall, the first end wall, and the second end wall respectively connected with both ends of the inner cylinder wall, the first end wall and the second end wall may be disposed on two opposite sides of the transducer device along the vibration direction of the transducer device and enclose the accommodating cavity with the inner cylinder wall, the first end wall may be provided with the mounting hole, the vibration panel may be located outside the core housing and may be configured to contact the skin of the user, one end of the connecting member may be connected with the vibration panel, and another end of the connecting member extends into the core housing through the mounting hole and may be connected with the transducer device, wherein viewed along the vibration direction, the area of the vibration panel may be larger than the area of the mounting hole, and the area of the mounting hole may be larger than the area of the connecting member.

In some embodiments, the headphone may further include a housing, the pickup assembly, and the switch assembly, the pickup assembly may include the pivot connecting block, the connecting rod, and the pickup, the pivot connecting block may be pivotally connected with the housing, one end of the connecting rod may be connected with the pivot connecting block, and the pickup may be provided on another end of the connecting rod, wherein the recessed region may be provided on the side of the pivot connecting block away from the housing, and the switch assembly may be provided in the recessed region.

In some embodiments, the protrusion may be provided on the bottom of the recessed region, and the outer peripheral wall of the protrusion and the sidewall of the recessed region form the ring groove, the switch assembly may include the switch circuit board, the elastic supporting member, and the key, the switch circuit board may be disposed on the top of the protrusion, the elastic supporting member may include the ring fixing portion and the elastic supporting portion, the ring fixing portion may be fixed in the ring groove, the elastic supporting portion may be provided in the shape of the dome, and the key may be provided on the elastic supporting portion.

In some embodiments, the ring fixing portion and the elastic support portion may be integrally formed, the headphone may further include the reinforcing ring, and the reinforcing ring may be provided on the ring fixing portion along the circumference of the ring fixing portion and may be connected with the pivot connecting block.

In some embodiments, the reinforcing ring may be sleeved on the periphery of the ring fixing portion, and the peripheral wall of the reinforcing ring may be fixedly connected with the sidewall of the recessed region.

In some embodiments, the reinforcing ring may be a metal member.

In some embodiments, the key may include the key cap, the key rod, and a ring flange, the key rod and the ring flange may be connected with a same side of the key cap, the ring flange encircles the key rod, the key rod and the ring flange may be embedded into the elastic support portion, and when the key rod is projected orthogonally to the switch circuit board along the pressing direction of the key, the key rod overlaps with a switch component protruding from the switch circuit board.

In some embodiments, a protruded height of the ring flange may be equal to a protruded height of the key rod.

In some embodiments, the headphone may further include the header-beam assembly, and the header-beam assembly may be configured to wrap around the top of the head of the user and to allow the core module to be located on the front side of the ear of the user, wherein in the wearing state, the header-beam assembly and the top of the head form the first contacting point, the core module and the cheek of the user form the second contacting point, and the spacing between the second contacting point and the first contacting point along the sagittal axis of the user may be between 20 mm and 30 mm.

In some embodiments, wherein the header-beam assembly may include the arcuate header-beam member and the adapter member, the arcuate header-beam member may be configured to wrap around the top of the head of the user, the adapter member may include the first connecting section, the intermediate transition section, and the second connecting section, the intermediate transition section connects the first connecting section and the second connecting section, the first connecting section and the second connecting section may be respectively bent relative to the intermediate transition section and extend along opposite directions, the first connecting section may be connected with the arcuate header-beam member, and the second connecting section may be connected with the core module; wherein viewed along the coronal axis of the user, the intermediate transition section may be inclined relative to the vertical axis of the user.

In some embodiments, the core housing may include the first vibration plate, the vibration panel, and the connecting member, the core housing may be connected with the header-beam assembly, the transducer device may be suspended in the accommodating cavity of the core housing through the first vibration plate, the core housing may include the inner cylinder wall, the first end wall, and the second end wall respectively connected with both ends of the inner cylinder wall, the first end wall and the second end wall may be disposed on two opposite sides of the transducer device along the vibration direction of the transducer device and enclose the accommodating cavity with the inner cylinder wall, the first end wall may be provided with the mounting hole, the vibration panel may be located outside the core housing and may be configured to contact the skin of the user, one end of the connecting member may be connected with the vibration panel, and another end of the connecting member extends into the core housing through the mounting hole and may be connected with the transducer device; wherein viewed along the vibration direction, the area of the vibration panel may be larger than the area of the mounting hole, and the area of the mounting hole may be larger than the area of the connecting member.

In some embodiments, the headphone may include the header-beam assembly, the header-beam assembly may include the arcuate header-beam member, the adapter member, and the connecting wire assembly, the arcuate header-beam member may be configured to wrap around the top of the head of the user, the adapter member may be connected with the arcuate header-beam member and may be capable of extending from or retracting into the arcuate header-beam member under the action of the external force, the connecting wire assembly may include the wire extending along the arcuate header-beam member, the wire may include a positioning section and two natural sections disposed at two ends of the positioning section, the positioning section may be fixed to the arcuate header-beam assembly, and the two natural sections may be connected with the arcuate header-beam member to allow the wire to extends along with the extension of the adapter member or retracts along with the retraction of the adapter member.

In some embodiments, the header-beam assembly may further include an abutting member clamped to the arcuate header-beam member, the abutting member abuts the positioning section against the arcuate header-beam member.

In some embodiments, the abutting member may include the abutting portion and two clamping portions disposed at both ends of the abutting portion, each clamping portion of the two clamping portions may be bent relative to the abutting portion, the two clamping portions extend in a same direction towards a side of the abutting portion and may be capable of being close to each other under an action of an external force, the abutting portion may be configured to abut the positioning section, and the two clamping portion may be configured to clamp to the arcuate header-beam member.

In some embodiments, the arcuate header-beam member may include an inner compartment body and an outer cover body connected with the inner compartment body, the inner compartment body may be configured to contact the head of the user, the wire may be disposed between the inner compartment body and the outer cover body, and the abutting member may be clamped to the outer cover body.

In some embodiments, the arcuate header-beam member may further include an inner cover body, the inner cover body and the inner compartment body may be connected with a same side of the outer cover body, and the inner cover body and the outer cover body clamp the adapter member.

In some embodiments, the wire may further include a telescoping section disposed between the positioning section and each of the two natural sections, the elastic coefficient of the telescoping section may be greater than the elastic coefficient of either of the positioning section and the each of the two natural sections.

In some embodiments, the connecting wire assembly may further include the auxiliary wire connected with the each of two natural sections, the elastic coefficient of the auxiliary wire may be greater than the elastic coefficient of the telescoping section to provide an elastic restoring force when the wire is stretched.

In some embodiments, the auxiliary cord may include an elastic body and two sleeve rings disposed at both ends of the elastic body, each of the two sleeve rings may be disposed on a corresponding natural section of the two natural sections and stopped by the limiting structure on the natural section along the rebound direction of the telescoping section.

In some embodiments, the limiting structure may be the protrusion integrally connected with the insulating layer of the wire, or a knot formed by knotting the natural sections.

In some embodiments, each end of the both ends of the arcuate header-beam member may be connected with the core module through the adapter member, the battery may be connected with one of two core modules at the both ends of the arcuate header-beam member, the main board may be connected with another one of the two core modules, and the battery and the main board may be electrically connected through the wire.

In some embodiments, the headphone may include the header-beam assembly, the header-beam assembly may include the arcuate header-beam member, the adapter member, and a damping member, the arcuate header-beam member may be configured to wrap around the top of the head of the user and include the inner compartment body, the inner cover body, and the outer cover body, the inner compartment body may be configured to contact the head of the user, the inner cover body and the inner compartment body may be connected with the same side of the outer cover body, the inner cover body and the outer cover body clamp the adapter member, the outer cover body may be provided with a first guiding groove configured to guide the adapter member to move relative to the outer cover body, the damping member may be provided on a side of the adapter member facing the inner cover body and protrudes from the first guiding groove, and the damping member further abuts the inner cover body to provide a resistance when the adapter member extends from or retracts into the arcuate header-beam member.

In some embodiments, the adapter member may be provided with a storage slot at an end of the adapter member close to the inner compartment body, and the damping member may be provided within the storage slot and at a portion of the damping member protrudes from the adapter member.

In some embodiments, one end the adapter member close to the inner compartment body may be provided with a slider, the outer cover body may be provided with a stopping portion at one end of the first guiding groove away from the inner compartment body, the stopping portion may be configured to stop the slider, and the storage slot may be provided on the slider.

In some embodiments, the inner cover body may be provided with a second guiding slot configured to guide the damping member when the adapter member extends from or retracts into the arcuate header-beam member.

In some embodiments, the headphone may further include the connecting wire assembly provided between the inner compartment body and the outer cover body, the connecting wire assembly may include the wire, the adapter member may include the first connecting section, the intermediate transition section, and the second connecting section, the intermediate transition section connects the first connecting section and the second connecting section, the first connecting section and the second connecting section may be respectively bent relative to the intermediate transition section and extend along opposite directions, the slider may be provided in the first connecting section, the first connecting section and the second connection section may be respectively provided with the wiring cavity, the intermediate transition section may be provided with the opening slot, and the opening slot may be configured to realize flow communication between the wiring cavity of the first connection section and the wiring cavity of the second connection section to allow the wire to pass and be provided within the adapter member.

In some embodiments, the wire may include the telescoping section and the two natural sections disposed at both ends of the telescoping section, the elastic coefficient of the telescoping section may be greater than the elastic coefficient of each of the two natural sections, and the each of the two natural sections may be connected with the adapter members to allow the wire to extend along with the extension of the adapt member or retract along with the retraction of the adapter member.

In some embodiments, the connecting wire assembly may further include the auxiliary wire connected with the each of the two natural sections, the elastic coefficient of the auxiliary wire may be greater than the elastic coefficient of the telescoping section to provide the elastic restoring force when the wire is stretched.

In some embodiments, the auxiliary wire may include the elastic body and the two sleeve rings disposed at both ends of the elastic body, each of the two sleeve rings may be disposed on a corresponding natural section of the two natural sections and stopped by the limiting structure on the natural section along the rebound direction of the telescoping section.

In some embodiments, the limiting structure may be the protrusion integrally connected with the insulating layer of the wire, or the knot formed by knotting the natural section.

In some embodiments, each end of both ends of the arcuate header-beam member may be connected with the core module through the adapter member, the battery may be connected with one of two core modules at the both ends of the arcuate header-beam member, the main board may be connected with the other one of the two core modules, and the battery and the main board may be electrically connected through the wire.

In some embodiments, the headphone may include the header-beam assembly, the header-beam assembly may include the arcuate header-beam member configured to wrap around the top of the head of the user, the arcuate header-beam member may include the inner compartment body, the inner cover body, and the outer cover body, the inner compartment body may be elastic and configured to contact the head of the user, the inner cover body and the inner compartment body may be connected with a same side of the outer cover body, one end of the inner compartment body extends between the inner cover body and the outer cover body, and during a process that both ends of the header-beam assembly may be gradually pulled away from each other, at least a portion of the inner compartment body may be capable of being withdrawn from between the inner cover body and the outer cover body.

In some embodiments, the inner cover body may be integrally molded with the outer cover body.

In some embodiments, one end of the inner compartment body may be provided with one or more through holes, and a side of the inner cover body facing the outer cover body may be provided with one or more posts extending into the one or more through holes, a radial dimension of each of the one or more posts may be smaller than a radial dimension of each of the one or more through holes such that during the process that both ends of the header-beam assembly may be gradually separated along the direction away from each other, at least a portion of the inner compartment body may be capable of being withdrawn from between the inner cover body and the outer cover body and may be stopped by the one or more posts.

In some embodiments, at least one of the one or more through holes may be a waist-shaped hole with a length direction disposed along an extension direction of the arcuate header-beam member.

In some embodiments, the one or more through holes include two through holes and the one or more posts include two posts, the two through holes may be provided at intervals along a direction perpendicular to an extension direction of extension of the header-beam assembly, and each of the two posts respectively extends into one of the two through holes.

In some embodiments, the header-beam assembly may further include the adapter member, the inner cover body and the outer cover body clamp the adapter member, and the adapter member may be capable of extending from or retracting into the arcuate header-beam member under the action of the external force.

In some embodiments, the headphone may further include the connecting wire assembly provided between the inner compartment body and the outer cover body, the connecting wire assembly may include the wire, the adapter member may include the first connecting section, the intermediate transition section, and the second connecting section, the intermediate transition section connects the first connecting section and the second connecting section, the first connecting section and the second connecting section may be respectively bent relative to the intermediate transition section and extend along opposite directions, the first connecting section and the second connection section may be respectively provided with the wiring cavity, the intermediate transition section may be provided with the opening slot, the opening slot may be configured to realize flow communication between the wiring cavity of the first connection section and the wiring cavity of the second connection section to allow the wire to further pass and be provided within the adapter member.

In some embodiments, the wire may include the telescoping section and two natural sections disposed at both ends of the telescoping section, the elastic coefficient of the telescoping section may be greater than the elastic coefficient of the two natural sections, and the each of the two natural section may be connected with the two adapter members to allow the wire to extend along with the extension of the adapt member or retract along with the retraction of the adapter member.

In some embodiments, the connecting wire assembly may further include the auxiliary wire connected with each of the two natural sections, the elastic coefficient of the auxiliary wire may be greater than the elastic coefficient of the telescoping section to provide the elastic restoring force when the wire is stretched.

In some embodiments, the auxiliary cord may include the elastic body and the two sleeve rings disposed at both ends of the elastic body, each of the two sleeve rings may be disposed on a corresponding natural section of the two natural sections and stopped by the limiting structure on the natural section along the rebound direction of the telescoping section, and the limiting structure may be the protrusion integrally connected with the insulating layer of the wire, or the knot formed by knotting the natural section.

In some embodiments, each end of both ends of the arcuate header-beam member may be connected with the core module through the adapter member, the battery may be connected with one of the two core modules at the both ends of the arcuate header-beam member, the main board may be connected with the other one of the two core modules, and the battery and the main board may be electrically connected through the wire.

In some embodiments, the headphone may include the header-beam assembly, the header-beam assembly may include the arcuate header-beam member configured to wrap around the top of the head of the user, the arcuate header-beam member may include the intermediate section and two end sections respectively connected with both ends of the intermediate section, and an arc length of each of the two end sections may be less than an arc length of the intermediate section; wherein during a process that both ends of the header-beam assembly may be gradually pulled away from each other, the two end sections of the header-beam assembly deviate along a direction away from each other relative to the intermediate section.

In some embodiments, the headphones include the housing, the pickup assembly, and one or more damping members, the pickup assembly may include the pivot connecting member block, the connecting rod, and the pickup, one of the pivot connecting member block and the housing may include a pivot hole, the other one of the pivot connecting member block and the housing may include a pivot extending into the pivot hole, one end of the connecting rod may be connected with the pivot connecting member block, the pickup may be disposed at another end of the connecting rod, the one or more damping members may be disposed in a region where the pivot connecting member block overlaps the housing along an axial direction of the pivot hole, and the one or more damping members may be connected with one of the pivot connecting block and the housing and further abut the other one of the pivot connecting block and the housing to provide a resistance during a rotation of the pickup assembly relative to the housing.

In some embodiments, the one or more damping members may be provided within an accommodating slot of the housing and protrude from the accommodation slot.

In some embodiments, viewed along the axial direction of pivot hole, at least one of the one or more damping members has an arcuate shape and may be provided concentrically with the pivot hole.

In some embodiments, a count of the one or more damping members exceeds 1, the one or more damping members may be spaced around the pivot hole.

In some embodiments, a side of the pivot connecting block facing the housing forms the pivot, a side of the pivot connecting block away from the housing may be provided with a recessed region, and the headphone may further include the switch assembly provided within the recessed region.

In some embodiments, the protrusion may be provided on the bottom of the recessed region, the outer peripheral wall of the protrusion and the sidewall of the recessed region form the ring groove, the switch assembly may include the switch circuit board, the elastic supporting member, and the key, the switch circuit board may be disposed on the top of the protrusion, the elastic supporting member may include the ring fixing portion and the elastic supporting portion, the ring fixing portion may be fixed to the ring groove, the elastic supporting portion may be provided in the shape of the dome and may be connected with the ring fixing assembly, and the key may be provided on the elastic supporting portion.

In some embodiments, the ring fixing portion may be integrally formed with the elastic support portion, the headphone may further include the reinforcing ring, and the reinforcing ring may be provided on the ring fixing portion along the circumference of the ring fixing portion and may be connected with the pivot connecting block.

In some embodiments, the reinforcing ring may be sleeved on a periphery of the ring fixing portion, and the peripheral wall of the reinforcing ring may be fixedly connected with the sidewall of the recessed region.

In some embodiments, the headphone may further include the header-beam assembly, the core module may be connected with the header-beam assembly through the housing, and the header-beam assembly may be configured to wrap around the top of the head of the user such that the core module may be disposed on the front side of the ear of the user; wherein in the wearing state, the header-beam assembly and the top of the head form the first contacting point, the core module and the cheek of the user form the second contacting point, and the spacing between the second contacting point and the first contacting point along the sagittal axis of the user may be between 20 mm and 30 mm.

In some embodiments, the header-beam assembly may include the arcuate header-beam member and the adapter member, the arcuate header-beam member may be configured to wrap around the top of the head of the user, the adapter member may include the first connecting section, the intermediate transition section, and the second connecting section, the intermediate transition section connects the first connecting section and the second connecting section, the first connecting section and the second connecting section may be respectively bent relative to the intermediate transition section and extend along opposite directions, the first connecting section may be connected with the arcuate header-beam member, and the second connecting section may be connected with the core module; wherein viewed along the coronal axis of the user, the intermediate transition section may be inclined relative to the vertical axis of the user.

In some embodiments, the headphones include the housing, the pickup assembly, the wire, and a spacer, the pickup assembly may include the pivot connecting block, the connecting rod, and the pickup, the pivot connecting block extends into the pivot hole of the housing and allows the pickup assembly to rotate relative to the housing, one end of the connecting rod may be connected with the pivot connecting block, the pickup may be disposed at another end of the connecting rod, the wire extends through an interior of the pivot connecting block and an interior of the connecting rod to be electrically connected with the pickup, and the spacer may be fixed within the housing such that the pivot connecting block and the wires may be provided at intervals.

In some embodiments, the spacer covers a portion of the pivot connecting block on a circumference of the pivot hole, and at least a portion of the spacer extends into the pivot hole.

In some embodiments, the pivot connecting block may be configured to be stopped by the spacer after the pickup assembly rotates at an angle relative to the housing.

In some embodiments, the pivot connecting block may include the pivot and a barb portion and an operation portion respectively connected with both ends of the pivot, the pivot may be disposed in the pivot hole, the barb portion and the operation portion may be disposed on opposite sides of the housing to lock the pivot connecting block and the housing along the axial direction of the pivot hole, the connecting rod may be connected with the operation portion, the spacer may include a fixing portion connected with the housing and an arcuate extension portion connected with the fixing portion, the fixing portion covers a portion of the barb portion and may be provided at intervals from the barb portion along the axial direction of the pivot hole, the arcuate extension portion extends into the pivot and may be provided at intervals from the pivot in the radial direction of the pivot hole, the wire laps over the arcuate extension portion and the fixing portion when passing through the pivot hole, and the barb portion may be stopped by the fixing portion after the pickup assembly rotates at an angle relative to the housing.

In some embodiments, the headphone may further include the circuit board fixed in the housing, the housing may be provided with a hot melt post, the fixing portion and the circuit board may be sleeved on the hot melt post, and the pickup may be electrically connected with the circuit board through the wire.

In some embodiments, the recessed region may be provided on a side of the pivot connecting block away from the housing, and the headphone may further include the switch assembly provided within the recessed region.

In some embodiments, the protrusion may be provided on the bottom of the recessed region, the outer peripheral wall of the protrusion and the sidewall of the recessed region form the ring groove, the switch assembly may include the switch circuit board, the elastic supporting member, and the key, the switch circuit board may be disposed on the top of the protrusion, the elastic supporting member may include the ring fixing portion and the elastic supporting portion, the ring fixing portion may be fixed to the ring groove, the elastic supporting portion may be provided in the shape of the dome, and the key may be provided on the elastic supporting portion.

In some embodiments, the ring fixing portion may be integrally formed with the elastic support portion, the headphone may further include the reinforcing ring, and the reinforcing ring may be provided on the ring fixing portion along the circumference of the ring fixing portion and may be connected with the pivot connecting block.

In some embodiments, the headphone may further include the header-beam assembly, the core module may be connected with the header-beam assembly through the housing, and the header-beam assembly may be configured to wrap around the top of the head of the user such that the core module may be disposed on the front side of the ear of the user; wherein in the wearing state, the header-beam assembly and the top of the head form the first contacting point, the core module and the cheek of the user form the second contacting point, and the spacing between the second contacting point and the first contacting point along the sagittal axis of the user may be between 20 mm and 30 mm.

In some embodiments, the header-beam assembly may include the arcuate header-beam member and the adapter member, the arcuate header-beam member may be configured to wrap around the top of the head of the user, the adapter member may include the first connecting section, the intermediate transition section, and the second connecting section, the intermediate transition section connects the first connecting section and the second connecting section, the first connecting section and the second connecting section may be respectively bent relative to the intermediate transition section and extend along opposite directions, the first connecting section may be connected with the arcuate header-beam member, and the second connecting section may be connected with the core module; wherein viewed along the coronal axis of the user, the intermediate transition section may be inclined relative to the vertical axis of the use.

BRIEF DESCRIPTION OF THE DRAWINGS

In order to illustrate the technical solutions related to the embodiments of the present disclosure, a brief introduction of the drawings referred to in the description of the embodiments is provided below. Obviously, the drawings described below are only some examples or embodiments of the present disclosure. Those skilled in the art, without making creative efforts, may further obtain other drawings according to these drawings.

DETAILED DESCRIPTION

The present disclosure is described in further detail below in connection with the accompanying drawings and embodiments. In particular, the following embodiments are only configured to illustrate the present disclosure, but do not limit the scope of the present disclosure. Similarly, the following embodiments are only some but not all of the embodiments of the present disclosure, and all other embodiments obtained by those skilled in the art without making creative efforts fall remain within the scope of protection of the present disclosure.

Reference to "embodiments" in the present disclosure refers to particular features, structures or characteristics described in conjunction with embodiments may be included in at least one embodiment of the present disclosure. It is understood by those skilled in the art, both explicitly and implicitly, that the embodiments described herein may be combined with other embodiments.

In the present disclosure, a headphone 10 may include a core module 11, and the core module 11 may be configured to at least generate a bone-conduction sound and contact a skin of a user (e.g., a cheek) in a wearing state to allow an outer ear canal of an ear of the user to be "open". In other words, when the outer ear canal of the ear of the user is open and not blocked/obstructed by the headphone 10, the headphone 10 may also generate an air-conduction sound, which will be For example described below. At this point, a sound produced by the headphone 10 may be predominantly the bone-conduction sound and supplemented by the air-conduction sound, i.e., the air-conduction sound enhances the bone-conduction sound, thereby improving the sound quality of the headphone 10.

It should be noted that the bone-conduction sound of the present disclosure refers to that a mechanical vibration generated by the core module 11 may be mainly transmitted through a medium such as the skull of the user, and the air-conduction sound of the present disclosure refers to that the mechanical vibration generated by the core module 11 may be mainly transmitted through a medium such as air. Further, the headphone 10 of the present disclosure may include two core modules 11, and each of the two core modules 11 may convert an electrical signal into a mechanical vibration to facilitate the headphone 10 to realize a stereo sound effect. Therefore, in other application scenarios where a stereo sound requirement may be not particularly high, such as hearing aids for hearing patients, live teleprompters for hosts, etc., the headphone 10 may also be provided with only one core module 11, and a canceled core module 11 may be replaced by a structural member that assists in wearing the headphone 10.

Figure 1:
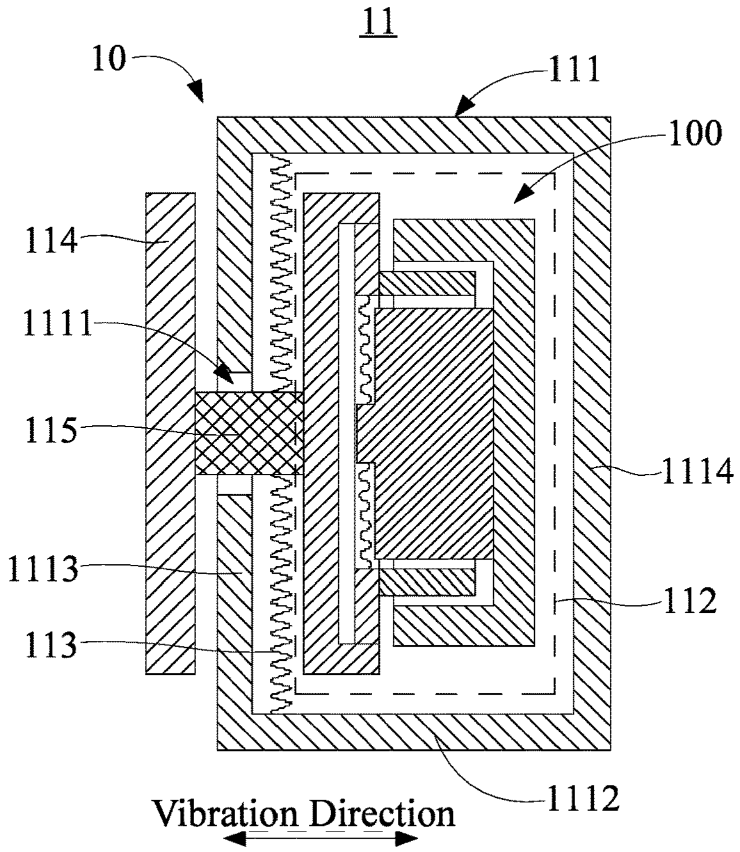
FIG. 1 is a schematic diagram illustrating an exemplary headphone according to some embodiments of the present disclosure.

In conjunction with FIG. 1, the core module 11 may include a core housing 111 and a transducer device 112 disposed within an accommodating cavity 100 of the core housing 111, the transducer device 112 may be provided to convert an electrical signal into the mechanical vibration. In such cases, the core module 11 may transmit a mechanical vibration generated by the transducer device 112 mainly through bone conduction, thereby forming a bone-conduction sound.

In some embodiments, in a wearing state, the core module 11 may contact the skin of the user directly through the core housing 111, i.e., the core module 11 directly transmits the mechanical vibration generated by the transducer device 112 through the core housing 111. In such cases, the headphone 10 may not include structural members such as a first vibration plate 113, a vibration panel 114, or the like, as described elsewhere in the present disclosure. In addition, the core housing 111 also drives the air outside the headphone 10 to vibrate, thereby generating a sound leakage. At this time, to reduce the sound leakage of the headphone 10, a through hole (also referred to as a "sound leakage reduction hole") may be provided in the core housing 111 for realizing flow communication between the accommodating cavity 100 and an exterior of the headphone 10 such that a sound wave output to the exterior of the headphone 10 through the sound leakage reduction hole may cancel out (also referred to as a "drilling a hole to reduce the sound leakage") with the sound leakage generated by a vibration of the core housing 111 vibrating with the transducer device 112 in a far-field.

In some other embodiments, the core module 11 may also include the first vibration plate 113 and the vibration panel 114. The transducer device 112 may be suspended in the accommodating cavity 100 through the first vibration plate 113, and at least a portion of the vibration panel 114 may be disposed outside the accommodating cavity of the core housing 11 and the vibration panel 114 may be connected with the transducer device 112 for transmitting the mechanical vibration generated by the transducer device 112 to the user. Correspondingly, one end of the core housing 111 close to the vibration panel 114 may be an open structure. In such cases, in the wearing state, the core module 11 may contact the skin of the user through the vibration panel 114, i.e., the core module 11 transmits the mechanical vibration generated by the transducer device 112 through the vibration panel 114. In addition, due to the presence of the first vibration plate 113, the mechanical vibration generated by the transducer device 112 may be less or even not transmitted to the core housing 111 to prevent the core housing 111 from driving the air outside the headphone 10 to vibrate as much as possible, thereby reducing the sound leakage of the headphone 10. The sound leakage of the headphone 10 may also be further reduced by drilling the hole to reduce the sound leakage.

Figure 42:
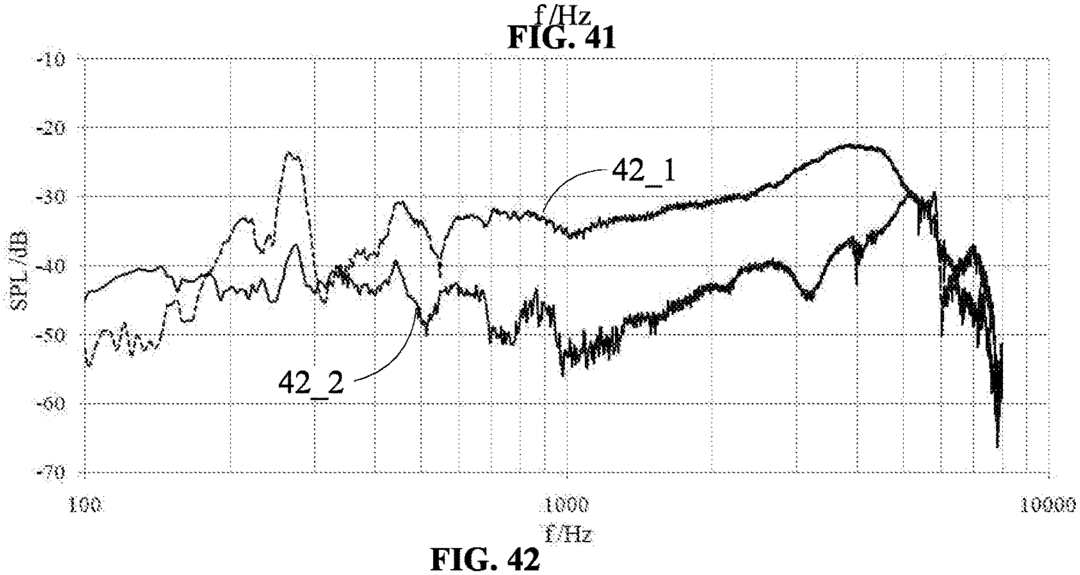
FIG. 42 is a graph illustrating frequency response curves of sound leakages of a headphone in a non-wearing state according to some embodiments of the present disclosure.

In other embodiments, such as FIG. 1, the core module 11 also transmits the mechanical vibration generated by the transducer 112 through the vibration panel 114, with the difference that the core housing 111 is not open at one end close to the vibration panel 114, i.e., the core housing 111 may be a closed structure except for a mounting hole 1111 described elsewhere in the present disclosure. At this time, the core housing 111 may reduce the sound leakage of the headphone 10 based on an acoustic dipole, and there is less or even no need to dispose an additional sound leakage reduction hole on the core housing 111. In conjunction with FIG. 42, a frequency response curve 42_1, and a frequency response curve 42_2 in FIG. 42 respectively represent the sound leakage of the headphone 10 when the end of the core housing 111 close to the vibration panel 114 is an open structure and the sound leakage of the headphone 10 when the end of the core housing 111 close to the vibration panel 114 is the closed structure. The sound leakage of the headphone 10 is significantly reduced when the end of the core housing 111 close to the vibration panel 114 is the open structure compared with a case in which the end of the core housing 111 close to the vibration panel 114 is the closed structure.

For example, the core module 11 may also include a connecting member 115 connecting the vibration panel 114 and the transducer device 112, and the core housing 111 is provided with a mounting hole(s) 1111 for mounting a connecting member 115. At this time, the vibration panel 114 is disposed outside the core housing 111 to contact the skin of the user; one end of the connecting member 115 is connected with the vibration panel 114, and another end of the connecting member 115 extends into the core housing 111 and is connected with the transducer device 112. In this way, even though the mechanical vibration generated by the transducer device 112 is partially transmitted to the core housing 111 through the first vibration plate 113, a phase of the sound leakage generated by a first end wall 1113 vibrating with the transducer device 112 is opposite to a phase of the sound leakage generated by a second end wall 1114 vibrating with the transducer device 112 such that the sound leakage generated by the first end wall 1113 and the sound leakage generated by the second end wall 1114 are able to cancel each other out in the far-field, thereby reducing the sound leakage of the headphone 10. Based on this, fewer or even no sound leakage reduction holes may be provided on the core housing 111, thereby improving the waterproof and dustproof performance of the headphone 10. In some embodiments, viewed along a vibration direction of the transducer device 112, an area of the vibration panel 114 is larger than the area of the mounting holes 1111, and the area of the mounting holes 1111 is larger than an area of the connecting member 115. Therefore, the mechanical vibration generated by the transducer device 112 may not be transmitted to the core housing 111 through the connection member 115, thereby further reducing the sound leakage of the headphone 10. At this time, a gap between the connecting member 115 and a wall of the mounting hole 1111 and the accommodating cavity 100 cooperate to enclose a Helmholtz resonance cavity, and a resonance frequency of the Helmholtz resonance cavity may be less than or equal to 4 kHz, preferably less than or equal to 2 kHz, or more preferably less than or equal to 1 kHz.

For example, the core housing 111 may include an inner cylinder wall 1112, and the first end wall 1113 and the second end wall 1114 respectively connected with both ends of the inner cylinder wall 1112, the inner cylinder wall 1112 is disposed at a periphery of the transducer device 112, and the first end wall 1113 and the second end wall 1114 are respectively disposed at opposite sides of the transducer device 112 along the vibration direction of the transducer device 112 and enclosed the accommodating cavity 100 with the inner cylinder wall 1112. Viewed along the vibration direction of the transducer device 112, a cross-section of the inner cylinder wall 1112 is in any one of the shapes of round, oval, runway, polygonal, etc., and obviously, a whole or a localization of the shape of the inner cylinder wall 1112 may be irregular. Further, in the wearing state, the first end wall 1113 is closer to the skin of the user relative to the second end wall 1114. At this time, the first end wall 1113 is provided with a mounting hole 1111. Obviously, in other embodiments such as embodiments in which a need for the sound leakage reduction is not stringent or in which holes are drilled for the sound leakage reduction, the core housing 111 may not include the first end wall 1113 and/or the second end wall 1114, and a side of the transducer device 112 away from the vibration panel 114 may be protected by other structural members (e.g., an adapter housing 13 described elsewhere in the present disclosure). In some other embodiments such as the embodiments in which the core module 11 is not provided with the vibration panel 114, the core housing 111 may contact the skin of the user directly through the first end wall 1113.

Figure 61:
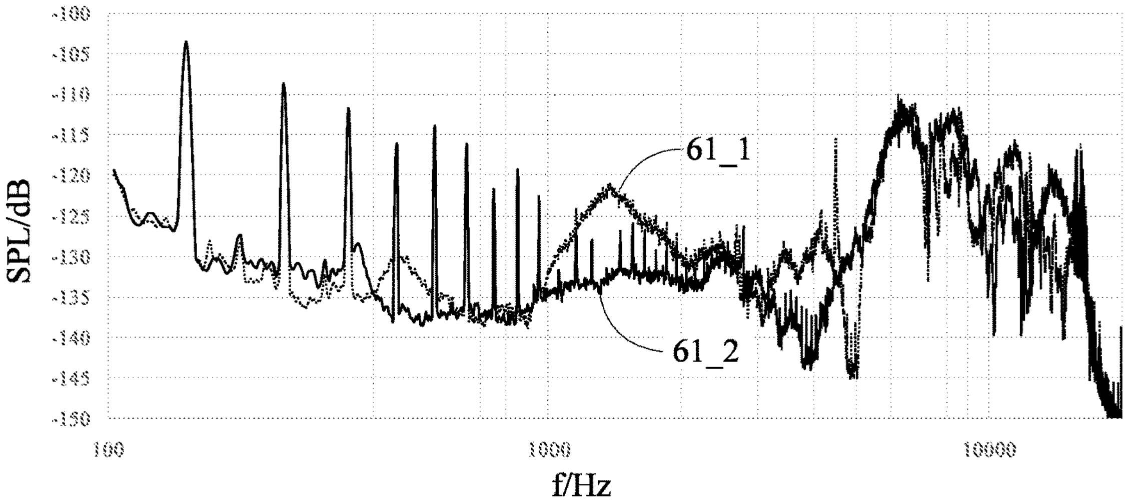
FIG. 61 is a graph illustrating frequency response curves of sound leakages of two embodiments of headphones in a non-wearing state according to some embodiments of the present disclosure.

The inventor of the present disclosure has found in the course of long-term research and development that: in conjunction with FIG. 61, a frequency response curve 61_1 and a frequency response curve 61_2 in FIG. 61 respectively represent the sound leakage of the headphone 10 when the core housing 111 has a larger volume and the sound leakage of the headphone 10 when the core housing 111 has a smaller volume. The sound leakage of the headphone 10 is significantly reduced when the core housing 111 has a smaller volume compared with a case in which the core housing 111 has a larger volume. For example, when the core housing 111 has a smaller volume, the sound leakage in a frequency range of 1 kHz-2 kHz is significantly reduced, and the sound leakage in a frequency range of 3 kHz-4 kHz is significantly reduced, which are frequency ranges that are more sensitive to a human ear. The sound leakage in the frequency range of 1 kHz-2 kHz contains more human voice components and has a greater impact on a subjective perception of the user, such that the headphone 10 is more competitive in the market when the sound leakage is maintained at a lower level in this frequency range. Based on this, under the condition that the core housing 111 accommodates the transducer device 112, the volume of the core housing 111 may be less than or equal to 3 $cm^3$ to reduce the sound leakage of the headphone 10, wherein the volume of the core housing 111 may be measured by filling water therein. Further, the volume of the core housing 111 may be adjusted by adjusting a radial dimension of the inner cylinder wall 1112 along a direction perpendicular to the vibration direction of the transducer device 112 or by adjusting a radial gap between the inner cylinder wall 1112 and the transducer device 112 along the direction perpendicular to the vibration direction of the transducer device 112. For example, under the condition that the transducer device 112 does not collide with the core housing 111 during vibration, the above-mentioned radial dimension or the above-mentioned radial gap may be as small as possible, thereby reducing the sound leakage of the headphone 10. In addition, the impact resistance of the headphone 10 may be increased, because a smaller radial dimension or a smaller radial gap allows the transducer device 112 to have a smaller movement stroke in an event of impacts such as a drop, structural members such as the first vibration plate 113 and the second vibration plate 1122 may have relatively small deformations and may be less likely to undergo plastic deformations or fracture, which improves reliability of the first vibration plate 113 and the second vibration plate 1122.

It should be noted that: although the transducer device 112 is suspended in the accommodating cavity 100 through the first vibration plate 113, for example, the transducer device 112 is connected with a central region of the first vibration plate 113 and a peripheral region of the first vibration plate 113 is connected with the core housing 111, a relative position of the first vibration plate 113 may be reasonably adjusted according to the actual needs. For example, the first vibration plate 113 is disposed within the accommodating cavity 100. Specifically, the first vibration plate 113 is disposed on a side of the first end wall 1113 close to the second end wall 1114. In other words, viewed along the vibration direction of the transducer device 112, the area of the mounting hole 1111 may be smaller than the area of the first vibration plate 113. The area of the first vibration plate 113 may be defined as an area of a region enclosed by the largest peripheral boundary of an orthographic projection of the first vibration plate 113 along the vibration direction of the transducer device 112. As another example, the first vibration plate 113 is disposed within the mounting hole 1111. Alternatively, a portion of the first vibration plate 113 is disposed within the accommodating cavity 100 and another portion is disposed within the mounting hole 1111, or a portion of the first vibration plate 113 is disposed within the accommodating cavity 100, a portion of the first vibration plate 113 is disposed within the mounting holes 1111, and a portion of the first vibration plate 113 is disposed outside of the core housing 111. In conjunction with FIG. 1, the present disclosure For example illustrates the first vibration plate 113 disposed within the accommodating cavity 100 such that the core housing 111 may be facilitated to reduce the sound leakage of the headphone 10 based on the acoustic dipole. It should be noted that the first vibration plate 113 disposed in the accommodating cavity 100 allows the headphone 10 to obtain a better sound leakage reduction effect compared with a case in which the first vibration plate 113 is disposed in the mounting hole 1111. This is mainly because since the area of the first vibration plate 113 along the vibration direction of the transducer device 112 is larger than the area of the connecting member 115 along the vibration direction of the transducer device 112, the first vibration plate 113 being disposed in the mounting hole 1111 may cause the area of the first end wall 1113 along the vibration direction of the transducer device 112 to be reduced to a larger extent, which may easily result in that a difference of stiffness between the first end wall 1113 and the second end wall 1114 is relatively large and thus is not conducive to the formation of the acoustic dipole between the first end wall 1113 and the second end wall 1114.

In some embodiments, the accommodating cavity 100 may communicate with the exterior of the headphone 10 merely through a first channel, the first channel is a gap between the connecting member 115 and the wall of the mounting hole 1111. In other words, the core housing 111 is not provided with the sound leakage reduction hole. In such cases, the sound leakage generated by the first end wall 1113 and the sound leakage generated by the second end wall 1114 cancel each other in the far-field to reduce the sound leakage of the headphone 10. It should be noted that: in connection with FIG. 8, when the core module 11 is provided with the Helmholtz resonance cavity 200, the core housing 111 may be provided with the through hole for realizing flow communication between the accommodating cavity 100 and the Helmholtz resonance cavity 200, and the through hole may be provided on the inner cylinder wall 1112 and/or the second end wall 1114. At this time, the Helmholtz resonance cavity 200 communicates with the accommodating cavity 100 only through the above-mentioned through hole and does not communicate with the exterior of the headphone 10 through other channels, which may still be regarded as the accommodating cavity 100 communicating with the exterior of the headphone 10 merely through the first channel.

Figure 9:
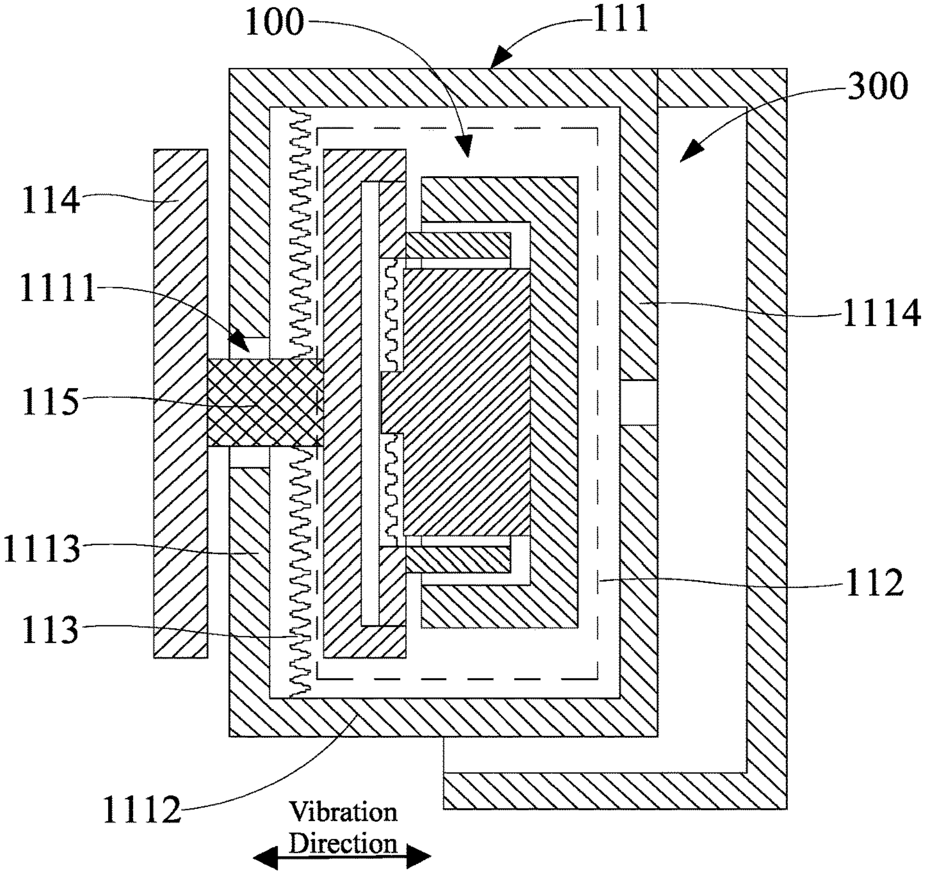
FIG. 9 is a schematic diagram illustrating an exemplary headphone according to some embodiments of the present disclosure.

In some other embodiments in which the core module 11 is provided with an audio filter 300, in conjunction with FIG. 9, the accommodating cavity 100 communicates with the exterior of the headphone 10 merely through the first channel and a second channel, the first channel is the gap between the connecting member 115 and the wall of the mounting hole 1111, and the second channel communicates with the exterior of the headphone 10 through the audio filter 300. In such cases, in addition to the mounting hole 1111, although the core housing 111 is also provided with the through hole for realizing flow communication between the accommodating cavity 100 and the audio filter 300, a role acted by the through hole is different from the role acted by the sound leakage reduction hole, and the through hole and the sound leakage reduction hole should not be confused.

In some other embodiments, the accommodating cavity 100 may communicate with the exterior of the headphone 10 merely through the first channel and the second channel, the first channel is a gap between the connecting member 115 and the wall of the mounting hole 1111, and a ratio of an opening area of the second channel to the opening area of the first channel may be less than or equal to 10%. The second channel may be used as a sound leakage reduction hole to further adjust or optimize the sound leakage of the headphone 10 under the premise of an acoustic dipole sound leakage reduction. In such cases, since the core housing 111 may reduce the sound leakage of the headphone 10 based on the acoustic dipole such that the sound leakage of the headphone 10 may be at a level that is easy to be received by the user, the opening area of the second channel may be much smaller than an opening area of a sound leakage reduction hole that is disposed merely by a drilling a hole to reduce the sound leakage in related art, which is helpful to meet waterproof requirements and dustproof requirements of the headphone 10. The second channel may not be used as an acoustic hole such as the sound leakage reduction hole; instead, the second channel may be used as an appearance hole. For example, in an embodiment in which the headphone 10 includes two core modules 11, one of the two core modules 11 is provided with a microphone and the core housing 111 thereof is provided with a microphone hole, and the other of the two core modules 11 is not provided with the microphone but the core housing 111 thereof is provided with the appearance hole corresponding to the microphone hole on the core housing 111; or the second channel may be merely used as a useless through hole provided on the core housing 111.

It should be noted that compared with the core module 11 directly contacting the skin of the user through the core housing 111, the core module 11 may achieve a better fit by contacting the skin of the user through the vibration panel 114. This is because the first vibration plate 113 has a certain elasticity, and the transducer device 112, the vibration panel 114, or the like are suspended in the accommodating cavity 100 through the first vibration plate 113. In the wearing state, the first vibration plate 113 allows the vibration panel 114 to be inclined at a certain angle relative to the core housing 111 according to a skin contour when contacting the skin of the user, such that the vibration panel 114 is able to more closely fit the skin of the user, which is conducive to reducing damage of the vibration panel 114 in transmitting the mechanical vibration of the transducer device 112 to a medium such as a skull of the user, thereby enhancing the bone conduction. Further, the vibration panel 114 may also drive the air outside of the headphone 10 to vibrate in a process of vibrating with the transducer device 112, phases of sounds generated by two opposite sides of the vibration panel 114 are opposite, and the sounds may cancel each other out in the far-field, thereby reducing the sound leakage of the headphone 10.

In general, a resonance frequency f of a structure satisfies a relationship with a stiffness K of the structure and a mass m of the structure: $f \propto (K/m)$. The stiffness may also be referred to as an elasticity coefficient, a coefficient of intensity, etc. Obviously, for the same mass, the greater the stiffness of the structure, the higher the resonance frequency of the structure. In addition, the greater the stiffness of the structure, the fewer the higher-order modes of the structure during vibration, which is conducive to improving sound quality. The stiffness of the structure K is related to a material (expressed as Young's modulus E), a specific structural form, and other factors. Generally, the stiffness K of the structure, Young's modulus E of the material, the thickness t of the structure, and an area S of the structure satisfy a relationship: $K \propto (E-t)/S$. The smaller the area S of the structure is, the greater the stiffness K of the structure is; the greater the thickness t of the structure is, the greater the stiffness K of the structure is. Therefore, one of an increase in Young's modulus E of the material, an increase in the thickness t of the structure, a decrease in the area S of the structure, or a combination thereof may increase the stiffness K of the structure, thereby increasing the resonance frequency of the structure and reducing the higher-order modes when the structure vibrates. Based on this, the Young's modulus of the first end wall 1113 and the second end wall 1114 may be respectively greater than or equal to 2000 MPa, preferably greater than or equal to 3000 MPa; and/or, the thickness of the first end wall 1113 and the thickness of the second end wall 1114 may be respectively between 0.3 mm and 3 mm, preferably between 0.5 mm and 2.5 mm; and/or, the area of the first end wall 1113 and the area of the second end wall 1114 may be respectively between 200 $mm^2$ and 500 $mm^2$, preferably between 300 $mm^2$ and 400 $mm^2$, so that the stiffness of the first end wall 1113 and the second end wall 1114 may be sufficiently large. In this way, when the structure vibrates, the higher order modes of the first end wall 1113 and the second end wall 1114 may be as few as possible, and the resonance frequency of the sound leakage generated by each of the first end wall 1113 and the second end wall 1114 may be shifted to a higher frequency band as much as possible, for example, greater than or equal to 4 kHz so that the user is not sensitive to the sound leakage. Further, a difference between the stiffness of the first end wall 1113 and the stiffness of the second end wall 1114 may be small to make the resonance frequency of the sound leakage generated by the first end wall 1113 and the resonance frequency of the sound leakage generated by the second end wall 1114 to be as similar as possible, thereby making the sound leakages generated by the first end wall 1113 and the second end wall 1114 to better cancel each other out in the far-field so that the sound leakage of the headphone 10 is reduced. Similarly, Young's modulus of the vibration panel 114 may be greater than or equal to 3000 MPa, preferably greater than or equal to 4000 MPa; and/or, the thickness of the vibration panel 114 may be between 0.3 mm and 3 mm, preferably between 0.5 mm and 2.5 mm; and/or, the area of the vibration panel 114 may be between 130 $mm^2$ and 400 $mm^2$, preferably between 140 $mm^2$ and 300 $mm^2$, such that the stiffness of the vibration panel 114 is sufficiently large, thereby allowing the higher order-modes of the vibration panel 114 when vibrating to be as few as possible.

For example, viewed along the vibration direction of the transducer device 112, the ratio of the area of the mounting hole 1111 to the area of the first end wall 1113 may be less than or equal to 0.6, preferably less than or equal to 0.5. In such cases, when the mounting hole 1111 satisfies the installation requirements of the connecting member 115, the stiffness of the first end wall 1113 and the stiffness of the second end wall 1114 may be as similar as possible, such that the resonance frequency of the sound leakage generated by the first end wall 1113 and the resonance frequency of the sound leakage generated by the second end wall 1114 are as similar as possible. Further, viewed along the vibration direction of the transducer device 112, the ratio of the difference between the area of the mounting hole 1111 and the area of the connecting member 115 to the area of the mounting hole 1111 may be greater than 0 and less than or equal to 0.5, preferably greater than 0 and less than or equal to 0.4. In such cases, when the mounting hole 1111 allows the connecting member 115 and the vibration panel 114 to move relative to the core housing 111, a gap between the connecting member 115 and the first end wall 1113 is as small as possible such that a sound wave generated by vibrations of the air in the accommodating cavity 100 vibrating with the transducer device 112 is prevented from propagating to the outside of the headphone 10 through the mounting hole 1111 to generate the sound leakage as much as possible, i.e., to inhibit an acoustic cavity effect, thereby reducing the sound leakage of the headphone 10. The phase of the sound wave transmitted to the exterior of the headphone 10 through the mounting hole 1111 may be opposite to the phase of one of the sound leakages generated by the first end wall 1113 and the second end wall 1114, the sound wave transmitted to the exterior of the headphone 10 through the mounting hole 1111 may further adjust the cancellation of the sound leakages generated by the first end wall 1113 and the second end wall 1114, thereby reducing the sound leakage of the headphone 10.

For example, the opening shape of the mounting hole 1111 and the cross-sectional shape of the connection member 115 may be the same regular shape. For example, the opening shape of the mounting hole 1111 and the cross-sectional shape of the connecting member 115 are corresponding polygons such as regular polygons, i.e., when the cross-sectional shape of the connecting member 115 is square, a regular hexagon shape, etc., the opening shape of the mounting hole 1111 may be a corresponding square shape, a corresponding regular hexagon shape, etc. As another example, the opening shape of the mounting hole 1111 and the cross-sectional shape of the connection member 115 are corresponding circular shapes, oval shapes, etc. Further, the gap between the connection member 115 and the first end wall 1113 (specifically, the wall of the mounting hole 1111) may be greater than 0 and less than or equal to 2 mm, preferably greater than 0 and less than or equal to 1 mm, and more preferably greater than or equal to 0.1 mm and less than or equal to 1 mm, so that when the mounting hole 1111 allows the connection member 115 and the vibration panel 114 to move relative to the core housing 111, the gap between the connection member 115 and the first end wall 1113 is as small as possible. When the count of mounting hole 1111 and the count of the connecting member 115 respectively exceed 1 and the count of the mounting hole 1111 corresponds to the count of the connecting member 115 one-to-one, as shown in (b) and (c) in FIG. 2, the gap between the connecting members 115 and the wall of the mounting hole 1111 may be defined as a sum of gaps formed by each of a plurality of connecting members 115 with the walls of a corresponding mounting hole 1111. Obviously, in some other embodiments, the shape of the opening of the mounting hole 1111 and the shape of the cross-section of the connecting members 115 may also be regular shapes different from each other. For example, when the cross-sectional shape of the connection member 115 is the square shape, the hexagon shape, or other regular polygon shapes, the opening shape of the mounting hole 1111 may also be circular; conversely, when the cross-sectional shape of the connection member 115 is the circular shape, the opening shape of the mounting hole 1111 may also be square, a hexagon shape, or other regular polygon shapes. In some embodiments, the opening shape of the mounting hole 1111 and the cross-sectional shape of the connection member 115 may also be other irregular structural shapes. In conjunction with FIG. 2, the present disclosure for example illustrates the cross-sectional shape of the connection member 115 as circular shape; correspondingly, the opening shape of the mounting hole 1111 is also circular.

Figure 2:
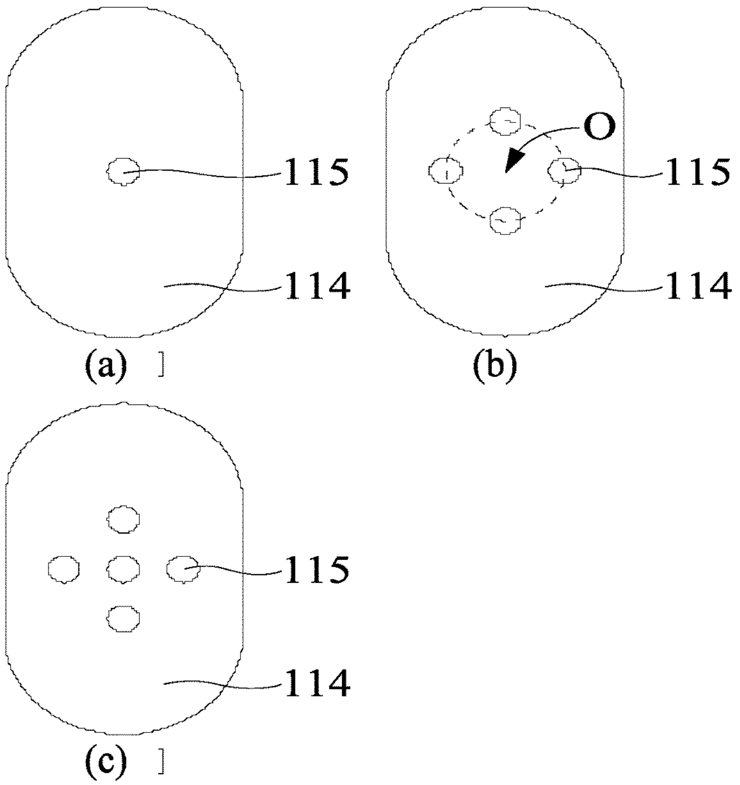
FIG. 2 is a structural schematic diagram illustrating an exemplary relative positional relationship between a connecting member and a vibration panel of a headphone according to some embodiments of the present disclosure.

In some embodiments, such as (a) in FIG. 2, the core module 11 may include a single one connecting member 115, and the connecting member 115 may be connected with a central region of the vibration panel 114. At this time, the count of mounting hole 1111 may also be one, and the connection member 115 passes through the mounting hole 1111. In such cases, under the same condition, a communication area between the mounting hole 1111 and the exterior of the core housing 111 may be decreased as much as possible such that the sound wave generated by vibrations of the air in the accommodating cavity 100 vibrating with the transducer device 112 is prevented from propagating to the outside of the headphone 10 through the mounting hole 1111 to generate the sound leakage as much as possible.

In some other embodiments, such as (b) in FIG. 2, the core module 11 may include a plurality of connecting members 115, such as three, four, etc., and the plurality of connecting members 115 are provided at intervals around a centerline (e.g., as shown by O in (b) of FIG. 2) of the vibration panel 114 parallel to the vibration direction of the transducer device 112. At this time, the count of mounting hole 1111 may exceed 1, and the plurality of connection members 115 are respectively connected with the transducer device 112 through a corresponding mounting hole 1111, which may improve the reliability of the connection members 115 connecting the vibration panel 114 and the transducer device 112. Further, centers of the plurality of connecting members 115 may be on the same circle (i.e., the centers are concyclic), and a center of the circle (e.g., shown as O in (b) of FIG. 2) may be on the centerline of the vibration panel 114 parallel to the vibration direction of the transducer device 112. The plurality of connecting members 115 may be evenly provided at intervals around the centerline of the vibration panel 114 parallel to the vibration direction of the transducer device 112.

In some embodiments, such as (c) in FIG. 2, the core module 11 may include a plurality of connecting members 115, such as four, five, etc., wherein one of the plurality of connecting members 115 is connected with the central region of the vibration panel 114, and the other connecting members 115 are provided at intervals around the connecting member 115 located in the central region of the vibration panel 114. At this time, the count of mounting hole 1111 may exceed 1, and the plurality of connection members 115 are respectively connected with the transducer device 112 through a corresponding mounting hole 1111. In this way, the reliability of the connection members 115 connecting the vibration panel 114 and the transducer device 112 may be improved.

It should be noted that compared with FIG. 1, FIG. 2 may be simply regarded as an orthographic projection of the vibration panel 114 and the connecting member 115 along the vibration direction of the transducer device 112.

In some embodiments, the accommodating cavity 100 may communicate with the exterior of the headphone 10 through one single channel, the channel is the gap between the connecting member 115 and the wall of the mounting hole 1111. At this time, the core module 11 may include a sealing membrane 118 configured to seal the channel, i.e., the gap between the connecting member 115 and the wall of the mounting hole 1111 may be sealed by the sealing membrane 118 to prevent the sound wave conducted by the air in the accommodating cavity 100 from propagating to the exterior of the headphone 10 through the channel to generate the sound leakage. The sealing membrane 118 may be made of at least one of rubber, silicone, polyvinyl chloride (PVC), polycarbonate (PC), polyether ether-ether-ketone (PEEK), etc.

Figure 35:
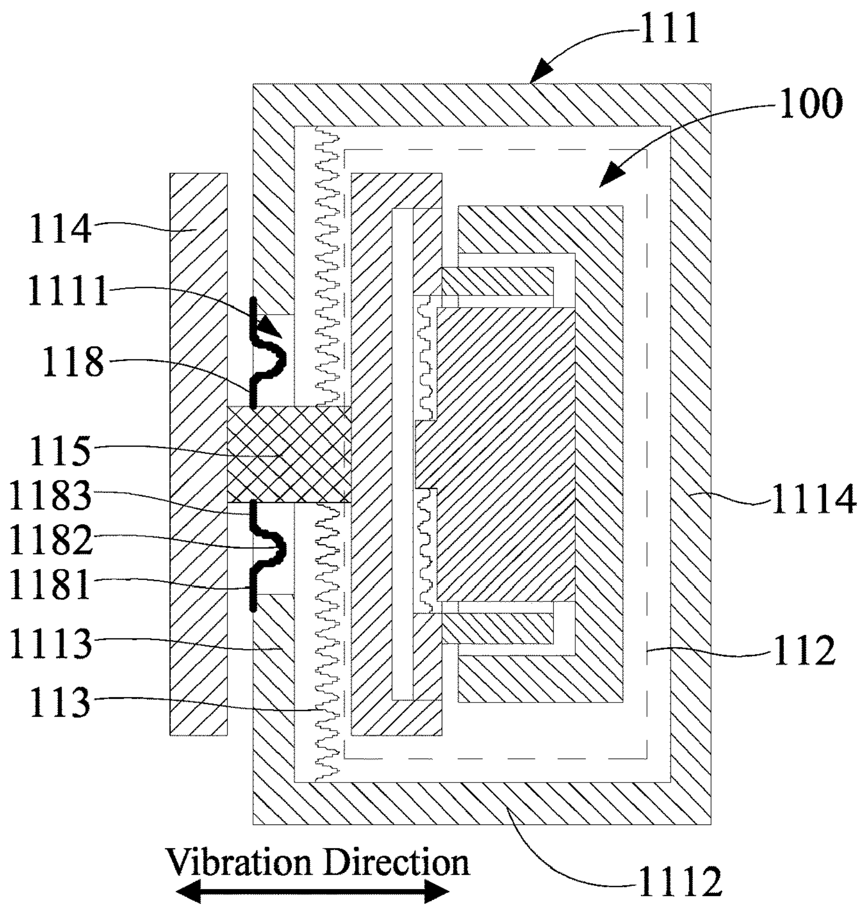
FIG. 35 is a schematic diagram illustrating an exemplary headphone according to some embodiments of the present disclosure.

For example, in connection with FIG. 35, the sealing membrane 118 may include a first connecting portion 1181, a pleated portion 1182, and a second connecting portion 1183, and the first connecting portion 1181, the pleated portion 1182, and the second connecting portion 1183 are integrally connected. The pleated portion 1182 forms a recessed region between the first connecting portion 1181 and the second connecting portion 1182. At this time, the first connection portion 1181 may be connected with the first end wall 1113, and the second connection portion 1183 may be connected with the connection member 115 or the vibration panel 114. In this way, compared with a planar film structure (e.g., a portion where the recessed region is located is a planar shape), a non-planar film structure with a folded ring (i.e., the recessed region) is conducive to increasing the elasticity of the sealing membrane 118, which is conducive to avoiding a mechanical vibration generated by the transducer device 112 being transmitted to the core housing 111 through the sealing membrane 118, and is also conducive to preventing the sealing membrane 118 from being "torn apart" due to excessive relative movement between the connecting member 115 or the vibration panel 114 and the core housing 111, or from being "ruptured" due to excessively high or low sound pressure within the accommodating cavity 100, or from experiencing fatigue failure due to excessive changes in sound pressure within the accommodating cavity 100. In addition, the core housing 111 may be provided with a pressure relief hole, and the pressure relief hole is configured to balance the sound pressure in the accommodating cavity 100 so that the sound pressure is maintained at a level that does not vary much relative to an atmospheric pressure to prolong a service life of the sealing membrane 118. An area of the pressure relief hole may be less than or equal to 4 $mm^2$. It should be noted that the sealing membrane 118 is conducive to increasing the gap between the wall surfaces of the connection member 115 and the mounting hole 1111, i.e., the opening area of the mounting hole 1111 may be set to be larger than the cross-sectional area of the connection member 115, which is conducive to avoiding unnecessary wear and tear, thereby extending the service life of the core module 11.

Figure 46:
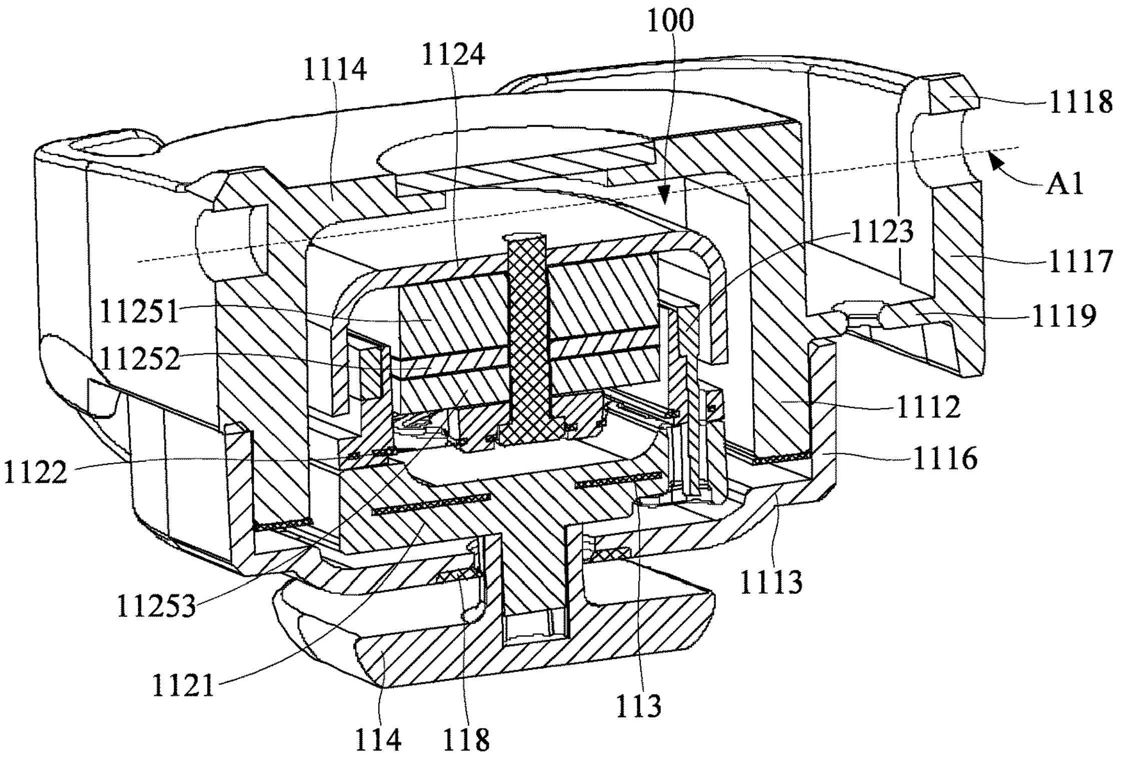
FIG. 46 is a schematic diagram illustrating an exemplary headphone according to some embodiments of the present disclosure.

It should be noted that in combination with FIG. 46 and FIG. 35, the sealing membrane 118 may be merely connected with the first end wall 1113, that is, a gap may be between the sealing membrane 118 and the connection member 115, and the gap is smaller than the gap between the connection member 115 and the wall of the mounting hole 1111, which may not only reduce the communication area between the accommodating cavity 100 and the exterior of the headphone 10, but also facilitate balancing the sound pressure inside the accommodating cavity 100 to maintain the sound pressure at a level that does not vary much relative to the atmospheric pressure.

Based on the relevant descriptions above, when the transducer device 112 generates a mechanical vibration, the core housing 111 (specifically may be the first end wall 1113 and the second end wall 1114) and the vibration panel 114 may further form a plurality of sets of acoustic dipoles, i.e., two opposite phases may cancel each other out, thereby reducing the sound leakage of the headphone 10. Based on this, a ratio of an absolute value of a difference between the stiffness of the vibration panel 114 and the stiffness of the first end wall 1113 to a greater of the stiffness of the vibration panel 114 and the stiffness of the first end wall 1113 may be between 0 and 0.4, preferably between 0 and 0.3; and/or a ratio of an absolute value of a difference between the stiffness of the vibration panel and the stiffness of the first end wall 1113 to the greater of the stiffness of the vibration panel 114 and the stiffness of the second end wall may between 0 and 0.4, preferably between 0 and 0.3. In such cases, the resonance frequency of the sound leakage generated by the vibration panel 114 and the resonance frequency of the sound leakage generated by the first end wall 1113 and/or the second end wall 1114 may be as close as possible to each other, so that the sound leakage generated by the vibration panel 114 and the sound leakage generated by the first end wall 1113 may better cancel each other out in the far-field, thereby reducing the sound leakage of the headphone 10.

For example, viewed along the vibration direction of the transducer device 112, a ratio of the area of the vibration panel 114 to the area of the first end wall 1113 may be between 0.3 and 1.6, preferably between 0.5 and 1.2. In other words, when the structure of the core housing 111 is determined, the area of the vibration panel 114 and the area of the first end wall 1113 may not differ much so that the stiffness of the vibration panel 114 and the stiffness of the first end wall 1113 may be as similar as possible. In addition, if the area of the vibration panel 114 is too small, it may affect the transmission of the mechanical vibration generated by the vibration panel 114 through the transducer device 112, thereby affecting the intensity of a bone-conduction sound generated by the headphone 10, and may also cause a contact surface between the skin of the user and the core module 11 to be too small and cause a discomfort in wearing, which in turn affects a wearing comfort of the headphone 10; if the area of the vibration panel 114 is too large, it may affect the stiffness of the vibration panel 114, thereby affecting the sound quality of the headphone 10, and may also cause the vibration panel 114 to be affected by the contour of the skin too much and make it difficult to closely fit with the skin of the user, thereby affecting the intensity of the bone-conduction sound generated by the headphone 10.

Generally, for the acoustic dipole, the smaller the distance between two monopoles with opposite phases, the more obvious the effect of inverse phase cancellation, i.e., the smaller the sound pressure in the far-field, and correspondingly, the smaller the sound leakage of the headphone 10 in the far-field. Considering the structural intensity of the vibration panel 114, a structural interference between the vibration panel 114 and the core housing 111 during vibration of the transducer device 112, and spatial requirements for providing structural members such as the transducer device 112 in the core housing 111, the distance between the two monopoles is hard to be zero. Therefore, along the vibration direction of the transducer device 112, the thickness of the vibration panel 114 may be between 0.3 mm and 3 mm, preferably between 0.5 mm and 2.5 mm. If the thickness of the vibration panel 114 is too small, it may not be conducive to sufficient stiffness of the vibration panel 114; and/or, a gap between the vibration panel 114 and the first end wall 1113 may be between 0.5 mm and 3 mm, preferably between 1 mm and 2 mm. If the gap is too small, it may easily cause the vibration panel 114 to collide with the core housing 111 and form a broken sound; and/or, a spacing between a side of the first end wall 1113 away from the second end wall 1114 and a side of the second end wall 1114 away from the first end wall 1113 may be between 6 mm and 16 mm.

Figure 3:
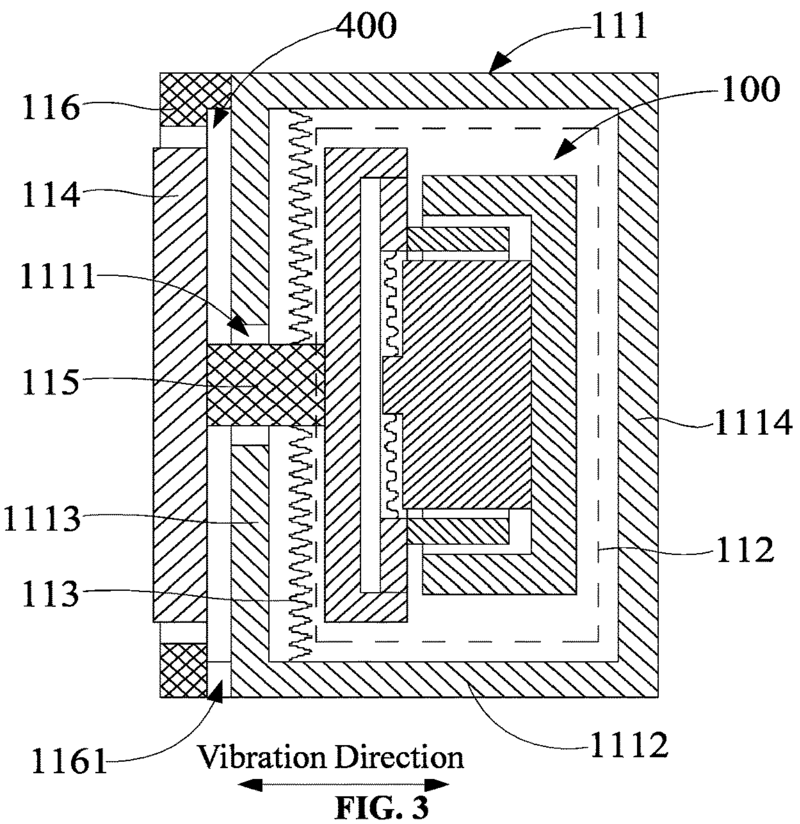
FIG. 3 is a schematic diagram illustrating an exemplary headphone according to some embodiments of the present disclosure.

In conjunction with FIG. 3, the core module 11 may also include a surrounding edge 116 connected with an end of the core housing 111 close to the vibration panel 114. For example, the surrounding edge 116 is connected with an end of the inner cylinder wall 1112 away from the second end wall 1114. As another example, the surrounding edge 116 is connected with the first end wall 1113, and the surrounding edge 116 may encircle the vibration panel 114 to prevent the vibration panel 114 from falling off. In other words, the surrounding edge 116 is connected with the core housing 111, and a projection of the surrounding edge 116 in a reference plane perpendicular to the vibration direction of the transducer device 112 surrounds a periphery of a projection of the vibration panel 114 in the reference plane. In the non-wearing state, the surrounding edge 116 is provided at intervals from the vibration panel 114 along a direction perpendicular to the vibration direction of the transducer device 112 to prevent the surrounding edge 116 from hindering the vibration panel 114 from vibrating with the transducer device 112. At least a portion of a side of the vibration panel 114 away from the transducer device 112 protrudes from a side of the surrounding edge 116 away from the transducer device along the vibration direction of the transducer device 112 to allow the vibration panel 114 to closely fit the skin of the user, thereby increasing the intensity of the bone-conduction sound generated by the headphone 10. Further, in the wearing state, in addition to the vibration panel 114 contacts the skin of the user, the surrounding edge 116 may also contact the skin of the user, i.e., at least a portion of the surrounding edge 116 contacts the skin of the user together with the vibration panel 114 to share a portion of pressing force applied by the core module 11 on the skin of the user, such that the vibration panel 114 is allowed to vibrate along with the transducer device 112, thereby improving the sound quality of the headphone 10, especially in a low frequency band. In other words, the core module 11 is provided with a surrounding edge 116, which is conducive to balancing wearing stability and comfort with sound quality. Therefore, a pressing force of the vibration panel 114 against the cheek of the user may be less than a pressing force of the header-beam assembly 12 pressing the core module 11 against the cheek of the user, and a contacting area between the vibration panel 114 and the cheek of the user may also be less than a contacting area between the core module 11 and the cheek of the user. When the core module 11 is provided with the surrounding edge 116, the pressing force of the core module 11 against the cheek of the user may be equal to the sum of the pressing force of the vibration panel 114 against the cheek of the user and the pressing force of the surrounding edge 116 against the cheek of the user, and the contacting area between the core module 11 and the cheek of the user may be equal to a sum of the contacting area between the vibration panel 114 and the cheek of the user and the contacting area between the surrounding edge 116 and the cheek of the user. When the core module 11 is not provided with the surrounding edge 116 and contacts the cheek of the user merely through the vibration panel 114, the pressing force of the core module 11 against the cheek of the user may be equal to the pressing force of the vibration panel 114 against the cheek of the user, and the contacting area between the core module 11 and the cheek of the user may be equal to the contacting area between the vibration panel 114 and the cheek of the user. Based on this, the header-beam assembly 12 described elsewhere in the present disclosure may apply a pressing force between 0.4 N and 0.8 N to press the core module 11 against the cheek of the user, and the pressing force of the vibration panel 114 against the cheek of the user may be between 0.1 N and 0.7 N. The contacting area between the core module 11 and the cheek of the user may be between 400 $mm^2$ and 600 $mm^2$, preferably between 450 $mm^2$ and 550 $mm^2$; and the contacting area between the vibration panel 114 and the cheek of the user may be between 180 $mm^2$ and 300 $mm^2$, preferably between 160 $mm^2$ and 280 $mm^2$.

Further, a side of the core housing 111 close to the vibration panel 114, the vibration panel 114, and the surrounding edge 116 may enclose a cavity 400. For example, the surrounding edge 116 may enclose the cavity 400 with the first end wall 1113 and the vibration panel 114, and the surrounding edge 116 may be provided with one or more communicating holes 1161 for realizing flow communication between the cavity 400 and the exterior of the core module 11, so that in the wearing state, the cavity 400 may be in flow communication with the exterior of the core module 11 through the communicating holes 1161. In other words, the surrounding edge 116 may be provided with the one or more communicating holes 1161. A gap between the vibration panel 114 and the core housing 111 (e.g., the first end wall 1113) and the exterior of the headphone 10 may be in flow communication via the one or more communicating holes 1161, so that the sound leakage generated by the first end wall 1113 and the sound leakage generated by the second end wall 1114 may cancel each other out in the far-field, i.e., the sound leakages generated by the opposite sides of the core housing 111 may cancel each other out in the far-field to better satisfy the need of for sound leakage reduction of the headphone 10. A count of the one or more communicating holes 1161 may exceed 1. For example, a plurality of communicating holes 1161 are spaced around the connecting member 115, as another example, an opening ratio of the plurality of communicating holes 1161 on the surrounding edge 116 is greater than or equal to 30% to allow the sound leakage generated by the first end wall 1113 to be transmitted more and cancel out with the sound leakage generated by the second end wall 1114 in the far-field. The opening ratio may refer to a product of an area of a communicating hole 1161 of the plurality of communicating holes 1161 and the count of communicating holes 1161 and then divided by an area of the surrounding edge 116. Further, in the wearing state, at least a portion of the plurality of communicating holes 1161 may not contact the skin of the user to facilitate a transmission of the sound leakage generated by the first end wall 1113 through the at least a portion of the plurality of communicating holes 1161. Thus, in conjunction with FIG. 3, the plurality of communicating holes 1161 may be provided on a side of the surrounding edge 116; in conjunction with FIG. 27 or FIG. 32, the one or more communicating holes 1161 may be provided on the connecting portion 1162, a first outer cylinder wall 1115 is provided with one or more avoidance holes corresponding to the one or more communicating holes 1162, or the one or more communicating holes 1161 may be provided on a portion of a limiting portion 1164 that does not contact the skin of the user. In conjunction with FIG. 52, the one or more communicating holes 1161 may be provided on a portion of the surrounding edge 116 that does not contact the skin of the user. In addition, the cavity 400 and the one or more communicating holes 1161 may also constitute one or more Helmholtz resonance cavities, increasing the opening ratio of the one or more communicating holes 1161 on the surrounding edge 116 is conducive to shifting the resonant peaks of a resonance of the cavity 400 to a frequency band of a high frequency, so that the user may perceive fewer sound leakage. It should be noted that in the wearing state, an opening direction of at least one of the one or more communicating holes 1161 may be away from the top of the head of the user. For example, an angle between an opening direction of the communicating holes 1161 and the vertical axis of the user may be between 0 and 10°, so that liquids such as perspiration of the user or the like may be left out via the at least one of the one or more communicating holes 1161, i.e., to prevent perspiration or the like from being retained in the core module 11. The sound leakage generated by the first end wall 1113 may also be transmitted through the gap between the surrounding edge 116 and the vibration panel 114 along the direction perpendicular to the vibration direction of the transducer unit 112, thereby canceling the sound leakage generated by the second end wall 1114 out in the far-field, which will be exemplified below.

For example, there is a target frequency range with an interval length of at least 1/3 octave within a frequency range of 500 Hz to 4 kHz. In the target frequency range, the sound leakage generated by the headphone 10 in the wearing state when the one or more communicating holes 1161 are in an open state is weaker than the sound leakage generated by the headphone 10 in the wearing state when the one or more communicating holes 1161 are in a closed state. The target frequency range may be within a range of 1 kHz to 2 kHz. It should be noted that the one or more communicating holes 1161 being in the closed state may refer to that the one or more communicating holes 1161 are blocked.

Further, there may be at least one communicating hole 1161 on each unit area of a square millimeter on the surrounding edge 116 so that a count of one or more communicating holes 1161 on the surrounding edge 116 is sufficiently large and an area of each communicating hole 1161 is not exceptionally large, which is conducive to ensuring the structural intensity of the surrounding edge 116. Obviously, in some other embodiments in which the structural intensity of the surrounding edge 116 is sufficient, the area of the communicating hole 1161 may be relatively large.

In some embodiments, the surrounding edge 116 may be a plastic member, and the wall thickness of the surrounding edge 116 may be between 0.2 mm and 1 mm. If the wall thickness of the surrounding edge 116 is too small, the structural intensity of the surrounding edge 116 may be insufficient. If the wall thickness of the surrounding edge 116 is too large, the surrounding edge 116 may contact the skin of the user before the vibration panel 114, which makes it difficult for the vibration panel 114 to contact the skin of the user. Obviously, on the premise that the vibration panel 114 is in contact with the skin of the user, a portion of the surrounding edge 116 configured to contact the skin of the user may be thicker than other portions of the surrounding edge 116. For example, the wall thickness of the portion of the surrounding edge 116 configured to contact the skin of the user is greater than 1 mm to prevent the surrounding edge 116 from being squeezed and collapsed in the wearing state. Further, when the surrounding edge 116 is the plastic member, the plastic member may be molded on a metal frame through an injection molding technique to provide structural reinforcement to the surrounding edge 116.

In some embodiments, the surrounding edge 116 may be a metal member to allow the opening ratio of the one or more communicating holes 1161 on the surrounding edge 116 to be greater than or equal to 60%, primarily because the structural intensity of the metal member may be higher than the structural intensity of the plastic member. For example, the surrounding edge 116 is a wire mesh with a mesh count (i.e., a count of holes per inch) between 5 and 508.

In some embodiments, the core housing 111 may be a first plastic member, the surrounding edge 116 may be connected with the core housing 111 through a second plastic member, the second plastic member and a metal member may be integrally molded through the injection molding technique, and the one or more communicating holes 1161 may be provided on the metal member.

Figure 43:
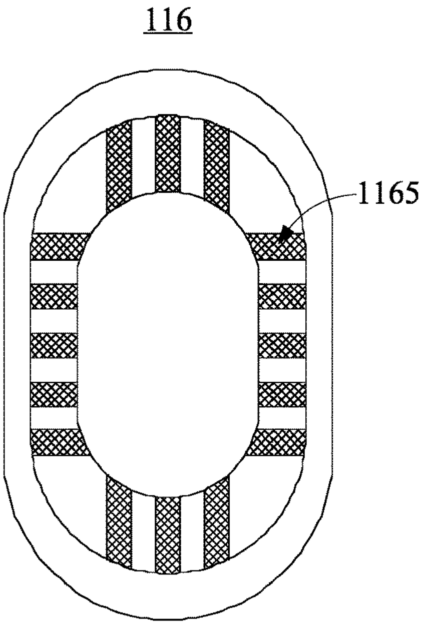
FIG. 43 is a schematic diagram illustrating a structure of a headphone facing a skin of a user in a wearing state according to some embodiments of the present disclosure.
Figure 44:
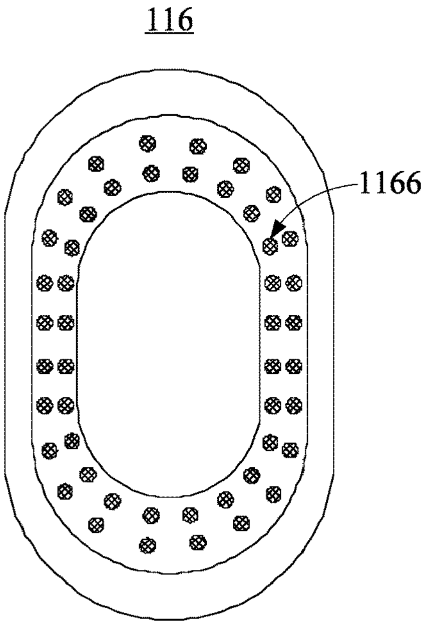
FIG. 44 is a schematic diagram illustrating an exemplary headphone facing a skin of a user in a wearing state according to some embodiments of the present disclosure.

In conjunction with FIG. 43 or FIG. 44, an outer surface of the surrounding edge 116 facing the skin of the user in the wearing state may have an uneven region such that a portion of the surrounding edge 116 may not fit with the skin of the user when the surrounding edge 116 contacts the skin of the user, i.e., there is a gap between the surrounding edge 116 and the skin of the user, thereby allowing the cavity 400 to be in flow communication with the exterior of the core module 11. In such cases, the sound leakage generated by the opposite sides of the core housing 111 (e.g., the first end wall 1113 and the second end wall 1114) may cancel out each other in the far-field, thereby satisfying the need for the sound leakage reduction of the headphone 10. A height difference of the uneven region may be between 0.5 mm and 5 mm such that the cavity 400 may be in flow communication with the exterior of the core module 11 through a sufficient gap.

In some embodiments, in conjunction with FIG. 43, at least one groove 1165 may be provided on an outer surface of the surrounding edge 116, and in the wearing state, the cavity 400 is in flow communication with the exterior of the core module 11 through the at least one groove 1165. Parameters such as a count, depth, etc., of the at least one groove 1165 may affect an area through which the cavity 400 is in flow communication with the exterior of the core module 11. For example, a projection of the surrounding edge 116 on a reference plane perpendicular to the vibration direction of the transducer device 112 has a long axis direction and a short axis direction. The long axis direction and the short axis direction are orthogonal to each other. A dimension of the surrounding edge 116 in the long axis direction is larger than a dimension of the surrounding edge 116 in the short axis direction, and the count of the at least one groove 1165 may exceed 1, and the at least one groove 1165 may be divided into four groups, wherein two groups of grooves 1165 are provided at intervals along the long axis direction respectively, and the other two groups of grooves 1165 are provided at intervals along the short axis direction respectively, and a count of grooves 1165 of each group provided at intervals along the long axis direction may be greater than a count of grooves 1165 of each group provided at intervals along the short axis direction. For ease of differentiation and description, a region where the at least one groove 1165 is located in FIG. 43 is filled with a grid, i.e., a region where the grid is located may be simply regarded as the at least one groove 1165. Furthermore, for example, a depth of the at least one groove 1165 may be between 0.5 mm and 5 mm.

In some embodiments, in conjunction with FIG. 44, the outer surface of the surrounding edge 116 may be provided with at least one protrusion 1166, the at least one protrusion 1166 is configured such that a gap is formed between the surrounding edge 116 and the skin of the user in the wearing state, and the cavity 400 is in flow communication with the exterior of the core module 11 through the gap. Parameters such as a count, height, etc. of the at least one protrusion 1166 may affect an area through which the cavity 400 is in flow communication with the exterior of the core module 11. For example, the count of the at least one protrusion 1166 exceeds 1, and the at least one protrusion 1166 makes the gap to be in a form of grid. For ease of differentiation and description, the region where the protrusion 1166 is located in FIG. 44 is filled with a grid, i.e., the region where the grid is located may be simply regarded as the at least one protrusion 1166. As another example, the height of the at least one protrusion 1166 may be between 0.5 mm and 5 mm.

Similarly, within the frequency range of 500 Hz to 4 kHz, there is a target frequency range with an interval length of at least 1/3 octave. Based on this, within the target frequency range, the sound leakage generated by the headphone 10 in the wearing state when the outer surface of the surrounding edge 116 has the uneven region is weaker than the sound leakage generated by the headphone 10 in the wearing state when the outer surface of the surrounding edge 116 does not have the uneven region. The target frequency range may be within a range of 1 kHz to 2 kHz. It should be noted that the outer surface of the surrounding edge 116 does not have the uneven region may refer to filling in the uneven region on the outer surface of the surrounding edge 116. For example, a glue is filled in the at least one groove 1165 or between the at least one protrusion 1166, and after the glue has cured, it may simply be regarded as that the outer surface of the surrounding edge 116 does not have the uneven region.

Figure 45:
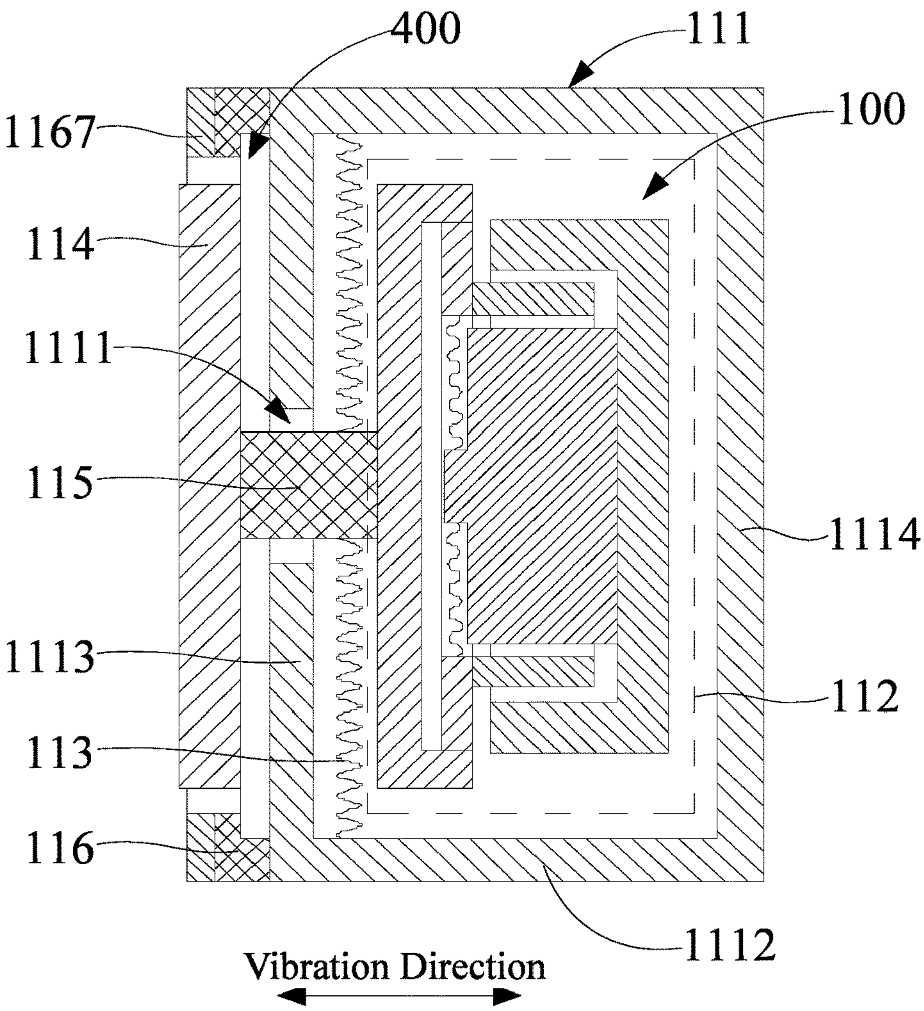
FIG. 45 is a schematic diagram illustrating an exemplary headphone according to some embodiments of the present disclosure.

In conjunction with FIG. 45, a side of the surrounding edge 116 facing the skin of the user in the wearing state may be provided with a porous structure 1167, such that in the wearing state, at least a portion of the porous structure 1167 may contact the skin of the user together with the vibration panel, and the cavity 400 is allowed to be in flow communication with the exterior of the core module 11. In this way, the sound leakages generated by the opposite sides of the core housing 111 (e.g., the first end wall 1113 and the second end wall 1114) may cancel each other out in the far-field, thereby satisfying the need for the sound leakage reduction of the headphone.

Further, the porous structure 1167 may include a fixing layer and a porous body layer connected with the fixing layer, the porous structure 1167 is connected with the surrounding edge 116 through the fixing layer, and the porous structure 1167 realizes flow communication between the cavity 400 and the exterior of the core module 11 through the porous body layer. The porosity of the porous main body layer may be greater than or equal to 60%, for example, the porous body layer includes a sponge or a foam.

In some embodiments, the fixing layer of the porous structure 1167 may be detachably connected with the surrounding edge 116, and a connection manner between the fixing layer and the surrounding edge 116 includes any one of a magnetic suction, a buckle, or a bonding connection. The bonding connection may be realized by any one of a Velcro, a single-sided adhesive, and a double-sided adhesive.

In some embodiments, the fixing layer of the porous structure 1167 may be a cured glue, i.e., the porous structure 1167 is fixed to the surrounding edge 116 by glue. At this point, since the replacement of the porous structure 1167 is inconvenient, to prolong the service life of the porous structure 1167, the porous structure 1167 may include a protective layer covering the porous body layer of the porous structure 1167, and the porous structure 1167 contacts the skin of the user through the protective layer. The protective layer may include a textile or a steel mesh.

Similarly, there is a target frequency range with an interval length of at least 1/3 octave within a frequency range of 500 Hz to 4 kHz. Based on this, within the target frequency range, the sound leakage generated by the headphone 10 in the wearing state when the core module 11 has the porous structure 1167 is weaker than the sound leakage generated by the headphone 10 in the wearing state when the core module 11 does not have the porous structure 1167. The target frequency range is within a range of 1 kHz to 2 kHz. It should be noted that the core module 11 not having the porous structure 1167 may refer to removing the porous structure 1167 from the surrounding edge 116. For example, when the porous structure 1167 is detachably connected with the surrounding edge 116, the porous structure 1167 may be detached, and when the porous structure 1167 is fixed to the surrounding edge 116 by glue, the porous structure 1167 may be scraped off with a knife.

It should be noted that in embodiments in which the surrounding edge 116 is provided with the at least one groove 1165, the at least one protrusion 1166, and the porous structure 1167, the surrounding edge 116 may also be provided with the one or more communicating holes 1161 for realizing flow communication between the cavity 400 and the exterior of the core module 11 such that the cavity 400 is further in flow communication with the exterior of the core module 11 through the one or more communicating holes 1161 in the wearing state. The count of the one or more communicating holes 1161 may exceed 1, and the opening ratio of the one or more communicating holes 1161 on the surrounding edge 116 may be greater than or equal to 30%.

Figure 4:
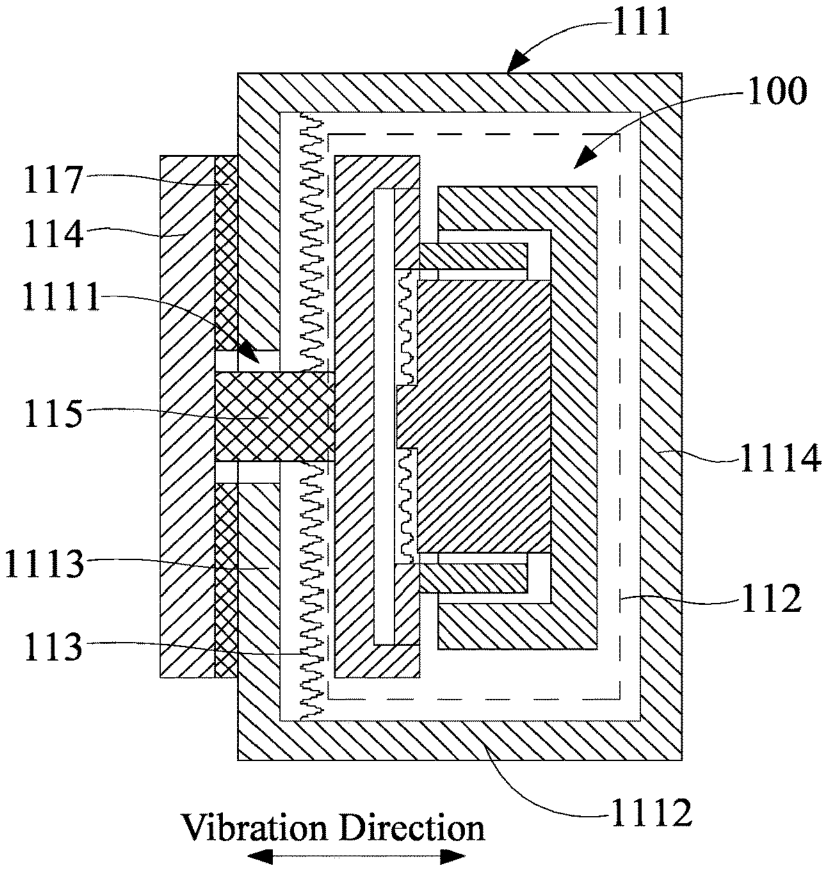
FIG. 4 is a schematic diagram illustrating an exemplary headphone according to some embodiments of the present disclosure.

In conjunction with FIG. 4, a spacer 117 may also be provided between the vibration panel 114 and the first end wall 1113, and a Rockwell hardness of the spacer 117 is less than the Rockwell hardness of the first vibration plate 113. In other words, the spacer 117 may also be referred to as a soft spacer relative to the first vibration plate 113. In this way, the mechanical vibration generated by the transducer device 112 is prevented from propagating to the core housing 111 through the spacer 117, thereby further reducing the sound leakage of the headphone 10. The spacer 117 may have an adhesive property, such as foam adhesive, such that the spacer 117 may connect the vibration panel 114 and the first end wall 1113 to prevent the vibration panel 114 from falling off.

It should be noted that the inventor of the present disclosure has found in their long-term research that the surrounding edge 116 provided in the core module 11 is conducive to shifting the sound leakage to a middle and high frequency band. The spacer 117 provided in the core module 11 is conducive to shifting the sound leakage to the middle and low frequency band, both of which are conducive to improving the sound leakage. Further, in the present disclosure, the frequency range corresponding to the low-frequency band may be within a range of 20 Hz to 150 Hz, the frequency range corresponding to the middle frequency band may be within a range of 150 Hz to 5 kHz, and the frequency range corresponding to the high-frequency band may be within a range of 5 kHz to 20 kHz, wherein the frequency range corresponding to the middle and low frequency band may be within a range of 150 Hz to 500 Hz, and the frequency range corresponding to the middle and high frequency band may be within a range of 500 Hz to 5 kHz.

Figure 5:
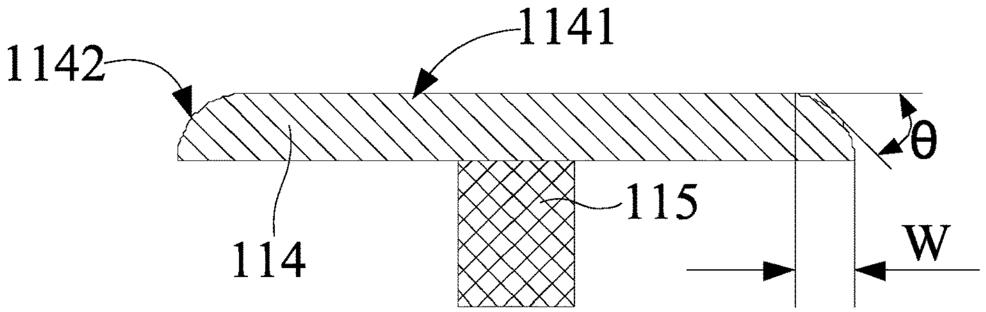
FIG. 5 is a schematic diagram illustrating an exemplary vibration panel according to some embodiments of the present disclosure.
Figure 6:
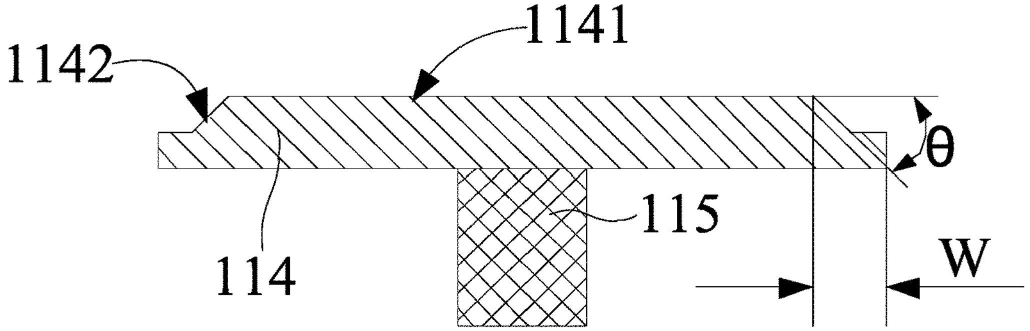
FIG. 6 is a schematic diagram illustrating an exemplary vibration panel according to some embodiments of the present disclosure.
Figure 7:
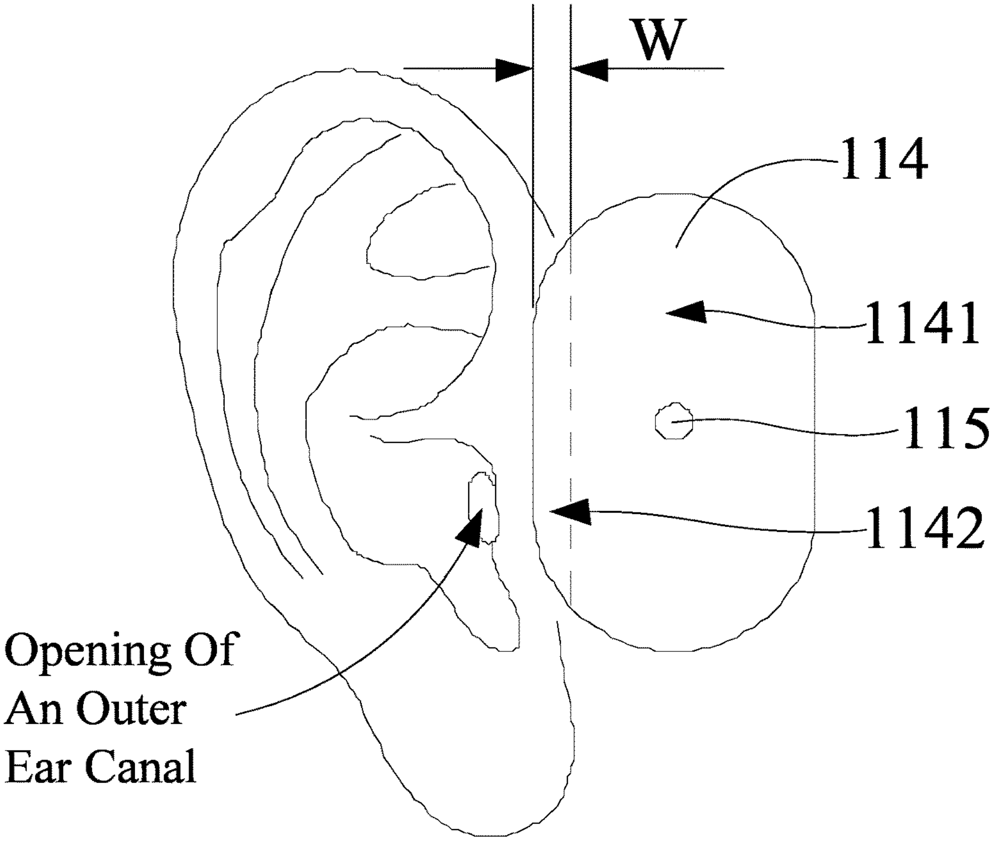
FIG. 7 is a schematic diagram illustrating an exemplary vibration panel according to some embodiments of the present disclosure.

In conjunction with FIG. 5 to FIG. 7, a side of the vibration panel 114 away from the transducer device 112 may include a skin contacting region 1141 for contacting the skin of the user and an air-conduction enhancement region 1142, at least a portion of the air-conduction enhancement region 1142 does not contact the skin of the user, and the vibration panel 114 may cause the air outside the headphone 10 to vibrate to form the sound wave through the air-conduction enhancement region 1142. In other words, the core module 11 generates both the bone-conduction sound and an air-conduction sound through the vibration panel 114, and the bone-conduction sound and the air-conduction sound are in the same phase to allow the air-conduction sound to enhance the bone-conduction sound, thereby improving the sound quality of the headphone 10. At least a portion of the air-conduction enhancement region 1142 may be inclined relative to the skin-contacting region 1141 and extend towards the transducer device 112, and an inclination angle (e.g., as shown by θ in FIG. 5 and FIG. 6) of the air-conduction enhancement region 1142 relative to the skin-contacting region 1141 may be between 0 and 75°, and preferably between 0 and 60°; and/or, a width (e.g., shown as W in FIG. 5 to FIG. 7) of an orthographic projection of the air-conduction enhancement region 1142 along the vibration direction of the transducer device 112 may be greater than or equal to 1 mm, preferably greater than or equal to 2 mm. In such cases, a size of the air-conduction enhancement region 1142 is increased, thereby increasing an enhancement effect of the air-conduction sound on the bone-conduction sound. Further, the air conduction enhancement region 1142 may be configured as an arcuate surface (e.g., shown in FIG. 5) or as a flat surface (e.g., shown in FIG. 6).

In some embodiments, such as FIG. 5, the air-conduction enhancement region 1142 as a whole may be inclined relative to the skin contacting region 1141 and extend towards the transducer device 112.

In some other embodiments, such as FIG. 6, at least a portion of the air-conduction enhancement region 1142 may be inclined relative to the skin contacting region 1141 (i.e., θ≠0) and extend towards the transducer device 112, and another portion of the air-conduction enhancement region 1142 is provided at intervals from the skin contacting region 1141 along the vibration direction of the transducer device 112 such as being parallel to the skin contacting region 1141 (i.e., θ=0). Further, in conjunction with FIG. 27, when the core housing 111 is provided with the surrounding edge 116, viewed along the vibration direction of the transducer device 112, the surrounding edge 116 may partially overlap the air-conduction enhancement region 1142 and be staggered from the skin contacting region 1141 to allow the surrounding edge 116 to stop the vibration panel 114 along the vibration direction of the transducer device 112.

In other alternative embodiments, such as FIG. 7, in the wearing state, at least a portion of the air-conduction enhancement region 1142 is directed to an opening of the outer ear canal of the ear of the user to allow the sound wave generated by the vibration panel 114 to be directed to the opening of the outer ear canal, thereby increasing the enhancement effect of the air-conduction sound on the bone-conduction sound. For example, the vibration panel 114 has the long axis direction and the short axis direction, the long axis direction and the short axis direction are perpendicular to the vibration direction of the transducer device 112 and orthogonal to each other, and the vibration panel 114 has a dimension in the long axis direction that is larger than a dimension of the vibration panel 114 in the short axis direction, e.g., viewed along the vibration direction, the vibration panel 114 has an ellipse shape or a rounded rectangle or a runway shape. In the wearing state, the long axis direction is directed to the top of the head of the user, and the short axis direction is directed to the opening of the outer ear canal of the ear of the user. The core module 11 as a whole may be close to the outer ear canal in the wearing state, so that the core module 11 may better cause the air in the outer ear canal to vibrate (i.e., the air-conduction sound) when transmitting the mechanical vibration generated by the transducer device 112 through bone-conduction, thereby increasing a volume of the sound heard by the user.

Figure 8:
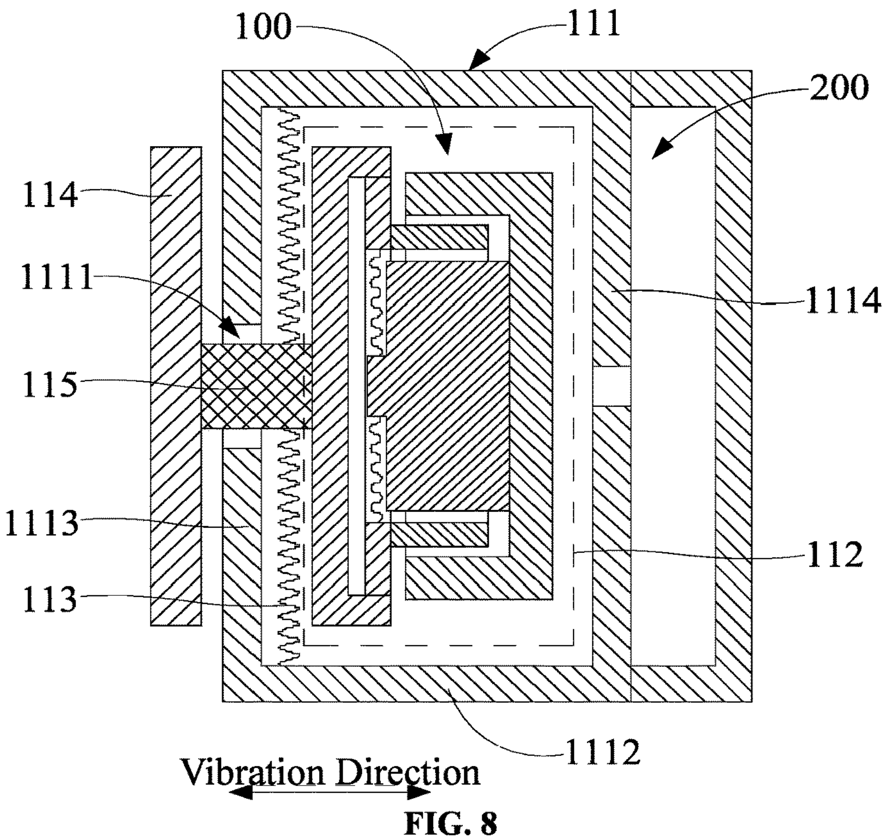
FIG. 8 is a schematic diagram illustrating an exemplary headphone according to some embodiments of the present disclosure.
Figure 10:
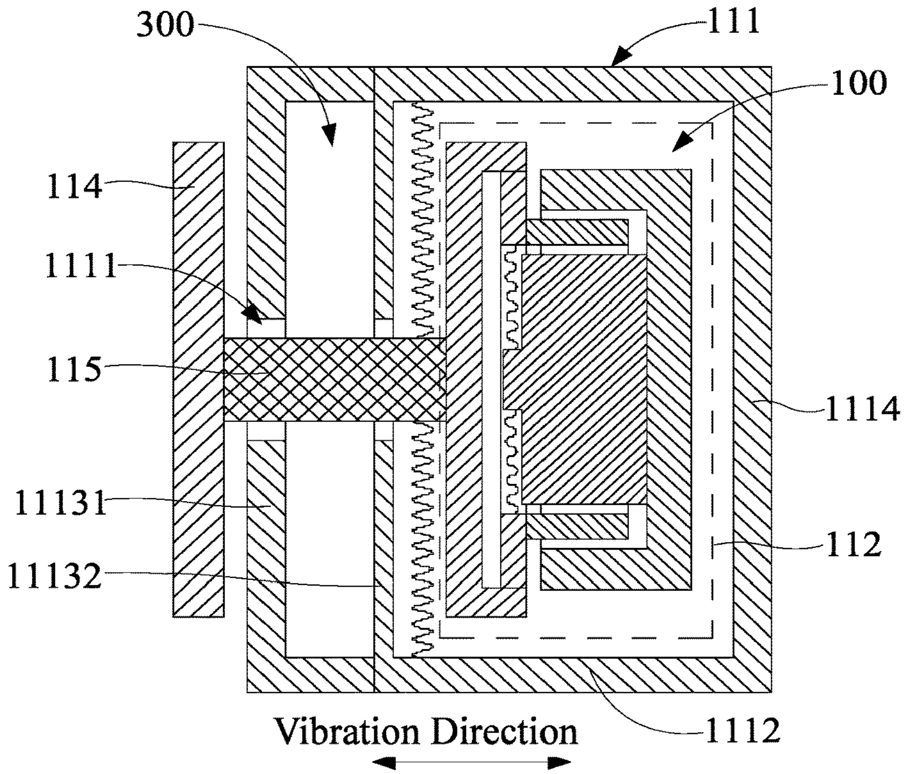
FIG. 10 is a schematic diagram illustrating an exemplary headphone according to some embodiments of the present disclosure.

In conjunction with FIG. 8 to FIG. 10, the core module 11 may be provided with an acoustic cavity in flow communication with the accommodating cavity 100, the acoustic cavity is configured to absorb an acoustic energy of the sound wave generated by vibrations of the air in the accommodating cavity 100 vibrating with the transducer device 112. The sound wave may be output to the exterior of the headphone 10 through the mounting hole 1111 to form the air-conduction sound.

In some embodiments, such as FIG. 8, a frequency response curve of the sound wave has a resonant peak, and the acoustic cavity may be the Helmholtz resonance cavity 200 to attenuate an intensity (which may specifically be a peak resonance intensity) of the resonant peak, i.e., to suppress a sudden increase of the peak resonance intensity, thereby balance the sound quality of the headphone 10. The peak resonance frequency of the resonant peak may be within a range of 500 Hz to 4 kHz, preferably within a range of 1 kHz to 2 kHz. For example, the Helmholtz resonance cavity 200 may be provided on the core housing 111, such as on a side of the second end wall 1114 away from the transducer device 112; and/or, the Helmholtz resonance cavity 200 may be provided on the transducer device 112 (e.g., the magnetic circuit system thereof). Obviously, in some other embodiments in which a certain frequency point or a certain frequency band is highlighted, the Helmholtz resonance cavity 200 may be configured to attenuate a vibration intensity of the frequency response curve of the air-conduction sound in a preset frequency band, wherein the preset frequency band may not encompass the resonant peak. A difference between the peak resonance intensity of the resonant peak when the opening for realizing the flow communication between the Helmholtz resonance cavity and the accommodating cavity is in the open state and the peak resonance intensity of the resonant peak when the opening for realizing flow communication between the Helmholtz resonance cavity and the accommodating cavity is in the closed state is greater than or equal to 3 dB, and a corresponding frequency response curve may be obtained under a condition of an excitation voltage of 1 V.

In some other embodiments, such as FIG. 9 and FIG. 10, the acoustic cavity may be an audio filter 300, and a cut-off frequency of the audio filter 300 may be less than or equal to 5 kHz, preferably less than or equal to 4 kHz to attenuate acoustic energy in bands with frequencies greater than the cut-off frequency. For example, in conjunction with FIG. 9, the audio filter 300 may be located on a side of the transducer device 112 away from the vibration panel 114, i.e., a rear audio filter. In conjunction with FIG. 10, the audio filter 300 may be located on a side of the transducer device 112 facing the vibration panel 114, i.e., a front audio filter. For example, a first end wall 1113 may include a first sub-end wall 11131 and a second sub-end wall 11132 provided at intervals along the vibration direction of the transducer device 112, the mounting hole 1111 passes through the first sub-end wall 11131 and the second sub-end wall 11132 along the vibration direction of the transducer device 112, and the first sub-end wall 11131, the second sub-end wall 11132, and the inner cylinder wall 1112 cooperate to form the audio filter 300. A gap between the first sub-end wall 11131 and the second sub-end wall 11132 along the vibration direction of the transducer device 112 may be between 0.5 mm and 5 mm, preferably between 1 mm and 3 mm.

Figure 11:
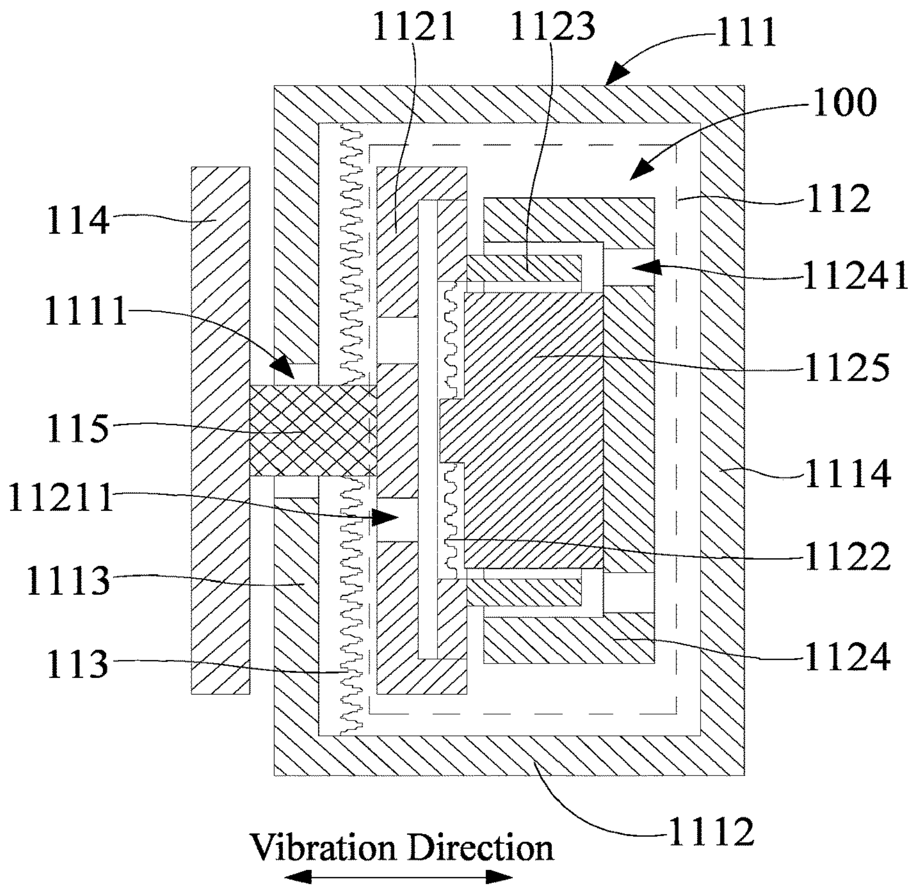
FIG. 11 is a schematic diagram illustrating an exemplary headphone according to some embodiments of the present disclosure.

In connection with FIG. 11, the transducer device 112 may include a frame 1121, a second vibration plate 1122, a magnetic circuit system, and a coil 1123. The frame 1121 is connected with the core housing 111 through the first vibration plate 113, the second vibration plate 1122 connects the frame 1121 with the magnetic circuit system to suspend the magnetic circuit system within the accommodating cavity 100, and the coil 1123 is connected with the frame 1121 and extends into a magnetic gap of the magnetic circuit system along the vibration direction of the transducer device 112. At this point, the vibration panel 114 may be connected with the frame 1121 through the connecting member 115. For example, a peripheral region of the first vibration plate 113 may be connected with the core housing 111, and a central region of the first vibration plate 113 may be connected with the frame 1121; the peripheral region of the second vibration plate 1122 may be connected with the frame 1121, and the central region of the second vibration plate 1122 may be connected with the magnetic circuit system. Obviously, in some other embodiments, the peripheral region of the second vibration plate 1122 may be connected with the magnetic circuit system, and the central region of the second vibration plate 1122 may be connected with the frame 1121. At this time, the magnetic circuit system may be connected with the peripheral region of the second vibration plate 1122 through a cylinder connecting member. The magnetic circuit system may include a magnetic guide cover 1124 and at least one magnet 1125 connected with a bottom of the magnetic guide cover 1124, and a count of the at least one magnet 1125 may be one or at least two; the magnet 1125 may be connected with the central region of the second vibration plate 1122 and provided at intervals from the magnetic guide cover 1124 along the direction perpendicular to the vibration direction of the transducer device 112 to form a magnetic gap, and the coil 1123 extends between the magnet 1125 and the magnetic guide cover 1124. It should be noted that in some embodiments in which the magnetic guide 1124 is provided with a ring magnet surrounding the magnet 1125 on an inner side of the magnetic guide 1124, although the magnetic gap is specifically formed between the ring magnet and the magnet 1125, the magnetic gap is still located between the magnetic guide cover 1124 and the magnet 1125, and thus the magnetic gap is still be regarded as being formed by the magnet 1125 and the magnetic guide 1124 providing at intervals along the direction perpendicular to the vibration direction of the transducer device 112.

Figure 27:
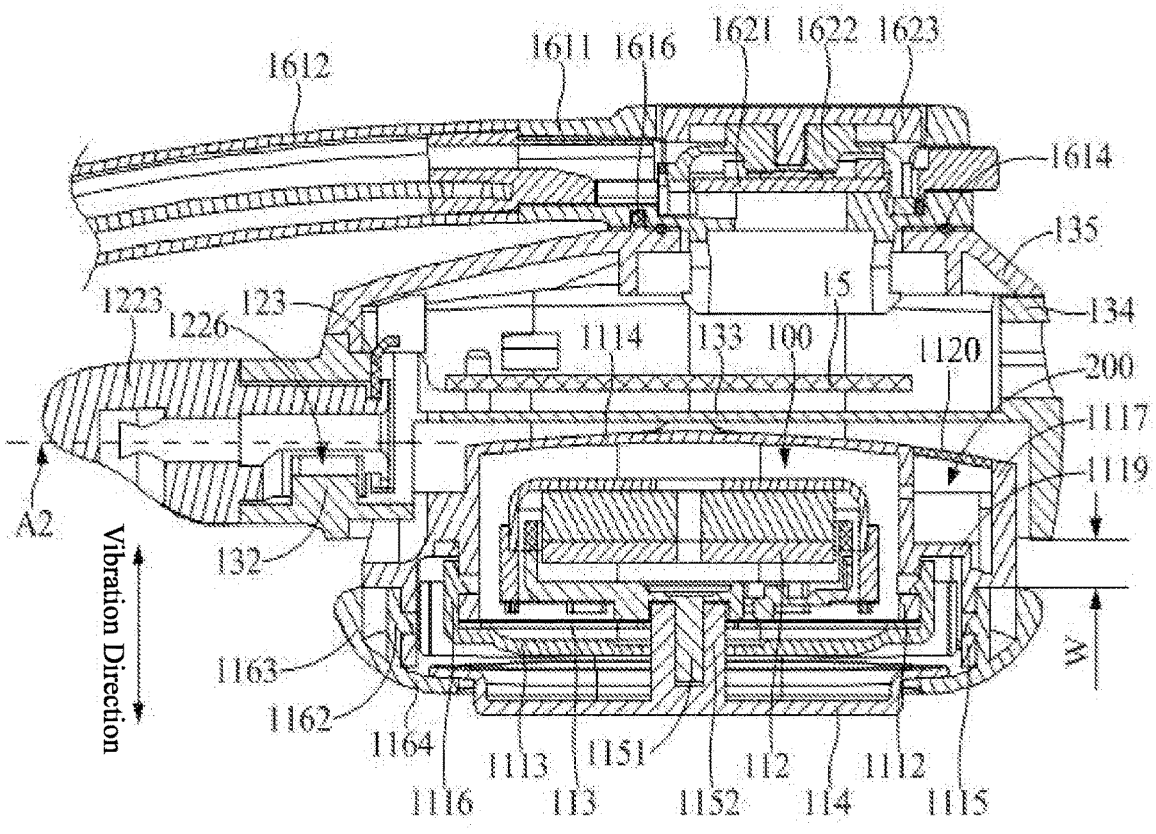
FIG. 27 is a schematic diagram illustrating a cross-sectional structure according to some embodiments of the headphone of FIG. 12.
Figure 28:
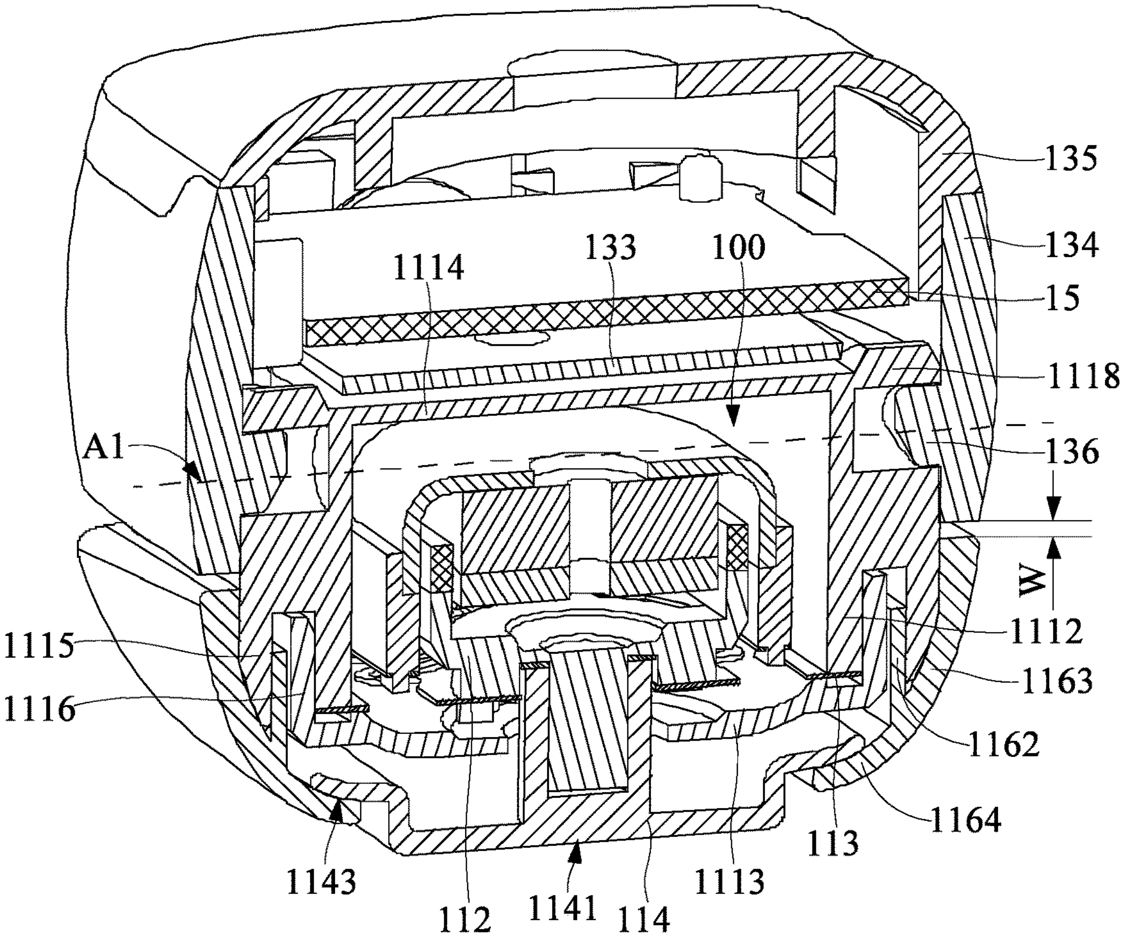
FIG. 28 is a schematic diagram illustrating a cross-sectional structure of a headphone in another view of FIG. 27.

In some embodiments, in conjunction with FIG. 27 and FIG. 28, the central region of the first vibration plate 113 may be nested on the frame 1121, and the peripheral region of the first vibration plate 113 may be pressed against the inner cylinder wall 1112 by the first end wall 1113. The central region of the second vibration plate 1122 may be nested on the frame 1121 and disposed farther away from the vibration panel 114 relative to the first vibration plate 113, and the peripheral region of the second vibration plate 1122 may be fixed to the cylinder connecting member. A sidewall of the magnetic guide cover 1124 of the magnetic circuit system may be connected with the cylinder connecting member to allow the magnetic circuit system to be connected with the frame 1121 through the second vibration plate 1122. The coil 1123 is connected with a side of the frame 1121 away from the first vibration plate 113 and the second vibration plate 1122, and extends into the magnetic gap between the magnet guide cover 1124 and the magnet 1125. At this time, since the sidewall of the magnetic guide cover 1124 is connected with the second vibration plate 1122 through the cylinder connecting member, a cavity is formed inside the transducer device 112, and without other structural improvements, the cavity may be in flow communication with the accommodating cavity 100 merely through a hollowed-out region on the second vibration plate 1122 such that in a more serious acoustic cavity effect may be generated during the vibration of the transducer device 112, thereby causing a large sound leakage.

In some embodiments, in conjunction with FIG. 46 and FIG. 11, the frame 1121 may be connected with the core housing 111 through the first vibration plate 113, the second vibration plate 1122 may be connected with the first vibration plate 113 through the frame 1121, the magnetic circuit system may be connected with the central region of the second vibration plate 1122 to suspend the magnetic circuit system within the accommodating cavity, and the coil 1123 extends into the magnetic gap of the magnetic circuit system along the vibration direction the transducer device 112. The magnetic gap surrounds a position where the magnetic circuit system is connected with the second vibration plate 1122. In this way, the magnetic circuit system is connected with the central region of the second vibration plate 1122, which makes it unnecessary for the magnetic circuit system to be provided with the cylinder connecting member connected with the peripheral region of the second vibration plate 1122, i.e., the cylinder connecting member is eliminated to allow a larger communication area between the inside and the outside of the transducer device 112, which facilitates a suppression of the acoustic cavity effect, thereby improving the sound leakage of the headphone 10. For example, the magnet 1125 of the magnetic circuit system is connected with the central region of the second vibration plate 1122, and the sidewall of the magnetic guide cover 1124 are able to be provided at intervals from the second vibration plate 1122 along the vibration direction of the transducer device 112 to form a channel for realizing flow communication between the magnetic gap and the outside of the magnetic circuit system, thereby increasing the communication area between the inside and the outside of the transducer device 112.

Figure 47:
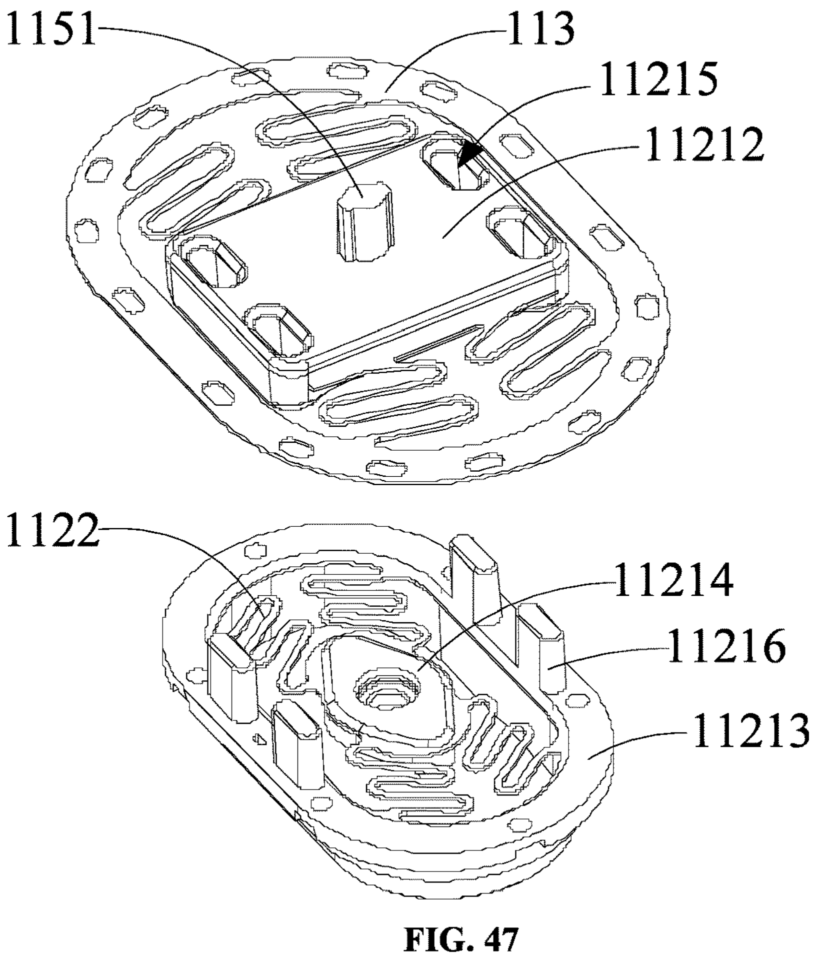
FIG. 47 is a schematic diagram illustrating an exemplary frame in FIG. 46 according to some embodiments of the present disclosure.

For example, in conjunction with FIG. 47 and FIG. 46, the frame 1121 may include a first frame 11212 and a second frame 11213, the first frame 11212 may be connected with the central region of the first vibration plate 113, and the second frame 11213 may be connected to the peripheral region of the second vibration plate 1122. Correspondingly, the second frame 11213 and the vibration panel 114 may be respectively connected with the first frame 11212, and the coil 1123 may be connected with the second frame 11213. At this time, since a position where the coil 1123 is connected with the second frame 11213 corresponds to the peripheral region of the second vibration plate 1122, the magnetic gap is enabled to surround the central region where the magnetic circuit system is connected with the second vibration plate 1122. The first frame 11212 and the first vibration plate 113 may be integrally molded by a metal insert injection molding technique, and the second frame 11213 and the second vibration plate 1122 may be integrally molded by the metal insert injection molding technique. Correspondingly, one of the first frame 11212 and the second frame 11213 is provided with a connecting jack, and another one of the first frame 11212 and the second frame 11213 is provided with a connecting pin embedded in the connecting jack, and the connecting pin extends into the connecting jack such that the first frame 11212 is connected with the second frame 11213. The present embodiment is illustrated, for example, the first frame 11212 and the second frame 11213 are provided with a connecting jack 11215 and a connecting jack 11216, respectively.

Further, the transducer device 112 may include a suspending frame 11214, the suspending frame 11214 is connected with the central region of the second vibration plate 1122, the second frame 11213 is located at a periphery of the suspending frame 11214 and provided at intervals from the suspending frame 11214 along the direction perpendicular to the vibration direction of the transducer device 112, and the magnet 1125 of the magnetic circuit system may be connected with the suspending frame 11214. In this way, the magnetic gap between the magnetic guide cover 1124 and the magnet 1125 surrounds the central region where the magnet 1125 is connected with the second vibration plate 1122.

Further, the magnet 1125 may be a permanent magnet or may include a first magnetic member 11251, a magnetic guide member 11252, and a second magnetic member 11253 provided in layers along the vibration direction of the transducer device 112, the second magnetic member 11253 is closer to the second vibration plate 1122 than the first magnetic member 11251. For example, the first magnetic member 11251 is connected with the bottom of the magnetic guide cover 1124. The first magnetic member 11251 and the second magnetic member 11253 have different magnetization directions, such as the magnetization directions of the two are opposite to each other. Further, the sidewall of the magnetic guide cover 1124 may at least overlap with the magnetic guide member 11252 when projected orthogonally to a peripheral surface of the magnet 1125 along the direction perpendicular to the vibration direction of the transducer device 112 to allow the magnetic field formed by the magnet 1125 to be more concentrated within the magnetic gap, thereby reducing the sound leakage. In some embodiments, the coil 1123 may overlap at least the magnetic guide member 11252 when projected orthogonally to the outer peripheral surface of the magnet 1125 along the direction perpendicular to the vibration direction of the transducer device 112 to allow more of the magnetic field formed by the magnet 1125 to pass through the coil 1123, thereby increasing a utilization rate of the magnetic field.

Further, the magnetic guide cover 1124 may be provided with at least one connecting hole 11241. The magnetic gap is in flow communication with an external space of the magnetic circuit system to increase the communication area between the inside and the outside of the transducer device 112, thereby weakening the acoustic cavity effect. The frame 1121 may also be provided with a communicating hole 11211 extending along the vibration direction of the transducer device 112, and the cylinder connecting member may also be provided with a through hole extending along the direction perpendicular to the vibration direction of the transducer device 112, which further increases the communication area between the inside and the outside of the transducer device 112, thereby weakening the acoustic cavity effect. In the process of the generation of the mechanical vibration of the transducer device 112, the air on both sides of the transducer device 112 along the vibration direction may be compressed or stretched, i.e., positive and negative sound pressure may be generated, and the communicating hole may make the air on both sides of the transducer device 112 in flow communication and thereby canceling each other out.

In some embodiments, in the non-wearing state, the frequency response curve of vibration of the vibration panel 114 has a resonant valley, a first resonant peak, and a second resonant peak in a frequency range within a range of 80 Hz to 2 kHz, and the peak frequencies of the resonant valley, the first resonant peak, and the second resonant peak are respectively defined as f0, f1, and f2 and satisfy a relationship: $f0<f1<f2$, wherein 80 Hz≤f0≤400 Hz, 80 Hz≤f1≤400 Hz, and 100 Hz≤f2≤2 kHz.

In some embodiments, the frequency response curve of vibration of the vibration panel 114 in the non-wearing state has merely one resonant peak in a frequency band within a range of 80 Hz to 2 kHz. The peak frequency of the resonant peak is within a range of 100 Hz to 2 kHz.

In some embodiments, in the non-wearing state, the frequency response curve of the vibration panel 114 has a first resonant peak and a second resonant peak in a frequency band and has no resonant valley within a range of 80 Hz to 2 kHz. The first resonant peak has a peak frequency within a range of 80 Hz to 400 Hz, and the second resonant peak has a peak frequency within a range of 100 Hz to 2 kHz.

In some embodiments, in the non-wearing state, the frequency response curve of the vibration of the vibration panel 114 has a resonant valley, a first resonant peak, and a second resonant peak in the frequency band within a range of 80 Hz to 200 Hz, and the peak frequencies of the resonant valley, the first resonant peak, and the second resonant peak are respectively defined as f0, f1, and f2 and satisfy a relationship: $f0<f2$, $f1<f2$.

In some embodiments, the mass of the core housing 111 is greater than or equal to 1.2 g, preferably greater than or equal to 1.5 g; and/or, the stiffness of the first vibration plate 113 is less than or equal to 2500 N/m. Further, the mass of the magnetic circuit system is greater than or equal to 3 g, preferably greater than or equal to 5 g; and/or, the stiffness of the second vibration plate 1122 is greater than or equal to 3000 N/m, preferably greater than or equal to 5000 N/m.

In some embodiments, the mass of the core housing 111 is less than or equal to 0.5 g, preferably less than or equal to 0.3 g; and/or, the stiffness of the first vibration plate 113 is greater than or equal to 2000 N/m, preferably greater than or equal to 5000 N/m.

In some embodiments, in the non-wearing state, the frequency response curve of the vibration of the vibration panel 114 has a resonant peak, the resonant peak is strongly correlated with the stiffness of the frame 1121, and a peak frequency of the resonant peak is greater than or equal to 4 kHz, and preferably is greater than or equal to 5 kHz. The stiffness of the frame 1121 is greater than or equal to $10^5$ N/m, and preferably is greater than or equal to $5\times10^5$ N/m.

Figure 12:
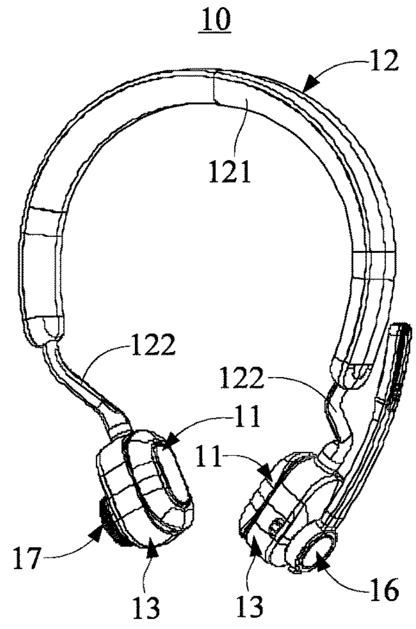
FIG. 12 is a schematic diagram illustrating an exemplary headphone according to some embodiments of the present disclosure.
Figure 13:
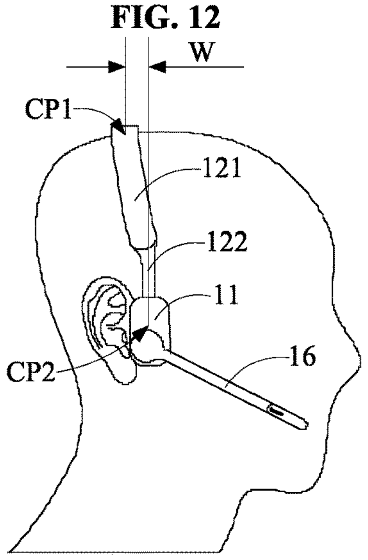
FIG. 13 is a schematic diagram illustrating an exemplary headphone according to some embodiments of the present disclosure.
Figure 14:
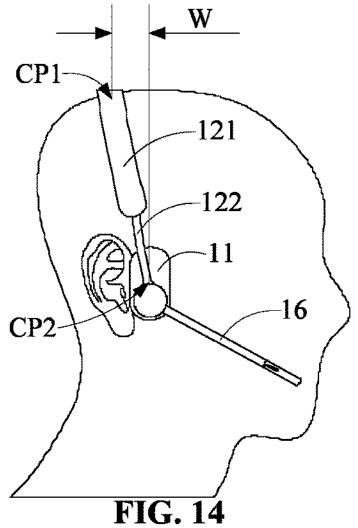
FIG. 14 is a schematic diagram illustrating an exemplary headphone in a wearing state according to some embodiments of the present disclosure.
Figure 15:
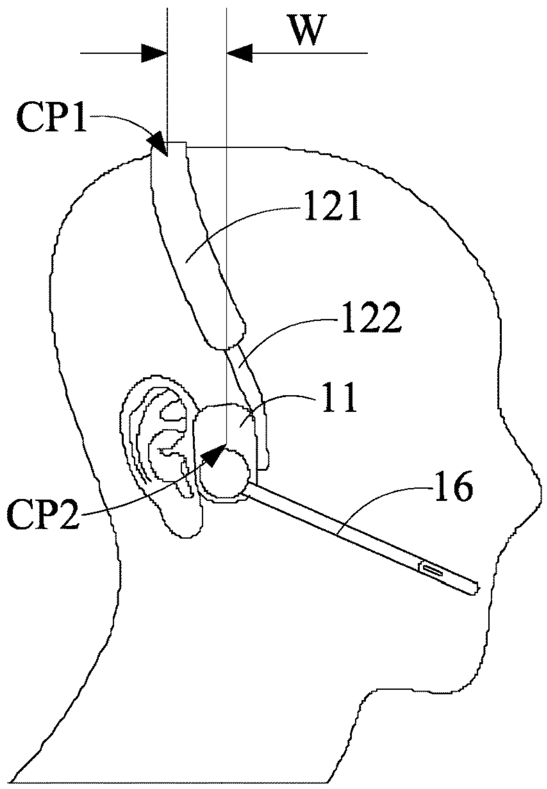
FIG. 15 is a schematic diagram illustrating an exemplary headphone in a wearing state according to some embodiments of the present disclosure.

In conjunction with FIG. 12, the headphone 10 may also include a header-beam assembly 12 connected with the core module 11, the header-beam assembly 12 is configured to wrap around the top of the head of the user and may allow the core module 11 as a whole to be disposed on a front side of the ear of the user. The core module 11 may also be disposed on the rear side of the ear of the user or other positions, or at least a portion of the core module 11 may be disposed on the front side or the rear side of the ear of the user. In some embodiments, such as FIG. 34, the core module 11 may contact the cheek of the user through the core housing 111 (specifically may be the first end wall 1113), i.e., a side of the core housing 111 away from an adapter housing 13 forms a contacting surface for contacting the skin of the user. In some other embodiments, such as FIG. 1, the core module 11 contacts the cheek of the user through the vibration panel 114. In some other embodiments, such as FIG. 3, the core module 11 contacts the cheek of the user through the vibration panel 114 and the surrounding edge 116. As another example, as shown in FIG. 45, the core module 11 contacts the cheek of the user through the vibration panel 114 and the porous structure 1167 on the surrounding edge 116.

It should be noted that in addition to the header-beam assembly 12 shown in FIG. 12, the core module 11 may be connected with other types of supporting assembly, and the supporting assembly is configured to support the core module 11 to be worn to a wearing position, which allows the user to wear the headphone 10. The supporting assembly includes a rear-hook structure and an ear-hook structure connected with both ends of the rear-hook structure respectively, the rear-hook structure is configured to wrap around the rear side of the head of the user in the wearing state, and the two ear-hook structures are respectively configured to hang on the left and right ears of the user in the wearing state. Further, the wearing position may be a position on the cheek of the user that is close to the ear or a front side of the ear of the user that is away from the f the head.

For example, in the wearing state, the header-beam assembly 12 and the top of the head of the user may form a first contacting point (e.g., shown as CP1 in FIG. 13 to FIG. 17), and the core module 11 and the cheek of the user may form a second contacting point (e.g., shown as CP2 in FIGS. 13 to 17), and a distance (e.g., shown as W in FIGS. 13 to 17) between the second contacting point and the first contacting point along a sagittal axis of the user may be between 20 mm and 30 mm, preferably between 22 mm and 28 mm. Further, the distance between the second contacting point and the first contacting point along a sagittal axis of the user is preferably 25 mm, when the distance is determined, the core module 11 may be naturally worn to the wearing position of the cheek of the user close to the ear, the core module 11 may vibrate to generate the sound wave at the wearing position, and the sound wave may be transmitted to the user in the shortest path, so that the transmission efficiency of the sound wave is higher and a sound loss is reduced. Viewed along the coronal axis of the user, the first contacting point may be located directly above the ear of the user, and the second contacting point may be located directly in front of the ear of the user. Further, the header-beam assembly 12 may include an arcuate header-beam member 121 and an adapter member 122, the arcuate header-beam member 121 is configured to wrap around the top of the head of the user, and two ends of the adapter member 122 are connected with the arcuate header-beam member 121 and the core module 11, respectively. The arcuate header-beam member 121 may be located above the ear of the user and form the first contacting point with the top of the head of the user. For example, the material of the arcuate header-beam member 121 may be plastic, and the material of the adapter member 122 may be metal. The material of the arcuate header-beam member 121 and the adapter member 122 may also be the same plastic or metal. When the core module 11 is provided to be able to move close to or away from the arcuate header-beam member 121 along an extension direction of the header-beam assembly 12, for example, when an end (which may be the first connecting section 1221 described elsewhere in the present disclosure) of the adapter member 122 away from the core module 11 is able to extend from or retract into the arcuate header-beam member 121, a portion of the arcuate header-beam member 121 cooperating with the adapter member 122 may be provided as a metal member to locally enhance wear resistance of the portion of the arcuate header-beam member 121 and the adapter member 122.

It should be noted that although FIG. 13 to FIG. 17 merely illustrate the contacting point formed between the headphone 10 and the head of the user on one side, the headphone 10 is generally a left-right symmetrical structure, for example, each of two ends of the header-beam assembly 12 shown in FIG. 12 is connected with a core module 11, so that the core module 11 at the each end forms a second contacting point with the cheek of the user, i.e., the headphone 10 and the head of the user may form a first contacting point and two contacting points, which may be referred to as "three-point wearing".

Figure 16:
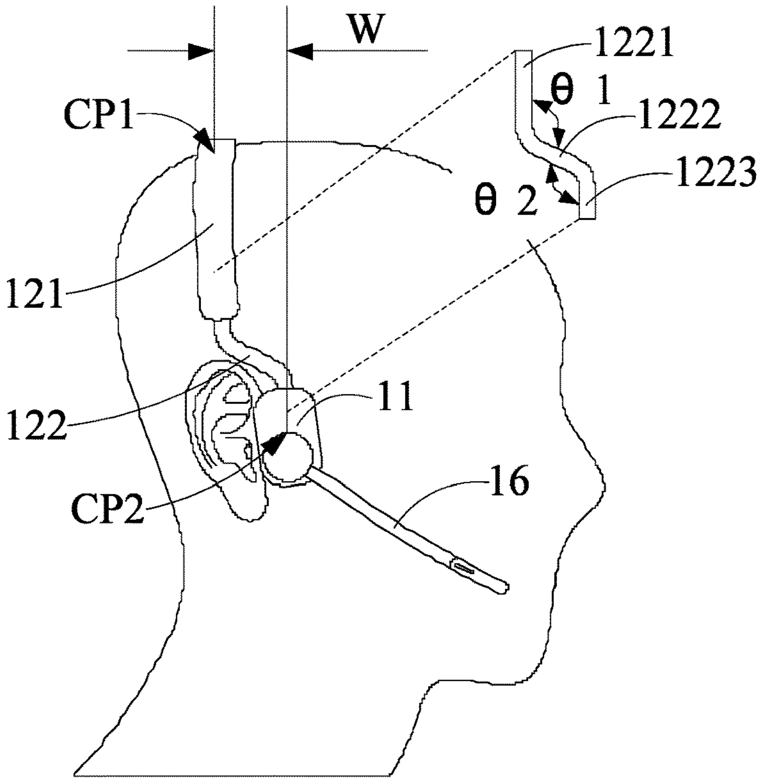
FIG. 16 is a schematic diagram illustrating an exemplary headphone in a wearing state according to some embodiments of the present disclosure.
Figure 48:
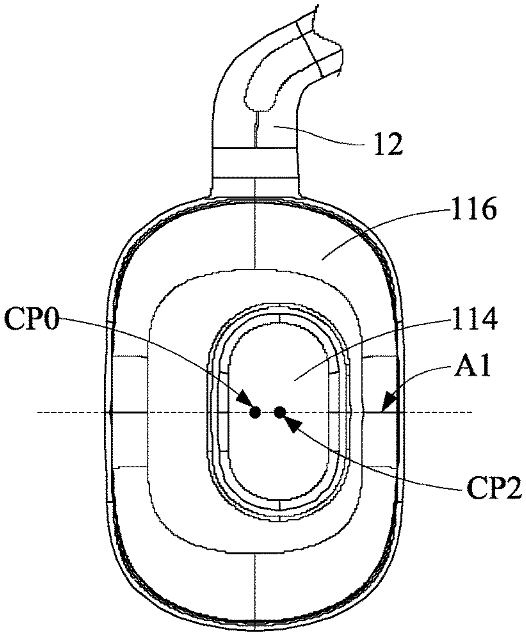
FIG. 48 is a schematic diagram illustrating an exemplary headphone facing a head of a user in FIG. 12 according to some embodiments of the present disclosure.

In conjunction with FIG. 48 and FIG. 16, in a wearing state and along a coronal axis of the user, a center (e.g., shown as CP2 in FIG. 48) of a side of the vibration panel 114 facing the wearing position is closer to an outer ear canal of the user than a center (e.g., shown as CP0 in FIG. 48) of a side of the core housing 111 facing the wearing position along a sagittal axis of the user. In other words, when structures of the supporting assembly and the core module 11 are determined, the vibration panel 114 is provided to be offset relative to the core housing 111 so that when the core module 11 vibrates to generate the sound wave at the wearing position, the sound wave may be transmitted to the central nervous system of the user in the shortest path, so that the transmission efficiency of the sound wave is higher and the sound loss is reduced. In addition, the vibration panel 114 is closer to the outer ear canal in the wearing state, so that the core module 11 may better cause the air in the outer ear canal to vibrate (i.e., the air-conduction sound) when transmitting the mechanical vibration generated by the transducer device 112 through bone-conduction, thereby increasing a sound volume heard by the user. It should be noted that in embodiments where the core module 11 includes the surrounding edge 116, the vibration panel 114 is provided to be offset relative to the surrounding edge 116, i.e., a center of a side of the vibration panel 114 facing the wearing position and a center of a side of the surrounding edge facing the side of the wearing position do not coincide.

In some embodiments, a center of the vibration panel 114 projected orthographically onto the core housing 111 along the vibration direction of the transducer device 112 coincides with a center of the transducer device 112 projected orthographically onto the core housing 111 along the vibration direction, i.e., the vibration panel 114 is not offset relative to the transducer device 112, e.g., a position where the frame 1121 connected with the vibration panel 114 is at the center of the vibration panel 114; and the center of the transducer device 112 projected orthogonally onto the core housing 111 along the vibration direction does not coincide with a center of a side of the core housing 111 facing the transducer device 112 along the vibration direction, i.e., the transducer device 112 as a whole is offset relative to the core housing 111.

In some other embodiments, the center of the transducer device 112 projected orthogonally onto the core housing 111 along the vibration direction coincides with the center of the side of the core housing 111 facing the transducer device 112 along the vibration direction, i.e., the transducer device 112 as the whole is not offset relative to the core housing 111; and the center of the vibration panel 114 projected orthogonally onto the core housing 111 along the vibration direction does not coincide with the center of the core housing 112 projected orthographically onto the core housing 111 along the vibration direction, i.e., the vibration panel 114 is offset relative to the transducer device 112, e.g., the position where the frame 1121 is connected with the vibration panel 114 is not at the center of the vibration panel 114 such that the vibration panel 114 is offset relative to the core housing 111.

Further, the headphone 10 may include an adapter housing 13 connecting the core housing 111 with a supporting assembly (e.g., the header-beam assembly 12). In conjunction with FIG. 20, FIG. 27, and FIG. 28, the adapter housing 13 may include a cylinder sidewall 134 disposed at the periphery of the core housing 111, and the cylinder sidewall 134 may be connected with the header-beam assembly 12. An orthographic projection of core housing 111 and an orthographic projection of the cylinder sidewall 134 on a reference plane perpendicular to the vibration direction of the transducer device 112 may respectively have a first center and a second center. In the wearing state, the first center may be closer to the outer ear canal of the ear of the user relative to the second center. In other words, in conjunction with FIG. 46 and FIG. 28, when structures of the supporting assembly and the core module 11 are determined, the core housing 111 is offset relative to the adapter housing 13, such that the sound wave generated by the core module 11 at the wearing position may be transmitted to the central nervous system of the user through the shortest path to improve the transmission efficiency of the sound wave and reduce the sound loss.

For example, in conjunction with FIG. 48 and FIG. 46, the core housing 111 may be configured to rotate around a first axis (e.g., shown as A1 in FIG. 48) relative to the adapter housing 13 to allow the core module 11 to better fit the wearing position. The first center and second center are provided at intervals along the direction in which the first axis is located. In other words, in the direction in which the first axis is located, if a side of the core housing 111 is closer to the cylinder sidewall 134, another side of the core housing 111 may be farther away from the cylinder sidewall 134, i.e., a gap between the core housing 111 and the cylinder sidewall 134 may be unequal in the direction in which the first axis is located. Further, the first center and second center may be on the first axis, i.e., the core module 11 is shifted merely a distance along the first axis.

In some embodiments, in conjunction with FIG. 13 to FIG. 16, in the wearing state and viewed along the coronal axis of the user, at least a portion of the header-beam assembly 12 is inclined relative to the vertical axis of the user, such as extends obliquely toward the front of the user, to facilitate the formation of the first contacting point and the second contacting point. At this point, the adapter member 122 may be provided in the form of a rod or a plate. For example, in conjunction with FIG. 13, viewed along the coronal axis of the user, the arcuate header-beam member 121 is inclined relative to the vertical axis of the user, and the adapter member 122 is parallel to the vertical axis of the user. At this point, the adapter member 122 may be connected with a side of the core module 11 facing the top of the head of the user. As another example, in conjunction with FIG. 14 and viewed along the coronal axis of the user, the arcuate header-beam member 121 is inclined relative to the vertical axis of the user, and the adapter member 122 is also inclined relative to the vertical axis of the user, and both of the arcuate header-beam member 121 and the adapter member 122 are inclined at a same angle relative to the vertical axis of the user. At this point, the adapter member 122 may be connected with a side of the core module 11 away from the cheek of the user. As another example, in conjunction with FIG. 15 and viewed along the coronal axis of the user, the arcuate header-beam member 121 is inclined relative to the vertical axis of the user, a portion of the adapter member 122 is inclined relative to the vertical axis of the user, and another portion of the adapter member 122 is parallel to the vertical axis of the user. At this point, the adapter member 122 may be connected with a side of the core module 11 away from the ear of the user. As another example, in conjunction with FIG. 16 and viewed along the coronal axis of the user, the arcuate header-beam member 121 is parallel to the vertical axis of the user, a portion of the adapter member 122 is inclined relative to the vertical axis of the user, and another portion is parallel to the vertical axis of the user. At this point, the adapter member 122 may be connected with a side of the core module 11 facing the top of the head of the user.

Figure 17:
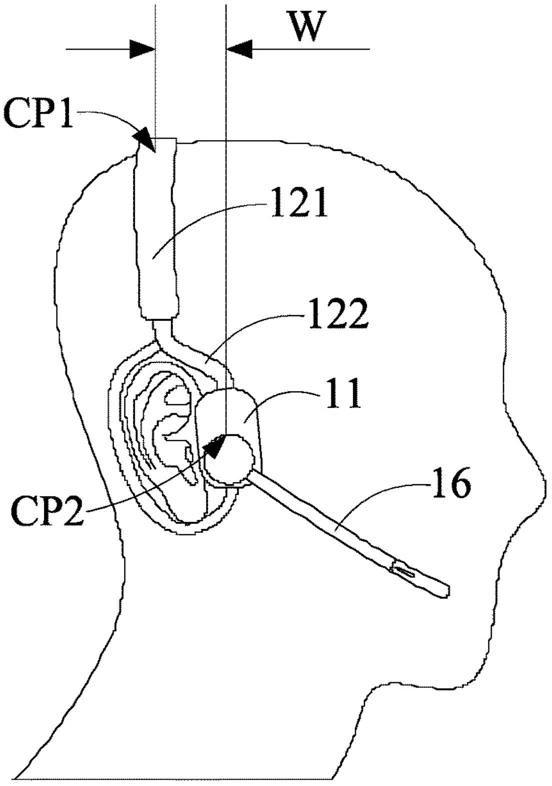
FIG. 17 is a schematic diagram illustrating an exemplary headphone in a wearing state according to some embodiments of the present disclosure.

In some other embodiments, in conjunction with FIG. 17, the adapter member 122 may be in a ring shape. At this point, in the wearing state and viewed along the coronal axis of the user, the arcuate header-beam member 121 may be parallel to the vertical axis of the human body, and the adapter member 122 may be sleeved on the periphery of the ear of the user, thereby forming a first contacting point and a second contacting point. The adapter member 122 may be in the form of a continuous closed ring or a discontinuous ring (e.g., a C-shaped ring or a U-shaped ring).

It should be noted that in fields of medicine and anatomy, three basic sections of the human body, a sagittal plane, a coronal plane, and a horizontal plane, as well as the three basic axes, the sagittal axis, the coronal axis, and the vertical axis, may be defined. The sagittal plane refers to a plane perpendicular to the ground along an anterior and posterior direction of the body, and the sagittal plane divides the body into left and right parts. The coronal plane refers to a plane perpendicular to the ground along the left and right direction of the body, and the coronal plane divides the body into front and back parts. The horizontal plane refers to a plane parallel to the ground along an up-and-down direction of the body, and the horizontal plane divides the body into up-and-down parts. Correspondingly, the sagittal axis is an axis that passes perpendicularly through the coronal plane along the anterior and posterior direction of the body, the coronal axis is the axis that passes perpendicularly through the sagittal plane along the right and left direction of the body, and the vertical axis is the axis that passes perpendicularly through the horizontal plane along the up and down direction of the body.

Figure 20:
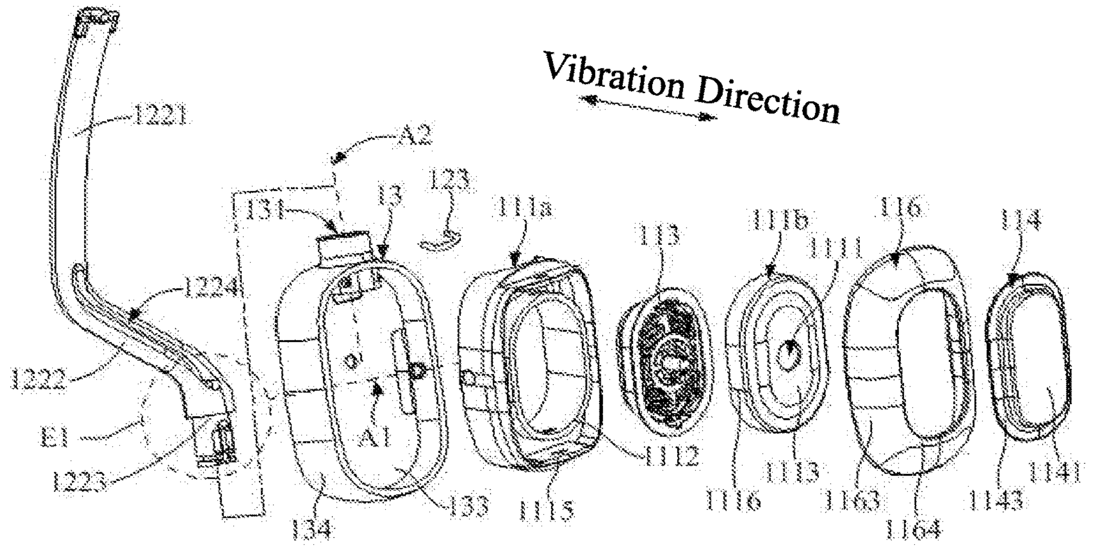
FIG. 20 is a schematic diagram illustrating a disassembled structure of a headphone as described in FIG. 12.

For example, and in conjunction with FIG. 12, FIG. 16, and FIG. 20, the adapter member 122 may include a first connecting section 1221, an intermediate transition section 1222, and a second connecting section 1223, the intermediate transition section 1222 connects the first connecting section 1221 with the second connecting section 1223. The first connecting section 1221 and the second connecting section 1223 are respectively bent relative to the intermediate transition section 1222 and extend along opposite directions. In such cases, the first connecting section 1221 may be connected with the arcuate header-beam member 121 and the second connecting section 1223 may be connected with the core module 11. Viewed along the coronal axis of the user, the intermediate transition section 1222 is inclined relative to the vertical axis of the user to facilitate a formation of the first contacting point and the second contacting point.

Further, a bending angle (e.g., shown as θ1 in FIG. 16) of the first connecting section 1221 relative to the intermediate transition section 1222 may be greater than or equal to 90° and less than 180°; and/or, a bending angle (e.g., shown as θ2 in FIG. 16) of the second connecting section 1223 relative to the intermediate transition section 1222 may be greater than or equal to 90° and less than 180°. Therefore, the adapter member 122 is enabled to more smoothly connect the arcuate header-beam member 121 and the core module 11. In the wearing state and viewed along the coronal axis of the user, the first connecting section 1221 may be parallel to the second connecting section 1223. In such cases, the spacing (e.g., shown as W in FIG. 16) between the first connecting section 1221 and the second connecting section 1223 may be between 20 mm and 30 mm, preferably between 22 mm and 28 mm.

Figure 19:
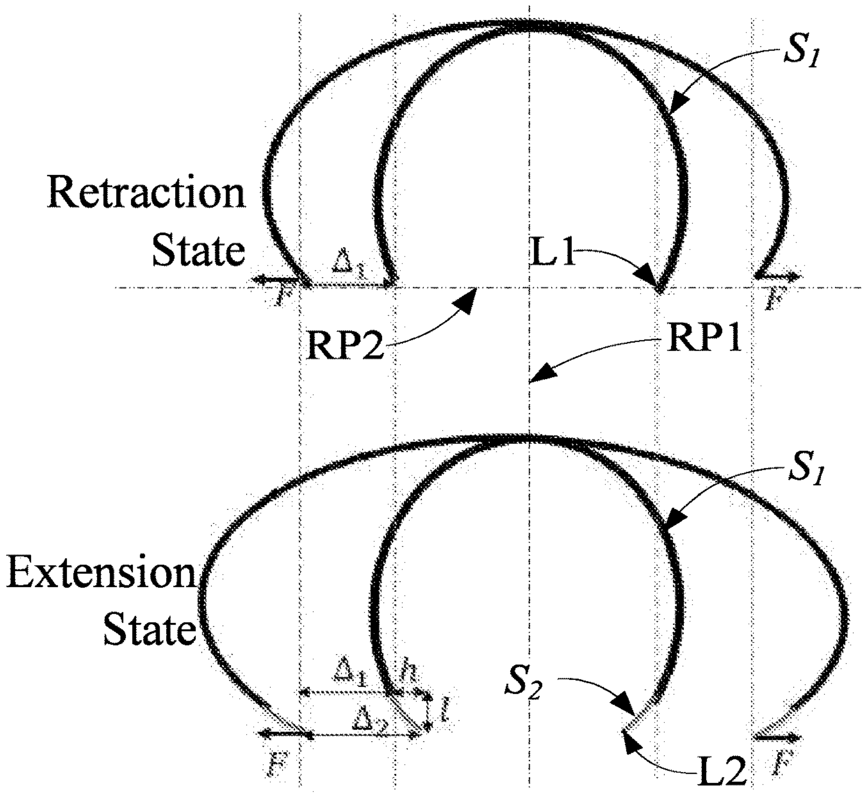
FIG. 19 is a schematic diagram illustrating a mechanical model of a header-beam assembly according to some embodiments of the present disclosure.

It should be noted that in conjunction with FIG. 19, the adapter member 122 may also have an arcuate arc in other views (e.g., viewed along the sagittal axis of the user), for example, two adapter members 122 of both ends of the arcuate header-beam member 121 may extend in the same direction close to each other such that the headphone 10 may better contact the head of the user and the header-beam assembly 12 may provide the pressing force for the core module 11.

Further, in conjunction with FIG. 20, the first connection section 1221 and the second connection section 1223 may be respectively provided with a wiring cavity, for example, both of the first connection section 1221 and the second connection section 1223 are respectively provided in the form of a hollow tube, the intermediate transition section 1222 may be provided with an opening slot 1224, and the wiring cavity of the first connection section 1221 and the wiring cavity of the second connection section 1223 may be in flow communication via the opening slot 1224, which allows wiring of the headphone 10 to be extended from the core module 11 to the arcuate header-beam member 121 through the adapter member 122. The wiring of the headphone 10 may be a wire, a flexible circuit board, etc. Correspondingly, the header-beam assembly 12 may also include a sealing member embedded in the opening slot 1224, and the sealing member covers the wiring to improve the waterproof and dustproof of the headphone 10 and improve the appearance of the headphone 10. The sealing member may include a cured adhesive or may include a cover plate. In some other embodiments, the wiring of the headphone 10 may also be exposed to the adapter member 122. Correspondingly, the adapter member 122 may be provided as a solid structure.

The inventors of the present disclosure have found in their long-term research that when the header-beam assembly 12 applies a pressing force between 0.4 N and 0.8 N to press the core module 11 against the cheek of the user, i.e., in the wearing state, the pressing force of the core module 11 against the cheek of the users may be between 0.4 N and 0.8 N, preferably between 0.5N and 0.6N, the user may obtain an excellent wearing stability and comfort as well as good sound quality. The pressing force may be measured using a clamping force tester (e.g., FL-86161A, Bowen Instruments). Specifically, during a measurement, the headphone 10 are clamped on both sides of a parallel plate of the clamping force tester and supported on a middle fork of the clamping force tester. Subsequently, the parallel plate of the clamping force tester makes two core modules 11 away from each other and has a test spacing (e.g., an average value of a width of the head of the user, e.g., 145 mm), thereby simulating a wearing state of the headphone 10. In such cases, the corresponding pressing force may be measured by reading a value displayed on the clamping force tester. For different users, the dimensions of the heads of the users are different (e.g., "big head" and "small head"). Therefore, the header-beam assembly 12 may be configured to have an adjustable arc length to meet the wearing needs of different users of the headphone 10. Further, the present disclosure desires that different users are capable of obtaining a consistent pressing force when wearing the headphone 10.

For example, the first connecting section 1221 is capable of extending from or retracting into the arcuate header-beam member 121 under the action of the external force to allow the core module 11 to move closer to or farther away from the arcuate header-beam member 121 along the extension direction of the header-beam assembly 12, thereby adjusting an arc length of the header-beam assembly 12. The second connecting section 1223 is also capable of extending from or retracting into the core module 11 under the action of the external force, which is also capable of adjusting the arc length of the header-beam assembly 12.

Further, in conjunction with FIG. 12, each of both ends of the arcuate header-beam member 121 may be provided with the adapter member 122 and the core module 11. The header-beam assembly 12 provides a first pressing force for the core module 11 in a first using state and provides a second pressing force for the core module 11 in a second using state, and the absolute value of the difference between the second pressing force and the first pressing force may be between 0 and 0.1 N, preferably between 0 and 0.05 N. When the headphone 10 is worn by different users, i.e., when the header-beam assembly 12 has different arc lengths and the two core modules 11 have different spacings, the header-beam assembly 12 makes the difference in the pressing force applied by the two core modules 11 on the cheek of the users not significant, thereby increasing adaptability of the headphone 10 to different users.

It should be noted that in the first using state, each of the two adapter members 122 at both ends of the arcuate header-beam member has a first extension relative to the arcuate header-beam member 121, and the two core modules 11 at both ends of the arcuate header-beam member have a first spacing between each other. In the second using state, the each adapter member has a second extension relative to the arcuate header-beam member and the two core modules have a second spacing between each other, the second extension is greater than the first extension, and the second spacing is greater than the first spacing. In short, the first using state may be suitable for a user with a small head to wear the headphone 10, and the second using state may be suitable for a user with a large head to wear the headphone 10. Therefore, the first extension may take a minimum value when the core module 11 is closest to the arcuate header-beam member 121, and the second extension may take a maximum value when the core module 11 is farthest away from the arcuate header-beam member 121.

The inventors of the present disclosure have found in their long-term research that parameters such as the stiffness and bending degree of the arcuate header-beam member 121 and the adapter member 122 have a certain influence on the pressing force that may be provided by the header-beam assembly 12 under the same conditions, which is hereby qualitatively analyzed.

Figure 18:
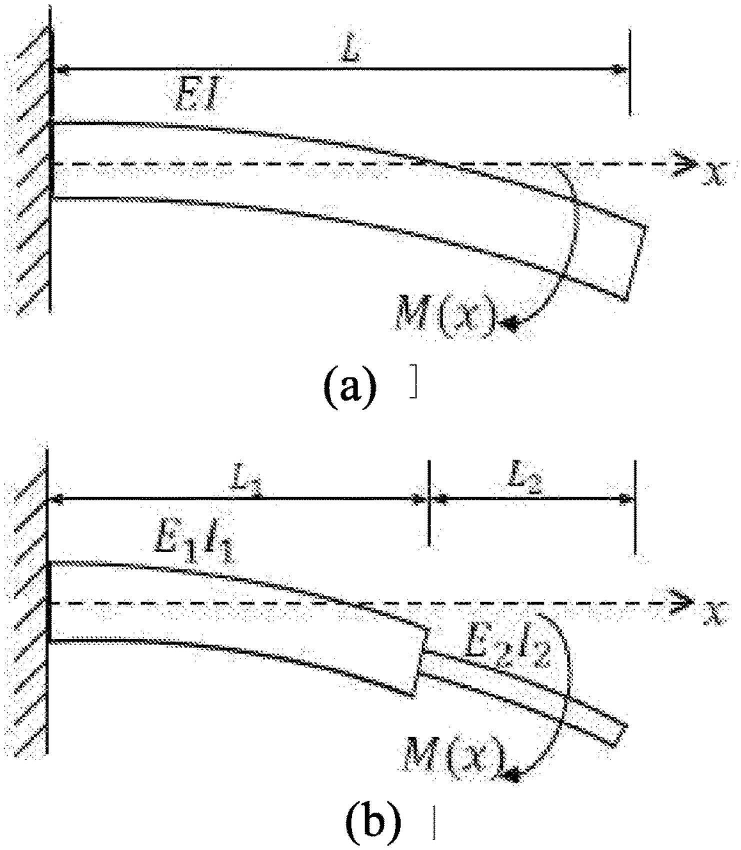
FIG. 18 is a schematic diagram illustrating a mechanical model of a bending deformation of a cantilever beam according to some embodiments of the present disclosure.

For a cantilever beam, in conjunction with FIG. 18, a cantilever beam may deform under the action of loads such as a concentrated force, a distributed load, etc., and a maximum deflection $w_{max}$ occurs at a free end of the cantilever beam.

For an equal-section cantilever beam, in conjunction with (a) in FIG. 18 and based on the mechanics of materials, a deflection at the free end satisfies the following equation (1).

$$w_{max} = \frac{1}{EI}\int\int_0^L M(x)dxdx \quad (1)$$

where EI is a section bending stiffness, M(x) is a section bending torque, E is Young's modulus of the material, and I is a section inertia torque.

For variable-section cantilever beams, combined with (b) in FIG. 18, since properties of a cross-section of the variable-section beam may change, a section-by-segment stiffness technique may be used in analyzing a displacement of the free end of the variable-section beam. A variable-section cantilever beam is regarded as composed of several equal-section cantilever beams, and when calculating the deformation, remaining cantilever beam sections may be regarded as rigid bodies except for a current cantilever beam section, and finally, the displacements and deformations under the same load condition are superimposed, which is commonly used in an outward-extending cantilever beam or a variable-section cantilever beam. Correspondingly, the deflection at the free end satisfies the following equation (2).

$$w_{max} = \frac{1}{E_1 I_1}\int\int_0^{L_1} M(x)dxdx + \frac{1}{E_2 I_2}\int\int_0^{L_2} M(x)dxdx \quad (2)$$

For the headphone shown in FIG. 12, the left side and the right side of the headphone 10 may be simplified as a symmetrical structure, and therefore one side of the headphone 10 may be taken for force analysis. In this case, the headphone 10 satisfies a torque equilibrium equation both whether in the first using state (e.g., a retracting state) or in the second using state (e.g., extended state), i.e., the following equation (3).

$$M=F\cdot L \quad (3)$$

where M is a bending torque value of the headphone 10 at a head pivot point (e.g., a first contacting point CP1), F is the pressing force provided by the header-beam assembly 12 for the core module 11 in a using state, and L is a force arm from an equivalent centralized action point (e.g., the second contacting point CP2) of the core module 11 to the head pivot point. In conjunction with FIG. 19, using a fully retracted working condition (e.g., an extension of the adapter member 122 relative to the arcuate header-beam member 121 is minimum) as a reference, and assuming that the position of the equivalent centralized action point on the core module 11 does not change due to an extension or a retraction of the header-beam assembly 12, at a fully extended working condition (e.g., the extension of the adapter member 122 relative to the arcuate header-beam member 121 is maximum), the force arm L is increased. Based on this, and in combination with the torque balance equation (2), a law of change of the bending torque M may be analyzed to obtain a law of change of the pressing force F.

In conjunction with FIG. 19, under two different working conditions, including the fully retracted working condition (e.g., the "retraction state" shown in FIG. 19) and the fully extended working condition (e.g., the "extension state" shown in FIG. 19), the headphone 10 is opened from an initial free state to a final state with a corresponding spacing (e.g., the width of the head of 145 mm). It is assumed that in a critical state, the pressing force of the headphone 10 respectively in the fully retracted working condition and the fully extended working condition is the same, i.e., whether in the retraction state or the extension state, the header-beam assembly 12 may provide a same or a similar pressing force for the core module 11.

For the fully retracted working condition, the header-beam assembly 12 may be simply regarded as an equal-section cantilever beam (i.e., an arc section $S_1$ in which the arcuate header-beam member 121 is located), and based on the deflection at the free end of the header-beam assembly 12, i.e., the equation (1), the following equation (4) is obtained by integrating along the arc section $S_1$.

$$\Delta_1 = \frac{1}{E_1 I_1}\int\int_0^{S_1} F\cdot L_1(s)dsds \quad (4)$$

where $E_1I_1$ is a cross-section anti-bending stiffness of the arc section $S_1$, and $L_1(s)$ is a force arm function of a concentrated force $L_1(s)$ on the cross-section of the arc section $S_1$.

For the fully extended condition, the beam assembly 12 may be simply regarded as a variable-section cantilever beam (i.e., the arc section $S_1$ where the arcuate header-beam member 121 is located and an arc section $S_2$ where the adapter member 122 is located), and based on the deflection at the free end of the beam, i.e., equation (2), the following equation (5) is obtained by integrating and summing respectively along the arc section $S_1$ and the arc section $L_2(s)$.

$$\Delta_2 = \frac{1}{E_1 I_1}\int\int_0^{S_1} F\cdot L_1(s)dsds + \frac{1}{E_1 I_1}\int\int_0^{S_1} F\cdot l\, dsds + \frac{1}{E_2 I_2}\int\int_0^{S_2} F\cdot L_2(s)dsds \quad (5)$$

where $E_2I_2$ is a cross-section anti-bending stiffness of the arc section $S_2$, and $L_2(s)$ is the force arm function of the concentrated force F on the cross-section of the arc section $S_2$. The first two terms at the right end of the equation are deformations of the arc section $S_1$, the third term is the deformation of the arc section $S_2$, and l is a component of the arc section $S_2$ in the vertical direction.

Further, in conjunction with FIG. 19, the two working conditions satisfy the following equation (6).

$$\Delta_2=\Delta_1+h \quad (6)$$

where h is a magnitude of the arc section $S_2$ along a horizontal direction. The relation (4) and (5) are substituted into the equation (6) and h of the critical state with the same pressing force under the two working condition is denoted as $h_{cr}$, the equation (7) is obtained.

$$h_{cr} = \frac{1}{E_1 I_1}\int\int_0^{S_1} F\cdot l\, dsds + \frac{1}{E_2 I_2}\int\int_0^{S_2} F\cdot L_2(s)dsds \quad (7)$$

Equation (7) gives a change rule of the pressing force of the headphone 10 with a same head width in the extension state or the retraction state. Correspondingly, an actual design value h of the arc section $S_2$ in the horizontal direction satisfies the following equation (8).

$$\begin{cases} \text{When } h > h_{cr}\text{, the pressing force in the extension state is greater than the pressing force in the retraction state;} \\ \text{When } h < h_{cr}\text{, the pressing force in the retraction state is greater than the pressing force in the extension state;} \end{cases}$$

According to equations (7) and (8), assuming that the cross-section anti-bending stiffness $E_1I_1$ of the arc section $S_1$ and the magnitude l of the arc section $S_2$ in the vertical direction are constant:

1) The smaller the anti-bending stiffness $E_2I_2$ of the cross-section anti-bending stiffness of the arc section $S_2$ (i.e., the larger the $h_{cr}$), the smaller the pressing force after the extension of the arc section $S_2$;

(2) The smaller the arc section $S_2$ bends inward (e.g., the smaller the h), the smaller the pressing force after the extension of the arc section $S_2$.

Based on the detailed analysis above, a quantitative description is now provided. For example, in the non-wearing state, when each core module 11 of the two core modules 11 is closest to or farthest away from the arcuate header-beam member 121, the adapter members 122 at both ends of the arcuate header-beam member 121 are symmetrically disposed relative to a first reference plane (e.g., shown as RP1 in FIG. 19), and a second reference plane (e.g., a plane in which the paper is disposed) passes through a line (e.g., shown as RP2 in FIG. 19) connecting the both ends of the arcuate header-beam member 121 and perpendicularly intersects with the first reference plane. The first reference plane may be parallel to the sagittal plane of the user and the second reference plane may be parallel to the coronal plane of the user in the wearing state. Further, in conjunction with FIG. 19, when the arcuate header-beam members 121 is in a natural state, and the arcuate header-beam member 121 and the two adapter members 122 are projected onto the second reference plane, when the core module 11 is closest to the arcuate header-beam member 121 (e.g., the "retraction state" shown in in FIG. 19), a free end (e.g., the second connection plane) of the adapter members 122 connected with the core module 11 has a first position (e.g., $L_1$ in FIG. 19), and when a the core module 11 is farthest away from the arcuate header-beam member 121 (e.g., the "extension state" shown in in FIG. 19), the free end has a second position (e.g., $L_1$ in FIG. 19). A line connecting the first position and the second position has a first projection magnitude (e.g., shown as h in FIG. 19) in a first reference direction parallel to a line connecting the two ends of the arcuate header-beam member 121 and a second projection magnitude (e.g., shown as l in FIG. 19) in a second reference direction perpendicular to the line connecting the both ends of the arcuate header-beam member 121, and a ratio of the second projection magnitude to the first projection magnitude may be greater than or equal to 2. Further, a ratio of the cross-section anti-bending stiffness of the each of the two adapter members 122 to the cross-section anti-bending stiffness of the arcuate header-beam member 121 may be less than or equal to 0.9. In other words, each adapter member of the two adapter members 122 is designed to be soft and straight, such that the pressing force in the retraction state is greater than the pressing force in the extension state when the spacing between the two core modules 11 is the same. Since the larger the head width, the greater the pressing force, it may be further realized that a clamping force when the spacing between the two core modules 11 is small and in the contraction state (that is, a "small head" user wears the headphone 10) is the same as or similar to the clamping force when the spacing of the two core modules 11 is large and in the extension state (that is, a "big head" user wears the headphone 10).

The inventor of the present disclosure has found in a long-term study that, under the same condition, a count of contacting points formed between the headphone 10 and the head of the user in the wearing state and a distribution thereof have a greater impact on the stability of wearing. For example, in a head-down state, under the influence of gravity of the headphone 10, the headphone 10 has a risk of slipping or rotating relative to the head of the user with the core module 11 as a pivot, thereby affecting the reliability of the headphone 10 in wearing.

For example, for example, as shown in FIGS. 13 to 17, in the wearing state, the header-beam assembly 12 and the top of the head of the user may form the first contacting point, and the core module 11 and the cheek of the user may form the second contacting point. When the user wears the headphone 10 according to the size of his or her head, and under the action of the pressing force provided by the header-beam assembly 12 for the core module 11, the headphone 10 may apply a pressing force directed to the head of the user at the first contacting point and the second contacting point. In the head-down state, the core module 11 generates a resistance torque under an action of friction due to contact with the cheek of the user, and the header-beam assembly 12 generates another resistance torque under the action of friction due to contact with the top of the head of the user, and a combined torque of the two resistance torques may be greater than or equal to a gravity torque of the gravity of the headphone 10 relative to the core module 11, i.e., the gravity torque of the headphone 10 is overcome in the head-down state, thereby preventing the headphone 10 from slipping or rotating relative to the head of the user with the core module 11 as the pivot.

Further, in the wearing state, in addition to the header-beam assembly 12 forming the first contacting point with the top of the head of the user and the core module forming the second contacting point with the cheek of the user, the header-beam assembly 12 may further form a third contacting point (e.g., shown as CP3 in FIG. 49) with the head of the user, and the third contacting point is disposed between the first contacting point and the second contacting point along the vertical axis of the user. When the user wears the headphone 10 according to the size of the head, and under the action of the pressing force provided by the header-beam assembly 12 for the core module 11, the headphone 10 may apply a pressing force directed to the head of the user at the first contacting point, the second contacting point, and the third contacting point. In the head-down state, the core module 11 generates a resistance torque due to contact with the cheek of the user under the action of the friction, and the header-beam assembly 12 generates another resistance torque due to contact with the top of the head of the user under the action of the friction, the header-beam assembly 12 generates another resistance torque due to contact with a position other than the top of the head of the user under the action of the friction, and a combined torque of the three resistance torques may be greater than the combined torque of the two resistance torques above, so that the headphone 10 may apply the pressing force respectively toward the head of the user at the first contacting point, the second contacting point, and the third contacting point. The combined torque of the three resistance torques may be greater than the combined torques of the two resistance torques, which is conductive to overcoming the gravity torque of the headphone 10 in the head-down state, thereby improving the reliability of the headphone 10 in wearing.

It should be noted that in connection with FIG. 12, each of the two ends of the header-beam assembly 12 may be connected with a core module 11, and each core module 11 may form the second contacting point with the cheek of the user. Correspondingly, each header-beam assembly 12 may form the third contacting point with one of the two sides of the head of the user. In other words, the headphone 10 and the head of the user may actually form one first contacting point, two second contacting points, and two third contacting points, which is referred to as "five-point wearing". For the third contacting point on one side of the head of the user, due to the long length of the header-beam assembly 12 or the differences in the head of the user due to different people, the count of the third contacting points may exceed one. Further, when the header-beam assembly 12 forms the third contacting point with the head of the user, at least a portion of the header-beam assembly 12 between the first contacting point and the two second contacting points does not contact the head of the user, that is, not all of the header-beam assembly 12 contacts the head of the user and forms a corresponding pressing force, which may facilitate maintenance of a small change in the magnitude of the pressing force at the core module 11.

Figure 49:
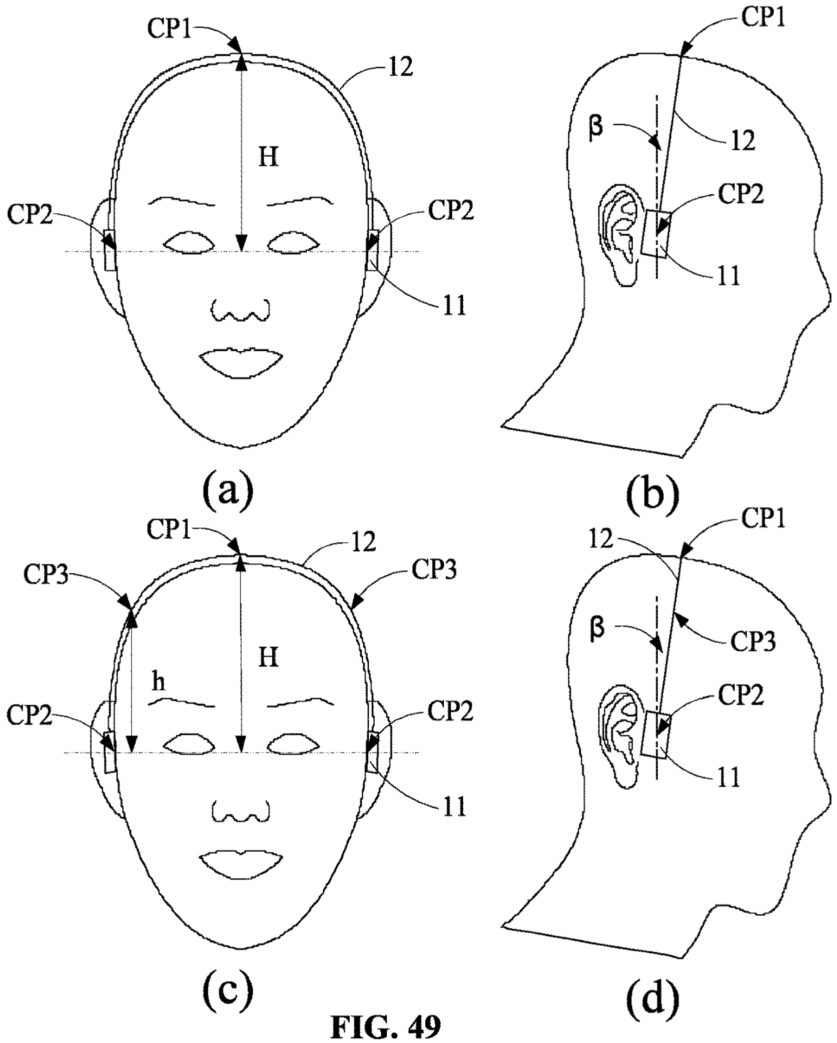
FIG. 49 is a schematic diagram illustrating mechanical models of a headphone in different wearing modes according to some embodiments of the present disclosure.

In conjunction with FIG. 49, an exemplary illustration of a force analysis of a three-point wearing and a five-point wearing described above is provided below. (a) in FIG. 49 is a schematic diagram illustrating mechanical modeling of a three-point wearing viewed along the sagittal axis of the user when the user does not lower his/her head. (b) in FIG. 49 is a schematic diagram illustrating mechanical modeling of the three-point wearing viewed along the coronal axis of the user when the user lowers his/her head. (c) in FIG. 49 is a schematic diagram illustrating mechanical modeling of a five-point wearing case viewed along the sagittal axis of the user when the user does not lower his/her head. (d) in FIG. 49 is a schematic diagram illustrating mechanical modeling of the five-point wearing viewed along the coronal axis of the user when the user lowers his/her head.

In the three-point wearing and the five-point wearing, assuming that the size of the head of the user and the wearing state of the earphone 10 are constant such that a distance H from the first contacting point to a reference line connecting the two core modules 11 is constant, the pressing force of the header-beam assembly to the head of the user is constant, and a quality G of the headphone 10 and a distance L from an equivalent center of gravity of the headphone 10 to the reference line is constant; a contacting area between a core module 11 and the cheek of the user is constant such that an equivalent force arm r is constant when the core module 11 acts on the cheek of the user; and a friction coefficient μ1 between the core module 11 and the cheek of the user and a friction coefficient μ2 between the header-beam assembly 12 and the head of the user are constant. For the five-point wearing, the distance between the third contacting point and the reference connecting line is h, $h<H$.

Assuming further that: a pressing force F2 provided by the header-beam assembly 12 remains constant in the three-point wearing and the five-point wearing, therefore, for the three-point wearing, the pressing force provided by the header-beam assembly 12 mainly acts on the second contacting point(s), making the pressing force of the core module 11 on the cheek of the user to be F2; and for the five-point wearing, the pressing force provided by the header-beam assembly 12 not merely acts on the second contacting point(s), but also acts on the third contacting point such that the pressing force of the core module 11 on the cheek of the users is less than F2. Assuming that the pressing force of the header-beam assembly 12 against the head of the user at the third contacting point is F3, the pressing force of the core module 11 against the cheek of the user is (F2−F3).

For the three-point wearing, in the head-down state, for example, when the head of the user is inclined forward by an angle β, the core module 11 generates a resistance torque under an action of the friction due to contact with the cheek of the user, and the header-beam assembly 12 generates another resistance torque under action of friction due to contact with the top of the head of the user, and a combined torque of the two resistance torques may be M1. For the five-point wearing, in the head-down state, for example, when the head of the user is also inclined forward by the angle β, the core module 11 generates a resistance torque under the action of friction due to a contact with the cheek of the user, the header-beam assembly 12 generates another resistance torque under the action of friction due to a contact with the top of the head of the user, and the header-beam assembly 12 generates yet another resistance torque under the action of friction due to contact with positions (e.g., the third contacting point) other than the top of the head of the user, a combined torque of the three resistance torques may be M2, and the combined torque M2 of the three resistance torques may be greater than the combined torque M1 of the two resistance torques, wherein the combined torque M1, the combined torque M2, and a gravity torque G·L·sin β satisfy the following equation:

$$M1 \geq G \cdot L \cdot \sin\beta$$

$$M2 \geq G \cdot L \cdot \sin\beta$$

$$M1 = \mu1 \cdot F2 \cdot r \cdot \mu2 \cdot F1 \cdot H$$

$$M2 = \mu1 \cdot (F2 - F3) \cdot r + \mu2 \cdot F3 \cdot h + \mu2 \cdot F1 \cdot H$$

$$M2 - M1 = \mu2 \cdot F3 \cdot h - \mu1 \cdot F3 \cdot r$$

where the distance h is much larger than the equivalent force arm r, and a difference between the friction coefficient μ1 and the friction coefficient μ2 is smaller than a difference between the distance h and the equivalent force arm r, i.e., h/r>μ1/μ2 or μ2·h−μ1·r>0, such that M2−M1>0. In other words, under the same conditions, the five-point wearing is more conducive to maintaining the wearing state of the headphone 10 in the head-down compared with the three-point wearing.

The inventor of the present disclosure has found in a long-term study that: for the above five-point wearing, the pressing force at the second contacting point may be between 0.2 N and 2 N, and the pressing force at the third contacting point may be between 0.3 N and 2 N such that the user may obtain good wearing stability and comfort, and the headphone 10 may have good sound quality. If the pressing force at the second contacting point is too small, the mechanical vibration transmitted from the core module 11 to the user may be less, thereby affecting the listening effect of the headphone 10. If the pressing force at the second contacting point is too large, the user may wear the headphone 10 uncomfortably. Further, if the pressing force at the third contacting point is too small, the wearing stability of the headphone 10 may not be improved. If the pressing force at the third contacting point is too large, the pressing force at the second contacting point may be insufficient.

Figure 50:
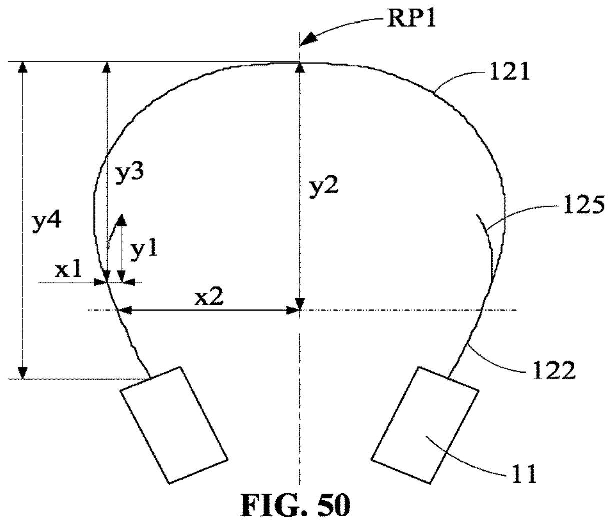
FIG. 50 is a schematic diagram illustrating an exemplary headphone according to some embodiments of the present disclosure.
Figure 51:
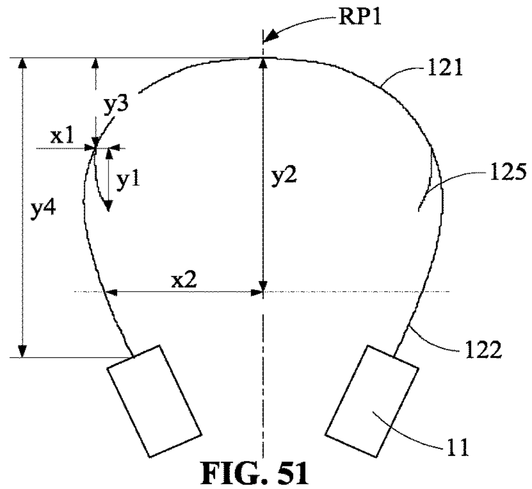
FIG. 51 is a schematic diagram illustrating an exemplary headphone according to some embodiments of the present disclosure.
Figure 52:
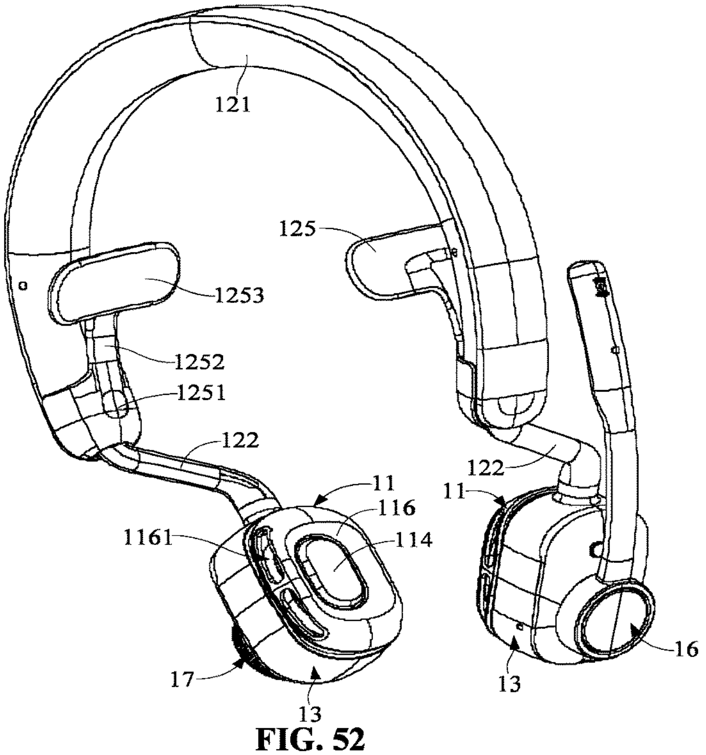
FIG. 52 is a schematic diagram illustrating an exemplary headphone according to some embodiments of the present disclosure.

In conjunction with FIGS. 50 to 52, the header-beam assembly 12 may include two auxiliary members 125 connected with the arcuate header-beam member 121. For example, the two auxiliary members 125 may be connected with an inner cover body 1214 described below such that the two auxiliary members 125 may respectively form a third contacting point with both sides of the head of the user in the wearing state. One of the two auxiliary members 125 may be connected with the arcuate header-beam member 121 at one end and not connected with the arcuate header-beam member 121 at another end, i.e., to form a cantilever beam structure. One of the two auxiliary members 125 may also be connected with the arcuate header-beam member 121 at each end of both ends, and a portion of a middle portion between the two ends is protruded. For ease of description, the present disclosure is illustrated, for example, with each of the two auxiliary members 125 configured to be cantilevered relative to the arcuate header-beam member 121. Obviously, in some other embodiments, the third contacting point may also be formed when the arcuate header-beam member 121 contacts the head of the user, such as when a portion of the arcuate header-beam member 121 is protruded to form the third contacting point, i.e., the header-beam assembly 12 does not include the auxiliary members 125. Correspondingly, the arcuate header-beam member 121 may form the first contacting point with the top of the head of the user.

Based on the detailed description above, in the head-down state, the pressing force at the first contacting point forms a first resistance torque relative to the second contacting point, the pressing force at the third contacting point forms a second resistance torque relative to the second contacting point, the pressing force at the second contacting point forms a third resistance torque relative to the contact surface between the core module 11 and the cheek of the user when the header-beam assembly 12 includes the two auxiliary members 125, and the pressing force at the second contacting point forms a fourth resistance torque relative to the contact surface between the core module 11 and the cheek of the user when the header-beam assembly 12 does not include the two auxiliary members 125. A combined torque formed by the first resistance torque, the second resistance torque, and the third resistance torque is greater than a combined torque formed by the first resistance torque and the fourth resistance torque. In short, the header-beam assembly 12 is provided with the two auxiliary members 125 to introduce another resistance torque, which facilitates overcoming the gravity torque of the headphone 10 in the head-down state, thereby improving the reliability of the headphone 10 in wearing.

Further, the two auxiliary members 125 are configured to be elastic so that when the headphone 10 are worn by users with heads of different sizes, a change of the pressing force at the second contacting point is less than or equal to 0.2 N due to different degrees of elastic deformations of the auxiliary members 125. Therefore, when the headphone 10 are used by different users, each of the two auxiliary members 125 may apply a pressing force against the head of the user to improve the stability of the headphone 10 in wearing, especially in the head-down state, and the two auxiliary members 125 may make the change in the pressing force of the core module 11 against the cheek of the user small, which may improve acoustic performance of the headphone 10. When the header-beam assembly 12 has an adapter member(s) 122 to adjust an arc length of the header-beam assembly 12 to better adapt to different users, the auxiliary members 125 are configured such that the absolute value of the difference between the second pressing force and the first pressing force is between 0 and 0.1 N, which makes the change in the pressing force of the core module 11 against the cheek of the user insignificant. The first pressing force and the second pressing force may be between 0.4 N and 0.8 N.

In conjunction with FIGS. 50 and 51, in the natural state, the header-beam assembly 12 has a first reference plane and a second reference plane, the first reference plane and the second reference plane are orthogonal to each other, the two auxiliary members 125 are symmetrically disposed relative to the first reference plane (e.g., as shown by RP1 in FIGS. 50 and 51), and the second reference plane (e.g., a plane in which the paper is disposed) passes through the highest point and the two endpoints of the arcuate header-beam member 121. When the arcuate header-beam member 121 and the auxiliary members 125 are projected onto the second reference plane, in the second reference plane, the line connecting at fixed end of the auxiliary member 125 and the free end of the auxiliary member 125 has a first projection magnitude (e.g., as shown by x1 in FIGS. 50 and 51) in a first reference direction parallel to a line connecting the two endpoints of the arcuate header-beam member 121 and has a second projection magnitude (e.g., as shown by y1 in FIGS. 50 and 51) in a second reference direction perpendicular to the line connecting the two endpoints of the arcuate header-beam member 121. Based on this, the ratio (e.g., y1/x1) between the second projection magnitude and the first projection magnitude may be between 1 and 5; and/or, an equivalent elasticity coefficient of each of the two auxiliary members 125 may be between 100 N/m and 180 N/m. If the ratio is too small, the pressing force at the third contacting point may be too small, which is not conducive to improving the reliability of the headphone 10 in wearing. If the ratio is too large, the pressing force at the third contacting point may be too large, which may cause the pressing force at the second contacting point to be insufficient, e.g., the core module 11 is supported by the auxiliary members 125. Similarly, if the equivalent elasticity coefficient of each of the two auxiliary members 125 is too small, the pressing force at the third contacting point may be too small, which is not conducive to improving the reliability of the headphone 10 in wearing. If the equivalent elasticity coefficient of each of the two auxiliary members 125 is too large, the pressing force at the third contacting point may be too large, which may cause the pressing force at the second contacting point to be insufficient, for example, the core module 11 is supported by the auxiliary members 125.

In some embodiments, in the natural state, when the arcuate header-beam member 121 is projected onto the second reference plane and a cartesian coordinate system is established in the second reference plane with the highest point of the arcuate header-beam member 121 as a coordinate origin, a straight line that passes through the coordinate origin and is parallel to the line connecting the two endpoints of the arcuate header-beam member 121 as an x-axis, and a straight line that passes through the coordinate origin and is perpendicular to the x-axis as a y-axis, a curve of the arcuate header-beam member 121 from any endpoint of the two endpoints to the highest point satisfies a following equation:

$$x = \pm\left(-2.63472525\cdot 10^{15}\cdot y^{10} + 1.41380284\cdot 10^{12}\cdot y^{9} - 3.25586957\cdot 10^{10}\cdot y^{8} + 4.2058788\cdot 10^{8}\cdot y^{7} - 3.34381129\cdot 10^{6}\cdot y^{6} + 1.69016414\cdot 10^{4}\cdot y^{5} - 5.42625713\cdot 10^{3}\cdot y^{4} + 1.07794891\cdot 10^{1}\cdot y^{3} - 1.27679777\cdot y^{2} + 9.70381438\cdot y + 2.61\right)$$

A thickness of each of the two auxiliary members 125 may be less than or equal to 4 mm, so that the auxiliary members 125 may provide a corresponding pressing force when the headphone 10 is worn by a user with a larger head. A gap between the auxiliary members 125 and the arcuate header-beam 121 may be greater than or equal to 10 mm, so that the auxiliary members 125 may provide a corresponding pressing force when the headphone 10 is worn by a user with a small head. If the thickness of the auxiliary member 125 is too large, the auxiliary member 125 may directly abut the arcuate header-beam member 121 when the headphone 10 is worn by a user with a large head, thereby causing the pressing force at the second contacting point to be insufficient, such as the core module 11 is supported by the two auxiliary members 125. If the gap between the auxiliary member 125 and the arcuate header-beam member 121 is too small, the auxiliary members 125 may not abut the head of the user when the headphone 10 is worn by the user with a small head, thereby causing the pressing force at the third contacting point to be too less.

In some embodiments, each of the two auxiliary members 125 may be fixed to an end portion of the arcuate header-beam member 121, and a line connecting any one of the two endpoints and the highest point of the arcuate header-beam member 121 has a third projection magnitude (e.g., shown as x2 in FIGS. 50 and 51) in a first reference direction parallel to the line connecting the two endpoints and has a fourth projection magnitude (e.g., shown as y2 in FIGS. 50 and 51) in the second reference direction perpendicular to the line connecting the two endpoints of the arcuate header-beam member 121. A ratio (e.g., y1/y2) between the second projection magnitude and the fourth projection magnitude may be between 0.1 and 0.5. If the ratio is too small, the pressing force at the third contacting point may be too small, which is not conducive to improving the wearing stability of the headphone 10. If the ratio is too large, the pressing force at the second contacting point may be insufficient. For example, the core module 11 and the arcuate header-beam member 121 may be supported by the auxiliary member 125, which is not conducive to improving the wearing stability of the headphone 10.

In some embodiments in which the each of the two auxiliary members 125 is not necessarily fixed to an end portion of the arcuate header-beam member 121, a distance between a fixed end of the auxiliary member 125 of the two auxiliary members 125 connected with the arcuate header-beam member 121 and the core module 11 adjacent to the auxiliary member 125 has a projection magnitude in the second reference direction perpendicular to the line connecting the two endpoints, and the projection magnitude is between 40 mm and 120 mm. If the distance is too small, the pressing force at the second contacting point may be insufficient, such as the core module 11 may be supported by the two auxiliary members 125; and if the distance is too large, the pressing force at the first contacting point may be insufficient, such as the arcuate header-beam member 121 is supported by the auxiliary member 125.

For example, in conjunction with FIG. 50, each of the two auxiliary members 125 may extend toward an intermediate region of the arcuate header-beam member 121. In the second reference plane, the fixed end of the each of the two auxiliary members 125 connected with the arcuate header-beam member 121 has a first distance (e.g., shown as y3 in FIG. 50) from the highest point along a reference direction perpendicular to the line connecting the two endpoints of the arcuate header-beam member 121, and a position where the core module 11 is connected with the header-beam assembly 12 has a second distance (e.g., shown as y4 in FIG. 50) from the highest point along the reference direction perpendicular to the line connecting the two endpoints of the arcuate header-beam member 121. A ratio (e.g., y3/y4) between the first distance and the second distance may be between 1/3 and 1/2. If the ratio is too small, the pressing force at the first contacting point may be insufficient, for example, the arcuate header-beam member 121 may be supported by the auxiliary member 125. If the ratio is too large, the pressing force at the second contacting point may be insufficient, for example, the core module 11 may be supported by the auxiliary member 125.

For example, in conjunction with FIG. 51, the auxiliary member 125 may extend toward an end of the arcuate header-beam member 121. In the second reference plane, the fixed end of the auxiliary member 125 connected with the arcuate header-beam member 121 has a third distance (e.g., shown as y3 in FIG. 51) from the highest point of the arcuate header-beam member 121 in the reference direction perpendicular to the line connecting the two endpoints of the arcuate header-beam member 121, and the position where the core module 11 is connected with the header-beam assembly 12 has a fourth distance (e.g., shown as y4 in FIG. 51) from the highest point along the reference direction. A ratio (e.g. y3/y4) between the third distance and the fourth distance may be between 1/5 and 1/3. If the ratio is too small, the pressing force at the first contacting point may be insufficient, for example, the arcuate header-beam member 121 may be supported by the auxiliary member 125. If the ratio is too large, the pressing force at the second contacting point may be insufficient, for example, the core module 11 may be supported by the auxiliary member 125.

For example, in conjunction with FIG. 52, the auxiliary member 125 may include a fixing portion 1251, a first extending portion 1252 connected with the fixing portion 1251, and a second extending portion 1253 connected with the first extending portion 1252, and the fixing portion 1251 may be connected with the arcuate header-beam member 121. The first extending portion 1252 and the second extending portion 1253 are disposed on a side of the arcuate header-beam member 121 facing the head of the user in the wearing state and are provided at intervals from the arcuate header-beam member 121 in the natural state to facilitate the auxiliary member 125 to form a third contacting point with the head of the user. The width of the second extending portion 1253 may be larger than the width of the first extending portion 1252, and the second extending portion 1253 is configured to form the third contacting point with the head of the user in the wearing state. In other words, the auxiliary member 125 may be configured into a T-shaped structure, a relatively elongated first extending portion 1252 facilitates deformation of the auxiliary member 125, and a relatively short and wide second extending portion 1253 facilitates better contact of the auxiliary member 125 with the head of the user. For example, in the wearing state and viewed along the vertical axis of the user, the second extending portions 1253 of the two auxiliary members 125 are close to each other facing the rear side of the head of the user, so that the two auxiliary members 125 may hook the head at the rear side of the head of the user, which is conducive to improving the wearing stability of the headphone 10, especially in the head-down state.

Further, in the natural state, the header-beam assembly 12 has the first reference plane and the second reference plane orthogonal to each other, the two auxiliary members 125 are symmetrically disposed relative to the first reference plane, and the second reference plane passes through the highest point of the arcuate header-beam member 121 and the two endpoints of the arcuate header-beam member 121. In the wearing state, the first reference plane may be parallel to the sagittal plane of the user, and the second reference plane may be parallel to the coronal plane of the user. An angle between an average normal of the second extending portion

1253 of each auxiliary member 125 and the second reference plane may be between 5 degrees and 10 degrees. Considering that the second extending portion 1253 may be configured as a mimetic structure that fits more closely with the head of the user, for example, as an arcuate structure, a normal thereof is further defined as an average normal. An equation for calculating the average normal may be:

$$\hat{r}_0 = \frac{\oiint_S \hat{r} ds}{\left|\oiint_S \hat{r} ds\right|};$$

where $\hat{r}_0$ is an average normal; $\hat{r}$ is the normal at any point on the surface, and ds is a surface element.

Further, an area of the second extending portion 1253 contacting the head of the user may be between 2 $cm^2$ and 8 $cm^2$. If the area is too small, the wearing state may be discomfort. If the area is too large, the appearance of the headphone 10 may be easily deteriorated. In addition, if the area is too small, the auxiliary members 125 may not generate sufficient resistance torque.

Further, the friction coefficient of the second extending portion 1253 may be greater than the friction coefficient of the first extension 1252 to make the auxiliary member 125 form a corresponding resistance torque primarily through the second extending portion 1253.

Further, the auxiliary member 125 may be detachably connected with the arcuate header-beam member 121, which facilitates a replacement or a choice of the user of whether to use the auxiliary members 125 based on actual needs.

Based on the detailed description above, due to the long length of the header-beam assembly 12 or the differences in the heads of users of different populations, the header-beam assembly 12 may not form the contacting point with the top of the head of the user in the wearing state and may not generate the corresponding pressing force. Based on this, in the wearing state, the core module 11 may form the first contacting point with the cheek of the user and apply the first pressing force against the head of the user. The header-beam assembly 12 may form the second contacting point with the head of the user and apply the second pressing force on the head of the user. The second contacting point is closer to the top of the head of the user relative to the first contacting point in the vertical axis of the user. In other words, the headphone 10 and the head of the user may form two first contacting points and two contacting points, which is referred to as "four-point wearing". For the second contacting point on one side of the head of the user, due to the long length of the header-beam assembly 12 or the differences in the heads of users of different populations, a count of the second contacting points may exceed 1. Further, when the header-beam assembly 12 forms the second contacting point with the head of the user, at least a portion of the header-beam assembly 12 between the second contacting point and the top of the head of the user may not contact the head of the user, i.e., not all of the header-beam assembly 12 contacts the head of the user and generates the corresponding pressing force, which may facilitate the maintenance of a small change in the magnitude of the pressing force at the core module 11.

Similarly, for the four-point wearing, in the head-down state, the second pressing force forms a first resistance torque relative to the first contacting point, the pressing force at the first contacting point forms a second resistance torque relative to the contact surface between the core module 11 and the cheek of the users in the case where the header-beam assembly 12 includes the two auxiliary members 125, and the pressing force at the first contacting point forms a third resistance torque relative to the contact surface between the core module 11 and the cheek of the users in the case where the header-beam The assembly 12 does not include the two auxiliary members 125. The first resistance torque and the second resistance torque form a combined torque that is greater than the third resistance torque. In short, the header-beam assembly 12 is provided with the two auxiliary members 125 to introduce another resistance torque, which facilitates overcoming the gravity torque of the headphone 10 in a head-down state, thereby improving the wearing stability of the headphone 10.

Similarly, for the four-point wearing, the pressing force at the first contacting point may be between 0.2 N and 2 N, and the pressing force at the second contacting point may be between 0.3 N and 2 N, such that the user may obtain a good wearing stability and comfort, and the headphone 10 may have a good sound quality.

Similarly, for the four-point wearing, in the wearing state, the two auxiliary members 125 connected with the arcuate header-beam member 121 form a second contacting point with each side of the head of the user; the auxiliary members 125 are configured to be elastic, so that when the headphone 10 are worn by users with different sizes of heads, a change of the first pressing force may be less than or equal to 0.2 N due to different degrees of elastic deformations of the two auxiliary members 125. Therefore, when the headphone 10 are used by different users, the auxiliary members 125 may be made to apply the pressing force on the head of the user to improve the wearing stability of the headphone 10, especially when in the head-down state, and the change of the pressing force of the core module 11 on the cheek of the user may also be small to maintain the acoustic performance of the headphone 10.

Figure 53:
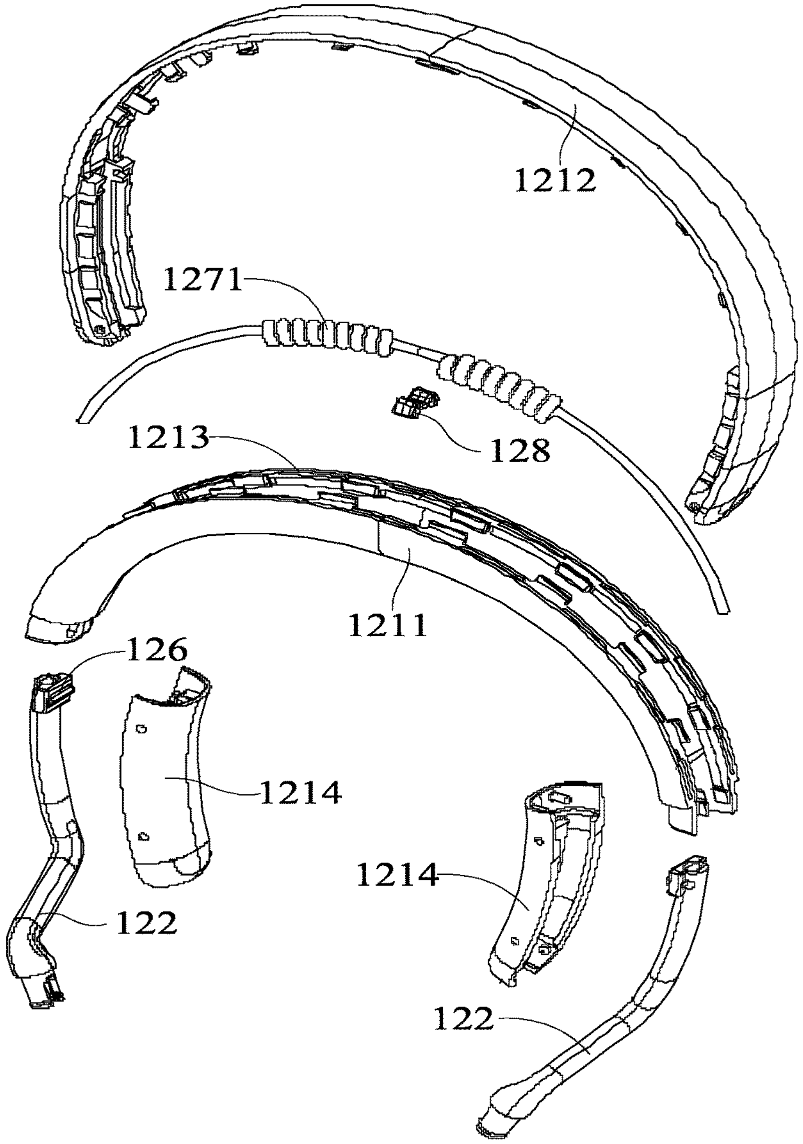
FIG. 53 is a schematic diagram illustrating a disassembled structure of an arcuate header-beam member according to some embodiments of the present disclosure.
Figure 54:
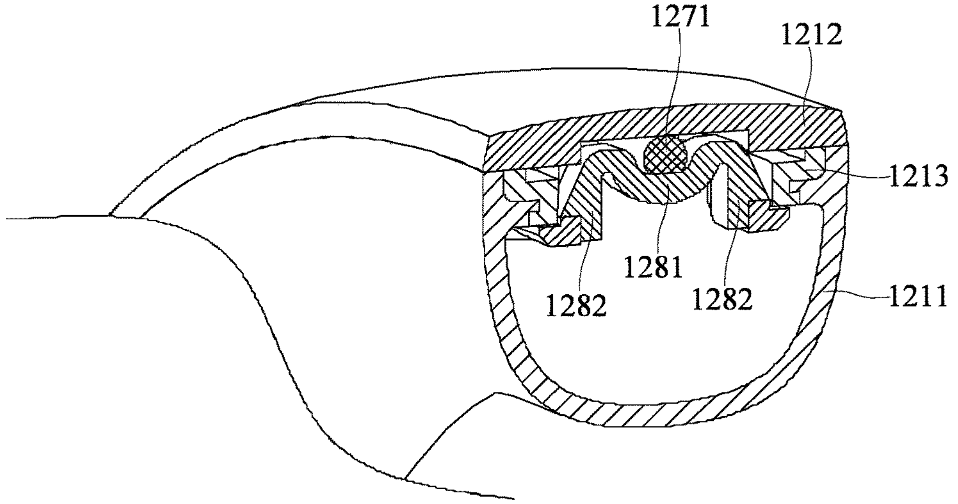
FIG. 54 is a schematic diagram illustrating a cross-sectional structure of an arcuate header-beam member in FIG. 53 according to some embodiments of the present disclosure.

Combined with FIGS. 53 and 54, the arcuate header-beam member 121 may include an inner compartment body 1211 and an outer cover body 1212 connected with the inner compartment body 1211, wherein the inner compartment body 1211 is configured to contact the head of the user, such as to form at least one of the first contacting point and the third contacting point. The inner compartment body 1211 may be a groove-shaped structure having a certain depth, the outer cover body 1212 may be an elongated structure having a certain thickness, and the inner compartment body 1211 and the outer cover body 1212 may be coordinated to form a wiring channel to facilitate an electrical connection of electronic components on the left and right sides of the headphone 10 through a corresponding wire 1271 therein. Further, the structural intensity of the outer cover body 1212 may be greater than the structural intensity of the inner compartment body 1211 such that the header-beam assembly 12 may provide a pressing force required for the core module 11. The material of the inner compartment body 1211 may be softer than the material of the outer cover body 1212 such that the header-beam assembly 12 may better fit with the head of the user, thereby increasing the wearing stability. Since the inner compartment body 1211 and the outer cover body 1212 have certain differences in structural intensity, material, and other aspects, to facilitate assembly, the arcuate header-beam member 121 may include a reinforcement body 1213 connected with the inner compartment body 1211, and the inner compartment body 1211 is connected with the outer cover body 1212 through the reinforcement body 1213. For example, the material of the reinforcement body 1213 may be the same or similar to the material of the outer cover body 1212. The reinforcement body 1213 and the inner compartment body 1211 may be integrally molded by an injection molding technique, and the reinforcement body 1213 and the outer cover body 1212 may be detachably connected through a clamping connection.

Figure 55:
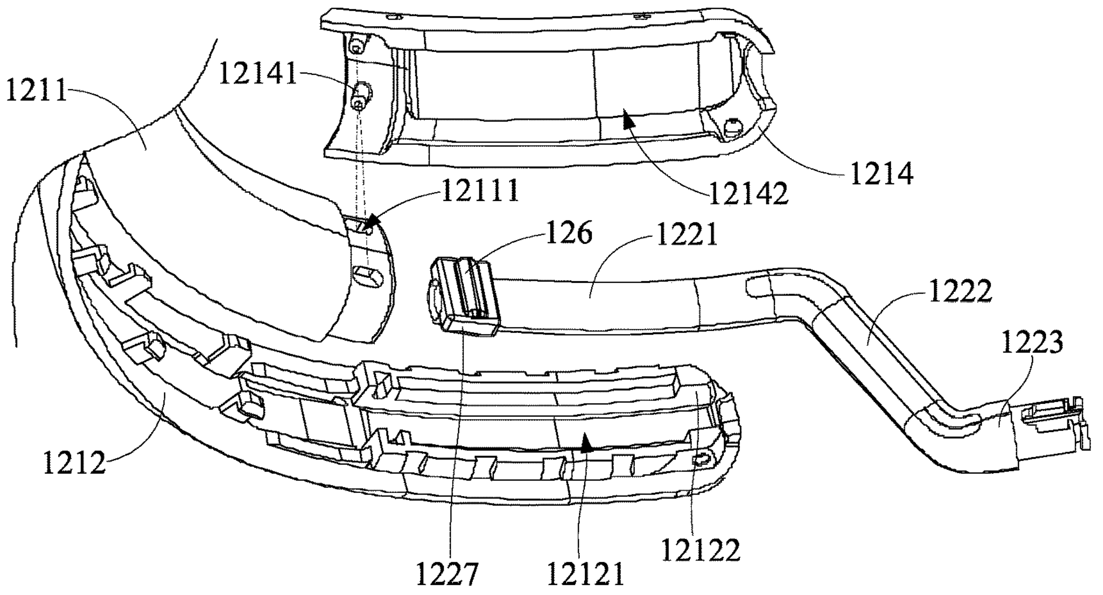
FIG. 55 is a schematic diagram illustrating a partially disassembled structure of a header-beam assembly according to some embodiments of the present disclosure.
Figure 56:
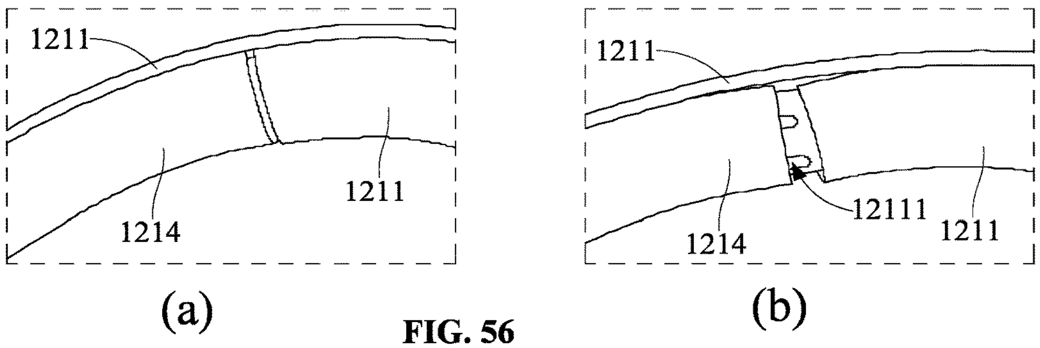
FIG. 56 is a schematic diagram illustrating a localized structure of a header-beam assembly in various states according to some embodiments of the present disclosure.

In conjunction with FIG. 55, FIG. 53, and FIG. 52, the arcuate header-beam member 121 may include an inner cover body 1214, wherein the inner cover body 1214 and the inner compartment body 1211 are respectively connected with the same side of the outer cover body 1212. An end portion of the inner compartment body 1211 extends between the inner cover body 1214 and the outer cover body 1212, and a portion of the inner compartment body 1211 may exit from between the inner cover body 1214 and the outer cover body 1212 in a process in which the two ends of the header-beam assembly 12 are gradually pulled away from each other, which corresponds to a process in which the two ends of the header-beam assembly 12 are supported by the head of the user when the user wears the headphone 10. Compared to the related technology in which the end portion of the inner compartment body 1211 is fixedly connected with the inner cover body 1214 (and the outer cover body 1212), the inner compartment body 1211 and the inner cover body 1214 in the present embodiment are configured to be able to move relative to each other, which is conducive to releasing stress of the inner compartment body 1211 when the header-beam assembly 12 is supported, especially stress of the end portion of the inner compartment body 1211, thereby prevent the inner compartment body 1211 from tearing due to excessive deformation. In conjunction with (a) in FIG. 56, before both ends of the header-beam assembly 12 are pulled away from each other, the end portion of the inner compartment body 1211 extends between the inner cover body 1214 and the outer cover body 1212. In conjunction with (b) in FIG. 56, after both ends of the header-beam assembly 12 have been pulled away from each other at a certain distance, a portion of the end portion of the inner compartment body 1211 is withdrawn from between the inner cover body 1214 and the outer cover body 1212.

In some embodiments, the inner lid body 1214 and the outer lid body 1212 may be two separate structural members. At this point, an end of the inner compartment body 1211 may be provided with at least one through hole 12111, and a side of the inner cover body 1214 facing the outer cover body 1212 may be provided with at least one post 12141 extending into the through hole 12111, a radial dimension of the post 12141 is smaller than a radial dimension of the through hole 12111, so that when both ends of the header-beam assembly 12 are progressively pulled away from each other, the portion of the inner compartment body 1211 is not merely withdrawn from between the inner cover body 1214 and the outer cover body 1212, but also stopped by the post 12141 to avoid the end portion of the inner compartment body 1211 from completely withdrawing from between the inner cover body 1214 and the outer cover body 1212, i.e., a portion of the inner compartment body 1211 may be always disposed between the inner cover body 1214 and the outer cover body 1212 to facilitate a better insertion of the inner compartment body 1211 into the header-beam assembly 12 during a rebound of the header-beam assembly 12. The through hole 12111 may be a waist-shaped hole with a length direction provided along an extension direction of the arcuate header-beam member 121 to provide a travel space for the inner compartment body 1211 to move relative to the inner cover body 1214. Further, a count of the at least one through hole 12111 and a count of the at least one post 12141 may be two, the two through holes 12111 may be provided at intervals along the direction perpendicular to the extension direction of the header-beam assembly 12, and the two posts 12141 may respectively extend into one of the two through holes 12111.

In some embodiments, the inner cover body 1214 and the outer cover body 1212 may be integrally molded structural members. In such cases, an end portion of the inner compartment body 1211 is inserted between the inner cover body 1214 and the outer cover body 1212. An insertion depth of the inner compartment body 1211 may be greater than the maximum withdrawal distance of the inner compartment body 1211 during the process of the header-beam assembly 12 is stretched, i.e., a portion of the inner compartment body 1211 may always be disposed between the inner cover body 1214 and the outer cover body 1212 to facilitate the better insertion of the inner compartment body 1211 between the inner cover body 1214 and the outer cover body 1212 during the rebound of the header-beam assembly 12.

Further, in embodiments where the header-beam assembly 12 includes an adapter member 122 and the adapter member 122 is capable of extending from or retracting into the arcuate header-beam member 121 under the action of the external force, a structural intensity of the inner cover body 1214 may be greater than a structural intensity of the inner compartment body 1211 to allow the inner cover body 1214 to clamp the adapter member 122 together with the outer cover body 1212. In such cases, the inner cover body 1214 and outer cover body 1212 may be two separate structural members to facilitate an assembly of the adapter member 122. In embodiments where the header-beam assembly 12 does not include the adapter member 122, or where the header-beam assembly 12 includes the adapter member 122 but the adapter member 122 does not extend from or retract into the arcuate header-beam member 121 under the action of the external force, the structural intensity of the inner cover body 1214 may also be larger than the structural intensity of the inner compartment 1211 such that the inner cover body 1214 and outer cover body 1212 may form a space accommodating the end portion of the inner compartment body 1211. In such cases, the inner cover body 1214 and the outer cover body 1212 may be integrally molded structural members, or the inner cover body 1214, the outer cover body 1212, and the adapter member 122 may be integrally molded structural members.

In some embodiments, the arcuate header-beam member 121 may be divided into an intermediate section and two end sections respectively connected with both ends of the intermediate section, and an arc length of each of the two end sections is less than an arc length of the intermediate section. When two ends of the header-beam assembly 12 are gradually pulled away from each other, the two end sections are deflected in a direction away from each other relative to the intermediate section, which facilitates a release of stresses of end portions of the intermediate section close to the two end sections. For example, the intermediate section may include the inner compartment body 1211, and each of the two end sections may include the inner cover body 1214, the inner compartment body 1211 and the inner cover body 1214 may be pivoted through a rotating shaft. The inner compartment body 1211 and the inner cover body 1214 are provided with the outer cover body 1212 on the same side to provide a function of support. In conjunction with (a) in FIG. 56, before the two ends of the header-beam assembly 12 are pulled away from each other, the end portion of the inner compartment body 1211 extends between the inner cover body 1214 and the outer cover body 1212, the inner compartment body 1211 and the inner cover body 1214 form an approximately smooth curve, and an angle between the inner compartment body 1211 and the inner cover body 1214 are approximately equal to 0°. In conjunction with (b) in FIG. 56, before the two ends of the header-beam assembly 12 are pulled away from each other by a certain distance, the angle between the inner compartment body 1211 and the inner cover body 1214 is greater than 0°, which corresponds to that the end portion of the inner compartment body 1211 exits from between the inner cover body 1214 and the outer cover body 1212.

Based on the relevant descriptions above, in embodiments where the header-beam assembly 12 includes the arcuate header-beam member 121 and the adapter member 122, the adapter member 122 is capable of extending from or retracting into the arcuate header-beam member 121 under the action of the external force to adjust the arc length of the header-beam assembly 12. Based on this and in conjunction with FIG. 55, the header-beam assembly 12 may include a damping member 126, the damping member 126 is configured to provide a damping feel when a user adjusts the arc length of the header-beam assembly 12 and to maintain a relative position between the adapter member 122 and the arcuate header-beam member 121 after the user has adjusted the arc length of the header-beam assembly 12 to a required arc length, i.e., to maintain the arc length of the header-beam assembly 12.

For example, in connection with FIG. 55, the outer cover body 1212 may be provided with a first guiding groove 12121 configured to guide the adapter member 122 to move relative to the outer cover body 1212 to cause the adapter member 122 to extend from or retract into the arcuate header-beam member 121 under guidance of the first guiding groove 12121. Further, the damping member 126 may be provided on a side of the adapter member 122 facing the inner cover body 1214 and protrude out of the first guiding groove 12121, and the damping member 126 further abuts the inner cover body 1214 to provide resistance when the adapter member 122 extends from or retracts into the arcuate header-beam member 121, which is simple and reliable.

An end of the adapter member 122 close to the inner compartment body 1221 is provided with a storage slot, for example, the storage slot is disposed at an end portion of the first connecting section 1221 away from the second connecting section 1223, and the damping member 126 may be provided within the storage slot of the adapter member 122 and a portion of the damping member 126 protrudes from the adapter member 122 such that the damping member 126 may abut the inner cover body 1214 to provide a corresponding resistance, which is favorable to maintain a relative position between the damping member 126 and the adapter member 122.

An end of the adapter member 122 close to the inner compartment body 1211 may be provided with a slider 1227, for example, the slider 1227 is provided at the end portion of the first connecting section 1221 away from the second connecting section 1223, and the storage slot may be provided on the slider 1227. Along a direction perpendicular to an extension and retraction direction of the adapter member 122, the width of the slider 1227 may be larger than the width of the first connecting section 1221. Correspondingly, the outer cover body 1212 may be provided with a stopping portion 12122 at the end of the first guiding groove 12121 away from the inner compartment body 1211, and the stopping portion 12122 is configured to stop the slider 1227 to avoid the adapter member 122 from detaching from the arcuate header-beam member 121 due to "over-pulling".

The inner cover body 1214 may be provided with a second guiding groove 12142 configured to guide the damping member 126 when the adapter member 122 extends from or retracts into the arcuate header-beam member 121, and the second guiding groove 12142 guides the adapter member 122 in conjunction with the first guiding groove 12121 to make the extension or retraction of the adapter member 122 more reliable. Correspondingly, the damping member 126 may be abut the bottom of the second guiding slot 12142.

Based on the relevant description of the present disclosure, each end of both ends of the header-beam assembly 12 may be connected with the core module 11, and the left side and a right side of the headphone 10 may be respectively provided with a battery 14, a main board 15, and electronic components such as a stick microphone assembly 16 and a function assembly 17, which need to be electrically connected through corresponding wires, a flexible circuit board, etc. For example, a wire 1271 for at least electrically connecting the battery 14 and the main board 15 may pass through the header-beam assembly 12 so that the wire 1271 is not exposed. Further, the header-beam assembly 12 may include an arcuate header-beam member 121 and an adapter member 122, the adapter member 122 is configured to connect the arcuate header-beam member 121 and a corresponding core module 11, and the adapter member 122 is configured to extend from or retract into the arcuate header-beam member 121 to adjust the arcuate length of the header-beam assembly 12 to facilitate the wearing of the headphone 10 by users with different head sizes. Therefore, the wire 1271 disposed within the header-beam assembly 12 may have a certain margin. For example, at least a portion of the wire 1271 may be folded within the header-beam assembly 12 to unfold with the extension of the header-beam assembly 12, thereby preventing the wire from being torn off when the user adjusts the arc length of the header-beam assembly 12. In addition, when the user shortens the arc length of the header-beam assembly 12, the wire 1271 may also be restored to an original state as much as possible, such as folded up so that the wire 1271 may be unfolded again the next time with the extension of the header-beam assembly 12.

Figure 57:
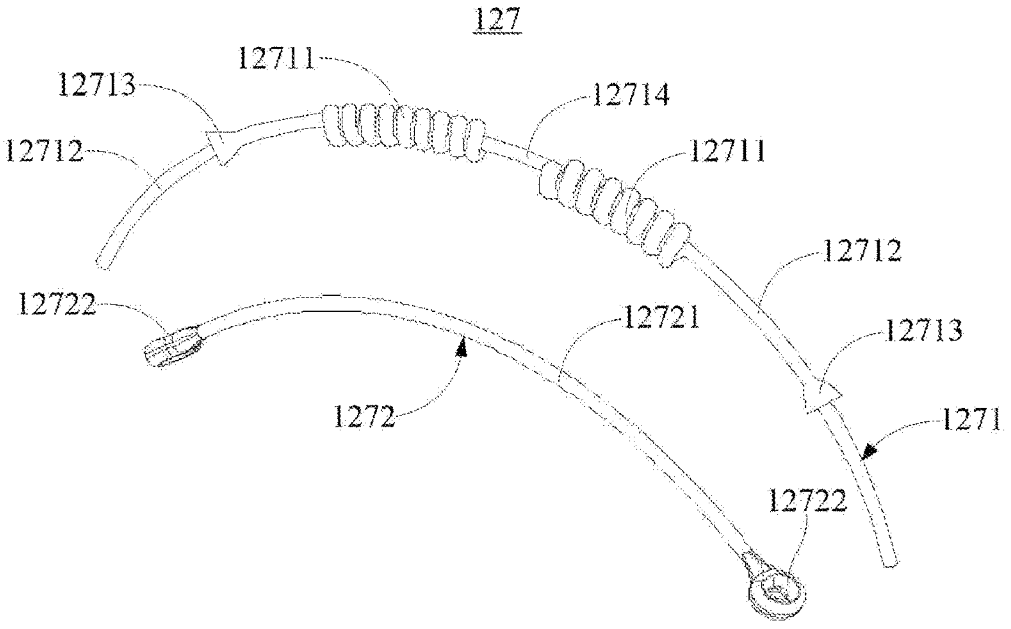
FIG. 57 is a schematic diagram illustrating a disassembled structure of a connecting wire assembly according to some embodiments of the present disclosure.

For example, in conjunction with FIG. 57 and FIG. 53, a connecting wire assembly 127 may include the wire 1271 configured to conduct electricity and an auxiliary wire 1272 connected with the wire 1271, wherein a deformation of the wire 1271 under an external force drives an elastic deformation of the auxiliary wire 1272, the auxiliary wire 1272 provides an elastic restoring force after the external force is released, and the elastic restoring force is configured to drive the wire 1271 to restore to a shape before the deformation. Therefore, by providing the auxiliary line 1272 cooperating with the wire 1271, after the wire 1271 and the auxiliary line 1272 are elongated, the auxiliary line 1272 may assist the wire 1271 restoring the shape before extension such that the wire 1271 may be elongated again. Based on this, the connecting wire assembly 127 may be provided within the header-beam assembly 12. For example, the wire 1271 and the auxiliary wire 1272 are located between the inner compartment body 1211 and the outer cover body 1212, and the wire 1271 further passes through and is disposed within the adapter member 122 to extend along the arcuate header-beam member 121 and to extend along with the extension of the adapter member 122 or to retract along with the retraction of the adapter member 122. The core module 11, the battery 14, the main board 15, and other electronic components may be electrically connected through the wire 1271. In such cases, when the user lengthens the arc length of the header-beam assembly 12, the connecting wire assembly 127 extends along with the extension of the adapter member 122 to deform the wire 1271 and the auxiliary wire 1272 together. When the user shortens the arc length of the header-beam assembly 12, the connecting wire assembly 127 retracts along with the retraction of the adapter member 122 such that the auxiliary wire 1272 may drive the wire 1271 to restore to an initial shape.

In some embodiments, the wire 1271 may include a telescoping section 12711 and two natural sections 12712 disposed at both ends of the telescoping section 12711, and an elastic coefficient of the telescoping section 12711 is between an elastic coefficient of the natural sections 12712 and an elastic coefficient of the auxiliary wire 1272. For example, the telescoping section 12711 may be a portion of wire 1271 that is spirally extended around at least a portion of the auxiliary wire 1272. As another example, the telescoping section 12711 may be a portion of the wire 1271 that extends folded along at least a portion of the auxiliary line 1272. Therefore, the wire 1271 has a certain elasticity at the telescoping section 12711, and the wire 1271 has a margin of extension along with the extension of the header-beam assembly 12. In a natural state, i.e., when no external force is applied to the wire 1271 or when the telescoping section 12711 is not deformed, a ratio of the length of the telescoping section 12711 to the length of the wire 1271 may be between 0.1 and 0.5. If the ratio is too small, the margin of the wire 1271 extending along with the extension of the header-beam assembly 12 may be small. If the ratio is too large, the length of the wire 1271 after being fully elongated may be too long, which is not conducive to lowering the cost of the connecting wire assembly 127.

In some embodiments, the wire 1271 may include a telescoping section 12711 and two natural sections 12712 disposed at two ends of the telescoping section 12711, and the length of the telescoping section 12711 is greater than the length of the auxiliary wire 1272, which allows the wire 1271 to have a margin of extension along with the extension of the header-beam assembly 12. At this point, the telescoping section 12711 may not be configured in a spiral shape, or a portion of the telescoping section 12711 may be configured in a folded shape.

For example, in conjunction with FIG. 57, the auxiliary wire 1272 may include an elastic body 12721 and two sleeve rings 12722 disposed at both ends of the elastic body 12721, each of the two sleeve rings 12722 may be sleeved on a corresponding natural section 12712 and stopped by the limiting structure 12713 on the natural section 12712 in a rebound direction of the telescoping section 12711, such that the auxiliary wire 1272 may drive the wire 1271 to restore to the initial state. In embodiments where the telescoping section 12711 is a portion of the wire 1271 that extends spirally around at least a portion of the auxiliary wire 1272, the elastic body 12721 may pass through and be provided within the telescoping section 12711 spirally extending. Further, the limiting structure 12713 may be a protrusion integrally connected with an insulating layer of the wire 1271 or a knot formed by knotting the natural section 12712.

It should be noted that in the embodiment in which the telescoping section 12711 is a spiral extended portion of the wire 1271, i.e., the telescoping section 12711 is in a spiral structure similar to a spring, the auxiliary wire 1272 may not be provided if the elasticity coefficient of the telescoping section 12711 is able to make the telescoping section 12711 to restore to the original state after the wire 1271 extends along with the extension of the header-beam assembly 12. In other words, the header-beam assembly 12 may include the header-beam member 121, the adapter member 122, and the wire 1271, the arcuate header-beam member 121 is configured to wrap around the top of the head of the user, the adapter member 122 is connected with the arcuate header-beam member 121 and is capable of extending from or retracting into the arcuate header-beam member 121 under the action of an external force, the wire 1271 is provided inside the header-beam assembly 12, a portion of the wire 1271 is provided in a spiral structure, an end portion of the wire 1271 is connected with the adapter member 122 to extend along with the extension of the adapter member 122, and the spiral structure of the wire 1271 allows the wire 1271 to retract along with the retraction of the adapter member 122.

Based on the relevant descriptions above, when the connecting wire assembly 127 is applied to the header-beam assembly 12, the natural section 12712 may be connected with the adapter member 122 to allow the wire 1271 to extend along with the extension of the adapter member 122 or to retract along with the retraction of the adapter member 122. Further, since each end of the arcuate header-beam member 121 may be connected with an adapter member 122, the connecting wire assembly 127 may also be divided into two portions, for example, a middle region of the telescoping section 12711 is fixed to the arcuate header-beam member 121 so that the two portions of the telescoping section 12711 are unaffected by each other when the two adapter members 122 respectively extend from or retract into the arcuate header-beam member 121.

For example, in conjunction with FIGS. 53, 57, and 54, the wire 1271 may include a positioning section 12714 and two natural sections 12712 disposed at two ends of the positioning section 12714, the positioning section 12714 is fixed to the arcuate header-beam member 121, the two natural sections 12712 are connected with the adapter member 122, the wire 1271 is configured to extend along with the extension of the adapter member 122 or retract along with the retraction of the adapter member 122. In such cases, the wire 1271 on both sides of the positioning section 12714 are unaffected by each other when the two adapter members 122 at both ends of the arcuate header-beam member 121 respectively extend or retract.

Further, the header-beam assembly 12 may include an abutting member 128 clamped to the arcuate header-beam member 121, the abutting member 128 abuts the positioning section 12714 against the arcuate header-beam member 121. The abutting member 128 may include an abutting portion 1281 and two clamping portions 1282 disposed at both ends of the abutting portion 1281, each clamping portion 1282 is respectively bent relative to the abutting portion 1281, the two clamping portions 1282 extend in a same direction toward a side of the abutting portion 1281 and are capable of being close to each other under the external force, the abutting portion 1281 is configured to abut the positioning section 12714, and the clamping portion 1282 is clamped to the arcuate header-beam member 121. For example, the abutting portion 1281 of the abutting member 128 abuts the positioning section 12714 of the wire 1271 against the outer cover body 1212 of the arcuate header-beam member 121, and the clamping portion 1282 of the abutting member 128 is clamped to the outer cover body 1212. Obviously, in some other implementations, the positioning section 12714 of the wire 1271 may also be attached to the outer cover body 1212 of the arcuate header-beam member 121 through adhesive directly.

Further, the wire 1271 may be provided with a spirally or folded telescoping section 12711 between the positioning section 12714 and each of the two natural sections 12712. Or the wire 1271 may not be provided with a spirally or folded telescoping section 12711 between the positioning section 12714 and the natural section 12712, but a length of the wire 12711 between the positioning section 12714 and the each of the two natural sections 12712 is greater than or equal to an amount of retraction of the adapter member 122. When the wire 1271 further includes the telescoping section 12711 disposed between the positioning section 12714 and the natural section 12712, the telescoping section 12711 has an elastic coefficient greater than the elastic coefficient of either of the positioning section 12714 and the natural section 12712. Similarly, the wire 1271 may deform with the assistance of an auxiliary line 1272, i.e., the auxiliary line 1272 is configured to provide an elastic restoring force when the wire 1271 is stretched.

Figure 21:
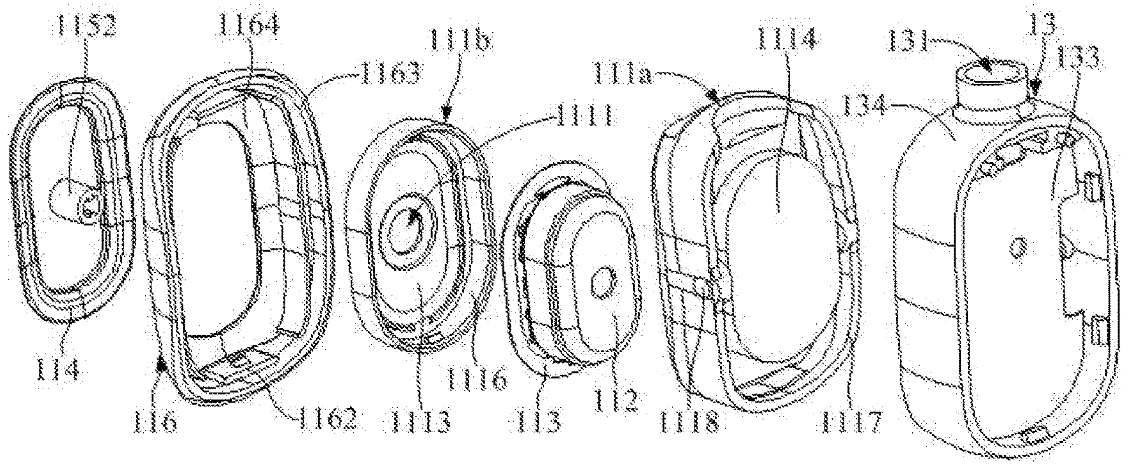
FIG. 21 is a schematic diagram illustrating a disassembled structure of a headphone of FIG. 20 in another view.

In conjunction with FIGS. 20 and 21, the headphone 10 may further include the adapter housing 13 connecting the core module 11 with the header-beam assembly 12. The core housing 111 may rotate around a first axis (e.g., shown as dashed line A1 in FIG. 20) relative to the adapter housing 13, and the adapter housing 13 may rotate around a second axis (e.g., shown as dashed line A2 in FIG. 20) relative to the header-beam assembly 12, which may increase a degree of freedom of the core module 11 in three-dimensional space relative to the header-beam assembly 12. Therefore, the core module 11 and the header-beam assembly 12 may better adapt to a contour of the head of the user, which may increase the stability and comfort of wearing the headphone 10, and the core module 11 may better fit the skin of the user. For example, the first axis of the core housing 111 rotating relative to the adapter housing 13 and the second axis of the adapter housing 13 rotating relative to the header-beam assembly 12 cross in a reference plane perpendicular to the vibration direction of the transducer device 112. The first axis and the second axis may be orthogonal to each other. For example, in the wearing state, the first axis is parallel to the sagittal axis of the user; and/or the second axis is parallel to the vertical axis of the user. The first axis and the second axis may be both coplanar or out-of-plane in the three-dimensional space.

For example, the adapter housing 13 may be pivotally connected with an end (e.g., the second connecting section 1223) of the adapter member 122 away from the arcuate header-beam member 121. Correspondingly, the second connection section 1223 may extend in the direction in which the second axis is located.

Figure 22:
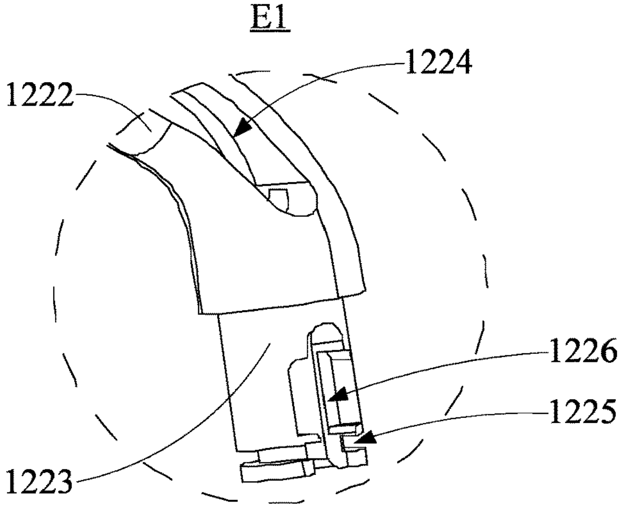
FIG. 22 is a schematic diagram illustrating a partially enlarged structure of a region of an adapter member E1 in FIG. 20.

In conjunction with FIGS. 20 and 27, the adapter housing 13 is provided with a rotating shaft cavity 131, and the adapter member 122 is inserted into the rotating shaft cavity along an axial direction (e.g., a direction in which the second axis is located) of the rotating shaft cavity. Further, the header-beam assembly 12 may include a locking member 123, and the locking member 123 is used for limiting the adapter member 122 along an axial direction of the rotating shaft cavity, such that the adapter member 122 is retained in the rotating shaft cavity 131. For example, in conjunction with FIGS. 20, 22, and 27, a slot 1225 is provided at a free end (e.g., the second connecting section 1223) of the adapter member 122, and after the adapter member 122 is inserted into the rotating shaft cavity 131 from one end of the rotating shaft cavity 131, the slot 1225 is exposed from another end of the rotating shaft cavity 131. The locking member 123 is clamped in the slot 1225, and the radial dimension of the locking member 123 is larger than the radial dimension of the rotating shaft cavity 131, and the radial dimension of the locking member 123 is larger than the radial dimension of the rotating shaft cavity 131 to lock the adapter member 122 in an opposite direction of the insertion direction of the adapter member 122 into the rotating shaft cavity 131. Further, a limiting slot 1226 is provided on an outer peripheral wall of the adapter member 122 (e.g., the second connecting section 1223), a limiting block 132 is provided on an inner peripheral wall of the rotating shaft cavity 131, and the limiting block 132 is embedded in the limit slot 1226 to limit a rotation angle of the adapter member 122 relative to the rotating shaft cavity 131. The angle of the adapter housing 13 rotating relative to the header-beam assembly 12 may be between 5° and 15°, which facilitates the headphone 10 to adapt to the contour of the head of the user, and also facilitates the user to wear the headphone.

Figure 23:
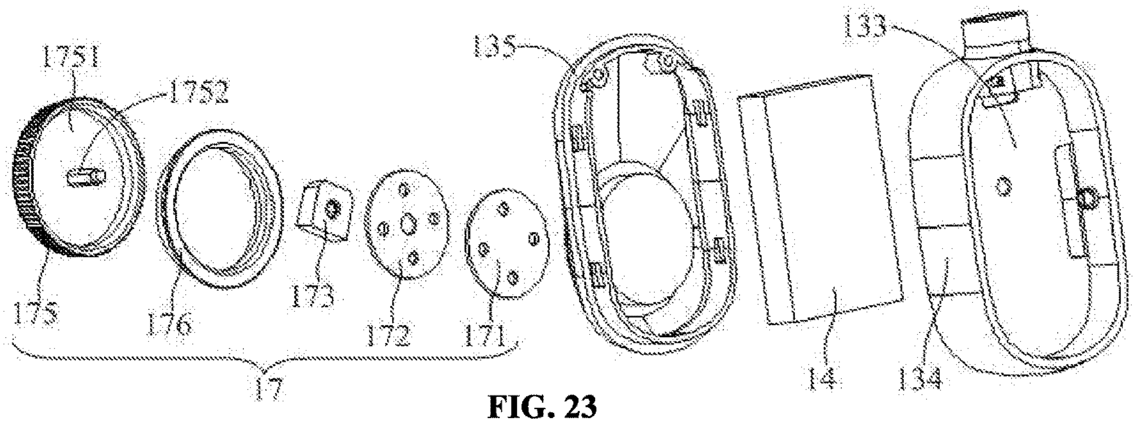
FIG. 23 is a schematic diagram illustrating a disassembled structure of a headphone according to some embodiments of the headphone of FIG. 12.
Figure 24:
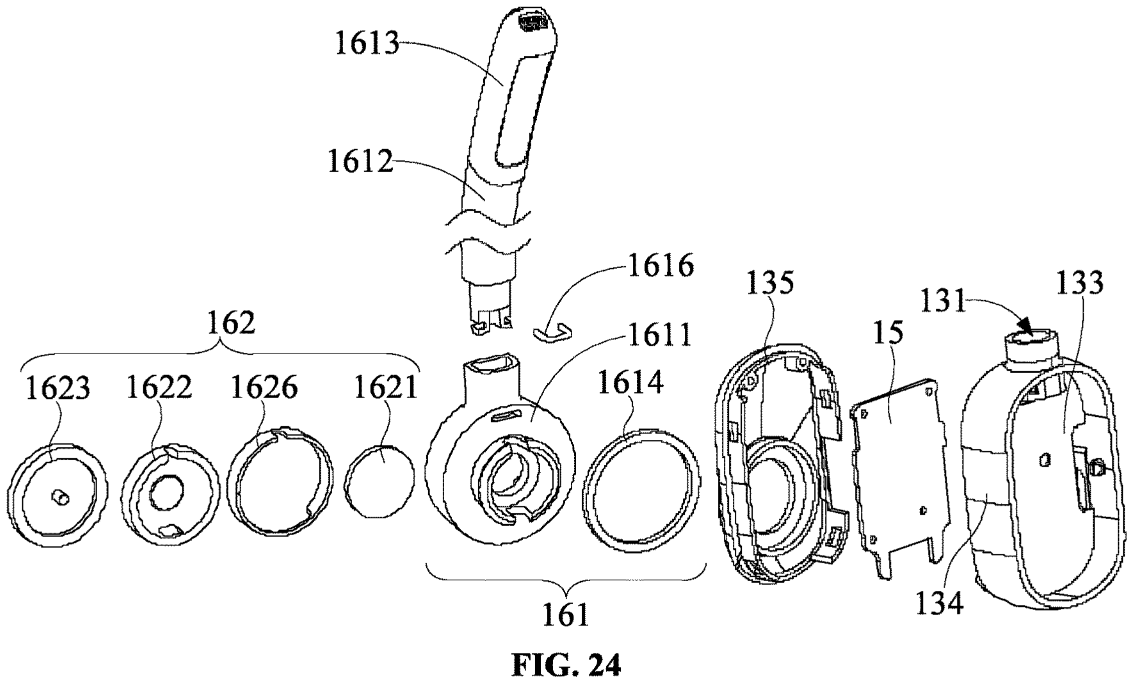
FIG. 24 is a schematic diagram illustrating a disassembled structure of a headphone according to some embodiments of FIG. 12.

In conjunction with FIGS. 23 and 24, the headphone 10 may further include the battery 14 and the main board 15 coupled to the core module 11 (which may specifically be the transducer device 112), the battery 14 is configured to power the main board 15, and the main board 15 is configured to control the transducer device 112 to convert an electrical signal into the mechanical vibration. The battery 14 may have a capacity greater than or equal to 200 mAh to increase the endurance of the headphone 10. Further, the adapter housing 13 may be configured to accommodate the battery 14 or the main board 15, for example, the battery 14 and the main board 15 are disposed in the adapter housing 13 on the left side and the adapter housing 13 on the right side of the headphone 10, respectively. In other words, the battery 14 is connected with one of the two core modules 11, and the main board 15 is connected with the other one of the two core modules 11. Therefore, the total weight of the core module 11 may be reduced to improve the sound quality of the headphone 10, and the total weight of the left and right sides of the headphone 10 may be shared to improve the stability and comfort of wearing the headphone 10.

For example, the adapter housing 13 may include a center plate 133 connected with the adapter member 122, a cylinder sidewall 134 surrounding the center plate 133, and a housing 135 buckled with the cylinder sidewall 134 so that the housing 135 is connected with the center plate 133, and the center plate 133, the cylinder sidewall 134, and the housing 135 may enclose an accommodation space. In other words, the adapter housing 13 may form the accommodation space for accommodating the electronic components. The electronic components may include the battery 14 or the main board 15, or may include a switch assembly 162 and/or a function assembly 17, or other light sources such as an LED or a light guide post thereof. The battery 14 or the main board 15 may be supported and fixed by the adapter housing 13 and may be located on a side of the adapter housing 13 facing the transducer device 112. For example, the battery 14 or the main board 15 may be provided between the housing 135 and the center plate 133. In such cases, the core housing 111 and the housing 135 may be respectively disposed on opposite sides of the center plate 133, and the battery 14 and the main board 15 may be provided at intervals from the core housing 111 along the vibration direction of the transducer device 112, i.e., the battery 14 or the main board 15 is provided in layers inside and outside with the core module 11. Obviously, in some other embodiments in which the transducer housing 13 does not include the housing 135, the battery 14 or the main board 15 and the core housing 111 may be located on the same side of the center plate 133. Correspondingly, the rotating shaft cavity 131 may be provided on the cylinder sidewall 134 and the center plate 133, and the adapter member 122 may also be rotationally connected with the center plate 133; and the core housing 111 may be rotationally connected with the cylinder sidewall 134.

Figure 32:
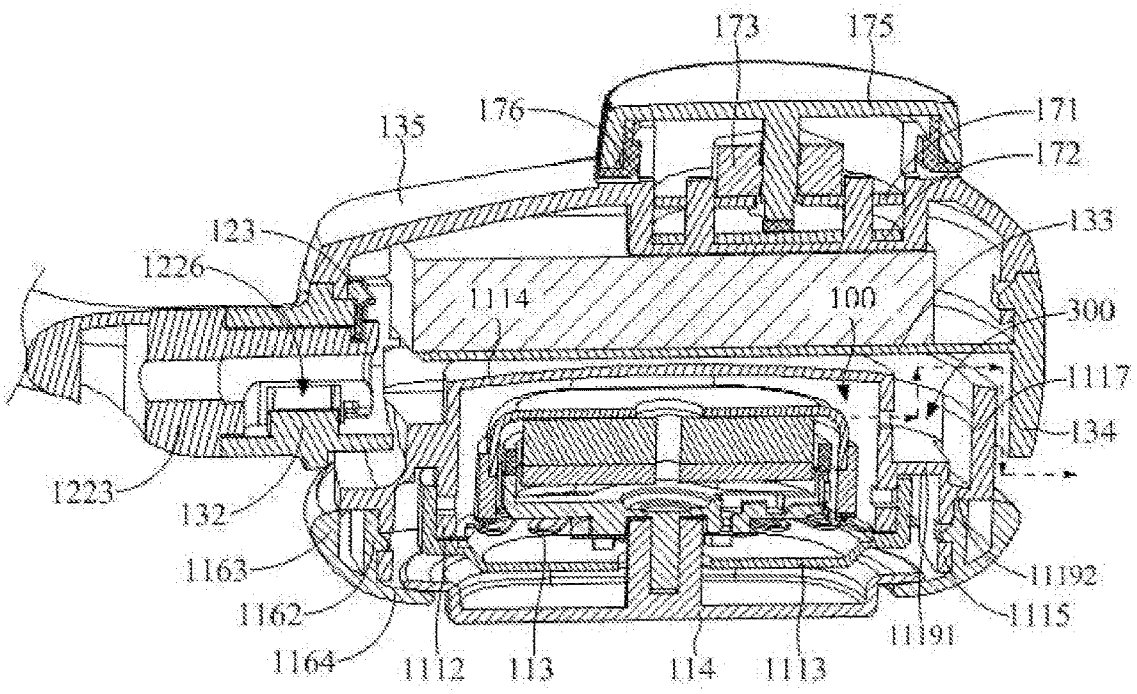
FIG. 32 is a schematic diagram illustrating a cross-sectional structure of a headphone as described in FIG. 12.

The inventors of the present disclosure have found in the course of long-term research and development that: in combination with FIG. 23 and FIG. 32, when the battery 14 and the transducer device 112 are disposed together at intervals along the vibration direction of the transducer device 112, a ratio of the capacity of the battery 14 to a sum of a weight of the core housing 111 and the weight of the battery 14 may be between 11 mAh/g and 24.5 mAh/g, which is conducive to prolonging battery life of the headphone 10 while taking into account the weight of the headphone 10 at the core module 11. Further, in the embodiment in which the headphone 10 includes the adapter housing 13 connected with the core housing 111, the battery 14 may drive two housing including the core housing 111 and the adapter housing 13 because the adapter housing 13 is rigidly connected with the core housing 111, which is more power-consuming, and thus the battery 14 needs a larger capacity. In such cases, the battery 14 is provided in the adapter housing 13, and the ratio of the capacity of the battery 14 to the sum of the weight of the core housing 111 and the weight of the adapter housing 13 may be between 55 mAh/g and 220 mAh/g, which is conducive to prolonging the battery life of the headphone 10 while taking into account the weight of the headphone 10 at the core module 11. The capacity of the battery 14 may be greater than or equal to 200 mAh, the sum of the weight of the core housing 111 and the weight of the battery 14 may be between 9 g and 20 g, and the sum of the weight of the core housing 111 and the weight of the adapter housing 13 may be between 1 g and 4 g. Further, since the transducer device 112 mainly transmits the mechanical vibration to the user through the vibration panel 114, when the capacity of the battery 14 is determined, the larger the contacting area between the vibration panel 114 and the skin of the user, the higher the efficiency of the vibration panel 114 transmitting the mechanical vibration, and the heavier the weight of the vibration panel 114; the smaller the contacting area between the vibration panel 114 and the skin of the user, the lower the efficiency of the vibration panel 114 transmitting the mechanical vibration, and the lighter the weight of the vibration panel 114. In such cases, a ratio of the capacity of the battery 14 to the contacting area between the vibration panel 114 and the skin of the user may be between 0.37 $mAh/mm^2$ and $0.73/mm^2$. In particular, the contacting area between the vibration panel 114 and the skin of the user may be between 300 $mm^2$ and 600 $mm^2$.

Figure 34:
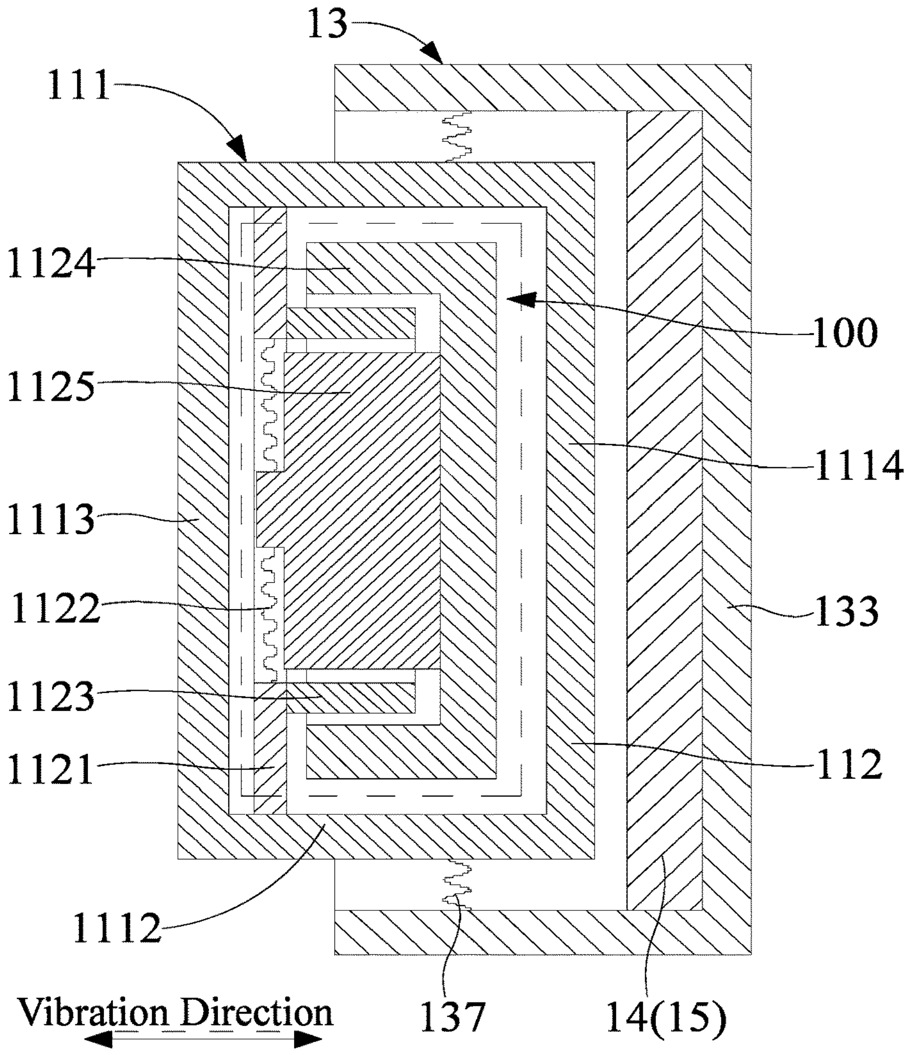
FIG. 34 is a schematic diagram illustrating an exemplary headphone according to some embodiments of the present disclosure.

Further, in conjunction with FIG. 34, the transducer device 112 may be rigidly connected with the core housing 111, for example, the coil 1123 may be rigidly connected with the core housing 111, or as another example, the coil 1123 is connected with the frame 1121 and the frame 1121 may be rigidly connected with the core housing 111, i.e., the transducer device 112 is not elastically connected with the core housing 111 through the first vibration plate 113. In such cases, the coil 1123 drives the core housing 111 to vibrate, i.e., the core housing 111 vibrates with the transducer device 112, thereby transmitting the mechanical vibration generated by the transducer device 112 to the skin of the user through the core housing 111. Correspondingly, the core housing 111 may be elastically connected with the adapter housing 13, for example, the core housing 111 is connected with the cylinder sidewall 134 through the elastic connecting member 137, and the core housing 111 or the adapter housing 13 is connected with the header-beam assembly 12 to attenuate the vibration of the adapter housing 13 along with the transducer device 112, thereby reducing the sound leakage of the headphone 10. The adapter housing 13 is provided in layers with the core housing 111 along the vibration direction of the transducer device 112 and is disposed on a side of the core housing 111 away from the vibration panel 114. The adapter housing 13 has a first projection area, on a reference plane perpendicular to the vibration direction, such as an area of the center plate 133, the core housing 111 has a second projection area on the reference plane, such as an area of the second endwall 1114, a ratio of the first projection area to the second projection area may be between 0.2 and 1.5, preferably between 0.2 and 1, more preferably between 0.2 and 0.5, which may attenuate a baffling effect and thereby reducing the sound leakage of the headphone 10. Further, along the vibration direction of the transducer device 112, a gap between the core housing 111 and the adapter housing 13 may be between 1 mm and 10 mm, preferably between 2 mm and 8 mm, which may attenuate the acoustic cavity effect and thereby reducing the sound leakage of the headphone 10. When either of the core housing 111 and the adapter housing 13 is an irregular structure, for example, either of a side of the core housing 111 facing the adapter housing 13 and a side of the adapter housing 13 facing the core housing 111 is a non-planar structure, or the side of the core housing 111 facing the adapter housing 13 and the side of the adapter housing 13 facing the core housing 111 is a planar structure but are not parallel, the gap between the core housing 111 and the adapter housing 13 may be referred to as a minimum gap between the core housing 111 and the adapter housing 13. It should be noted that the baffle effect is that the adapter housing 13 may change the propagation direction of the sound leakage on a side of the core housing 111 away from the vibration panel 114, and a large sound leakage directly in front of the user in the wearing state is not desired in the present disclosure; the acoustic cavity effect is that the gap between the adapter housing 13 and the core housing 111 may form an acoustic cavity, the sound leakage is generated due to an air-conduction resonance of the acoustic cavity, which is not desired in the present disclosure.

Figure 25:
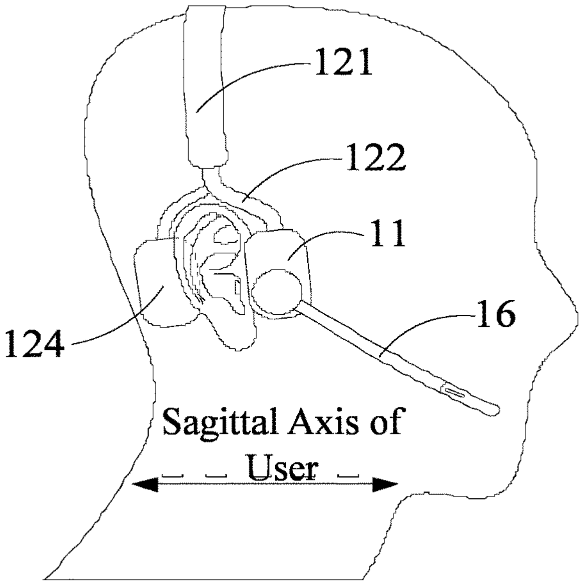
FIG. 25 is a schematic diagram illustrating an exemplary headphone in a wearing state according to some embodiments of the present disclosure.
Figure 26:
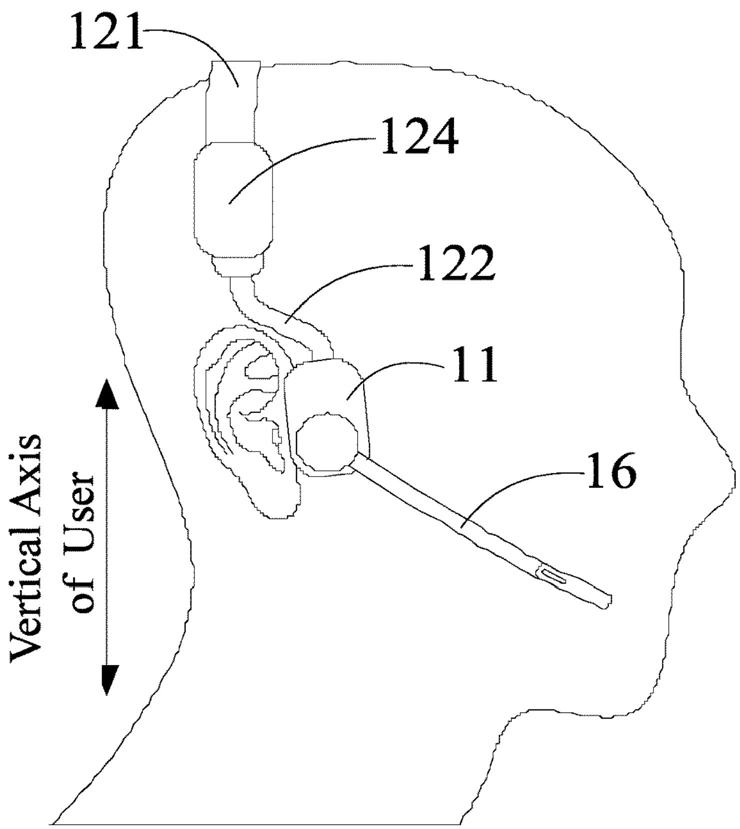
FIG. 26 is a schematic diagram illustrating an exemplary headphone in a wearing state according to some embodiments of the present disclosure.

It should be noted that: in other embodiments where the core module 11 does not rotate relative to the header-beam assembly 12 or where the core module 11 rotates around merely one axis (e.g., the second axis A2), the headphone 10 may not include an adapter housing 13, for example, the adapter member 122 is fixedly or rotationally connected with the core housing 111. Further, in conjunction with FIGS. 25 and 26, the battery 14 or the main board 15 may also be provided at a position other than the region where the core module 11 is located. For example, the headphone 10 may also include the supporting member 124 connected with the header-beam assembly 12, and the battery 14 or the main board 15 may be provided within the supporting member 124. The supporting member 124 may be configured as a portion of the header-beam assembly 12, and obviously, the battery 14 or the main board 15 may be provided directly within the header-beam assembly 12 (e.g., the arcuate header-beam member 121). In conjunction with FIG. 25, in the wearing state, the supporting member 124 is provided at intervals from the core module 11 along the sagittal axis of the user, i.e., the battery 14 or the main board 15 is provided in layers front to back with the core module 11, e.g., the core module 11 is closer to a front side of the head of the user relative to the supporting member 124. In conjunction with FIG. 26, in the wearing state, the supporting member 124 is provided at intervals from the core module 11 along the vertical axis of the user, for example, the core module 11 is farther away from the top of the head of the user relative to the supporting member 124.

In conjunction with FIGS. 27 to 28 and FIGS. 20 to 21, the core housing 111 may be rotated around a first axis A1 relative to the adapter housing 13, and the surrounding edge 116 may be connected with an end of the core housing 111 away from the adapter housing 13, i.e., the surrounding edge 116 may be connected with the end of the core housing 111 that is close to the vibration panel 114. The surrounding edge 116 may include a connecting portion 1162 connected with the core housing 111 and a flange portion 1163 connected with the connecting portion 1162, at least a portion of the flange portion 1163 is provided at intervals from the adapter housing 13 (e.g., the cylinder sidewall 134) along the vibration direction of the transducer device 112 to allow rotation of the core module 11 relative to the adapter housing 13. Viewed along the vibration direction of the transducer device 112, the flange portion 1163 is disposed at the periphery of the core housing 111 and overlaps the adapter housing 13 (e.g., the cylinder sidewall 134). Therefore, an angle of the core module 11 rotating relative to the adapter housing 13 may be limited to a certain angle range, for example between 5° and 15°, which facilitates the headphone 10 to adapt to the contour of the head of the user and facilitates the user to wear the headphone 10. Further, in the non-wearing state, with the axis (e.g., the first axis A1) of the core housing 111 rotating relative to the adapter housing 13 as a starting point, a gap (e.g., as shown by W in FIGS. 27 and 28) between the flange portion 1163 and the adapter housing 13 in the vibration direction of the transducer device 112 gradually increases along a reference direction, wherein the reference direction is defined as a direction that is perpendicular to the vibration direction and a direction where the first axis is located and is away from the first axis. The reference direction may be parallel to a second axis direction A2. Therefore, the total size of the core module 11 and the adapter housing 13 along the vibration direction of the transducer device 112 may be reduced, thereby making the structure of the headphone 10 more compact.

For example, a maximum distance (e.g., shown as W in FIG. 27) between the flange portion 1163 and the adapter housing 13 along the vibration direction of the transducer device 112 may be between 2 mm and 5 mm, preferably between 2.5 mm and 4 mm, and a minimum gap (e.g., shown as W in FIG. 28) may be zero or close to zero, and the minimum gap may be just enough for the core housing 111 to rotate relative to the adapter housing 13.

Further, viewed along the direction where the axis of the core housing 111 rotating relative to the adapter housing 13 (e.g., the first axis A1) is located, a side of the flange portion 11 facing the adapter housing 13 may be provided in an arcuate shape to increase the appearance quality of the headphone 10. An arc radius of the side of the flange portion 1163 facing the adapter housing 13 is greater than or equal to 50 mm to make the degree of bending of the flange portion 1163 not abnormally large, i.e., the flange portion 1163 extends in a relatively smooth bending, thereby improving the appearance quality of the headphone 10.

For example, the core housing 111 may include a first core housing 111*a*, a second core housing 111*b*, and the surrounding edge 116, and the second core housing 111*b* and the surrounding edge 116 may be connected with the first core housing 111*a*, respectively. The first core housing 111*a* may include the inner cylinder wall 1112 and a first outer cylinder wall 1115, the inner cylinder wall 1112 is disposed at the periphery of the transducer device 112, and the first outer cylinder wall 1115 is disposed at the periphery of the inner cylinder wall 1112 and is provided at intervals from the inner cylinder wall 1112 along the direction perpendicular to the vibration direction of the transducer device 112. Further, the second core housing 111*b* is connected with the inner cylinder wall 1112, and the surrounding edge 116 is connected with the first outer cylinder wall 1115 and surrounds the vibration panel 114. In such cases, the mounting hole 1111 may be provided on the second core housing 111*b* such that the structure of the core module 11 is simplified and the assembly is simplified. Specifically, the transducer device 112 and the first vibration plate 113 may be first mounted in the inner cylinder wall 1112, then the second core housing 111*b* is connected with the inner cylinder wall 1112, then the vibration panel 114 is connected with the transducer device 112 through the connecting member 115, and finally, the surrounding edge 116 is connected with the first outer cylinder wall 1115.

In some embodiments, the second core housing 111*b* may include the first end wall 1113 and a cylinder sidewall 1116 connected with the first end wall 1113, the cylinder sidewall 1116 is disposed between the inner cylinder wall 1112 and the first outer cylinder wall 1115 and is clamped to the inner cylinder wall 1112. For example, one of the inner cylinder wall 1112 and the cylinder sidewall 1116 is provided with a clamping groove, and the other is provided with an inverted buckle that cooperates with the clamping groove to realize a clamping connection between the second core housing 111*b* and the first core housing 111*a*. In some other embodiments, the second core housing 111*b* may also include merely a first end wall 1113, the first end wall 1113 covers an end surface of the inner cylinder wall 1112, and the first end wall 1113 and the inner cylinder wall 1112 may be connected through a hot melt post. Further, when the second core housing 111*b* is clamped to the first core housing 111*a*, a peripheral region of the first vibration plate 113 may also be abutted against the end surface of the inner cylinder wall 1112, and obviously, the first vibration plate 113 may be clamped or glued to the inner cylinder wall 1112.

In some embodiments, one of the connecting portion 1162 and the first outer cylinder wall 1115 is provided with a clamping groove, and the other is provided with the inverted buckle that cooperates with the clamping groove to realize a clamping connection between the surrounding edge rim 116 and the first core housing 111*a*. The connection portion 1162 may be provided in a cylinder shape and may be disposed at the periphery of the first outer cylinder wall 1115; the flange portion 1163 is correspondingly disposed at the periphery of a first outer cylinder wall 1115.

Further, a side of the vibration panel 114 away from the transducer device 112 may include an edge region 1143 connected with the skin contacting region 1141, the edge region 1143 is located at the periphery of the skin contacting region 1141 and provided at intervals from the skin contacting region 1141 along the vibration direction of the transducer device 112, e.g., the plane in which the edge region 1143 is located is parallel to a plane in which the skin contacting region 1141 is located. Correspondingly, the surrounding edge 116 may include a limiting portion 1164 connected with the connecting portion 1162, the limiting portion 1164 is disposed on a side of the vibration panel 114 away from the transducer device 112. Viewed along the vibration direction of the transducer device 112, the limiting portion 1164 overlaps the edge region 1143 and is staggered from the skin contacting region 1141. Therefore, the surrounding edge 116 may not affect the vibration panel 114 to vibrate with the transducer device 112 and may prevent the vibration panel 114 from falling off, thereby increasing the stability of the headphone 10. Correspondingly, in the non-wearing state, the skin contacting region 1141 may protrude the side of the limiting portion 1164 away from the transducer device 112 along the vibration direction of the transducer device 112.

Based on the related description above and in conjunction with FIG. 6, the side of the vibration panel 114 away from the transducer device 112 may also include an air-conduction enhancement region 1142, and the air-conduction enhancement region 1142 may be connected between the skin-contacting region 1141 and the edge region 1143. Since the edge region 1143 may not contact the skin of the user, at least a portion of the edge region 1143 that is not obstructed by the limiting portion 1164 may also be used as the air-conduction enhancement region 1142, thereby increasing the size of the air-conduction enhancement region 1142 to improve an enhancement effect of the air-conduction sound to the bone-conduction sound.

For example, the connecting member 115 may include a first connecting member 1151 connected with the transducer device 112 and a second connecting member 1152 connected with the vibration panel 114, for example, the first connecting member 1151 and the frame 1121 are integrally molded, and the second connecting member 1152 and the vibration panel 114 are integrally molded. One of the first connection member 1151 and the second connection member 1152 may be a cylinder-shaped structure, another of the first connection member 1151 and the second connection member 1152 may be a rod-shaped structure, and the rod-shaped structure is embedded within the cylinder-shaped structure to make the connection member 115 connect the transducer device 112 with the vibration panel 114.

Further, the first core housing 111*a* may also include a second outer cylinder wall 1117, the second outer cylinder wall 1117 is disposed at the periphery of the inner cylinder wall 1112 and provided at intervals from the inner cylinder wall 1112 along the direction perpendicular to the vibration direction of the transducer device 112. The second outer cylinder wall 1117 and the first outer cylinder wall 1115 extend along opposite directions to respectively connect the adapter housing 13 and the surrounding edge 116. The second outer cylinder wall 1117 is disposed on the inner side of the flange portion 1163, such that the flange portion 1163 may overlap with the cylinder sidewall 134 along the vibration direction of the transducer device 112. Correspondingly, the cylinder sidewall 134 may be disposed at the periphery of the second outer cylinder wall 1117, one of the cylinder sidewall 134 and the second outer cylinder wall 1117 may be provided with a shaft hole, and the other of the cylinder sidewall 134 and the second outer cylinder wall 1117 may be provided with a rotating shaft cooperating with the shaft hole, the rotating shaft is embedded in the shaft hole such that the core housing 111 may rotate relative to the adapter housing 13. Considering the appearance quality of the headphone 10 and the wall thickness of the cylinder sidewall 134, the shaft hole is preferably provided on the second outer cylinder wall 1117, and the rotating shaft is correspondingly provided on the cylinder sidewall 134. Further, to increase the reliability of a rotational connection between the core housing 111 and the adapter housing 13, a first core housing 111*a* may also include a reinforcing post 1118, and the reinforcing post 1118 may connect the second outer cylinder wall 1117 with the inner cylinder wall 1112, thereby locally reinforcing the second outer cylinder wall 1117 to facilitate providing of the shaft hole. For example, the cylinder sidewall 134 is provided with a rotating shaft 136, the reinforcing post 1118 is provided with the shaft hole, and the rotating shaft 136 extends into the shaft hole of the reinforcing post 1118.

Based on the related descriptions above, and in conjunction with FIGS. 8 and 9, the core module 11 may be provided with an acoustic cavity in flow communication with the accommodating cavity 100, the acoustic cavity is configured to absorb acoustic energy of the sound wave generated by vibrations of air in the accommodating cavity 100 vibrating with the transducer device 112, and the sound wave may be outputted to the exterior of the headphone 10 through the mounting hole 1111 to generate the air-conduction sound. The second outer cylinder wall 1117, the inner cylinder wall 1112, and a transition wall 1119 may enclose the acoustic cavity. Based on this, the first core housing 111*a* may enclose an acoustic cavity, such as a Helmholtz resonance cavity 200. The first core housing 111*a* may enclose with the adapter housing 13 to form the acoustic cavity, such as an audio filter 300.

For example, the first core housing 111*a* may further include a transition wall 1119 and a cover plate 1120 that are connected between the inner cylinder wall 1112 and the second outer cylinder wall 1117, the transition wall 1119 and the cover plate 1120 are provided at intervals along the vibration direction of the transducer device 112, and enclose the Helmholtz resonance cavity 200 with the inner cylinder wall 1112 and the second outer cylinder wall 1117. In such cases, the inner cylinder wall 1112 may be provided with a connecting hole realizing flow communication between the Helmholtz resonance cavity 200 and the accommodating cavity 100. The transition wall 1119 may also be connected between the first outer cylinder wall 1115 and the inner cylinder wall 1112, i.e., the second outer cylinder wall 1117 and the first outer cylinder wall 1115 are respectively disposed on opposite sides of the transition wall 1119, and extend in opposite directions.

Further, the transition wall 1119 and the cover plate 1120 may be disposed away from each other along the vibration direction of the transducer device 112 to increase the volume of the Helmholtz resonance cavity 200, such that the Helmholtz resonance cavity 200 may absorb the acoustic energy in a wider frequency band, i.e., the frequency response curve is flat in the wider frequency band, thereby making the sound quality of the headphone 10 more balanced. Therefore, the cover plate 1120 may be flush with the second end wall 1114 to enlarge the Helmholtz resonance cavity 200 along the vibration direction of the transducer device 112, and the second outer cylinder wall 1117 may be disposed at the periphery of the first outer cylinder wall 1115 to enlarge the Helmholtz resonance cavity 200 along the direction perpendicular to the vibration direction of the transducer device 112, such that the structure of the core module 11 is more compact. When the Helmholtz resonance cavity 200 meets corresponding acoustic requirements, the second outer cylinder wall 1117 may also be disposed on the inner side of the first outer cylinder wall 1115 or overlap with the first outer cylinder wall 1115 along the vibration direction of the transducer device 112. Further, in conjunction with FIG. 32, the transition wall 1119 may include a first sub-transition wall 11191 and a second sub-transition wall 11192, the first sub-transition wall 11191 connects the inner cylinder wall 1112 with the first outer cylinder wall 1115, and the second sub-transition wall 11192 connects the first outer cylinder wall 1115 with the second outer cylinder wall 1117. The first sub-transition wall 11191 and the second sub-transition wall 11192 are disposed at intervals along the vibration direction of the transducer device 112, and the second sub-transition wall 11192 is farther away from the center plate 133 than the first sub-transition wall 11191, i.e., closer to the vibration panel 114, to fully utilize a peripheral region where the flange portion 1163 is disposed in the surrounding edge 116 and a height difference of clamping positions of the surrounding edge 116 and the second housing 111*b* respectively clamping with the first core housing 111*a* in the vibration direction of the transducer device 112, thereby further enlarging the Helmholtz resonance cavity 200 along the vibration direction of the transducer device 112.

It should be noted that in some other embodiments where the core housing 111 does not rotate relative to the adapter housing 13, the first core housing 111*a* may not include a cover plate 1120, and one end of the Helmholtz resonance cavity 200 close to the second end wall 1114 may be sealed by a center plate 133. In some other embodiments, the acoustic cavity is the audio filter 300, in conjunction with FIG. 32, the first core housing 111*a* may also not include a cover plate 1120 to allow a sound wave generated by the vibrations of the air in the accommodating cavity 100 vibrating with the transducer device 112 to be transmitted to the exterior of the headphone 10 through a gap between the second outer cylinder wall 1117 and the cylinder sidewall 134 or other pathway (e.g., a path shown by a dashed line in FIG. 32). In other words, the audio filter 300 of the present disclosure may be enclosed by the second end wall 1114, the inner cylinder wall 1112, the transition wall 1119, and the second outer cylinder wall 1117 with the center plate 133 and the cylinder sidewall 134, and the sound wave are absorbed by the audio filter 300 and then transmitted to the exterior of the headphone 10 through the gap between the cylinder sidewall 134 and the second outer cylinder wall 1117. In such cases, the inner cylinder wall 1112 may be provided with a communicating hole for realizing flow communication between the audio filter 300 and the accommodating cavity 100. Correspondingly, a gap between the center plate 133 and the second end wall 1114 along the vibration direction of the transducer device 112 may be larger than a gap between the cylinder sidewall 134 and the second outer cylinder wall 1117 in the direction perpendicular to the vibration direction of the transducer device 112, so that the sound wave generated by the vibrations of the air in the accommodating cavity 100 vibrating with the transducer device 112 is transmitted to the exterior of the headphone 10 through the gap between the second outer cylinder wall 1117 and the cylinder sidewall 134 and the volume of the audio filter 300 may be increased to absorb the acoustic energy within a wider frequency band. A gap between the second outer cylinder wall 1117 and the inner cylinder wall 1112 along the direction perpendicular to the vibration direction of the transducer device 112 may be larger than a gap between the center plate 133 and the second end wall 1114 along the vibration direction of the transducer device 112, such that the space at the periphery of the inner cylinder wall 1112 is utilized to increase the volume of the audio filter 300. Further, in some other embodiments where the core module 11 is not provided with the acoustic cavity or the Helmholtz resonance cavity 200 is provided on the transducer device 112, the first core housing 111*a* may not include the cover plate 1120, and the transition wall 1119 may be a discontinuous structure that satisfies a connection between the first outer cylinder wall 1115, the second outer cylinder wall 1117, and the inner cylinder wall 1112. In such cases, the second outer cylinder wall 1117 may be disposed on the inner side of the first outer cylinder wall 1115 or overlap with the first outer cylinder wall 1115 along the vibration direction of the transducer device 112 to make the structure of the core module 11 more compact.

Figure 29:
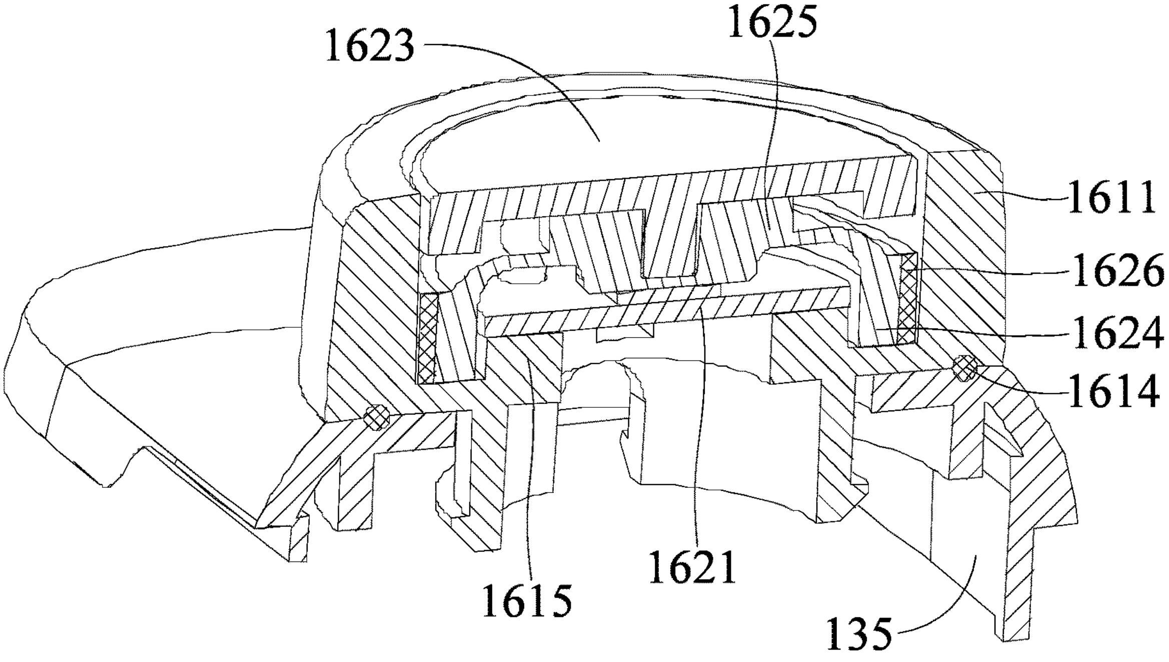
FIG. 29 is a schematic diagram illustrating a cross-sectional structure of a headphone in another view of FIG. 27.

In conjunction with FIG. 24, FIG. 27, and FIG. 29, the headphone 10 may further include a stick microphone assembly 16 coupled to a housing, and the stick microphone assembly 16 may rotate relative to the housing. When the headphone 10 is not provided with the adapter housing 13, the housing may be the core housing 111. When the headphone 10 is provided with the adapter housing 13, the housing may be the core housing 111 or the adapter housing 13. The present embodiment illustrates the housing as a housing 135, i.e., the stick microphone assembly 16 is connected with the housing 135 and may be rotated relative to the housing 135. Further, the stick microphone assembly 16 may include a pickup assembly 161 and a switch assembly 162, and the switch assembly 162 may be provided on the pickup assembly 161 to extend the function of the headphone 10.

For example, the pickup assembly 161 may include a pivot connecting block 1611, a connecting rod 1612, and a pickup 1613, the pivot connecting block 1611 is configured to be pivotally connected with the housing (e.g., the housing 135). For example, a portion of the pivot connecting block 1611 is embedded into a pivot hole of the housing 135, and an end of the connecting rod 1612 is connected with the pivot connecting block 1611, for example, both the housing 135 and the pivot connecting block are locked through the locking member 1616, and the pickup 1613 is provided at another end of the connecting rod 1612. The pickup assembly 161 may include one pickup 1613 configured to collect the voice of the user or may include two pickups 1613, one of the two pickups 1613 is configured to collect the voice of the user and the other one of the two pickups 1613 is configured to reduce the noise. Further, a side of the pivot connecting block 1611 away from the housing may be provided with a recessed region, and the switch assembly 162 may be provided in the recessed region to make the structure of the headphone 10 more compact. A side of the switch assembly 162 away from the housing may be (approximately) flush with the pivot connecting block 1611. Further, the pickup assembly 161 may also include a sealing ring 1614, and the sealing ring 1614 may be disposed at the periphery of the pivot hole of the housing 135 and provided between an end surface of the pivot connecting block 1611 facing the housing 135 and an end surface of the housing 135 facing the pivot connecting block 1611, such that when the stick microphone assembly 16 is assembled and connected with the housing 135, the sealing ring 1614 may be pressed, which may be simply and reliable.

Figure 62:
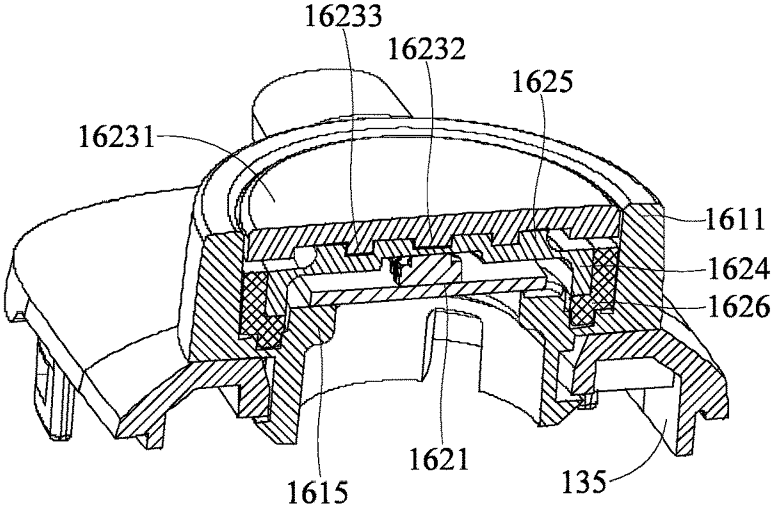
FIG. 62 is a schematic diagram illustrating a cross-sectional structure of a headphone in FIG. 27 according to some embodiments of the present disclosure.

In conjunction with FIG. 29, a protrusion 1615 is provided on the bottom of the recessed region, and an outer peripheral wall of the protrusion 1615 and a sidewall of the recessed region form a ring groove. Correspondingly, the switch assembly 162 may include a switch circuit board 1621, an elastic supporting member 1622, and a key 1623, the switch circuit board 1621 is coupled to the main board 15 and may be disposed on the top of the protrusion 1615, the elastic supporting member 1622 is connected to a sidewall and/or a bottom of the recessed region on the pivot connecting block 1611 and is configured to support the key 1623, the key 1623 may be disposed facing the switch circuit board 1621 (e.g., a flick switch on the switch circuit board 1621) in a preset pressing direction to receive a pressing force applied by the user and trigger the switch circuit board 1621 through the elastic supporting member 1622. The elastic supporting member 1622 may include a ring fixing portion 1624 and an elastic supporting portion 1625, wherein the ring fixing portion 1624 is fixed within the ring groove, and the elastic supporting portion 1625 is connected with the ring fixing portion 1624 and may be provided in a shape of dome such that the elastic supporting portion 1625 may deform relative to the ring fixing portion 1624 under the action of an external force and generating a displacement close to the switch circuit board 1621. In such cases, the key 1623 may be provided on the elastic supporting portion 1625. The key 1623 may include a key cap and a key rod connected with the key cap, the key cap is supported on the elastic supporting portion 1625, and the key rod is embedded in a blind hole preset on the elastic supporting portion 1625. However, the inventors of the present disclosure have found in the course of long-term research and development that: in the embodiment shown in FIG. 29, since a key rod of the key 1623 is high, i.e., the key rod is embedded deeply in the elastic supporting portion 1625, which is likely to lead to a technical problem that the key 1623 is jammed with an inner wall of the pivot connecting block 1611 due to a leverage effect when the user presses an edge of the key cap of the key 1623. Furthermore, because the elastic supporting portion 1625 is thick, a rebound effect after the user presses the key 1623 may be relatively poor. To this end, in conjunction with FIG. 62, the key 1623 may include a key cap 16231, a key rod 16232, and a ring flange 16233. The key rod 16232 and the ring flange 16233 are connected with the same side of the key cap 16231, and the ring flange 16233 encircles the key rod 16232. The key rod 16232 and the ring flange 16233 are embedded in the elastic supporting section 1625, for example, the key rod 16232 and the ring flange 16233 are respectively embedded in a blind hole preset on the elastic supporting section 1625. The key rod 1623 overlaps with a switching element protruding from the switching circuit board 1621 when the key rod 16232 is projected orthographically onto the switching circuit board 1621 along a pressing direction of the key 1623, which is conducive to triggering the switching circuit board 1621 when the user presses the key 1623. Therefore, under a restriction of the ring flange 16233, a leverage effect of the edge of the key cap 16231 relative to the key cap 16231 may be weakened, thereby solving the technical problem that the key cap 1623 jamming against the inner wall of the pivot connecting block 1611. A protruded height of the ring flange 16233 may be equal to a protruded height of the key rod 1623 to prevent the ring flange 16233 from being too short to play a corresponding role. Further, the protruded height of the key rod 16232 is less than or equal to a protruded height of the switch element on the switch circuit board 1621, which is conducive to reducing the thickness of the elastic supporting portion 1625 to increase the rebound effect after the user presses the key 1623.

The ring fixing portion 1624 may be integrally formed with the elastic supporting portion 1625, such as a silicone member. In such cases, the switch assembly 162 may also include a reinforcing ring 1626, the reinforcing ring 1626 is provided on the ring fixing portion 1624 along the periphery of the ring fixing portion 1624 and is fixedly connected with the pivot connecting block 1611. For example, the reinforcing ring 1626 is sleeved on the periphery of the ring fixing portion 1624, and an outer peripheral wall of the reinforcing ring 1626 is fixedly connected (e.g., through a clamping connection) with a sidewall of the recessed region. Therefore, when the user presses the switch assembly 162, the periphery of the elastic supporting portion 1625 may uniformly deform relative to the ring fixing portion 1624, thereby increasing the reliability and a pressing feel of the switch assembly 162. The reinforcing ring 1626 may be a metal member or a hard plastic member. In addition, since the volume of the recessed region on the pivot connecting block 1611 is limited, an area of the bottom of the ring groove is also limited, and the elastic supporting member 1622 is connected with the pivot connecting block 1611 through the reinforcing ring 1626 in a lateral direction at the same time, which is conducive to improving the reliability of a connection between the elastic supporting member 1622 and the pivot connecting block 1611. If the volume of the recessed region on the pivot connecting block 1611 is sufficiently large so that the area of the bottom of the ring groove is consequently sufficiently large, the elastic supporting member 1622 may also be directly connected with the bottom of the ring groove without the reinforcing ring 1626.

It should be noted that in some other embodiments where the headphone 10 is not provided with a stick assembly 16, the switch assembly 162 may also be provided directly on the housing (e.g., the core housing 111 or the housing 135) of the headphone 10.

Further, the switch assembly 162 may include a rigid spacer 1627 connected with the elastic supporting member 1622, for example, the rigid spacer 1627 is a hard plastic member such as PET and is connected with the elastic supporting portion 1625, such that the elastic supporting member 1622 triggers a flick switch through the rigid spacer 1627, which may prevent the flick switch on the switch circuit board 1621 from piercing the elastic supporting member 1622, thereby increasing the reliability of the switch assembly 162.

The inventor of the present disclosure found in the long-term research and development process that: the transducer device 112 may drive the elastic supporting member 1622 connected with the housing (such as the core housing 111 or the housing 135) to vibrate, thereby driving the key 1623, the rigid spacer 1627, etc. connected with the elastic supporting member 1622 to vibrate, in vibration modes generally including an up and down vibration, a swing vibration, and other vibration modes. In an up-and-down vibrating mode, the rigid spacer 1627 may directly collide with the flick switch on the switch circuit board 1621 and produce noise; and in the swing vibration mode, the rigid spacer 1627 may have relative sliding friction with the flick switch on the switch circuit board 1621, which may cause an up and down vibration and produce a harmonic sound that is an integer multiple of the vibration frequency of the transducer device 112, that is noise. In this regard, the present disclosure proposes the following embodiments to improve the problem of the noise of the headphone 10.

Figure 30:
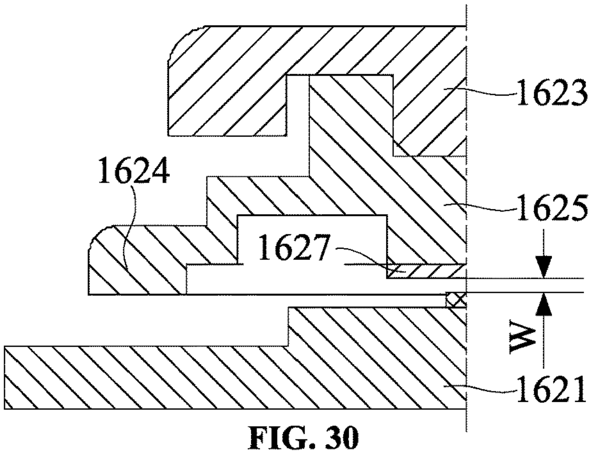
FIG. 30 is a schematic diagram illustrating a cross-sectional structure of a headphone according to some embodiments of the present disclosure.

In some embodiments, in conjunction with FIG. 30, in a non-pressed state, a gap (e.g., shown as W in FIG. 30) between the rigid spacer 1627 and the flick switch on the switch circuit board 1621 in a pressing direction may be larger than an amplitude of vibration of the key assembly vibrating the transducer device 112 to prevent the rigid spacer 1627 from colliding with the flick switch and generating noise, thereby increasing the reliability of the headphone 10. The key assembly of the present disclosure may include the elastic supporting member 1622 and the rigid spacer 1627 connected with the elastic supporting member 1622, and may also include the key 1623 connected with the elastic supporting member 1622. Further, the gap between the rigid spacer 1627 and the flick switch in the pressing direction may be greater than or equal to 0.1 mm, or may also be between 0.05 mm and 0.1 mm.

Figure 31:
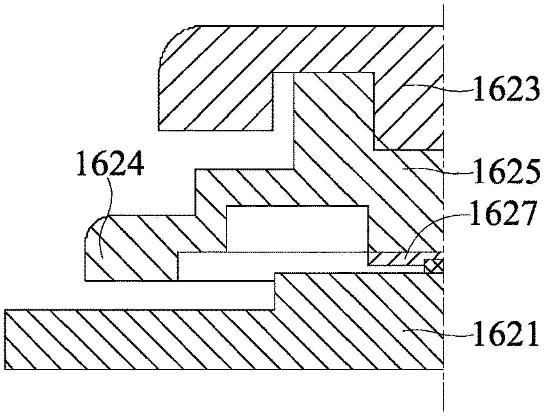
FIG. 31 is a schematic diagram illustrating a cross-sectional structure of a headphone according to some embodiments of the present disclosure.

In some other embodiments, in conjunction with FIG. 31, in the non-pressed state and during a process in which the key assembly vibrates with the transducer device 112, the flick switch on the switch circuit board 1621 moves together with the key assembly, that is, the rigid spacer 1627 is difficult to undergo a relative sliding friction with the flick switch, such that the noise is not generated by the key assembly due to a swing vibration of the key assembly, thereby increasing the reliability of the headphone 10. A portion of the flick switch on the switch circuit board 1621 may extend into the blind hole preset on the rigid spacer 1627 to prevent the rigid spacer 1627 from having relative sliding friction with the flick switch. Further, the inner surface of the blind hole may be a rough surface; and/or, an outer surface of the flick switch contacting the inner surface of the blind hole may also be a rough surface to increase static friction or dynamic friction, which may reduce the noise.

Further, viewed along the pressing direction of the switch assembly 162, the key assembly may be a non-circular structure to avoid the swing vibration of the key assembly with the transducer device 112.

Based on the relevant description above, the headphone 10 may include the sound pickup assembly 161, and the sound pickup assembly 161 may be configured to rotate relative to a housing such as the adapter housing 13 (specifically may be the housing 135) or the core housing 111 to adjust a position of the sound pickup assembly 161 relative to a physiological feature such as the mouth of a user in the wearing state, which facilitates the improvement of sound pickup effect of the sound pickup assembly 161. Based on this, and in conjunction with FIG. 58, the headphone 10 may include a damping member 163 provided between the sound pickup assembly 161 and the housing, the damping member 163 is configured to provide a damping feel when the user adjusts the position of the sound pickup assembly 161, and to maintain a position of the sound pickup assembly 161 relative to the housing after the user has adjusted the position of the sound pickup assembly 161 to a desired position.

Figure 58:
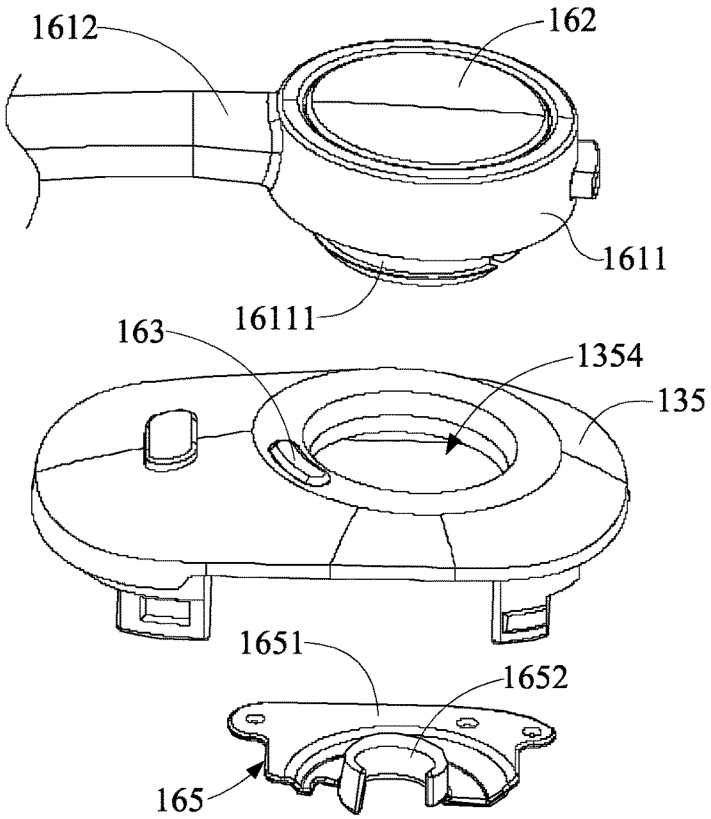
FIG. 58 is a schematic diagram illustrating a disassembled structure of a headphone according to some embodiments of the present disclosure.

For example, in conjunction with FIG. 58, one of the pivot connecting block 1611 and the housing (e.g., the housing 135) includes the pivot hole, and the other one of the pivot connecting block 1611 and the housing includes a pivot that extends into the pivot hole, i.e., the pivot connecting block 1611 and the housing are pivotally connected to facilitate a rotation of the pickup assembly 161 relative to the housing. For example, the housing includes a pivot hole 1354, and a side of the pivot connecting block 1611 facing the housing includes a pivot 16111 extending into the pivot hole 1354. Based on this, the damping member 163 may be disposed in a region where the pivot connecting block 1611 overlaps with the housing in an axial direction of the pivot hole 1354, and the damping member 163 is connected with one of the pivot connecting block 1611 and the housing and abuts the other one of the pivot connecting block 1611 and the housing to provide resistance during the rotation of the pickup assembly 161 relative to the housing. For example, the damping member 163 is provided within an accommodating slot of the housing and protrudes out of the accommodating slot of the housing to abut the pivot connecting block 1611. In other words, the damping member 163 may be disposed on an end surface of the housing facing the pivot connecting block 1611 in the axial direction of the pivot hole 1354. In addition, the damping member 163 may be disposed on a side of the housing facing the pivot 16111 in a circumference direction of the pivot hole 1354.

In some embodiments, when viewed along an axial direction of the pivot hole 1354, the damping member 163 may be arcuate and may be disposed concentrically with the pivot hole 1354 such that the pickup assembly 161 may rotate more smoothly.

In some embodiments, there may be a plurality of damping members 163, and the plurality of damping members 163 are provided at intervals around the pivot hole 1354 to make the resistance provided by the damping members 163 more uniform and the rotation of the pickup assembly 161 smoother.

Based on the relevant descriptions above, the pickup assembly 161 is provided with the pickup 1613 at the end of the pickup assembly 161, such that the pickup 1613 needs to be electrically connected with the circuit board such as the main board 15 through the wire 164, for example, the wire 164 may extend through an interior of the pivot connecting block 1611 and an interior of the connecting rod 1612 and be electrically connected with the pickup 1613 to prevent the wire 164 from being exposed. In addition, since the pickup assembly 161 needs to be rotated, there is a risk that the wire 164 may be worn to some extent.

Figure 59:
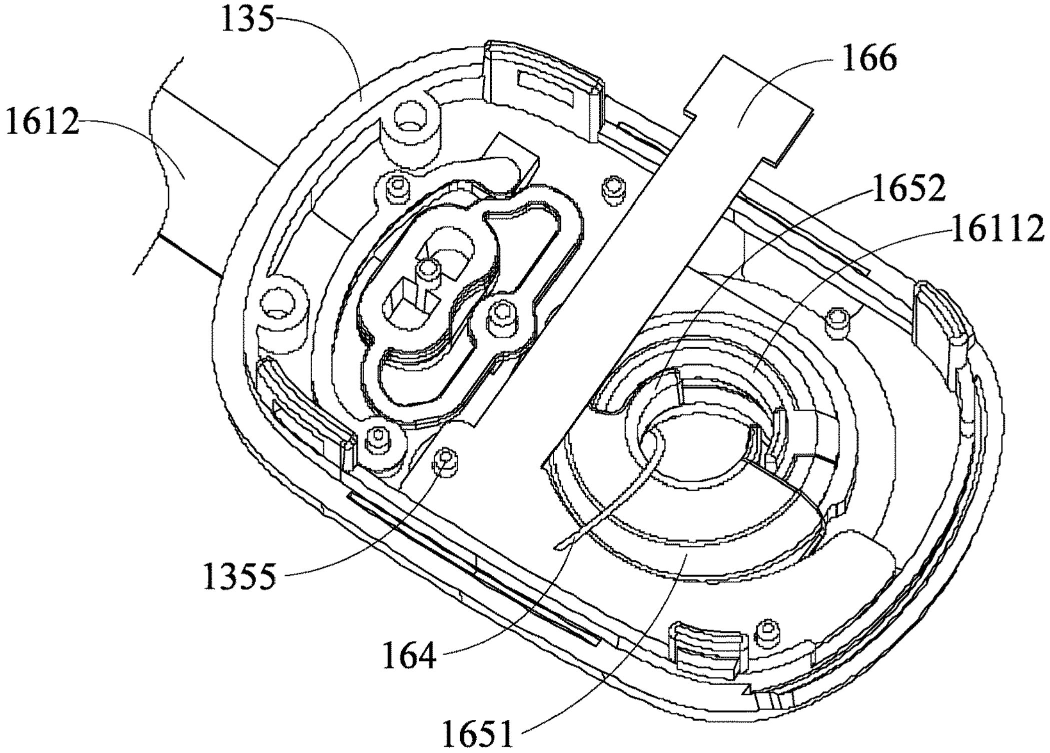
FIG. 59 is a schematic diagram illustrating a structure of a headphone in FIG. 58 in another view.
Figure 60:
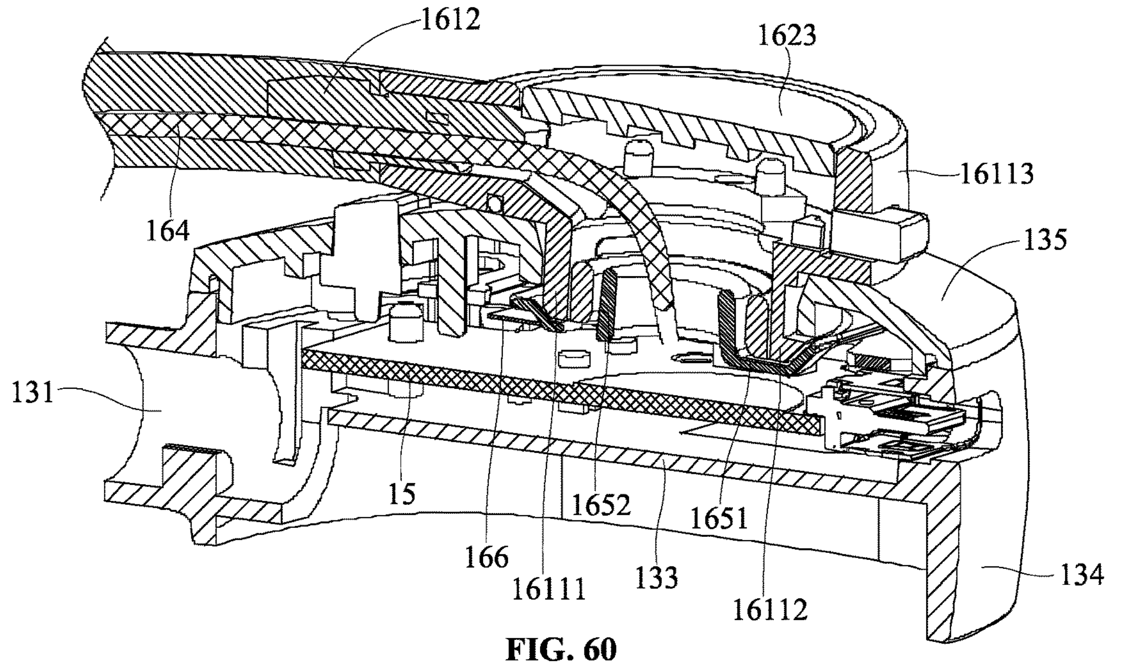
FIG. 60 is a schematic diagram illustrating a cross-sectional structure of a headphone according to some embodiments of the present disclosure.

For example, in conjunction with FIGS. 58 to 60, the headphone 10 includes a spacer 165 fixed within a housing such as the adapter housing 13 (specifically the housing 135) or the core housing 111, the spacer 165 keeps the pivot connecting block 1611 (specifically the pivot 16111) and the wire 164 being provided at intervals to avoid the wire 164 from being worn in a process of rotation of the pickup assembly 161, thereby increasing the reliability of the wire 164. For example, the spacer 165 covers a portion of the pivot connecting block 1611 (specifically the pivot shaft 16111) on the circumference of the pivot hole 1354 and a portion of the spacer 165 extends into the pivot hole 1354 to better space the wire 164 from the pivot shaft 16111.

Further, the pivot connecting block 1611 may be configured to be stopped by the spacer 165 after the pickup assembly 161 is rotated at an angle relative to the housing. The angle may be between 90° and 180°. For example, in conjunction with FIGS. 12 to 17, one of an initial position and an ending position of the pickup assembly 161 may be that the connecting rod 1612 is substantially parallel to the header-beam assembly 12, and the other one of the initial position and the ending position may be that the pickup 1613 directs to a mouth of the user.

In some embodiments, the pivot connecting block 1611 may include a pivot 16111 disposed within the pivot hole 1354, and a barb portion 16112 and an operation portion 16113 respectively connected with two ends of the pivot 16111, the barb portion 16112 and the operation portion 16113 are disposed on opposing sides of the housing to lock the pivot connecting block 1611 and the housing in an axial direction of the pivot hole 1354. Correspondingly, a connecting rod 1612 is connected with the operation portion 16113.

In some embodiments, the spacer 165 may include a fixing portion 1651 connected with the housing and an arcuate extension portion 1652 connected with the fixing portion 1651, wherein the fixing portion 1651 may cover a portion of the barb portion 16112 and be provided at intervals from the barb portion 16112 in the axial direction of the pivot hole 1354, and the arcuate extension portion 1652 may extend into the pivot 16111 and be provided at intervals from the pivot hole 1354 in a radial direction of the pivot 16111 to allow the pivot connecting block 1611 to rotate relative to the housing and the spacer 165 connected with the housing. In such cases, the wire 164 may be lapped over the arcuate extension portion 1652 and the fixing portion 1651 when passing through the pivot hole 1354, thereby spacing the wire 164 from the pivot connecting block 1611. Correspondingly, the barb portion 16112 may be stopped by the fixing portion 1651 after the pickup assembly 161 is rotated by an angle relative to the housing.

Further, the headphone 10 may include a circuit board 166 fixed on the housing, the pickup 1613 may be electrically connected with the circuit board 166 through the wire 164, for example, an end of the wire 164 away from the pickup 1613 is soldered to the circuit board 166, and the circuit board 166 and the main board 15 may be connected through a board-to-board connection. The housing (e.g., the housing 135) may be provided with a hot melt post 1355, and the fixing portion 1651 and the circuit board 166 are sleeved onto the hot melt post 1355, which is simple and reliable.

It should be noted that a side of the pivot connecting block 1611 away from the housing is provided with a recessed region, i.e., the recessed region is provided on the operation portion 16113, and the headphone 10 may also include a switch assembly 162 provided in the recessed region, which will not be repeated herein. Further, when the headphone 10 includes the switch assembly 162, since the switch assembly 162 and the pickup assembly 161 are configured to form the stick microphone assembly 16, the stick microphone assembly 16 may also include other electronic components, so that the wire 164 may also be configured to realize an electrical connection between the switch assembly 162 and the other electronic components and the main board 15, and the wire 164 may also be spaced from the pivot connecting block 1611 by the spacer 165, which will not be repeated herein.

Figure 33:
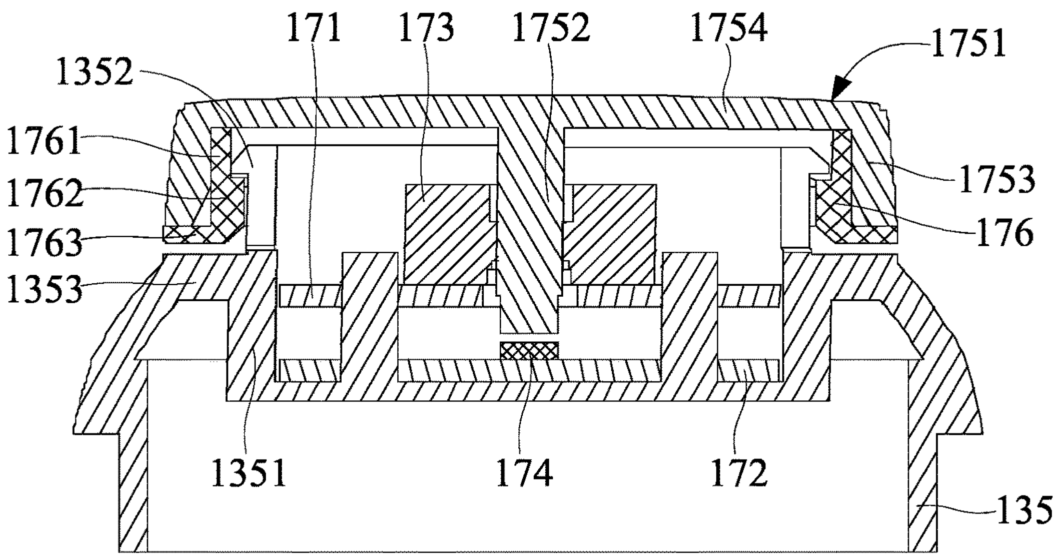
FIG. 33 is a schematic diagram illustrating a cross-sectional structure of a headphone in another view of FIG. 32.

In conjunction with FIGS. 23, 32, and 33, the headphone 10 may also include a function assembly 17 connected with the housing, and the user may control the headphone 10 through the function assembly 17. When the headphone 10 is not provided with the adapter housing 13, the housing may be the core housing 111. When the headphone 10 is provided with the adapter housing 13, the housing may be the core housing 111 or the adapter housing 13. This embodiment is illustrated exemplarily with the housing being the housing 135, and the function assembly 17 may be disposed in the recessed region of the housing 135.

For example, the function assembly 17 may include a first circuit board 171, a second circuit board 172, an encoder 173, a flick switch 174, and a function key 175, the first circuit board 171 and the second circuit board 172 are provided in layers and are coupled to the main board 15 respectively, the encoder 173 is provided on the first circuit board 171, the flick switch 174 is provided on the second circuit board 172 and is disposed on a side of the second circuit board 172 facing the first circuit board 171, the function key 175 may include a key cap 1751 and a key rod 1752 connected to the key cap 1751, the key cap 1751 is disposed on a side of the first circuit board 171 away from the second circuit board 172, a free end of the key rod 1752 away from the key cap 1751 is disposed facing the flick switch 174, and the encoder 173 is sleeved on the key rod 1752. When the user rotates the key bar 1752 through the key cap 1751, the key bar 1752 drives the encoder 173 to generate a first input signal. When the user presses the key bar 1752 through the key cap 1751, the key bar 1752 triggers the flick switch 174 to generate a second input signal. Therefore, the user may perform two operations of rotation and press through a single function key, thereby performing two types of control of the headphone 10, which may expand functions of the headphone 10 and simplify the structure of the headphone 10. Further, the first input signal is configured to control the volume up/down of the headphone 10; and/or, the second input signal is configured to control any one of playing/pausing, song skipping, devices matching, and power on/off of the headphone 10.

In conjunction with FIG. 33, the housing (e.g., housing 135) may include a first cylinder body 1351, and the first circuit board 171 and the second circuit board 172 are disposed in layers along an axial direction (parallel to a preset pressing direction of the function key 175) of the first cylinder body 1351 within the first cylinder body 1351. A side of the key cap 1751 away from the key bar 1752 may be (approximately) flush with the first cylinder body 1351. Further, the functional assembly 17 may also include an adapter ring 176 sleeved on the periphery of the first cylinder body 1351, and the adapter ring 176 is limited along the axial direction of the first cylinder body 1351 and capable of rotating around the axial direction of the first cylinder body 1351. In such cases, the key cap 1751 may be fixedly provided on the adapter ring 176, and the key rod 1752 may be inserted into the first cylinder body 1351 along the axial direction of the first cylinder body 1351 such that the function keys 175 may realize operations of rotation and pressing It should be noted that a bottom of the first cylinder body 1351 may be provided with a plurality of limiting posts provided at intervals along a rotational direction of the function key 175 (i.e., along the pressing direction of the function key 175), and the first circuit board 171 and the second circuit board 172 are sequentially provided at intervals and sleeved onto the plurality of limiting posts, which may prevent the first circuit board 171 from being driven to rotate when the user rotates the key rod 1752 through the key cap 1751 to drive the encoder 173 to rotate, i.e., keep the first circuit board 171 relatively stationary in a rotation direction of the function key 175. Further, the limiting post may include a first limiting section and a second limiting section that are integrally connected, the first limiting section is farther away from the bottom of the first cylinder body 1351 than the second limiting section, and a radial dimension of the first limiting section is smaller than a radial dimension of the second limiting section to form a bearing surface on the limiting post, the first circuit board 171 is supported on the bearing surface to prevent the first circuit board 171 from being driven to move to the second circuit board 172 when the user presses the key rod 1752 through the key cap 1751, i.e., to keep the first circuit board 171 relatively stationary in the rotation direction of the function key 175, thereby maintaining a spacing between the first circuit board 171 and the second circuit board 172 in the pressing direction of the function key 175.

Further, a first buckle 1352 is provided on an outer peripheral wall of the first cylinder body 1351, the adapter ring 176 may include a second cylinder body 1761, a second buckle 1762 is provided on an inner peripheral wall of the second cylinder body 1761, and the first buckle 1352 and the second buckle 1762 buckle each other to prevent the adapter ring 176 from moving along an opposite direction of an insertion direction of the key rod 1752 relative to the first cylinder body 1351, thereby preventing the adapter ring 176 from falling off the first cylinder body 1351 and increasing the reliability of the headphone 10.

It should be noted that the first cylinder body 1351 and the first buckle 1352 thereon are discontinuous in a circumferential direction of the first cylinder body 1351, as shown in FIGS. 32 and 33, a portion of the first cylinder body 1351 has a profile line and another portion of the first cylinder body 1351 and the first buckle 1352 connected with the first cylinder body 1351 do not have a profile line, such that when the adapter ring 176 is buckled with the housing 135, the first buckle 1352 gather facing a center the first cylinder body 1351 to allow the second buckle 1762 and the first buckle 1352 to cross over each other and thereby buckling together.

Further, a first flange 1353 may be provided on the outer peripheral wall of the first cylinder body 1351, a second flange 1763 may be provided on the outer peripheral wall of the second cylinder body 1761, and the first flange 1353 is configured to support the second flange 1763 for limiting a movement of the adapter ring 176 along the insertion direction of the key rod 1752 relative to the first cylinder body 1351, i.e., controlling a stroke of the user pressing the key rod 1752 through the key cap 1751, thereby preventing the key rod 1752 from crushing the flick switch 174 and increasing the reliability of the headphone 10.

Further, the key cap 1751 may include a third cylinder body 1753 and an end plate 1754 connected with the third cylinder body 1753. The third cylinder body 1753 may be sleeved on the periphery of the second cylinder body 1761, and one end of the third cylinder body 1753 is supported on a side of the second flange 1763 away from the first flange 1353 to increase the reliability of a connection between the key cap 1751 and the adapter ring 176. In such cases, the end plate 1754 is provided at another end of the third cylinder body 1753, and the key rod 1752 is provided on the end plate 1754.

Figure 36:
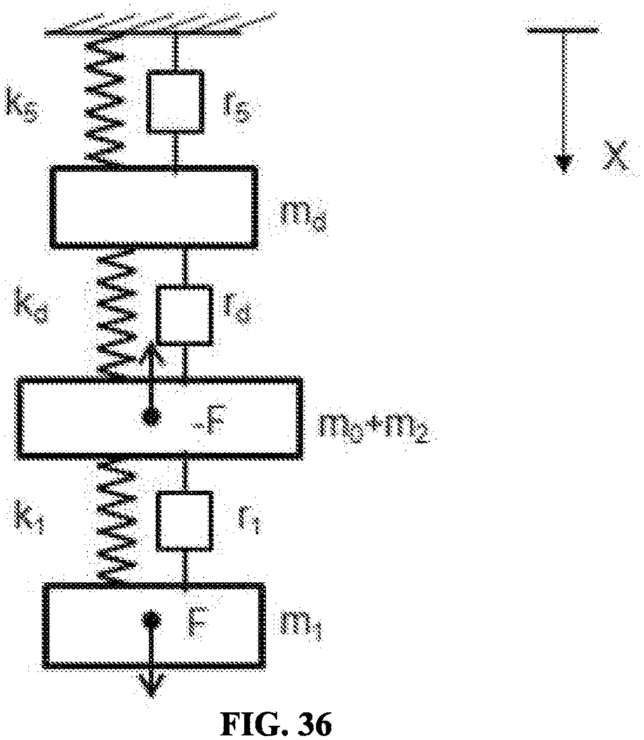
FIG. 36 is a schematic diagram illustrating an equivalent model of a headphone according to some embodiments of the present disclosure.

Based on the equivalent model of the headphone 10, in conjunction with FIG. 36, a vibration equation of the headphone 10 may be expressed as:

$$\begin{bmatrix} m_d & 0 & 0 \\ 0 & m_{02} & 0 \\ 0 & 0 & m_1 \end{bmatrix} \begin{Bmatrix} \ddot{x}_d \\ \ddot{x}_{02} \\ \ddot{x}_1 \end{Bmatrix} + \begin{bmatrix} r_5 + r_d & -r_d & 0 \\ -r_d & r_d + r_1 & -r_1 \\ 0 & -r_1 & r_1 \end{bmatrix} \begin{Bmatrix} \dot{x}_d \\ \dot{x}_{02} \\ \dot{x}_1 \end{Bmatrix} + \begin{bmatrix} k_5 + k_d & -k_d & 0 \\ -k_d & k_d + k_1 & -k_1 \\ 0 & -k_1 & k_1 \end{bmatrix} \begin{Bmatrix} x_d \\ x_{02} \\ x_1 \end{Bmatrix} + \begin{Bmatrix} 0 \\ -F \\ F \end{Bmatrix},$$

where $m_d$ denotes the mass of the core housing 111, $m_{02}$ denotes a sum of a mass $m_0$ and a mass $m_2$ of the vibration panel 114, $m_0$ being a sum of the mass of the coil 1123 and the mass of the frame 1121, $m_1$ denotes the mass of the magnetic circuit system (e.g., including a magnetic guide cover 1124 and the magnet 1125 connected to the bottom of the magnetic guide cover 1124), $r_5$ denotes the damping of the supporting assembly, rd denotes the damping of the first vibration plate 113, $r_1$ denotes the damping of the second vibration plate 1122, $k_5$ denotes the stiffness of the supporting assembly (e.g., the header-beam assembly 12), kd denotes the stiffness of the first vibration plate 113, $k_1$ denotes the stiffness of the second vibration plate 1122, $x_d$ denotes the displacement of the core housing 111, $x_{02}$ denotes the displacement of the coil 1123, the support 1121, and the vibration panel 114 as a whole, $x_1$ denotes the displacement of the magnetic circuit system, and F denotes a driving force generated by the transducer device 112.

Further, based on the above vibration equation, a frequency response curve of the headphone 10 may be obtained, thereby designing and optimizing relevant structural parameters or the like of the headphone 10, such that the acoustic performance of the headphone 10 may be improved. Obviously, for an actual product, a vibration displacement (i.e., an amplitude) of the vibration panel 114 may also be measured based on laser triangulation technique in the non-wearing state, and the vibration displacement of the vibration panel 114 may be converted into an acceleration of the vibration panel 114, which may be further converted into a vibration magnitude of the vibration panel 114, such that the frequency response curve of the vibration panel 114 (e.g., shown in FIG. 37) is obtained. Accordingly, the frequency response curve of the vibration panel 114 may be configured to represent a relationship between the change in vibration magnitude of the vibration panel 114 and the frequency of the vibration panel 114. In the embodiments shown in FIGS. 37 to 41, a horizontal axis of the frequency response curve may represent the frequency in Hz, and a vertical axis may represent the vibration magnitude of the vibration panel 114 in dB. Further, for a certain frequency response curve, a peak resonance frequency and a peak resonance intensity corresponding to a resonant peak or a resonant valley on the frequency response curve may affect the acoustic performance to a certain extent. For an audio signal such as speech, it is generally preferred that the frequency response curve is flat in the frequency within a range of 300 Hz to 3.4 kHz; and for an audio signal such as music, it is generally preferred that the frequency response curve is flat in the frequency within a range of 20 Hz to 20 kHz, thereby making the headphone 10 have a good acoustic performance.

It should be noted that the non-wearing state of the present disclosure may be referred to as that the headphone 10 is not worn by the user, for example, that the headphone 10 is not worn to the head of the user, the supporting assembly is fixed, for example, the header-beam assembly 12 is fixed to a fixing table of a laser vibrometer, and the core module 11 is in a cantilevered state relative to a fixing point of the supporting assembly. In such cases, the vibration panel 114 does not contact a medium (e.g., the skin of the user) other than connecting or contacting the core module 11. In the non-wearing state, the present disclosure may measure a vibration displacement of the vibration panel 114 based on the laser triangulation technique, thereby obtaining a frequency response curve of the vibration panel 114. For example, the laser vibrometer may emit a first laser signal to a test point such as a center of mass, and a geometric center on the vibration panel 114, the first laser signal may include a swept frequency signal within a frequency range of 20-20,000 Hz generated by a distortion analyzer, and the first laser signal may be focused on the test point at a first angle (e.g., 90°). The laser vibrometer may image a laser spot formed on the test point at a second angle, i.e., a second laser signal formed after the first laser signal is reflected or scattered by the vibration panel 114 may be captured by a laser receiver such as a CCD. Compared with a non-vibrating natural state, a relative position of the test point during vibration of the vibration panel 114 changes, i.e., the relative position of the laser spot changes, causing the second angle to change correspondingly and an imaging position of the laser spot on the laser receiver to change correspondingly. In such cases, the vibration displacement of the vibration panel 114 at different moments is obtained, and then the frequency response curve of the vibration panel 114 is obtained.

In conjunction with FIG. 36 and FIG. 1, the vibration panel 114 may vibrate under the driving of the transducer device 112 to transmit the mechanical vibration generated by the transducer device 112 to the user in the wearing state. In conjunction with FIG. 37, a frequency response curve of the vibration panel 114 in the non-wearing state may have at least one resonant peak, such as two resonant peaks, generated jointly by the first transducer 113 and the second vibration plate 1122. In such cases, for ease of description, the two resonant peaks may be further referred to as a first resonant peak P1 and a second resonant peak P2, and a peak resonance frequency of the second resonant peak P2 is greater than a peak resonance frequency of the first resonant peak P1. Obviously, in some other embodiments, the frequency response curve may also have merely one resonant peak generated jointly by the first vibration plate 113 and the second vibration plate 1122 by adjusting the mass, stiffness, and other parameters of each structure in the core module 11.

Further, at a certain frequency, the core housing 111 may resonate with the first vibration plate 113, which causes the core housing 111 to vibrate with a large amplitude thereby causing the vibration panel 114 to hardly vibrate. Combined with FIG. 37, in the non-wearing state, the frequency response curve of the vibration panel 114 includes a resonant valley V0 (which may be referred to as a "middle frequency valley") generated by the first vibration plate 113 within a frequency range of 200 Hz to 1 kHz, for example, a middle frequency valley appears close to 300 Hz. In such cases, the vibration panel 114 hardly vibrates at the frequency corresponding to the middle frequency valley (which may be referred to as a "middle frequency absence"), which is fatal to the acoustic performance of the headphone 10, for example, the user cannot effectively hear the sound. This is because, for the audio signal such as the speech, the middle frequency absence affects the quality of a call, and for the audio signal such as the music, the middle frequency absence affects the quality of playback. Therefore, one of the original inventive ideas of the present disclosure may be to reduce the middle frequency absence of the headphone 10. To this end, an inventive concept of the present disclosure may include the following two ideas: first, shifting the middle frequency valley to a frequency band with a lower or higher frequency, so that the middle frequency valley is not within a specific frequency band, for example, the middle frequency valley of the audio signal such as the speech is not within the frequency band of 300 Hz to 3.4 kHz, and second, reducing the middle frequency valley, for example, decreasing an amplitude (i.e., a peak resonance intensity) of the middle frequency valley, or for example, reducing a half width of the middle frequency valley.

The inventors of the present disclosure have found in their long-term research and development work that, based on the above vibration equation, the peak resonance frequency of the first resonant peak P1 is strongly correlated with the stiffness of the second vibration plate 1122, the peak resonance frequency of the second resonant peak P2 is strongly correlated with the stiffness of the first vibration plate 113, and the peak resonance frequency of the resonant valley V0 is strongly correlated with the stiffness of the first vibration plate 113 and the mass of the core housing 111. A strong correlation of the present disclosure refers to that when the stiffness of the first vibration plate 113 is changed, for example, a local structure of the first vibration plate 113 is damaged or interrupted in a case that the first vibration plate 113 is connected with the transducer device 112 and the core housing 111, the peak resonance frequency of the second resonant peak P2 and the peak resonance frequency of the resonant valley V0 become significantly larger or smaller; when the stiffness of the second vibration plate 1122 is changed, for example, if a local structure of the second vibration plate 1122 is damaged or interrupted in a case that the second vibration plate 1122 is connected with the magnetic circuit system and the frame 1121, the peak resonance frequency of the first resonant peak P1 becomes obviously larger or smaller, and when the mass of the core housing 111 is changed, for example, if curing glue is applied and cured on the core housing 111, the peak resonance frequency of the resonant valley V0 becomes obviously larger or smaller. For example, when the stiffness of the first vibration plate 113 is changed, an absolute value of an offset of the peak resonance frequency of the second resonant peak P2 is greater than an absolute value of an offset of the peak resonance frequency of the first resonant peak P1. When the stiffness of the second vibration plate 1122 is changed, the absolute value of the offset of the peak resonance frequency of the first resonant peak P1 is greater than the absolute value of the offset of the peak resonance frequency of the second resonant peak P2. However, this does not mean that the peak resonance frequency of the first resonant peak P1 and the peak resonance frequency of the second resonant peak P2 are merely related to the stiffness of the second vibration plate 1122 and the stiffness of the first vibration plate 113, respectively. For example, the peak resonance frequency of the first resonant peak P1 is also related to parameters such as the stiffness of the first vibration plate 113, the mass of the magnetic circuit system, etc., and as another example, the peak resonance frequency of the second resonant peak P2 is also related to the stiffness of the second vibration plate 1122, the mass of the magnetic circuit system, the mass of the core housing 111, and other parameters.

Figure 38:
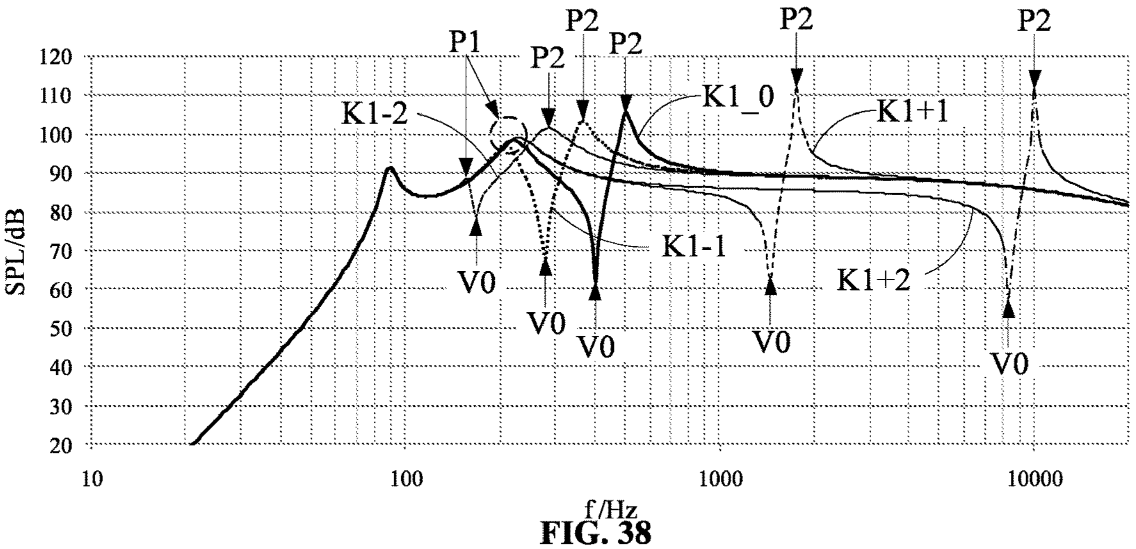
FIG. 38 is a graph illustrating frequency response curves of a vibration panel when a headphone is in a non-wearing state and a first vibration plate thereof has different stiffnesses according to the present disclosure.

In conjunction with FIG. 38, the frequency response curve of the vibration panel 114 in the non-wearing state has a relatively large difference for different stiffnesses of the first vibration plate 113, wherein reference symbols K1-2, K1-1, K1_0, K1+1, and K1+2 respectively denote the stiffness of the first vibration plate 113, and values thereof increase in sequence. Further, compared with a reference stiffness (e.g., K1_0), as the stiffness of the first vibration plate 113 gradually increases (e.g., K1_0→K1+1→K1+2), the peak resonance frequency of the first resonant peak P1 remains basically unchanged, and the peak resonance frequency of the second resonant peak P2 and the peak resonance frequency of the resonant valley V0 become significantly larger, i.e., the second resonant peak P2 and the resonant valley V0 are shifted toward a frequency band of a relatively higher frequency; and as the stiffness of the first vibration plate 113 gradually decreases (e.g., K1_0→K1-1→K1-2), the peak resonance frequency of the first resonant peak P1 becomes slightly smaller, and the peak resonance frequency of the second resonant peak P2 and the peak resonance frequency of resonant valley V0 become obviously smaller, i.e., the second resonant peak P2 and the resonant valley V0 are shifted toward a frequency band of a relatively lower frequency. In short, compared to the peak resonance frequency of the first resonant peak P1, the peak resonance frequency of the second resonant peak P2 and the peak resonance frequency of the resonant valley V0 change significantly with the change in the stiffness of the first vibration plate 113.

In addition, compared to the reference stiffness (e.g., K1_0), as the stiffness of the first vibration plate 113 gradually increases (e.g., K1_0→K1+1→K1+2), the peak resonance intensity of the first resonant peak P1, the peak resonance intensity of the second resonant peak P2, and the peak resonance intensity of the resonant valley V0 remain basically unchanged. As the stiffness of the first vibration plate 113 gradually decreases (e.g., K1_0→K1-1→K1-2), the peak resonance intensity of the second peak resonant peak P2 and the peak resonance intensity of the resonant valley V0 become obviously smaller, and the peak resonance intensity of the first resonant peak P1 first remains basically unchanged and then becomes obviously smaller.

Figure 39:
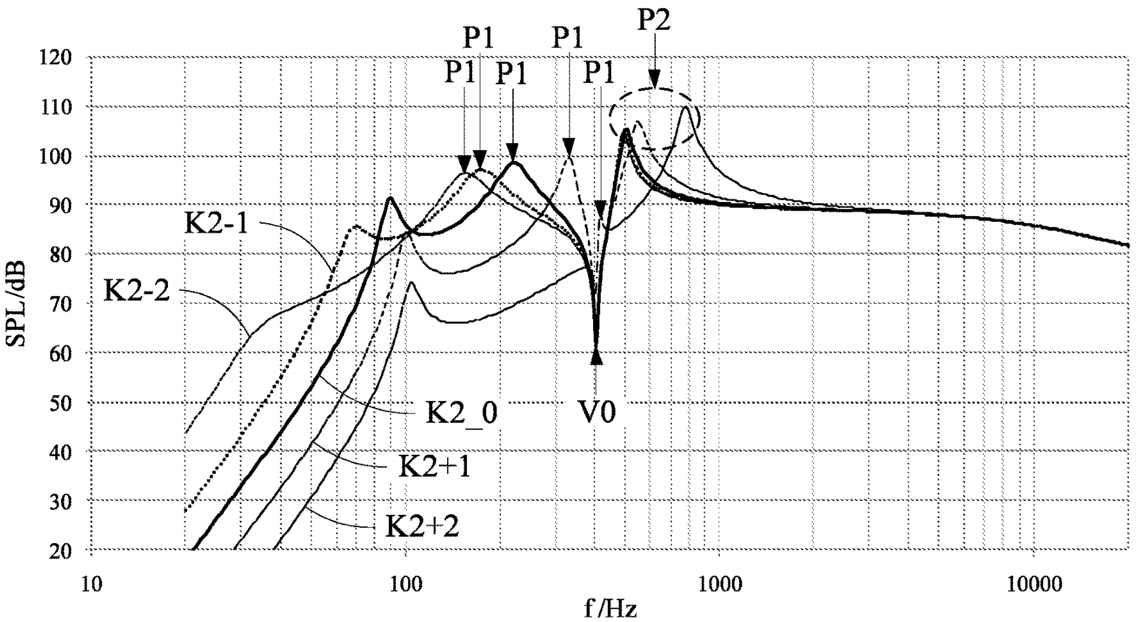
FIG. 39 is a graph illustrating frequency response curves of a vibration panel when a headphone is in a non-wearing state and a second vibration plate thereof has different stiffnesses according to the present disclosure.

In conjunction with FIG. 39, the frequency response curve of the vibration panel 114 in the non-wearing state has a relatively large difference for different stiffnesses of the second vibration plate 1122, wherein reference symbols K2-2, K2-1, K2_0, K2+1, and K2+2 respectively denote the stiffness of the second vibration plate 1122, and the values thereof increase in sequence. Further, compared with the reference stiffness (e.g., K2_0), as the stiffness of the second vibration plate 1122 gradually increases (e.g., K2_0→K2+1→K2+2), the peak resonance frequency of the resonant valley V0 remains basically unchanged, and the peak resonance frequencies of the first resonant peak P1 and the second resonant peak P2 become significantly larger, i.e., the first resonant peak P1 and the second resonant peak P2 are shifted to a frequency band of a higher frequency. And as the stiffness of the second vibration plate 1122 gradually decreases (e.g., K2_0→K2-1→K2-2), the peak resonance frequency of the first resonant peak P1 becomes obviously smaller, i.e., the first resonant peak P1 is shifted toward a frequency band of a lower frequency, and the peak resonance frequency of the second resonant peak P2 and the peak resonance frequency of the resonant valley V0 are basically unchanged. In short, compared to the peak resonance frequency of the resonant valley V0, the peak resonance frequency of the first resonant peak P1 changes significantly with the change in the stiffness of the second vibration plate 1122, and the peak resonance frequency of the second resonant peak P2 also changes with the change in the stiffness of the second vibration plate 1122, but an amount of change thereof is not large.

In addition, compared with the reference stiffness (e.g., K2_0), as the stiffness of the second vibration plate 1122 gradually increases (e.g., K2_0→K2+1→K2+2), the peak resonance intensity of the first resonant peak P1 is basically unchanged at first and then becomes significantly smaller, the peak resonance intensity of the second resonant peak P2 becomes slightly larger, and the peak resonance intensity of the resonant valley V0 is basically unchanged; and as the second vibration plate 1122 stiffness gradually decreases (e.g., K2_0→K2-1→K2-2), the peak resonant intensities of the first resonant peak P1, the second resonant peak P2, and the resonant valley V0 are basically unchanged.

Figure 40:
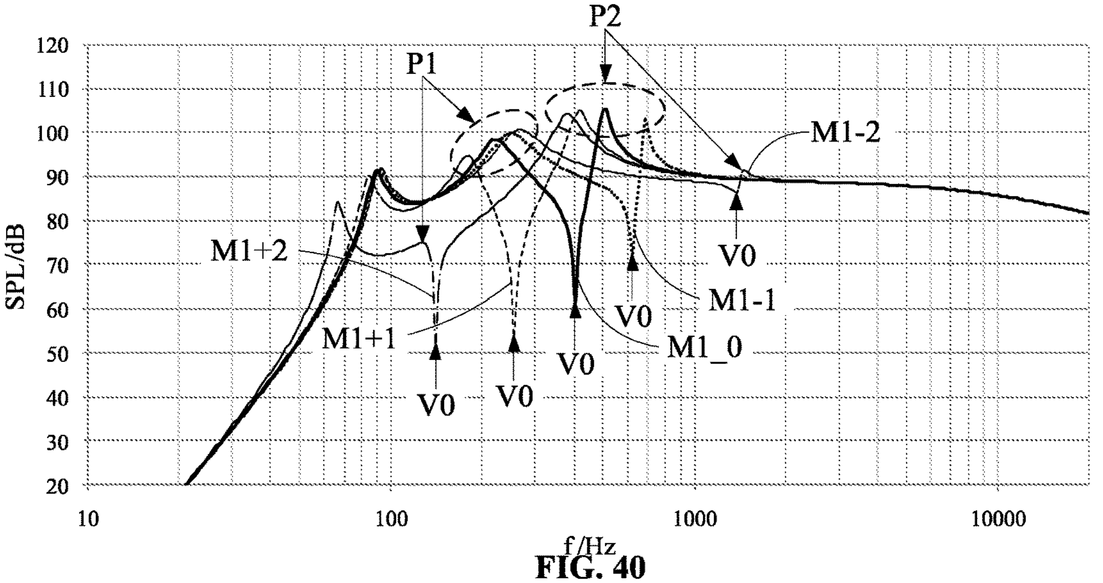
FIG. 40 is a graph illustrating frequency response curves of a vibration panel when a headphone is in a non-wearing state and a core housing thereof has different masses according to the present disclosure.

In conjunction with FIG. 40, the frequency response curve of the vibration panel 114 in the non-wearing state has a relatively large difference in different masses of the core housing 111, wherein reference symbols M1-2, M1-1, M1_0, M1+1, and M1+2 respectively denote the mass of the core housing 111, and the values thereof increase sequentially. Further, compared to the reference mass (e.g., M1_0), as the mass of the core housing 111 gradually increases (e.g., M1_0→M1+1→M1+2), the peak resonance frequency of the first resonant peak P1 and the peak resonance frequency of the second resonant peak P2 become slightly smaller, and the peak resonance frequency of the resonant valley V0 becomes significantly smaller, i.e., the resonant valley V0 shifts to a frequency band of a lower frequency. As the mass gradually decreases (e.g., M1_0→M1-1→M1-2), the peak resonance frequency of the first resonant peak P1 becomes slightly larger, the peak resonance frequency of the second resonant peak P2 and the peak resonance frequency of the resonant valley V0 become obviously larger, i.e., the resonant valley V0 shifts toward a frequency band of a higher frequency. In short, compared to the peak resonance frequency of the first resonant peak P1 and the peak resonance frequency of the second resonant peak P2, the peak resonance frequency of the resonant valley V0 changes significantly with a change in the mass of the core housing 111.

In addition, compared to the reference mass (e.g., M1_0), as the mass of the core housing 111 gradually increases (e.g., M1_0→M1+1→M1+2), the peak resonance intensity of the first resonant peak P1 becomes obviously smaller, the peak resonance intensity of the second resonant peak P2 remains basically unchanged, and the peak resonance intensity of the resonant valley V0 becomes obviously larger. As the mass of the core housing 111 gradually decreases (for example, M1_0→M1-1→M1-2), the peak resonance intensity of the first resonant peak P1 remains basically unchanged, the peak resonance intensity of the second resonant peak P2 remains basically unchanged at first and then becomes obviously smaller, and the peak resonance intensity of the resonant valley V0 becomes obviously smaller.

Further, in conjunction with FIGS. 1 and 36, the first vibration plate 113 may suspend structures such as the transducer device 112, the vibration panel 114, and other structures within the core housing 111, and the second vibration plate 1122 may suspend structures such as the magnetic circuit system of the transducer device 112 within the core housing 111. The total weight to be carried by the first vibration plate 113 is larger than the total weight to be carried by the second vibration plate 1122. Based on this, the stiffness of the first vibration plate 113 may be generally greater than the stiffness of the second vibration plate 1122 so that the first vibration plate 113 and the second vibration plate 1122 respectively meet a corresponding suspending requirement. In other words, when the total weight to be carried is greater, those skilled in the art tend to select a vibration plate with a greater stiffness. When the total weight to be carried is smaller, those skilled in the art tend to select a vibration plate with less stiffness. What is different is that: in the present disclosure, under the condition that a suspending requirement is satisfied, the stiffness of the first vibration plate 113 may be reduced and the stiffness of the second vibration plate 1122 may be increased to adjust the peak resonance frequency corresponding to the resonant peak and the peak resonance intensity corresponding to the resonant peak or the resonant valley on the frequency response curve, which makes the frequency response curve as flat as possible in a frequency range audible to the human ear. For example, the stiffness of the second vibration plate 1122 may be greater than the stiffness of the first vibration plate 113.

Figure 41:
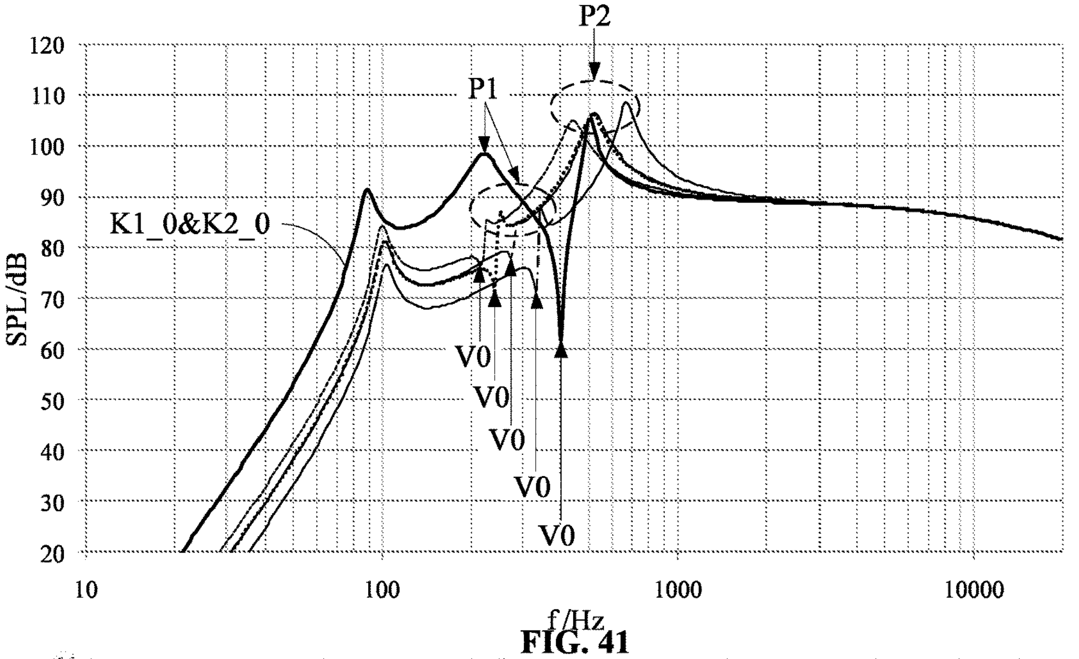
FIG. 41 is a graph illustrating frequency response curves of a vibration panel when a headphone is in a non-wearing state and a first vibration plate and a second vibration plate thereof have different masses according to the present disclosure.

In conjunction with FIG. 41, the frequency response curves of the vibration panel 114 in the non-wearing state have a relatively large difference for different stiffnesses of the first vibration plate 113 and the second vibration plate 1122. Compared to the reference stiffness (K1_0 & K2_0), as the stiffness of the first vibration plate 113 and/or the stiffness of the second vibration plate 1122 is continuously optimized, for example, the stiffness of the first vibration plate 113 is gradually reduced while the stiffness of the second vibration plate 1122 is gradually increased, the peak resonance frequency of the resonant valley V0 may become gradually smaller, that is to say, the resonant valley V0 may be shifted to a frequency band of a lower frequency, which is conducive to reduce the middle frequency absence. Moreover, the peak resonance intensity of the resonant valley V0 may also become gradually smaller, which is conducive to eliminating the middle frequency valley, making the frequency response curve flatter, thereby improving the acoustic performance of the headphone 10. It should be noted that the resonant peak jointly generated by the first vibration plate 113 and the second vibration plate 1122 and the resonant valley generated by the first vibration plate 113, on the frequency response curve shown in FIGS. 37 to 40, are in the form of "peak-valley-peak" (i.e., P1-V0-P2) and the peak resonance intensity of the resonant valley V0 is relatively large. And on the frequency response curve shown in FIG. 41, are in the form of "valley-peak-peak" (i.e., V0-P1-P2), and the peak resonance intensity of the resonant valley V0 is relatively small. In other words, compared to changing one of the stiffness of the first vibration plate 113 and the stiffness of the second vibration plate 1122, a case that the stiffness of the first vibration plate 113 is decreased and the stiffness of the second vibration plate 1122 is increased at the same time may not only shift the resonant valley V0 to a relatively lower frequency band more efficiently but also weaken the resonant valley V0.

In some embodiments, the mass of the core housing 111 may be greater than or equal to 1 g, and the stiffness of the first vibration plate 113 may be less than or equal to 7000 N/m, which may reduce the peak resonance frequency of the resonant valley V0, for example, the peak resonance frequency of the resonant valley V0 is less than or equal to 400 Hz, such that the resonant valley V0 may be shifted toward a frequency band with a lower frequency, which is conducive to reducing the middle frequency absence. In some embodiments, the mass of the core housing 111 may be greater than or equal to 1 g, and the stiffness of the first vibration plate 113 may be less than or equal to 7,000 N/m. In some embodiments, the mass of the core housing 111 may be greater than or equal to 1.2 g, and the stiffness of the first vibration plate 113 may be less than or equal to 5,000 N/m, which may reduce the peak resonance frequency of the resonant valley V0 more effectively. For example, the peak resonance frequency of the resonant valley V0 is less than or equal to 200 Hz, so that the resonant valley V0 is shifted more towards the frequency band of the lower frequency, which is conducive to reducing the middle frequency absence. In addition, the resonant valley V0 is shifted to a frequency band with a relatively lower frequency to make the vibration of the vibration panel 114 weaker in the low frequency band, which is also conducive to reducing a tingling sensation in the low frequency band.

Based on the relevant descriptions above, increasing the mass of the core housing 111 and decreasing the stiffness of the first vibration plate 113 are both conducive to decreasing the peak resonance frequency of the resonant valley V0, i.e., conducive to shifting the resonant valley V0 to a frequency band with a lower frequency. Correspondingly, a ratio of the mass of the core housing 111 to the stiffness of the first vibration plate 113 may be greater than or equal to 0.15 $s^2$. In some embodiments, the ratio of the mass of the core housing 111 to the stiffness of the first vibration plate 113 may be greater than or equal to 0.2 $s^2$. Therefore, when one of the masses of the core housing 111 and the stiffness of the first vibration plate 113 is determined, the other one of the mass of the core housing 111 and the stiffness of the first vibration plate 113 may be determined or optimized so that the peak resonance frequency of the resonant valley V0 is shifted as much as possible towards the frequency band of the lower frequency, thereby reducing the middle frequency absence. In some embodiments, in the non-wearing state, in addition to the resonant valley V0, the frequency response curve of the vibration panel 114 may have at least one resonant peak generated jointly by the first vibration plate 113 and the second vibration plate 1122 within the frequency range of 200 Hz to 2 kHz, such as the first resonant peak P1 and the second resonant peak P2. The peak resonance frequency of the first resonant peak P1 may be between 200 Hz and 400 Hz, and the peak resonance frequency of the second resonant peak P2 is greater than the peak resonance frequency of the first resonant peak P1. Therefore, the headphone 10 is able to obtain a higher sensitivity at least in the low and middle frequency band, i.e., the volume of the low and middle frequency is not too low, which improves the acoustic performance of the headphone 10. Obviously, in some other embodiments, the frequency response curve may also have merely one resonant peak in the frequency range of 200 Hz to 2 kHz, such as the second resonant peak P2.

In some embodiment, the stiffness of the second vibration plate 1122 may be greater than or equal to 1000 N/m to reduce the peak resonance intensity of the first resonant peak P1, thereby weakening the first resonant peak P1 and making the frequency response curve flatter overall. At the same time, the peak resonance frequency of the first resonant peak P1 is also slightly increased, that is, the first resonant peak P1 is slightly shifted to a frequency band of a higher frequency, and the resonant valley V0 is shifted to a frequency band of a lower frequency, so that the peak resonance frequency of the first resonant peak P1 may be larger than the peak resonance frequency of the resonant valley V0. Therefore, the headphone 10 may obtain a higher sensitivity at least in the middle and high frequency band, i.e., the volume in the middle and high frequency band is not too low, which improves the acoustic performance of the headphone 10.

In some embodiments, the mass of the core housing 111 may be less than or equal to 0.5 g, and the stiffness of the first vibration plate 113 may be greater than or equal to 80,000 N/m, which may increase the peak resonance frequency of the resonant valley V0. For example, the peak resonance frequency of the resonant valley V0 is greater than or equal to 2 kHz to cause the resonant valley V0 to shift toward a frequency band with a higher frequency, which is conducive to reducing the middle frequency absence. In some embodiments, the mass of the core housing 111 may be less than or equal to 0.5 g, and the stiffness of the first vibration plate 113 may be greater than or equal to 160,000 N/m, which may increase the peak resonance frequency of the resonant valley V0 more effectively. For example, the peak resonance frequency of the resonant valley V0 is greater than or equal to 4 kHz, such that the resonant valley V0 shifts more towards the frequency band of the higher frequency, which is conducive to reducing the middle frequency absence.

In some embodiment, in the non-wearing state, in addition to the resonant valley V0, the frequency response curve of the vibration panel 114 may have at least one resonant peak generated jointly by the first vibration plate 113 and the second vibration plate 1122, such as the first resonant peak P1 and the second resonant peak P2. The peak resonance frequency of the first resonant peak P1 is smaller than the peak resonance frequency of the resonant valley V0, for example, the peak resonance frequency of the first resonant peak P1 is between 200 Hz and 400 Hz, and the peak resonance frequency of the second resonant peak P2 is greater than the peak resonance frequency of the resonant valley V0. For example, the peak resonance frequency of the second resonant peak P2 is greater than or equal to 4 kHz. Therefore, the headphone 10 is able to obtain a higher sensitivity at least in the low and middle frequency band, that is, the volume of the low and middle frequencies is not excessively low, and the frequency response curve is flatter to improve the acoustic performance of the headphone 10.

In some embodiments, the core module 11 may be provided such that the frequency response curve of the vibration panel 114 vibrating in the non-wearing state has no effective resonant valley in a frequency band within a range of 400 Hz to 2 kHz to reduce the middle frequency absence. An effective resonant valley of the present disclosure satisfies one or more conditions including that a reference line section parallel to a horizontal axis of the frequency response curve has two intersections with the frequency response curve, an intensity corresponding to the reference line section minus a peak resonance intensity of the effective resonant valley is equal to 6 dB, and a difference between frequencies corresponding to two endpoints of the reference line section is less than or equal to 4 octaves, wherein the effective resonant valley is between the two intersections. For example, in the non-worn state, the vibration displacement of the vibration panel 114 is measured using the laser triangulation technique. Then, a frequency response point suspected to be the effective resonance valley (usually a position where the frequency response curve recesses) is selected, and the peak resonance intensity at the frequency response point is obtained. Further, a reference point is obtained by subtracting 6 dB from the peak resonance intensity, and then a reference line parallel to the horizontal axis of the frequency response curve is drawn through the reference point. If the reference line has two intersection points with the frequency response curve, the frequency difference between the two intersection points is further calculated and whether the frequency difference is less than or equal to 4 octaves is determined, and if the frequency difference is less than or equal to 4 octaves, the frequency response point is an effective resonant valley in the present disclosure. Therefore, compared with the effective resonant valley, even if the frequency response curve has a small localized upward convexity (e.g., the resonant peak of the present disclosure) or downward depression (e.g., the resonant valley of the present disclosure) in a certain frequency band, which makes the corresponding frequency response curve seem to be not flat enough, as long as such a small localized upward convexity or depression does not have a substantial adverse effect on the acoustic performance of the headphone 10, the resonant peak or resonant valley is still allowed to exist to take into account the cost of the core module 11. In short, the resonant valley and the effective resonant valley of the present disclosure are two different criteria for evaluating the flatness of the frequency response curve, and both of the two different criteria are mainly directed to the downward depression of the frequency response curve, wherein the effective resonant valley is a kind of resonant valley, but the resonant valley does not necessarily satisfy the definition of the effective resonant valley of the present disclosure.

Based on the relevant descriptions above, the peak resonance frequency of the effective resonant valley is related to parameters such as the stiffness of the first vibration plate 113 and the mass of the core housing 111. For example, the mass of the core housing 111 and/or the stiffness of the first vibration plate 113 may be configured such that the frequency response curve does not have an effective resonant valley within a frequency range of 400 Hz to 2 kHz to reduce the middle frequency absence. The frequency response curve having no effective resonant valley in the frequency band within a range of 400 Hz to 2 kHz refers to that a recessed position on the frequency response curve such as a resonant valley does not satisfy a definition of the effective resonant valley in the present disclosure, or refers to that a recessing position on the frequency response curve such as a resonant valley satisfies a definition of the effective resonant valley in the present disclosure but has a peak resonance frequency that is not within the frequency band within a range of 400 Hz to 2 kHz.

Further, in the non-wearing state, in addition to the effective resonant valley, the frequency response curve of the vibration panel 114 may have at least one resonant peak generated jointly by the first vibration plate 113 and the second vibration plate 1122 within the frequency band of 200 Hz to 2 kHz to make the volume in the middle frequency band not excessively low, which is conducive to improving the acoustic performance of the headphone 10. In some embodiments, the mass of the core housing 111 may be greater than or equal to 1 g, the stiffness of the first vibration plate 113 may be less than or equal to 2,500 N/m, and the stiffness of the second vibration plate 1122 may be less than or equal to 100,000 N/m. In other embodiments, the mass of the core housing 111 may be less than or equal to 0.5 g, and the stiffness of the first vibration plate 113 may be greater than or equal to 800,000 N/m. The stiffness of the first vibration plate 113 may be greater than or equal to 80,000 N/m, and the stiffness of the second vibration plate 1122 may be between 1,000 N/m and 500,000 N/m.

In some embodiment, the mass of the core housing 111 and/or the stiffness of the first vibration plate 113 may be configured such that the frequency response curve has no effective resonant valley in the frequency band within a range of 200 Hz to 2 kHz to reduce the middle frequency absence within a wider frequency band. The frequency response curve not having the effective resonant valley in the frequency band within a range of 200 Hz to 2 kHz refers to that a recessed position on the frequency response curve such as a resonant valley does not satisfy the definition of the effective resonant valley in the present disclosure, or refers to that the recessed position on the frequency response curve such as the resonant valley satisfies the definition of the effective resonant valley in the present disclosure but has peak resonance frequency that is not in the frequency band within a range of 200 Hz to 2 kHz. In some embodiments, the mass of the core housing 111 may be greater than or equal to 1 g, and the stiffness of the first vibration plate 113 may be less than or equal to 2500 N/m to reduce the peak resonance frequency of the effective resonant valley. For example, the peak resonance frequency of the effective resonant valley is less than or equal to 200 Hz such that the effective resonant valley may shift more toward a frequency band of a lower frequency, which is conducive to reducing the middle frequency absence. In some other embodiments, the mass of the core housing 111 may be less than or equal to 0.5 g, and the stiffness of the first vibration plate 113 may be greater than or equal to 80,000 N/m to increase the peak resonance frequency of the effective resonant valley, for example, the peak resonance frequency of the effective resonant valley is greater than or equal to 2 kHz, so that the effective resonant valley is shifted more toward a frequency band of a higher frequency, which is conducive to reducing the middle frequency absence.

Further, the mass of the core housing 111 and/or the stiffness of the first vibration plate 113 may be configured such that the frequency response curve has no effective resonant valley in the frequency band within a range of 200 Hz to 4 kHz to reduce the middle frequency absence in a wider frequency band. The frequency response curve not having the effective resonant valley in the frequency band within a range of 200 Hz to 4 kHz refers to that a recessed position on the frequency response curve such as a resonant valley does not satisfy the definition of an effective resonant valley in the present disclosure, or refers to that the recessed position on the frequency response curve such as a resonant valley satisfies the definition of the effective resonant valley in the present disclosure but has a peak resonance frequency that is not in the frequency band within a range of 200 Hz to 4 kHz. In some embodiments, the mass of the core housing 111 may be greater than or equal to 1 g, and the stiffness of the first vibration plate 113 may be less than or equal to 2500 N/m to more reduce the peak resonance frequency of the effective resonant valley. For example, the peak resonance frequency of the effective resonant valley is less than or equal to 200 Hz such that the effective resonant valley shifts more toward a frequency band of a lower frequency, which is conducive to reducing the middle frequency absence. In some other embodiments, the mass of the core housing 111 may be less than or equal to 0.5 g, and the stiffness of the first vibration plate 113 may be greater than or equal to 160,000 N/m to increase the peak resonance frequency of the effective resonant valley, for example, the peak resonance frequency of the effective resonant valley is greater than or equal to 4 kHz such that the effective resonant valley is shifted to a frequency band of a higher frequency, which is conducive to reducing the middle frequency absence.

In some embodiment, the mass of the core housing 111 and/or the stiffness of the first vibration plate 113 may be configured such that the frequency response curve has an effective resonant valley in the frequency band within a range of 200 Hz to 400 Hz, which is conducive to preventing the effective resonant valley from appearing in the middle frequency band, thereby reducing the middle frequency absence. For example, the mass of the core housing 111 may be greater than or equal to 1 g, and the stiffness of the first vibration plate 113 may be less than or equal to 7,000 N/m to reduce the peak resonance frequency of the effective resonant valley, for example, the peak resonance frequency of the effective resonant valley is less than or equal to 400 Hz such that the effective resonant valley is shifted to a frequency band with a lower frequency, thereby reducing the middle frequency absence. In addition, the effective resonant valley is shifted to the frequency band with the lower frequency to make the vibration of the vibration plate in the low-frequency band weaker, which is also conducive to reducing the tingling sensation in the low-frequency band. Further, in the non-wearing state, in addition to the effective resonant valley, the frequency response curve of the vibration panel 114 may have two resonant peaks generated jointly by the first transmitting vibrator 113 and the second transmitting vibrator 1122 in the frequency band within a range of 400 Hz to 2 kHz, i.e., the peak resonance frequencies of the two resonant peaks may be greater than the peak resonance frequency of the effective resonant valley, respectively. For example, the stiffness of the second vibration plate 1122 may be greater than or equal to 1000 N/m to reduce the peak resonance intensity of the first resonant peak, thereby weakening the first resonant peak and making the frequency response curve flatter overall. At the same time, the peak resonance frequency of the first resonant peak is also slightly increased, that is, the first resonant peak is slightly shifted to the frequency band with the higher frequency. The effective resonant valley is shifted to a frequency band with a lower frequency, so that the peak resonance frequency of the first resonant peak may be greater than the peak resonance intensity of the effective resonant valley. Therefore, the headphone 10 is able to obtain a higher sensitivity at least in the low and middle frequency band, i.e., the volume of the low and middle frequencies is not too low, thereby improving the acoustic performance of the headphone 10.

In some embodiment, the mass of the core housing 111 and/or the stiffness of the first vibration plate 113 may be configured such that the frequency response curve has an effective resonant valley in a frequency band within the range of 2 kHz to 20 kHz, which is conducive to preventing the effective resonant valley from appearing in the middle frequency band, thereby reducing the middle frequency absence. For example, the mass of the core housing 111 may be less than or equal to 0.5 g, and the stiffness of the first vibration plate 113 may be greater than or equal to 80,000 N/m to increase the peak resonance frequency of the effective resonant valley, for example, the peak resonance frequency of the effective resonant valley is greater than or equal to 2 kHz such that the effective resonant valley is shifted toward a frequency band with a higher frequency, thereby reducing the middle frequency absence.

In some embodiments, in the non-wearing state, the frequency response curve of the vibration panel 114 may have the first resonant peak and the second resonant peak generated jointly by the first vibration plate 113 and the second vibration plate 1122, the peak resonance frequency of the first resonant peak is smaller than the peak resonance frequency of the second resonant peak, and there is no effective resonant valley between the first resonant peak and the second resonant peak, which is not only conducive to increasing the flatness of the frequency response curve between the two resonant peaks, but also conducive to reducing the middle frequency absence of the frequency response curve at a certain frequency point or frequency band between the two resonant peaks. The frequency response curve not having the effective resonant valley between the first resonant peak and the second resonant peak refers to that a recessed position on the frequency response curve, such as a resonant valley, does not satisfy the definition of an effective resonant valley in the present disclosure, or refers to that the recessed position on the frequency response curve, such as the resonant valley, satisfies the definition of an effective resonant valley in the present disclosure but has a peak resonance frequency that is not between the first resonant peak and the second resonant peak. Further, the peak resonance frequency of the first resonant peak may be within a range of 80 Hz to 400 Hz, and the peak resonance frequency of the second resonant peak may be within a range of 100 Hz to 2 kHz. In some embodiments, the peak resonance frequency of the first resonant peak may be within a range of 200 Hz to 400 Hz, and the peak resonance frequency of the second resonant peak may be within a range of 400 Hz to 2 kHz.

Based on the relevant description above, the mass of the core housing 111 may be greater than or equal to 1 g, the stiffness of the first vibration plate 113 may be less than or equal to 7000 N/m, and the stiffness of the second vibration plate 1122 may be greater than or equal to 1000 N/m. In some embodiments, the mass of the core housing 111 may be greater than or equal to 1.2 g, the stiffness of the first vibration plate 113 may be less than or equal to 5000 N/m, and the stiffness of the second vibration plate 1122 may be greater than or equal to 3000 N/m.

In some embodiments, in the non-wearing state, the frequency response curve of the vibration panel 114 may have a resonant valley V0 generated by the first vibration plate 113, and a first resonant peak P1 and a second resonant peak P2 generated jointly by the first vibration plate 113 and the second vibration plate 1122, the resonant valley V0 having the peak resonance frequency that is less than a peak resonance frequency of the first resonant peak P1, and the peak resonance frequency of the first resonant peak P1 is smaller than the peak resonance frequency of the second resonant peak P2, which may not only reduce the middle frequency absence between the two resonant peaks on the frequency response curve, but also increase a flatness of the frequency response curve between the two resonant peaks. In some embodiments, the peak resonance frequency of the resonant valley V0 may be greater than or equal to 400 Hz. For example, the mass of the core housing 111 may be less than or equal to 1 g, the stiffness of the first vibration plate 113 may be greater than or equal to 7000 N/m, and the stiffness of the second vibration plate 1122 may be greater than or equal to 1000 N/m. In some other embodiments, the peak resonance frequency of the second resonant peak P2 may be less than or equal to 1 kHz. For example, the mass of the core housing 111 may be less than or equal to 1 g, the stiffness of the first vibration plate 113 may be greater than or equal to 7000 N/m, and the stiffness of the second vibration plate 1122 may be between 20000 N/m and 50000 N/m.

Figure 37:
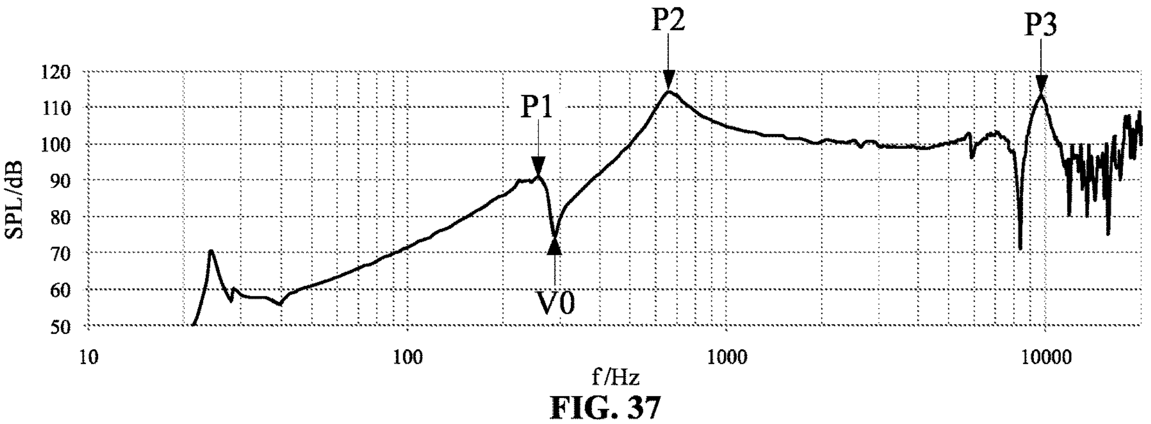
FIG. 37 is a graph illustrating frequency response curves of a vibration panel of a headphone in a non-wearing state according to some embodiments of the present disclosure.

In some embodiments, in conjunction with FIG. 37, in the non-wearing state, the frequency response curve of the vibration panel 114 may also have a resonant peak that is strongly correlated with the stiffness of the frame 1121, and the resonant peak may be defined as a third resonant peak P3. The stiffness of the frame 1121 may be greater than or equal to 100,000 N/m to make the peak resonance frequency of the third resonant peak P3 greater than or equal to 4 kHz, thereby making the frequency response curve in the middle and high frequency band and a higher frequency band as flat as possible, which is conducive to improving the acoustic performance of the headphone 10. In some embodiments, the material of the frame 1121 may include any one of polymer materials such as polycarbonate, nylon, plastic titanium, etc., such that the frame 1121 may have a sufficient rigid, thereby making the third resonant peak P3 shift toward the frequency band of higher frequency as much as possible. In some other embodiments, the frame 1121 may include a substrate and a reinforcing body, the substrate may be made of any one of polymer materials such as polycarbonate, nylon, plastic titanium, etc., and the reinforcing body may be glass fiber or carbon fiber doped in the substrate, or the reinforcing body may be aluminum alloy or stainless steel molded on the substrate through an overmolding technique to further increase the stiffness of the frame 1121, so that the third resonant peak P3 is shifted toward the higher frequency band as much as possible. Further, a ratio of an average thickness of the frame 1121 and an area of the frame 1121 may be greater than or equal to 0.01 $mm^{-1}$ to increase the stiffness of the frame 1121 such that the third resonant peak P3 is shifted toward the frequency band of the higher frequency as much as possible. The area of the frame 1121 may be referred to as an area of an orthographic projection of the frame 1121 along the vibration direction of the transducer device 112, and the average thickness of the frame 1121 may be equal to a volume of the frame 1121 divided by the area of the frame 1121, and both the area and the volume of the frame 1121 may be measured.

It should be noted that the stiffness of the first vibration plate 113 of the present disclosure may be measured as follows: first, an edge of the first vibration plate 113 is fixed on a fixing table of a tester such as a klystron, then a probe of the klystron is aligned with a test point such as a center of mass and a geometrical center of the first vibration plate 113, then a plurality of values of displacements are inputted into a control panel of the klystron, and corresponding relationships between the parameters such as the pressing force, the displacement, or the like of the probe is recorded to obtain a displacement-force curve (a horizontal axis of the displacement-force curve and a vertical axis of the displacement-force curve respectively represent the displacement and the force), and finally a slope of an inclined straight line section of the curve is obtained to obtain the stiffness of the first vibration plate 113. Each displacement may represent a distance moved by the probe, the movement of the probe may cause a deformation of the first vibration plate 113, and the deformation of the first vibration plate 113 caused by each displacement may not exceed a maximum deformation of the first vibration plate 113. Further, because the deformation of the first diaphragm 113 lags behind the movement of the probe, the displacement-force curve may have a curve section that is almost parallel to the horizontal axis, and the curve section parallel to the horizontal axis may be disregarded in calculating the stiffness of the first diaphragm 113. Obviously, the stiffness of the second vibration plate 1122, the stiffness of the frame 1121, and other stiffness of structures may also be measured in the same or similar manner and will not be repeated herein.

The above is merely a portion of the embodiments of the present disclosure, not to limit the scope of protection of the present disclosure, where the use of the present disclosure specification and the accompanying drawings of an equivalent device or an equivalent process transformation, or directly or indirectly in other related technical fields, are included in the scope of patent protection of the present disclosure.

What is claimed is:

1. A headphone, comprising:

a supporting assembly and a core module connected with the supporting assembly, wherein the supporting assembly is configured to support the core module to be worn at a wearing position, the core module includes a core housing, a transducer device, and a vibration panel, the transducer device is provided in a accommodating cavity of the core housing, and the vibration panel is connected with the transducer device and is configured to transmit a mechanical vibration generated by the transducer device to a user, wherein in a wearing state and along a coronal axis of the user, a center of a side of the vibration panel facing the wearing position is closer to an outer ear canal of the user than a center of a side of the core housing facing the wearing position along a sagittal axis of the user.

2. The headphone of claim 1, wherein a center of the vibration panel projected orthogonally onto the core housing along a vibration direction of the transducer device coincides with a center of the transducer device projected orthogonally onto the core housing along the vibration direction, and the center of the transducer device projected orthogonally onto the core housing along the vibration direction does not coincide with a center of a side of the core housing facing the transducer device along the vibration direction.

3. The headphone of claim 1, wherein a center of the transducer device projected orthogonally onto the core housing along a vibration direction of the transducer device coincides with a center of a side of the core housing facing the transducer device along the vibration direction, and a center of the vibration panel projected orthogonally onto the core housing along the vibration direction does not coincide with the center of the transducer device projected orthogonally onto the core housing along the vibration direction.

4. The headphone of claim 1, wherein the headphone further comprises an adapter housing connecting the core housing and the supporting assembly, the adapter housing includes a cylinder sidewall disposed at a periphery of the core housing, an orthographic projection of the core housing and an orthographic projection of the cylinder sidewall on a reference plane perpendicular to a vibration direction of the transducer device respectively have a first center and a second center, and in the wearing state, the first center is closer to the outer ear canal of the ear of the user relative to the second center.

5. The headphone of claim 4, wherein the core housing rotates around a first axis relative to the adapter housing, the first center and the second center are provided at intervals along a direction where the first axis is located.

6. The headphone of claim 5, wherein the first center and the second center are on the first axis.

7. The headphone of claim 5, wherein the adapter housing rotates around a second axis relative to the supporting assembly, and the second axis crosses the first axis.

8. The headphone of claim 4, wherein the headphone further comprises a battery and a main board coupled to the transducer device, the adapter housing further includes a center plate coupled to an inner side of the cylinder sidewall and an outer housing buckled with the cylinder sidewall, the battery or the main board is provided between the outer housing and the center plate, and the core housing is disposed at a side of the center plate away from the outer housing.

9. The headphone of claim 1, wherein the supporting assembly is a header-beam assembly, the header-beam assembly is configured to wrap around a top of a head of the user and to allow the vibration panel to contact a cheek of the user, in the wearing state, the header-beam assembly and the top of the head form a first contacting point, the vibration panel and the cheek of the user form a second contacting point, and a spacing between the second contacting point and the first contacting point along the sagittal axis of the user is between 20 mm and 30 mm.

10. The headphone of claim 9, wherein the header-beam assembly includes an arcuate header-beam member and an adapter member, the arcuate header-beam member is configured to wrap around the top of the head of the user, the adapter member includes a first connecting section, an intermediate transition section, and a second connecting section, the intermediate transition section connects the first connecting section and the second connecting section, the first connecting section and the second connecting section are respectively bent relative to the intermediate transition section and extend along opposite directions, the first connecting section is connected with the arcuate header-beam member, and the second connecting section is connected with the adapter housing;

wherein viewed along the coronal axis of the user, the intermediate transition section is inclined relative to a vertical axis of the user.

11. The headphone of claim 9, wherein the spacing between the second contacting point and the first contacting point along the sagittal axis of the user is between 22 mm and 28 mm.

12. The headphone of claim 9, wherein the spacing between the second contacting point and the first contacting point along the sagittal axis of the user is 25 mm.

13. The headphone of claim 10, wherein the first connecting section is bent at an angle greater than or equal to 90° and less than 180° relative to the intermediate transition section.

14. The headphone of claim 10, wherein the second connecting section is bent at an angle greater than or equal to 90° and less than 180° relative to the intermediate transition section.

15. The headphone of claim 10, wherein in the wearing state and viewed along the coronal axis of the user, the first connecting section is parallel to the second connecting section, and a spacing between the first connecting section and the second connecting section is between 20 mm and 30 mm.

16. The headphone of claim 10, wherein the first connecting section and the second connecting section are respectively provided with a wiring cavity, the intermediate transition section is provided with an opening slot, the wiring cavity of the first connecting section and the wiring cavity of the second connecting section are in flow communication via the opening slot such that a wiring of the headphone extends from the core module to the arcuate header-beam member through the adapter member, the header-beam assembly further includes a sealing member embedded in the opening slot, and the sealing member covers the wiring.

17. The headphone of claim 16, wherein the adapter member is made of metal and the arcuate header-beam member is made of plastic.

18. The headphone of claim 16, wherein the first connecting section is capable of extending from or retracting into the arcuate header-beam member under an action of an external force.

19. The headphone of claim 9, wherein a pressing force of the core module applied on the cheek of the user is between 0.4 N and 0.8 N.

20. The headphone of claim 19, wherein the pressing force of the core module applied on the cheek of the user is between 0.5 N and 0.6 N.

* * * * *